(12) United States Patent
Elwell

(10) Patent No.: US 7,486,193 B2
(45) Date of Patent: Feb. 3, 2009

(54) OCCUPANCY SENSOR NETWORK

(75) Inventor: Brian Elwell, Tyrone, GA (US)

(73) Assignee: Cooper Technologies Company, Houston, TX (US)

( * ) Notice: Subject to any disclaimer, the term of this patent is extended or adjusted under 35 U.S.C. 154(b) by 176 days.

(21) Appl. No.: 11/347,920

(22) Filed: Feb. 6, 2006

(65) Prior Publication Data

US 2007/0182580 A1    Aug. 9, 2007

(51) Int. Cl.
G08B 23/00    (2006.01)
(52) U.S. Cl. .................... 340/573.1; 340/933; 340/992; 340/943; 701/1; 701/117
(58) Field of Classification Search ............. 340/573.1, 340/933, 938, 939, 943, 951–952, 989–992; 701/1, 117
See application file for complete search history.

(56) References Cited

U.S. PATENT DOCUMENTS

| | | | |
|---|---|---|---|
| 3,710,098 A | 1/1973 | Walden | |
| 3,725,888 A | 4/1973 | Solomon | |
| 4,433,809 A * | 2/1984 | Schulz | 236/47 |
| 4,660,024 A | 4/1987 | McMaster | |
| 4,764,755 A | 8/1988 | Pedtke et al. | |
| 4,882,567 A | 11/1989 | Johnson | |
| 5,077,548 A | 12/1991 | Dipoala | |
| 5,189,393 A | 2/1993 | Hu | |
| 5,357,170 A | 10/1994 | Luchaco et al. | |
| 5,406,173 A | 4/1995 | Mix et al. | |
| 5,442,177 A | 8/1995 | Boulos et al. | |
| 5,489,827 A * | 2/1996 | Xia | 315/294 |
| 5,640,143 A | 6/1997 | Myron et al. | |
| 5,729,019 A * | 3/1998 | Krafthefer et al. | 250/353 |
| 5,764,146 A * | 6/1998 | Baldwin et al. | 340/567 |
| 5,867,099 A | 2/1999 | Keeter | |
| 5,986,357 A | 11/1999 | Myron et al. | |
| 6,078,253 A | 6/2000 | Fowler | |
| 6,285,912 B1 * | 9/2001 | Ellison et al. | 700/11 |
| 6,587,049 B1 * | 7/2003 | Thacker | 340/573.1 |
| 6,628,091 B2 | 9/2003 | Griffin et al. | |
| 2005/0237733 A1 * | 10/2005 | Laski et al. | 362/147 |
| 2007/0182554 A1 | 8/2007 | Elwell | |
| 2007/0182581 A1 | 8/2007 | Elwell | |
| 2007/0183329 A1 | 8/2007 | Elwell | |

OTHER PUBLICATIONS

U.S. Appl. No. 11/174,716, Elwell.

* cited by examiner

*Primary Examiner*—Daniel Previl
(74) *Attorney, Agent, or Firm*—King & Spalding LLP

(57) ABSTRACT

An occupancy sensor includes an acoustic transmitter and an acoustic receiver each operably coupled to a controller. The sensor further includes a communication interface operably coupled to the controller and capable of transmitting and receiving communication signals to and from a communication network through the communication interface. The sensor also includes memory for storing operation aspects, such as a network address associated with the sensor, information representative of data corresponding to the defined region monitored by the sensor, an office plan location for the sensor, and an operating schedule for the sensor. One or more operational aspects of the occupancy sensor may be adjusted through the use of a remote control or a local control at the sensor. The occupancy sensor processes acoustic and/or infrared signals to determine the presence or absence of an occupant within a defined region.

12 Claims, 75 Drawing Sheets

OCCUPANCY SENSOR NETWORK

CROSS REFERENCE TO RELATED APPLICATIONS

The present application is related to the following: U.S. utility patent application Ser. No. 11/348,204 filed on Feb. 6, 2006, U.S. Utility patent application Ser. No. 11/174,716, filed on Feb. 6, 2006, U.S. utility patent application Ser. No. 11/348,132 filed on Feb. 6, 2006, and U.S. utility patent application Ser. No. 11/348,133, filed on Feb. 6, 2006, the disclosures of which are incorporated herein by reference.

BACKGROUND

The present disclosure relates in general to lighting and in particular to electrical control systems.

DETAILED DESCRIPTION

Figure 1:
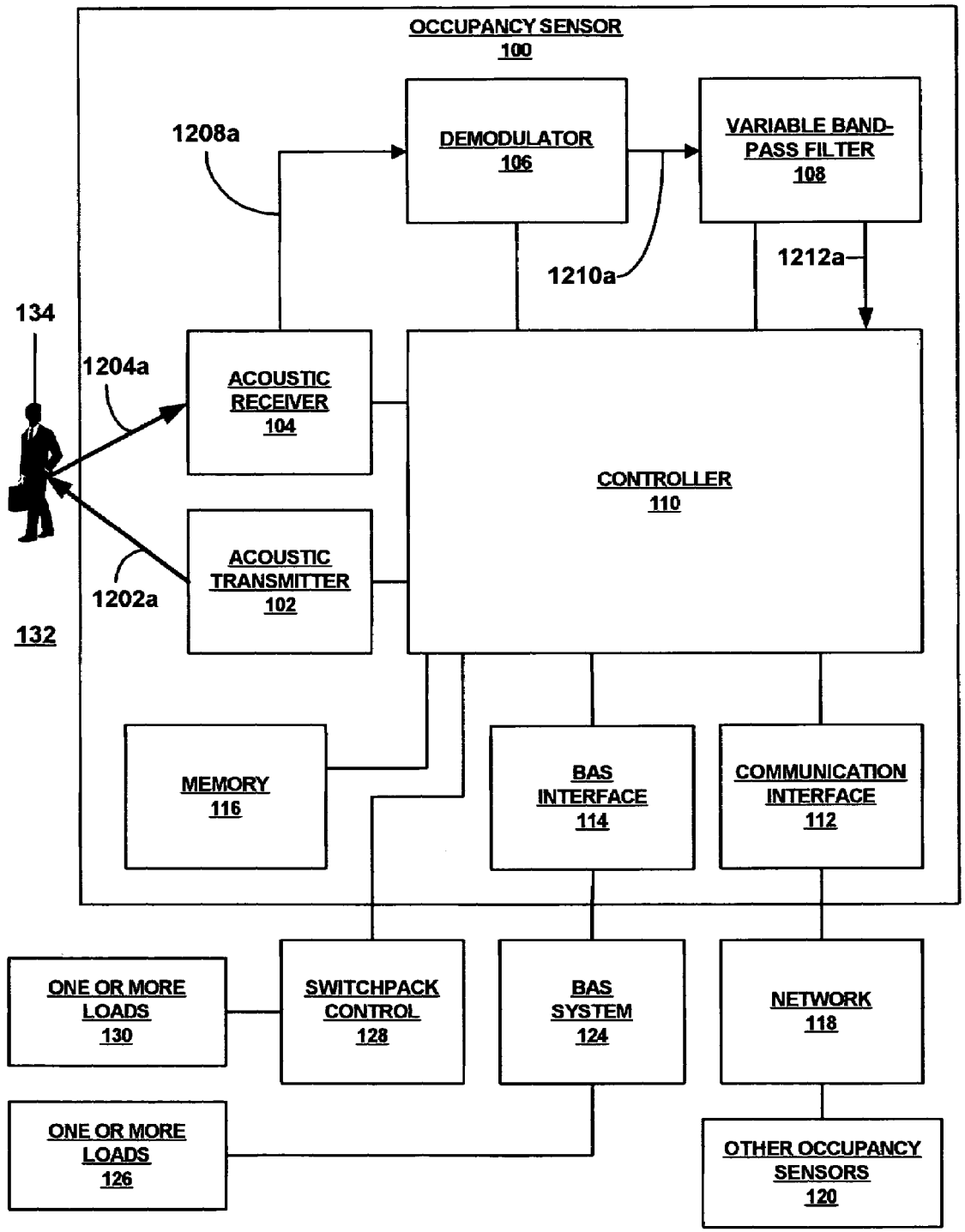
FIGS. 1-11 are schematic illustrations of an exemplary embodiment of a control system including an occupancy sensor.
Figure 2:
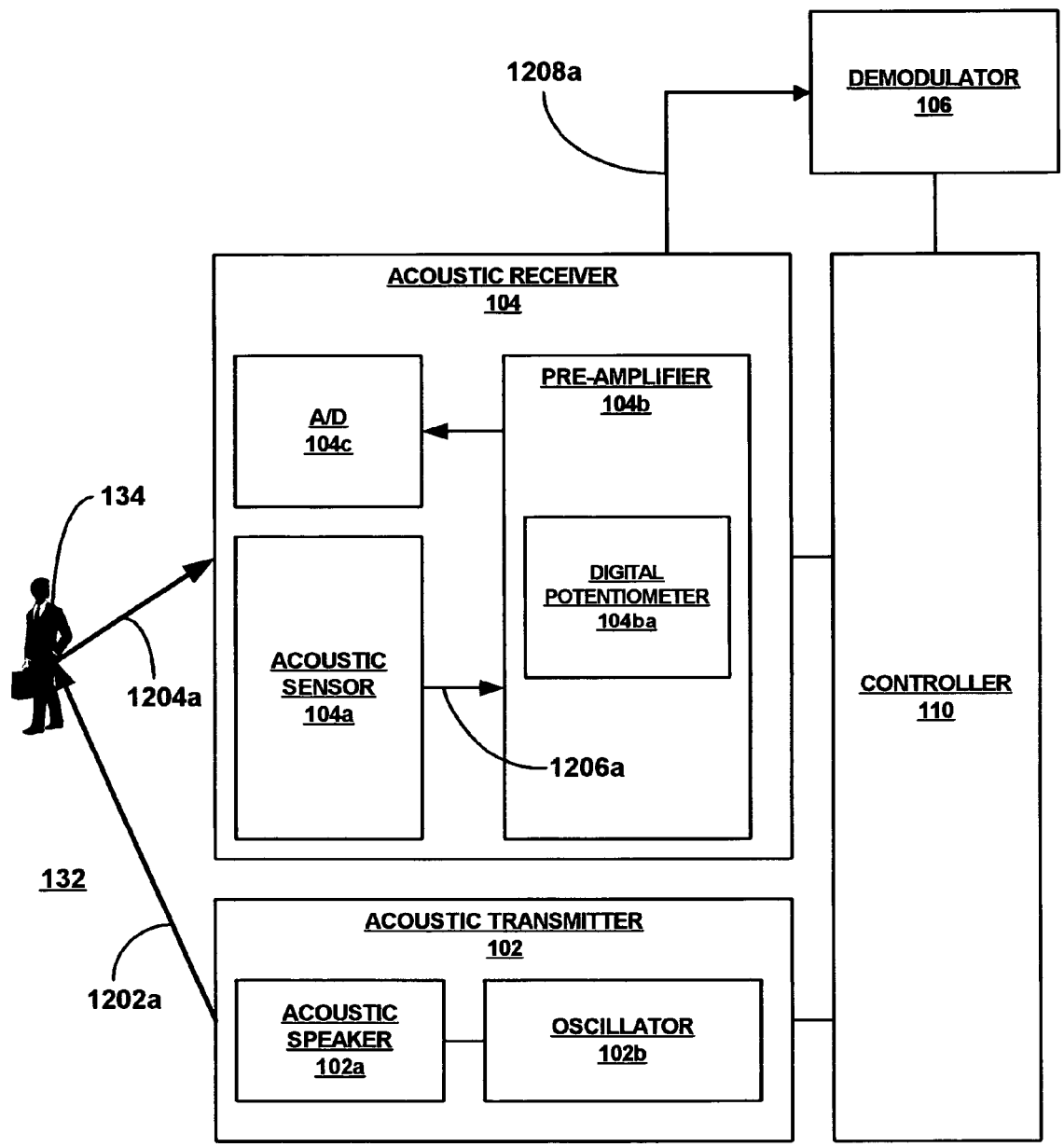
Figure 3:
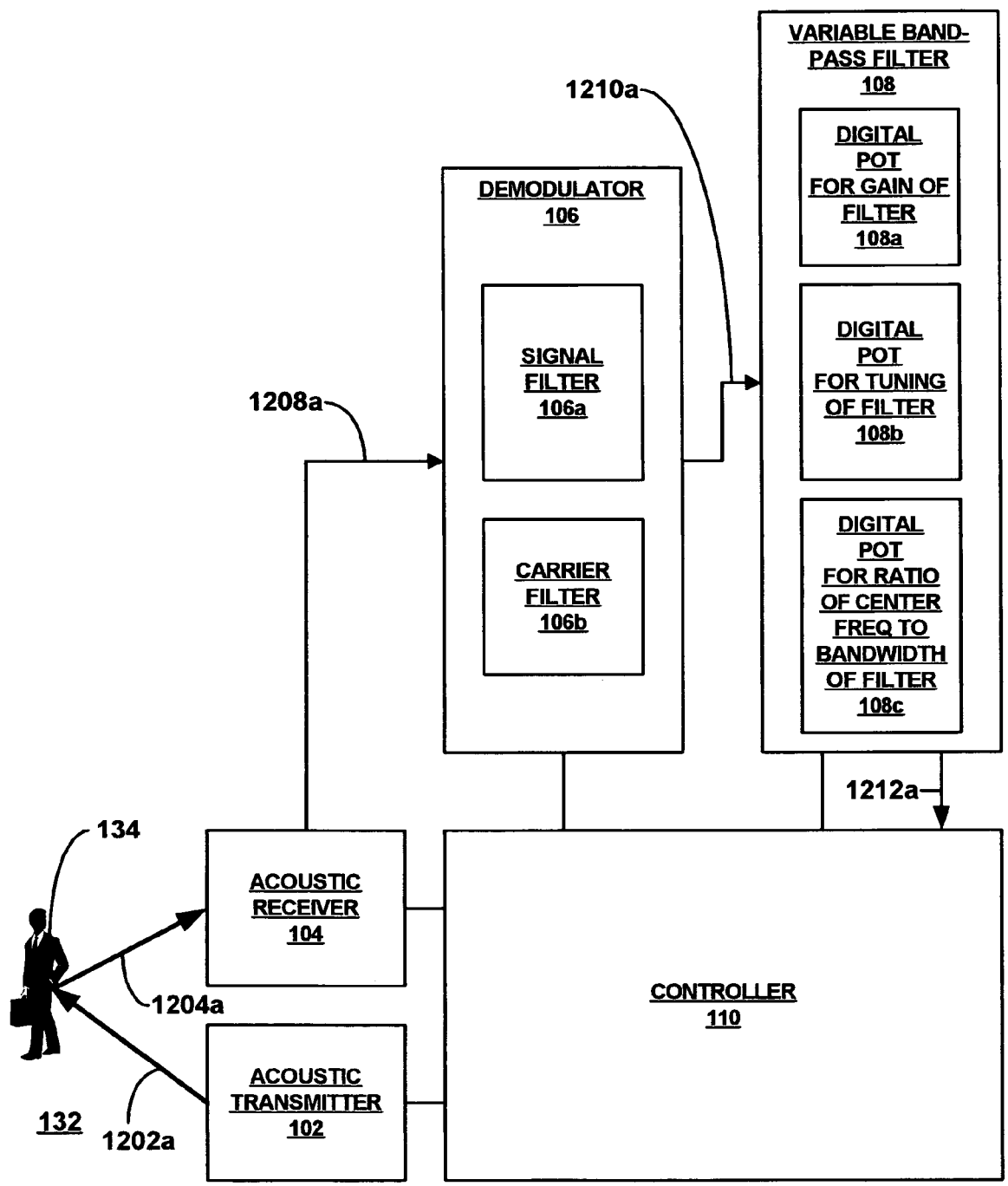
Figure 4:
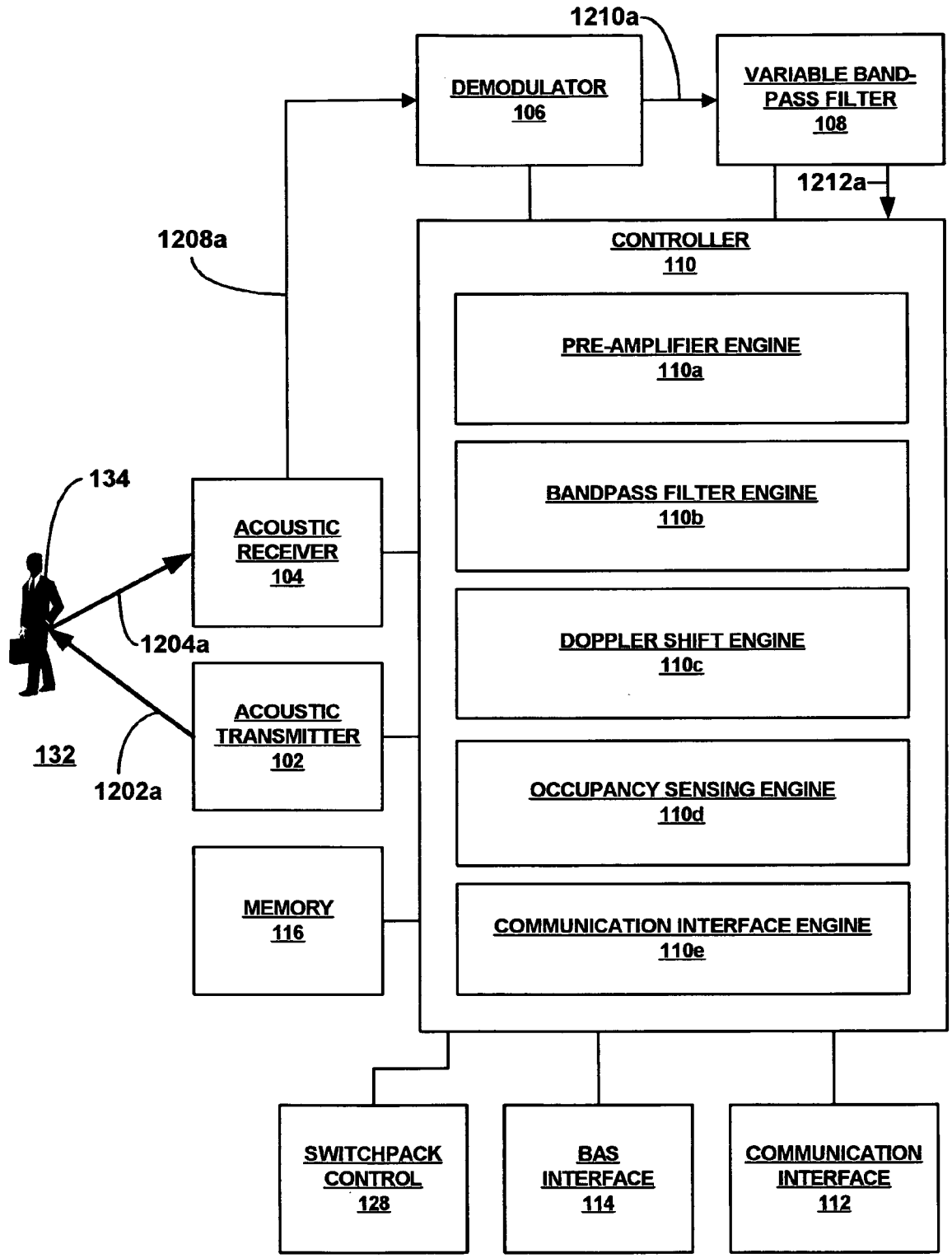
Figure 5:
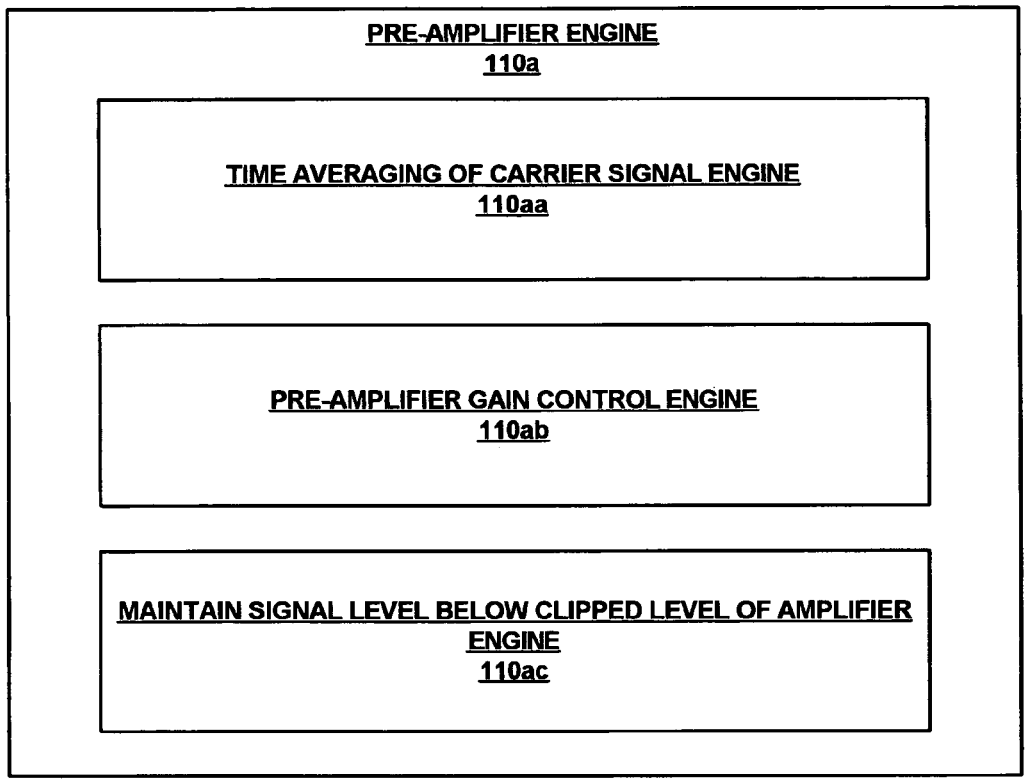
Figure 6:
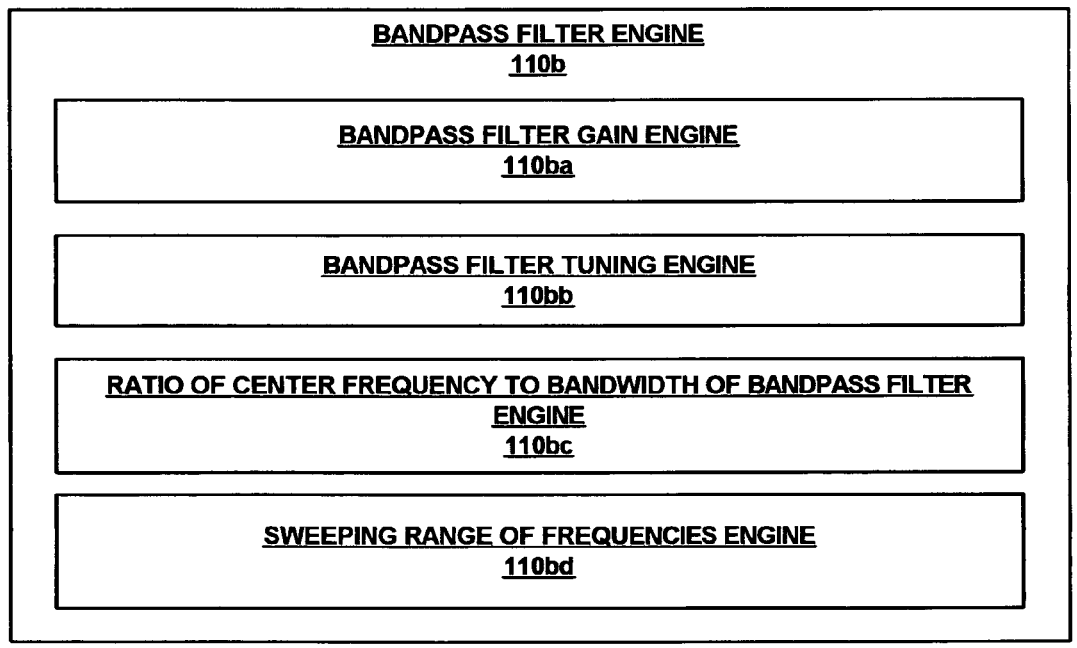
Figure 7:
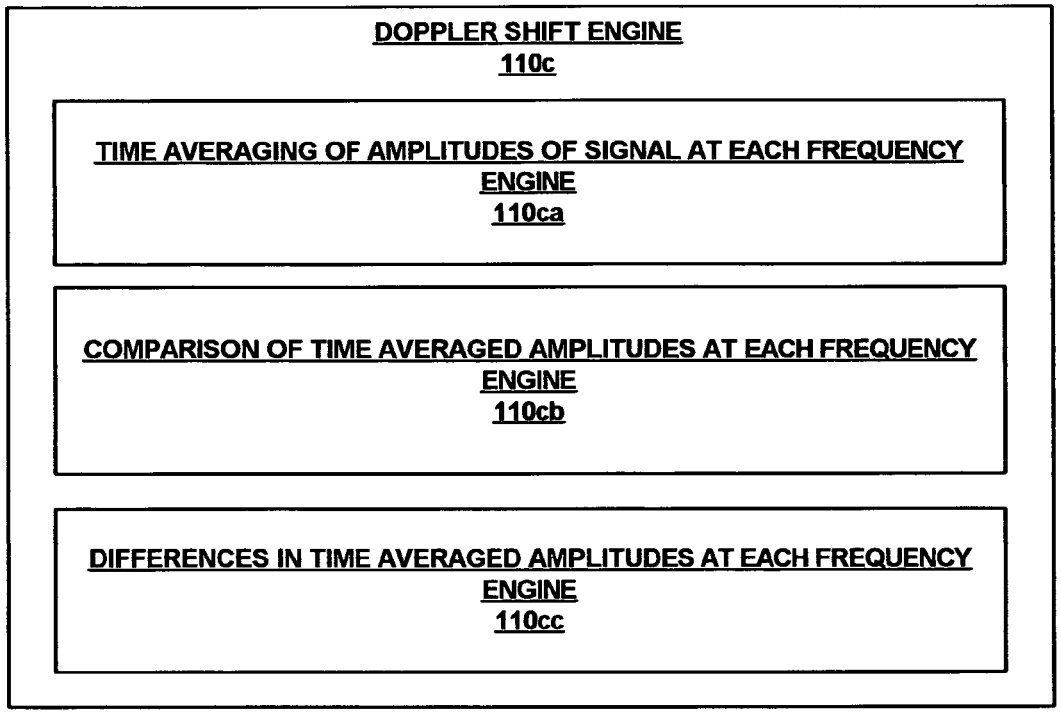
Figure 8:
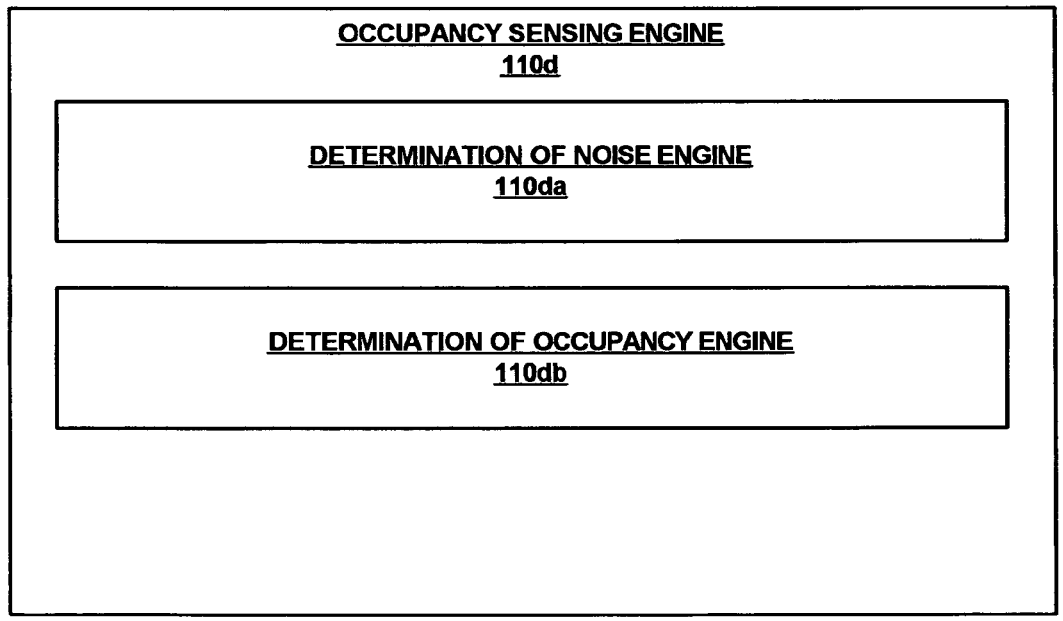
Figure 9:
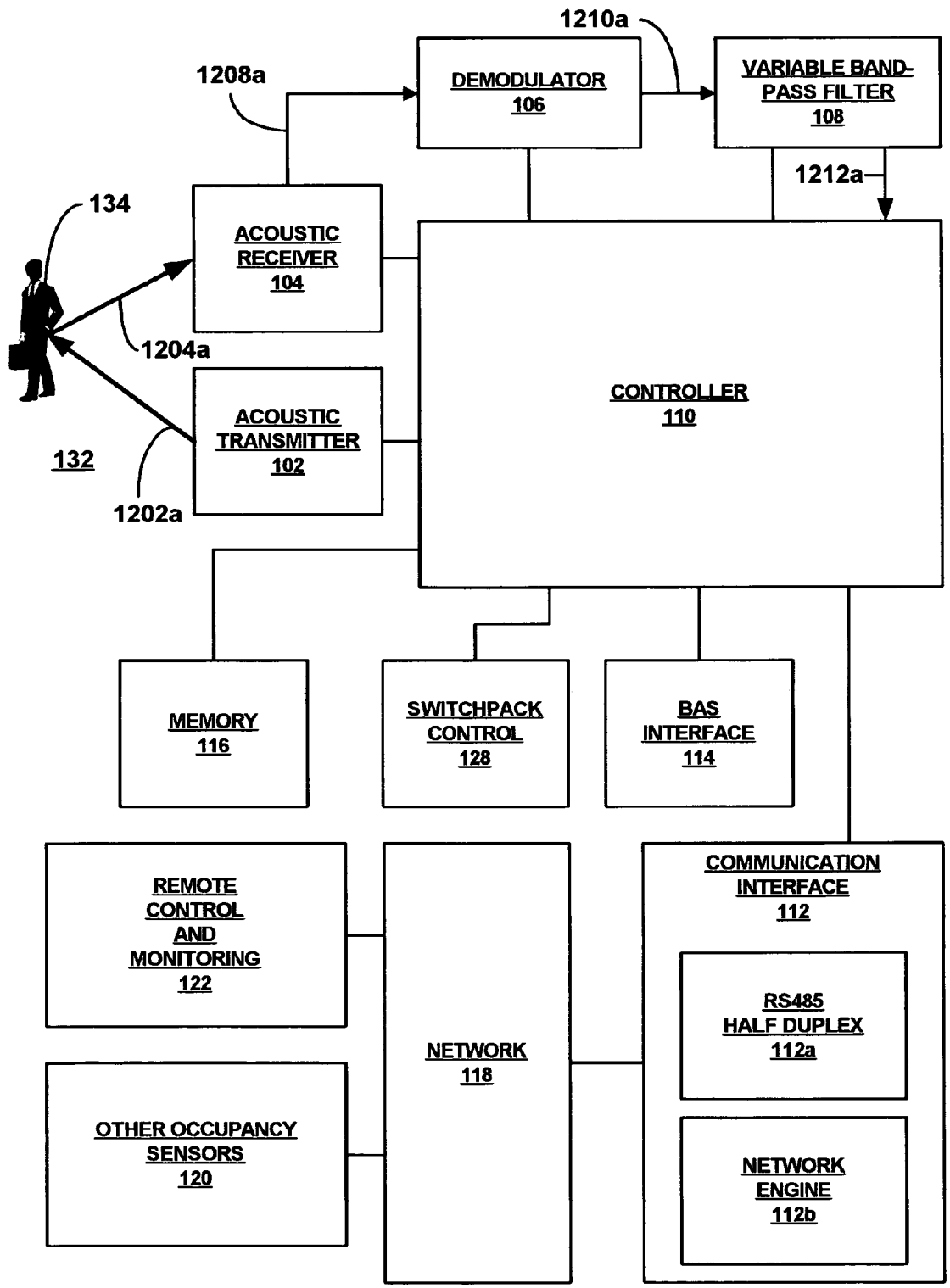

Referring now to FIGS. 1-11, an exemplary embodiment of an occupancy sensor 100 includes an acoustic transmitter 102, an acoustic receiver 104, a demodulator 106, a variable band-pass filter 108, a controller 110, a communication interface 112, a building automation system (BAS) interface 114, and a memory 116. In an exemplary embodiment, the acoustic transmitter 102, the acoustic receiver 104, the demodulator 106, the variable band-pass filter 108, the communication interface 112, the building automation system (BAS) interface 114, and the memory 116 are operably coupled to the controller 110.

In an exemplary embodiment, the acoustic transmitter 102 is operably coupled to the controller 110. In an exemplary embodiment, the acoustic transmitter 102 includes an acoustic speaker 102a that is operably coupled to an oscillator 102b. The acoustic speaker 102a may, for example, be an acoustic speaker having an output at the carrier frequency. In an exemplary embodiment, the acoustic speaker 102a includes a acoustic speaker, commercially available from Nippon Ceramic. The oscillator 102b may, for example, be an oscillator having a crystal for reasonable accuracy. In an exemplary embodiment, the oscillator 102b includes a crystal based oscillator, commercially available from Daiwa.

In an exemplary embodiment, the acoustic receiver 104 is operably coupled to the demodulator 106 and the controller 110. In an exemplary embodiment, the acoustic receiver 104 includes an acoustic sensor 104a that is operably coupled to a pre-amplifier 104b including a digital potentiometer 104ba, and the pre-amplifier is operably coupled to an analog-to-digital converter 104c. In an exemplary embodiment, the acoustic sensor 104a may, for example, be an acoustic sensor having good response characteristics at the selected carrier frequency which may, for example, be determined by testing the acoustic sensor in a well known manner. In an exemplary embodiment, the acoustic sensor 104a includes a acoustic sensor, commercially available from Nippon Ceramic. The pre-amplifier 104b may, for example, be a pre-amplifier tuned to the selected carrier frequency. In an exemplary embodiment, the pre-amplifier 104b includes an op-amp based pre-amplifier, commercially available from Microchip. The digital potentiometer 104ba may, for example, be a digital potentiometer having 8 bit resolution. In an exemplary embodiment, the digital potentiometer 104ba comprises a digital potentiometer, commercially available from Analog Devices.

In an exemplary embodiment, the demodulator 106 is operably coupled to the acoustic receiver 104, the variable band-pass filter 108, and the controller 110. In an exemplary embodiment, the demodulator 106 includes a signal filter 106a and a carrier filter 106b. The signal filter 106a may, for example, include a passive low pass network having a cutoff frequency above the signal frequency. In an exemplary embodiment, the signal filter 106a includes a resistor and capacitor. The carrier filter 106b may, for example, include a mixer operating at the carrier frequency for beating the reference frequency. In an exemplary embodiment, the carrier filter 106b includes a mixer, commercially available from On Semiconductor.

In an exemplary embodiment, the variable band-pass filter 108 is operably coupled to the demodulator 106 and the controller 110. In an exemplary embodiment, the variable band-pass filter 108 includes a digital potentiometer 108a for adjusting a gain of the filter, a digital potentiometer 108b for tuning a center frequency of the filter, and a digital potentiometer 108c for adjusting a ratio of the center frequency of the filter to the bandwidth of the filter. In an exemplary embodiment, the ratio of the center frequency of the variable band-pass filter 108 to the bandwidth of the filter ranges from about 6 to 12. The digital potentiometer 108a may, for example, be a conventional commercially available integrated circuit ("IC") having 8 bit resolution. In an exemplary embodiment, the digital potentiometer 108a includes a SPI or I2C interface, commercially available from Analog Devices. The digital potentiometer 108b may, for example, be a conventional commercially available IC having 8 bit resolution. In an exemplary embodiment, the digital potentiometer 108b includes a SPI or I2C interface, commercially available from Analog Devices. The digital potentiometer 108c may, for example, be a conventional commercially available IC having 8 bit resolution. In an exemplary embodiment, the digital potentiometer 108b includes a SPI or I2C interface, commercially available from Analog Devices.

In an exemplary embodiment, the controller 110 is operably coupled to the acoustic transmitter 102, the acoustic receiver 104, the demodulator 106, the variable band-pass filter 108, the communication interface 112, the BAS interface 114, and the memory 116. The controller 110 may, for example, include a programmable general purpose microcontroller, application specific integrated circuit (ASIC), parallel processing, or a digital signal processor ("DSP") controller having sufficient memory and processing power for the particular application which may be determined in a well known manner. In an exemplary embodiment, the controller 110 includes a I2C interface, USART and analog to digital ("A/D") converter, commercially available from Microchip. In an exemplary embodiment, the controller 110 includes a pre-amplifier engine 110a, a bandpass filter engine 110b, a Doppler shift engine 110c, an occupancy sensing engine 110d, and a communication interface engine 110e.

In an exemplary embodiment, the pre-amplifier engine 110a is adapted to control and monitor the operation of the pre-amplifier 104b of the acoustic receiver 104. In an exemplary embodiment, the pre-amplifier engine 110a includes a time averaging of carrier signal engine 110aa, a pre-amplifier gain control engine 110ab, and a maintain signal level below clipped level of amplifier engine 110ac. In an exemplary embodiment, the time averaging of carrier signal engine 110aa is adapted to calculate a time average of the amplitude of the carrier signal of the acoustic signals sensed by the acoustic sensor 104a. In an exemplary embodiment, the pre-amplifier gain control engine 110ab is adapted to control and monitor the operation of the digital potentiometer 104ba of the pre-amplifier 104b to thereby control the gain of the pre-amplifier. In an exemplary embodiment, the maintain signal level below clipped level of amplifier engine 110ab is adapted to process the time average of the amplitude of the carrier signal generated by the time averaging of carrier signal engine 110aa and control the pre-amplifier gain control engine 110ab to maintain the level of the output signal of the pre-amplifier 104b below the clipping level of the pre-amplifier to prevent distortion of the signal.

In an exemplary embodiment, the bandpass filter engine 110b is adapted to control and monitor the operation of the variable bandpass filter 108. In an exemplary embodiment, the bandpass filter engine 110b includes a bandpass filter gain engine 110ba that is adapted to monitor and control the operation of the digital potentiometer 108a in order to control the gain of the variable bandpass filter 108. In an exemplary embodiment, the bandpass filter engine 110b includes a bandpass filter tuning engine 110bb that is adapted to monitor and control the operation of the digital potentiometer 108b in order to tune the center frequency of the variable bandpass filter 108. In an exemplary embodiment, the bandpass filter engine 110b includes a ratio of center frequency to bandwidth of bandpass filter engine 110bc that is adapted to monitor and control the operation of the digital potentiometer 108c in order to control the ratio of the center frequency to the bandwidth of the variable bandpass filter 108. In an exemplary embodiment, the bandpass filter engine 110b includes a sweeping range of frequencies engine 110bd that is adapted to control and monitor the operation of the bandpass filter gain engine 110ba, the bandpass filter tuning engine 110bb, and the ratio of center frequency to bandwidth of bandpass filter engine 110bc in order to controllably sweep the variable bandpass filter 108 across a range of frequencies to thereby filter signals processed by the demodulator 106 to determine their spectral content across a range of frequencies.

In an exemplary embodiment, the doppler shift engine 110c is adapted to process the signals filtered by the variable bandpass filter 108 to determine variations in their spectral content. In an exemplary embodiment, the doppler shift engine includes a time averaging of amplitudes of signals at each frequency engine 110ca that is adapted to calculate a time average of the amplitude of the signals at each frequency. In an exemplary embodiment, the doppler shift engine 110c includes a comparison of the time averaged amplitudes at each frequency engine 110cb that is adapted to compare the time averaged amplitudes calculated by the time averaging of amplitudes of signals at each frequency engine 110ca in order to determine variations in the time averaged amplitudes from frequency to frequency. In an exemplary embodiment, the doppler shift engine 110c includes a differences in time averaged amplitudes at each frequency engine 110cc that is adapted to calculate the differences in the time averaged amplitudes from frequency to frequency.

In an exemplary embodiment, the occupancy sensing engine 110d is adapted to process the output of the doppler shift engine 110c to determine the presence or absence of an occupant within a defined region that the occupancy sensor 100 is positioned. In an exemplary embodiment, the occupancy sensing engine 110d includes a determination of noise engine 110da that is adapted to determine if the defined region includes a source of acoustic noise such as, for example, a ventilation system. In an exemplary embodiment, the occupancy sensing engine 110d includes a determination of occupancy engine 110db that is adapted to determine if the defined region includes an occupant or not.

In an exemplary embodiment, the communication interface 112 is operably coupled to the controller 110 and is adapted to be operably coupled to a network 118 such as, for example, a local area network (LAN), a wide area network (WAN), an Ethernet, and/or the Internet. In an exemplary embodiment, the communication interface 112 includes an RS485 half duplex communication interface and a network engine 112b for managing the operation of the communication interface. In an exemplary embodiment, the network 118 may, for example, be operably coupled to other occupancy sensor 120, and/or remote control devices 122. In an exemplary embodiment, the other occupancy sensors 120 may include conventional occupancy sensors and/or the occupancy sensor 100. In an exemplary embodiment, the other occupancy sensors 120 may include, for example, acoustic and/or infrared occupancy sensors. In an exemplary embodiment, the remote control devices 122 are adapted to remotely control and monitor the operation of the occupancy sensor 100 and/or the other occupancy sensors 120, and/or any other elements of the present disclosure.

In an exemplary embodiment, the BAS interface 114 is operably coupled to the controller 110 and is adapted to be operably coupled to a conventional BAS system 124 that may be operably coupled to one or more loads 126. In an exemplary embodiment, the BAS interface 114 may include a communication interface 114a that may include, for example, a convention communication interface suitable for communicating with a conventional BAS system. In an exemplary embodiment, the communication interface 114a includes an isolated form-C relay, commercially available from Aromat.

In an exemplary embodiment, a switchpak control 128 may be operably coupled to the controller 110 of the occupancy sensor 100 in order to control the operation of one or more loads 130 that may be operably coupled to the switchpak control 128. In an exemplary embodiment, the switchpack control 128 further includes a communication interface 128a for communicating with the network 118. Alternatively, one or more of the loads 126 and/130 may be operably coupled to the controller 110 of the occupancy sensor 100.

In an exemplary embodiment, one or more of the switchpack control 128 further provide power to the occupancy sensor 100, and interpret control signals for activation/deactivation of the loads 130. In an exemplary embodiment, the switchpack control 128 is also operably coupled to the network 118 using the communication interface 128a. As a result, the remote control and monitoring 122 may directly communicate with, monitor, and control the switchpack control 128. In an exemplary embodiment, the switchpack control 128 includes a conventional commercially available switchpack control from Novitas and/or Cooper Industries.

Figure 10:
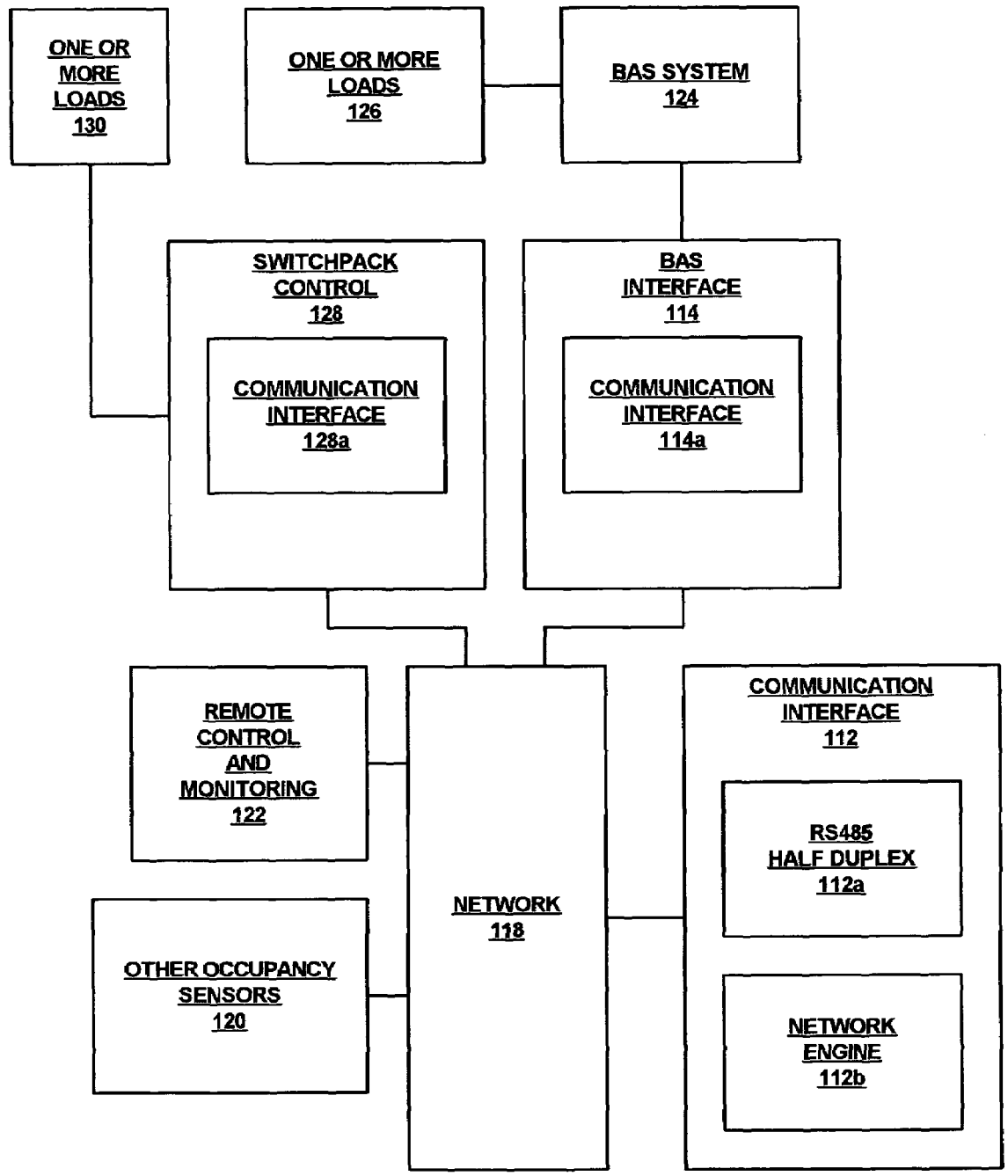
Figure 10B:
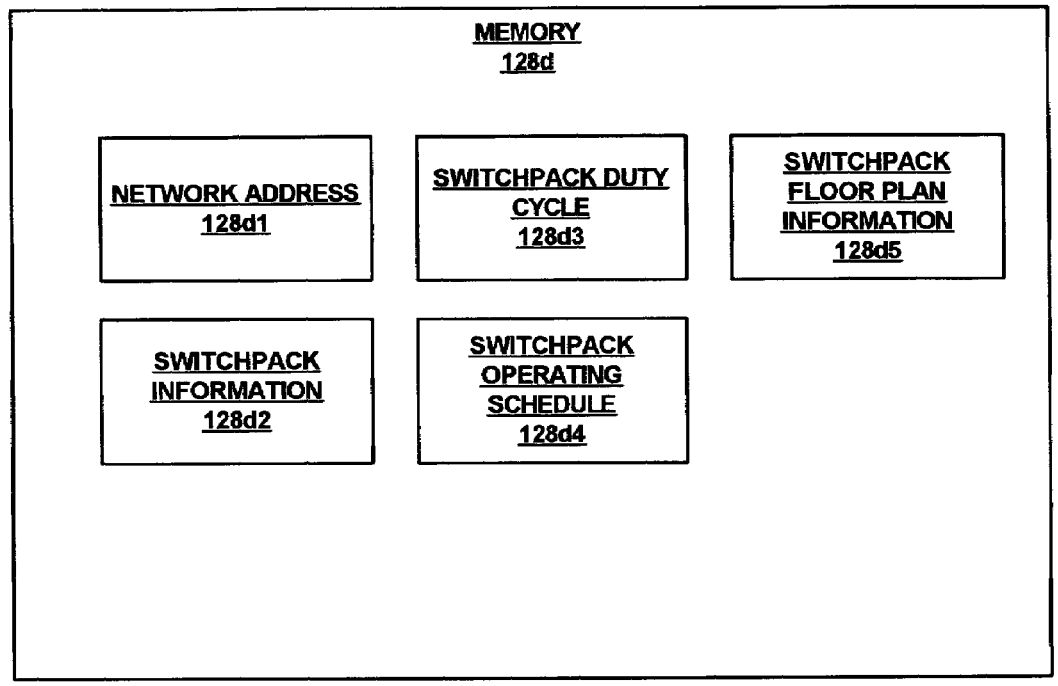
Figure 10A:
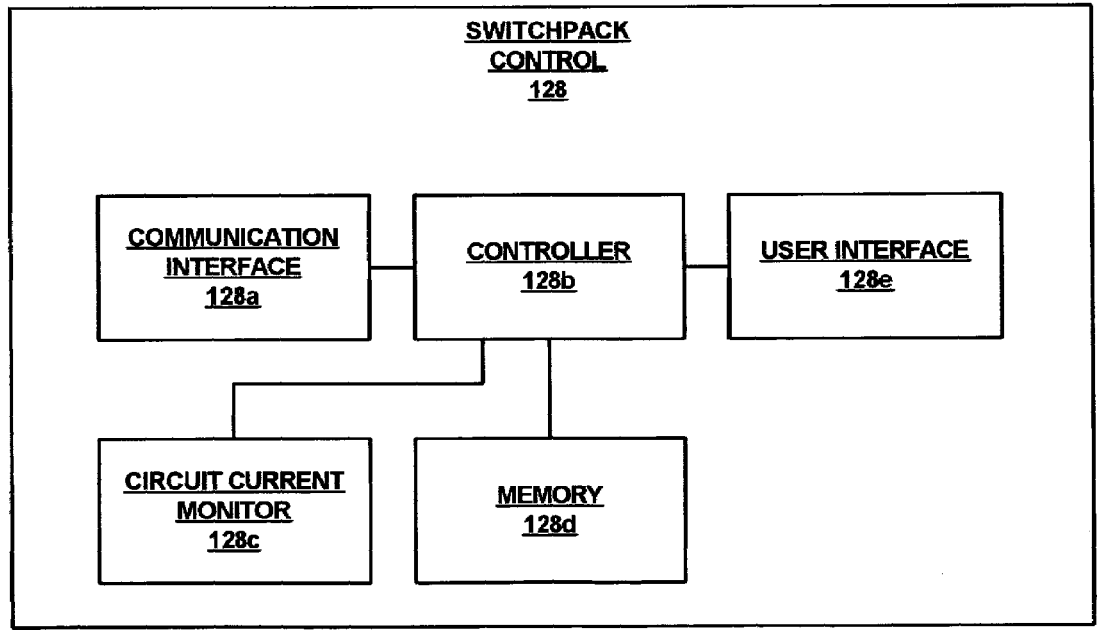
Figure 11:
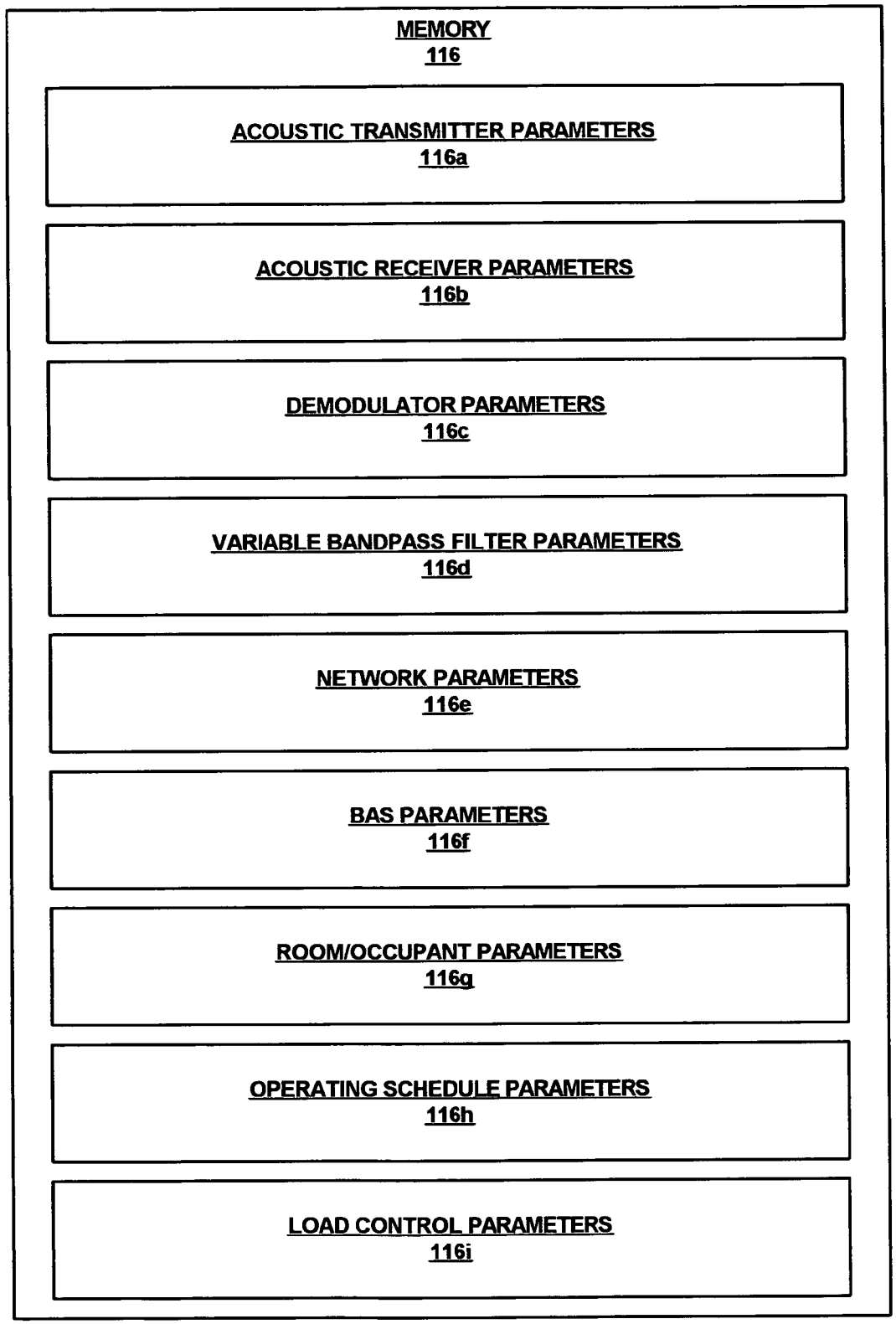

In an exemplary embodiment, as illustrated in FIG. 10a, the switchpack control 128 includes a conventional commercially available switchpack control further modified to include the communication interface 128a, a controller 128b, a circuit current monitoring device 128c, a memory 128d, and a user interface 128e. In an exemplary embodiment, the communication interface 128a, the circuit current monitoring device 128c, the memory 128d, and the user interface 128e are operably coupled to and controlled by the controller 128b.

In an exemplary embodiment, the circuit current monitoring device 128c is adapted to monitor the current within the loads 130 operably coupled to the switchpack control 128. In an exemplary embodiment, the circuit current monitoring device 128c may include a conventional commercially available current monitoring device.

In an exemplary embodiment, as illustrated in FIG. 10b, the memory 128d includes: a network address 128d1 for the switchpack control 128, information 128d2 specific to the switchpack control, a duty cycle 128d3 for the switchpack control, an operating schedule 128d4 for the switchpack control, and floor plan information 128d5 for the switchpack control and/or the loads 130 operably coupled to the switchpack control. In an exemplary embodiment, the memory 128d includes a non-volatile memory.

In an exemplary embodiment, the user interface 128e permits a local user of the switchpack control 128 to interface with and control the operation of the switchpack control.

In an exemplary embodiment, the switchpack control 128 includes a Novitas model 13-051 switchpack control product.

In an exemplary embodiment, the memory 116 is operably coupled to the controller 110. In an exemplary embodiment, the memory 116 includes one or more of the following: acoustic transmitter operating parameters 116a, acoustic receiver operating parameters 116b, demodulator operating parameters 116c, variable bandpass filter operating parameters 116d, network parameters 116e, BAS parameters 116f, room/occupant operating parameters 116g, operating schedule operating parameters 116h, and load control operating parameters 116i. The memory 116 may, for example, include DRAM, FLASH, or a non-volatile memory. In an exemplary embodiment, the memory 116 includes a non-volatile memory, commercially available from Microchip.

In an exemplary embodiment, the acoustic transmitter operating parameters 116a include one or more of the following: the carrier frequency of the acoustic signals transmitted by the acoustic transmitter 102, and output drive level. In an exemplary embodiment, the carrier frequency of the acoustic signals transmitted by the acoustic transmitter 102 may, for example, be between about 25 KHz and 40 KHz.

In an exemplary, the acoustic receiver operating parameters 116b include one or more of the following: the gain settings for the pre-amplifier 104b, and the resolution of the A/D converter 104c. In an exemplary embodiment, the resolution of the A/D converter 104c is 10 bits.

In an exemplary embodiment, the demodulator operating parameters 116c include one or more of the following: the carrier frequency and the range of signal frequencies.

In an exemplary embodiment, the variable bandpass filter operating parameters 116d include one or more of the following: the gain of the variable bandpass filter 108, the center frequency of the variable bandpass filter, the ratio of the center frequency to the bandwidth of the variable bandpass filter, and alternate settings for all of the above. In an exemplary embodiment, the center frequency of the variable bandpass filter 108 ranges from about 10 Hz to 300 Hz, and the ratio of the center frequency to the bandwidth of the variable bandpass filter ranges from about 6 to 12.

In an exemplary embodiment, the network parameters 116e include one or more of the following: the network address of the occupancy sensor 100, the baud rate, the last message status, and the new message status.

In an exemplary embodiment, the BAS operating parameters 116f include one or more of the following: the operating mode of the BAS system 124.

In an exemplary embodiment, the room/occupant operating parameters 116g include one or more of the following: the name of the defined region that the occupancy sensor 100 is positioned within, the number of defined region, the building/floor number for the defined region, the telephone number of the occupant of the defined region, the e-mail address of the occupant of the defined region, the model number of the occupancy sensor 100, the version of the occupancy sensor, the options included in the occupancy sensor, and the last good communication.

In an exemplary embodiment, the operating schedule operating parameters 116h include one or more of the following: the operating schedule, and operational characteristics for each of the defined operating time periods.

In an exemplary embodiment, the load control operating parameters 116i includes one or more of the following: the identity of the loads controlled directly or indirectly by the occupancy sensor 100, and the time delay associated with the operation of the occupancy sensor to change the operating state of the loads controlled directly or indirectly by the occupancy sensor.

Figure 12A:
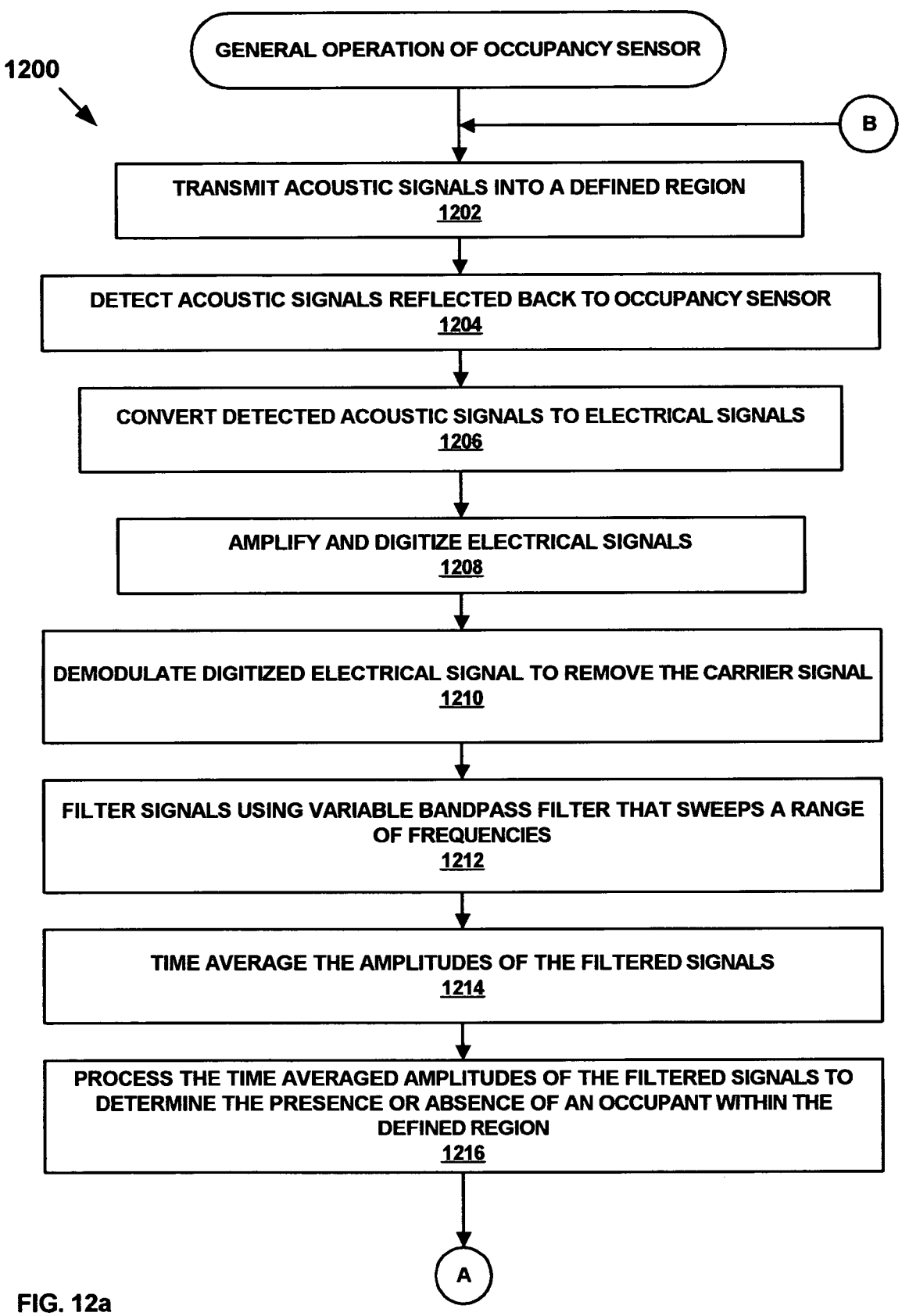
FIGS. 12a-12b is a flow chart illustration of an exemplary embodiment of the operation of the occupancy sensor of FIGS. 1-11.
Figure 12B:
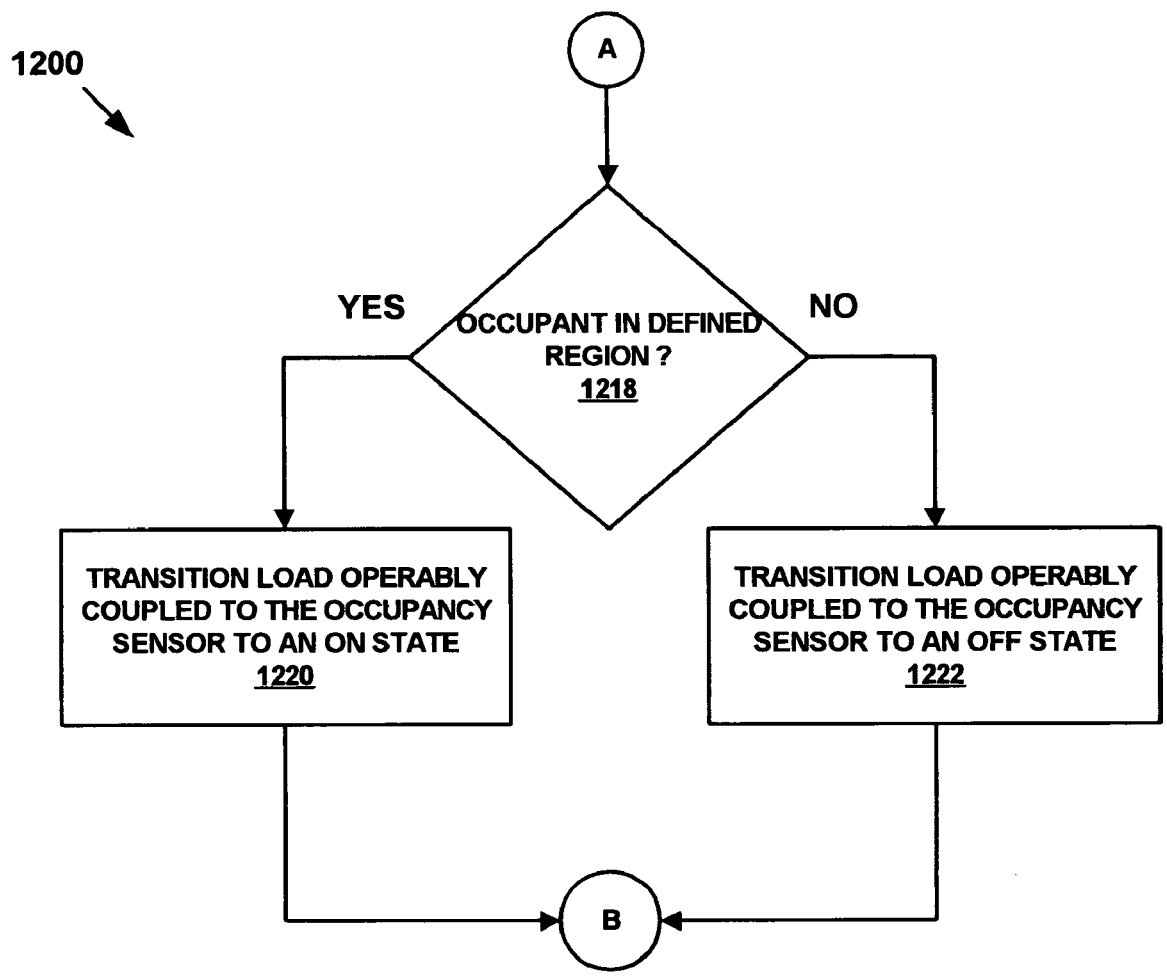
Figure 13:
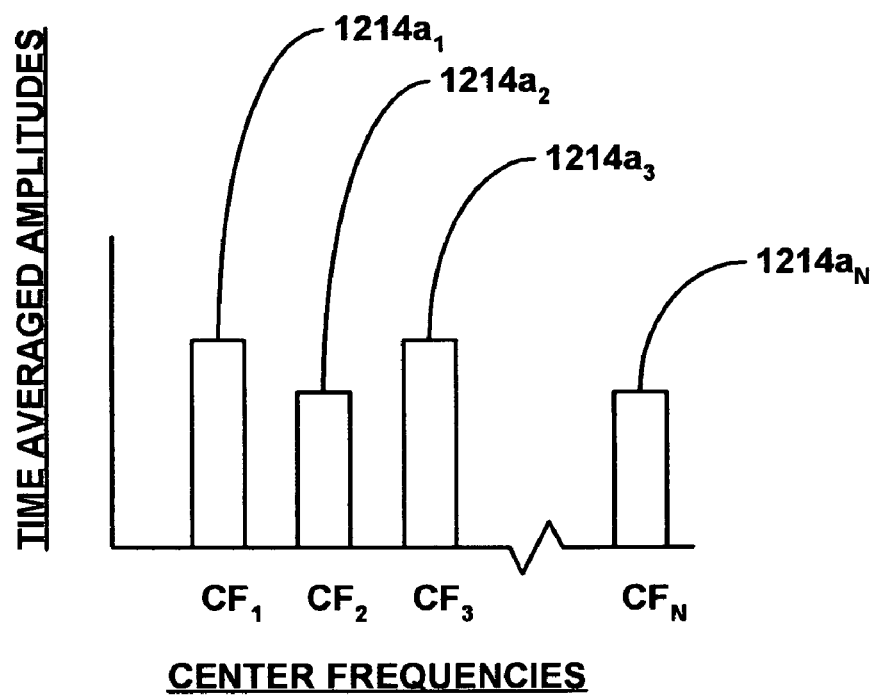
FIG. 13 is a graphical illustration of an exemplary embodiment of time averaged amplitudes of filtered signals for a plurality of center frequencies.

In an exemplary embodiment, as illustrated in FIGS. 12a-12b, during the operation of the occupancy sensor 100, the occupancy sensor implements a method 1200 in which, in step 1202, the acoustic transmitter 102 transmits acoustic signals 1202a into a defined region 132. The acoustic signals may then be reflected back to the occupancy sensor 100 by, for example, reflecting off of an occupant 134 positioned within the defined region 132, and the reflected signals 1204a detected by the acoustic sensor 104a of the acoustic receiver 104 in step 1204.

The reflected acoustic signals 1204a detected by the acoustic sensor 104a of the acoustic receiver 104 are then converted to electrical analog signals 1206a by the acoustic sensor 104a in step 1206. The electrical analog signals 1206a are then amplified and digitized by the pre-amplifier 104b and A/D converter 104c, respectively, in step 1208, to generate digitized signals 1208a.

The digitized signals 1208a are then demodulated in a conventional manner by the demodulator 106 in step 1210, to remove the carrier component of the digitized signals, and generate demodulated signals 1210a. The demodulated signals 1210a are then filtered using the variable bandpass filter 108 in step 1212 by repetitively sweeping the bandpass filter upwardly and then downwardly along a range of frequencies in order to generate filtered signals 1212a. In this manner, the spectral content of the demodulated signals 1210a may be determined along a range of frequencies.

The amplitudes of the filtered signals 1212a are then time averaged by the controller 110 in step 1214 to generate time averaged amplitudes 1214a for a range of frequencies, e.g., with center frequencies CF ranging from 1 to N. In this manner, the amplitude of the spectral content of the filtered signals 1212a are determined for the range of the frequencies swept by the variable bandpass filter 108. In this manner, the average amount of acoustic energy detected by the acoustic receiver 104 at a range of frequencies may be determined.

The time averaged amplitudes 1214a are then processed by the controller 110 in step 1216 to determine the presence or absence of the occupant 134 within the defined region 132 in step 1218. In an exemplary embodiment, in step 1218, the presence of the occupant 134 within the defined region 132 is indicated by variations in the time averaged amplitudes 1214a. For example, if the amplitude of time averaged amplitude $1214a_1$ is different from time averaged amplitude $1214a_2$, then this would indicate the presence of the occupant 134 within the defined region 132.

If the controller 110 determines that the occupant 134 is present within the defined region 132 in step 1218, then the controller with directly or indirectly transitions one or more of the loads in step 1220 to an on operational state. Alternatively, if the controller 110 determines that the occupant 134 is not present within the defined region 132 in step 1218, then the controller with directly or indirectly transitions one or more of the loads in step 1222 to an off operational state.

Figure 14:
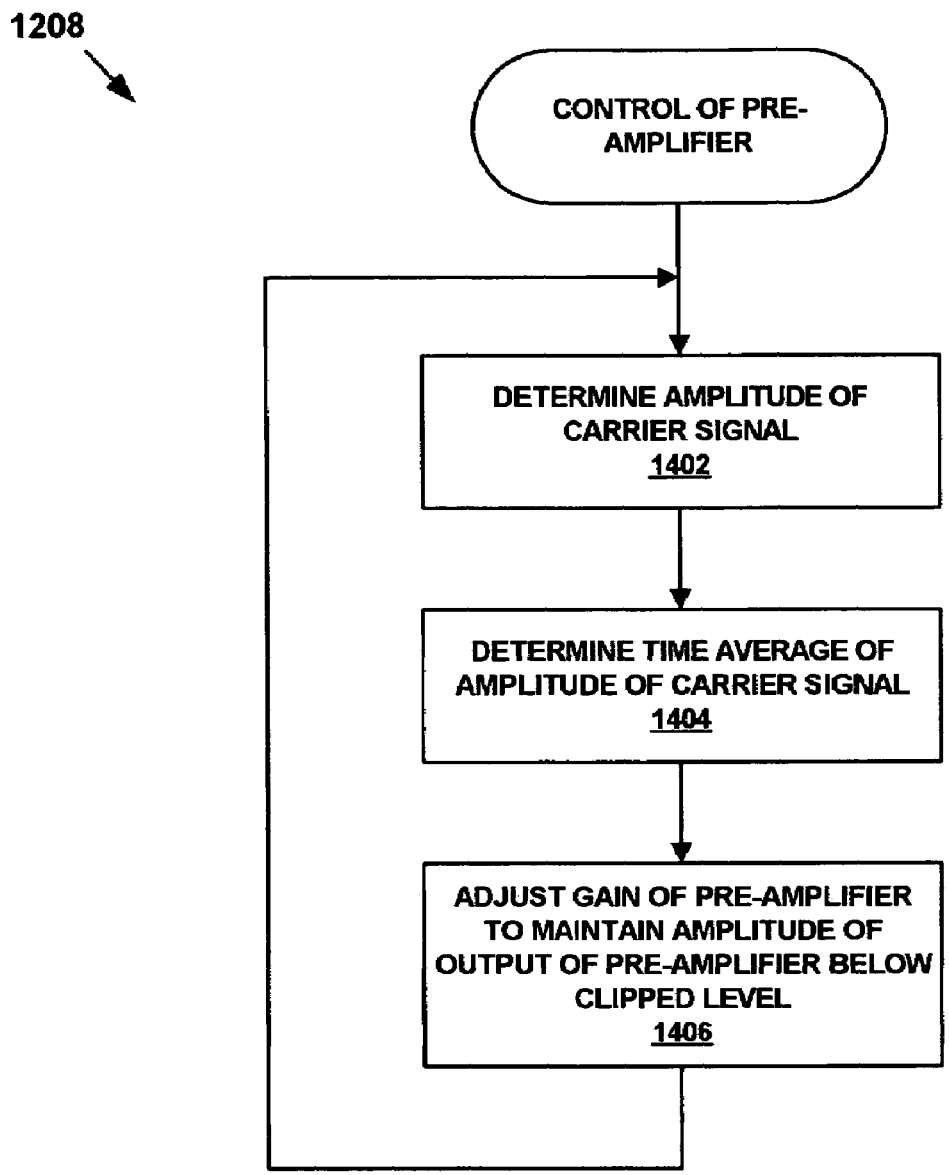
FIG. 14 is a flow chart illustration of an exemplary embodiment of a method of operating the pre-amplifier of the occupancy sensor of FIGS. 1-11.

Referring to FIG. 14, in an exemplary embodiment, during operation of step 1208 of the method 1200, the amplitude of the carrier signal portion of the analog signal 1206a is determined in step 1402 by the time averaging of carrier signal engine 110a of the preamplifier engine 110a of the controller 110. The time average of the amplitude of the carrier signal portion of the analog signal 1206a is then determined in step 1404 by the time averaging of carrier signal engine 110a of the preamplifier engine 110a of the controller 110. The gain of the pre-amplifier 104b is then adjusted in step 1406 to maintain the amplitude of the amplified output signal of the pre-amplifier below the clipped level associated with the pre-amplifier by the pre-amplifier gain control engine 110ab and maintain signal level below clipped level of amplifier engine 110ac of the pre-amplifier engine 110a of the controller 110. In this manner, distortion of the amplified output signal of the pre-amplifier 104b is minimized.

Figure 15:
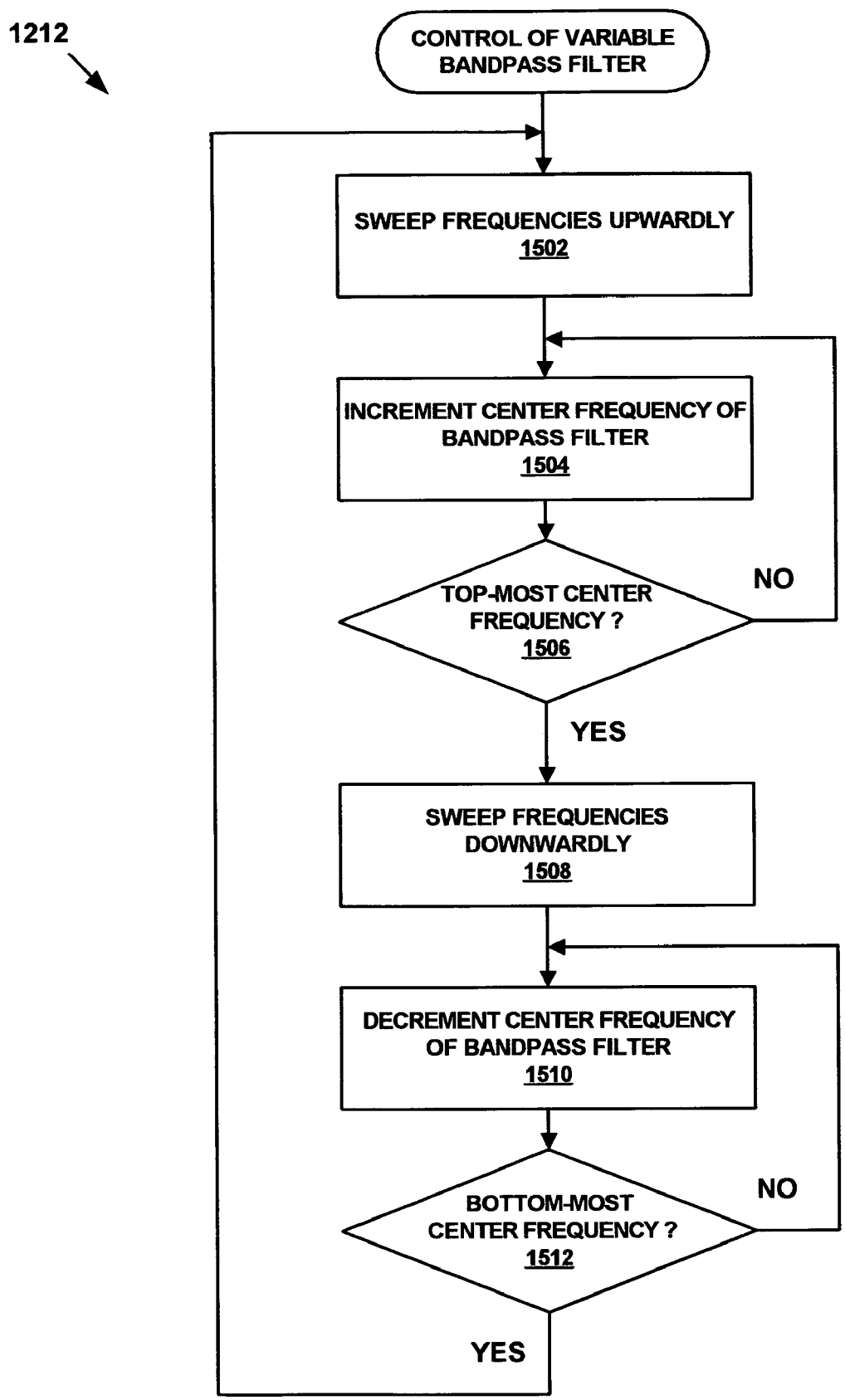
FIG. 15 is a flow chart illustration of an exemplary embodiment of a method of operating the variable bandpass filter of the occupancy sensor of FIGS. 1-11.
Figure 16:
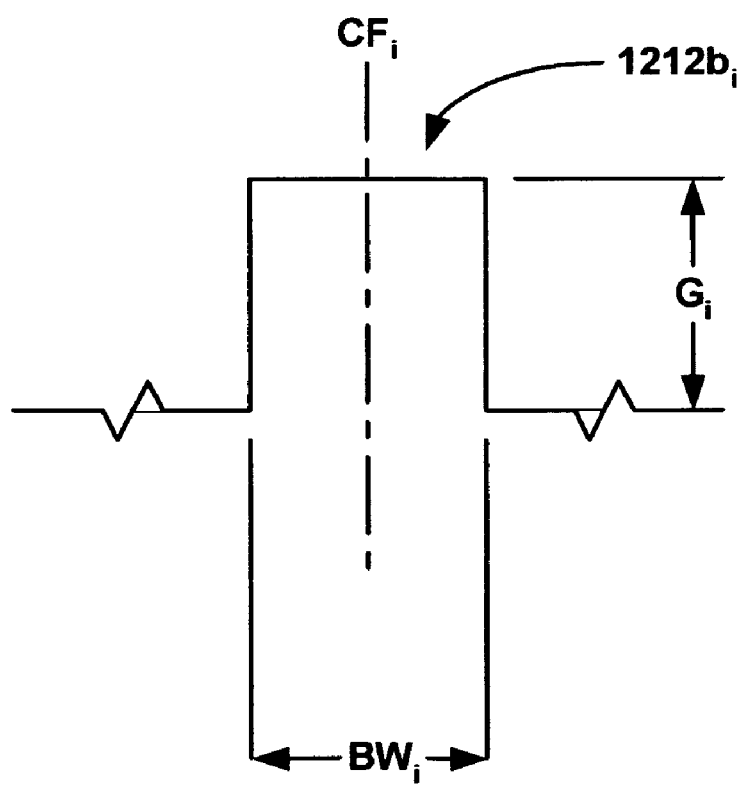
FIG. 16 is a graphical illustration of an exemplary embodiment of the variable bandpass filter of the occupancy sensor of FIGS. 1-11.
Figure 17:
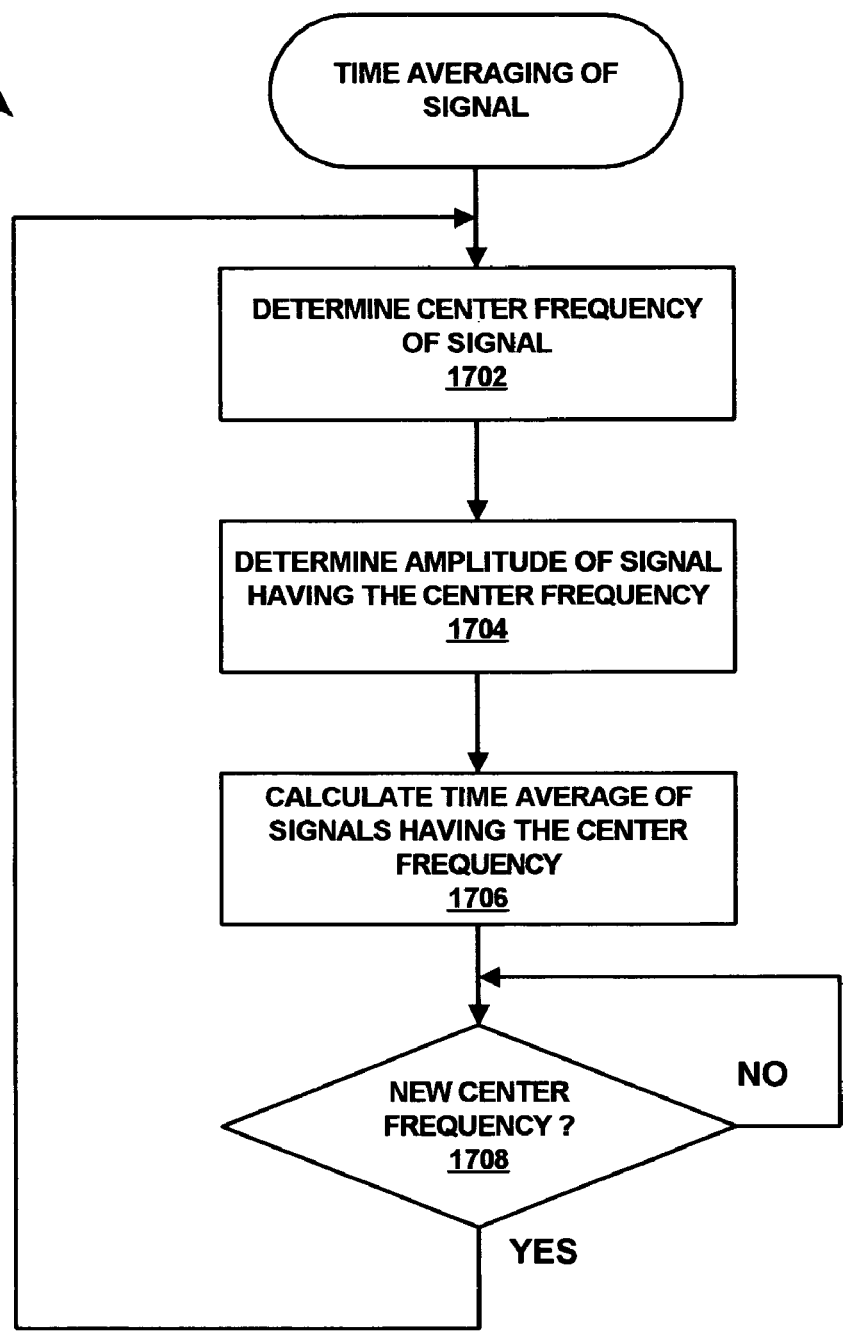
FIG. 17 is a flow chart illustration of an exemplary embodiment of a method of time averaging the amplitudes of signals filtered by the variable bandpass filter of the occupancy sensor of FIGS. 1-11.
Figure 18:
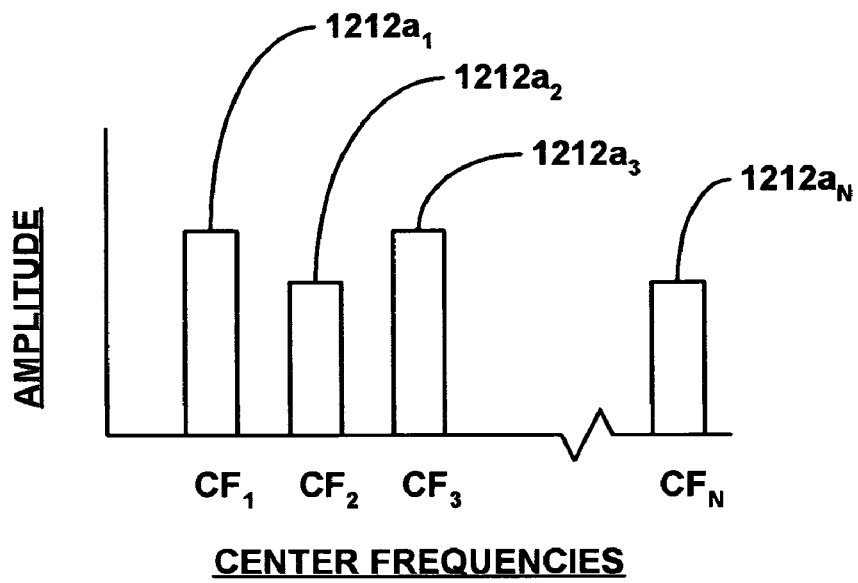
FIG. 18 is a graphical illustration of an exemplary embodiment of the output signals of the variable bandpass filter at a plurality of center frequencies.
Figure 19:
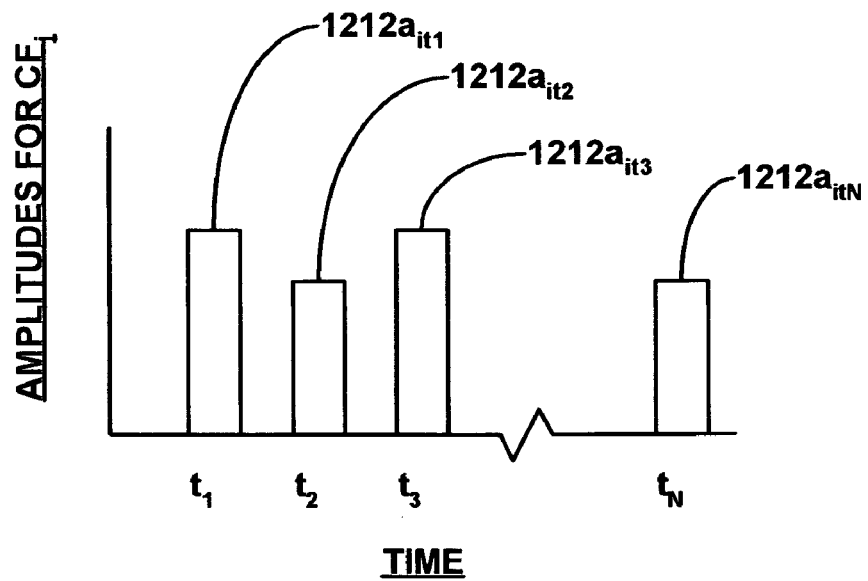
FIG. 19 is a graphical illustration of an exemplary embodiment of a time series the output signals of the variable bandpass filter at a particular center frequency.
Figure 20:
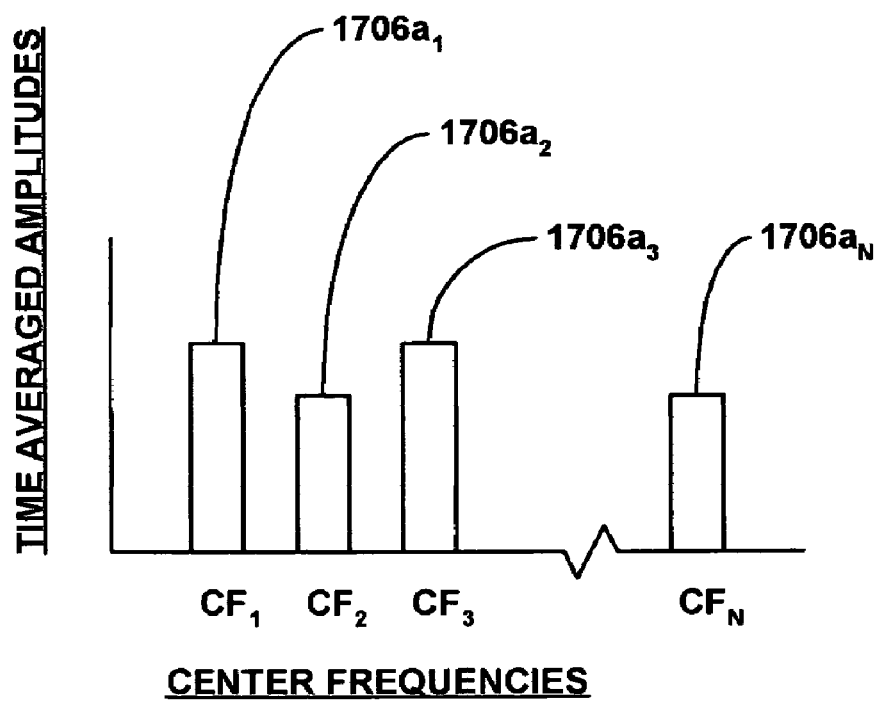
FIG. 20 is a graphical illustration of an exemplary embodiment of the time averaged amplitudes of the output signals of the variable bandpass filter at a plurality of center frequencies.

Referring to FIGS. 15-16, in an exemplary embodiment, during operation of step 1212 of the method 1200, a bandpass filter $1212b_i$ having a center frequency $CF_i$, a gain $G_i$, and bandwidth $BW_i$, and a ratio of the center frequency to the bandwidth $Q_i$ is continuously swept upwardly and then downwardly along a range of frequencies such that the center frequency $CF_i$ of the bandpass filter $1212b_i$ ranges from values 1 to N. In particular, the bandpass filter $1212b_i$ is first swept upwardly in steps 1502 and 1504 by incrementing the center frequency $CF_i$ of the bandpass filter $1212b_i$ from $CF_1$ to $CF_N$.

If a predetermined top most center frequency $CF_N$ has been reached in step 1506, then the bandpass filter $1212b_i$ is then swept downwardly in steps 1508 and 1510 by decrementing the center frequency $CF_i$ of the bandpass filter $1212b_i$ from $CF_N$ to $CF_1$. If a predetermined lowest most center frequency $CF_1$ has been reached in step 1512, then the bandpass filter $1212b_i$ is once again then swept upwardly in steps 1502 and 1504.

In an exemplary embodiment, steps 1502 to 1512 are implemented by the bandpass filter gain engine 110ba, the bandpass filter tuning engine 110bb, the ratio of the center frequency to the bandwidth of the bandpass filter engine 110bc, and the sweeping range of frequencies engine 110bd of the bandpass filter engine 110b of the controller 110.

Referring to FIGS. 17-20, in an exemplary embodiment, during operation of step 1214 of the method 1200, the amplitudes of the filtered signals $1212a_i$ output by the bandpass filter $1212b_i$ are time averaged. In particular, in steps 1702 and 1704, the center frequency $CF_i$ and amplitude of the signal $1212a_i$ having the center frequency is determined by the controller 110. The time average $1706a_i$ of the amplitudes of the signals $1212a_i$ having the center frequency $CF_i$ is then determined in step 1706. For example, for a given center frequency $CF_i$, there may be a plurality of amplitudes for times $t_1$ to $t_N$ for signals $1212a_{i,1}$ to $1212a_{i,N}$. Once the time average has been calculated in step 1708, then steps 1702-1708 are repeated.

In an exemplary embodiment, steps 1702 to 1708 are implemented by the time averaging of amplitudes of signals at each center frequency engine 110ca of the doppler shift engine 110c of the controller 110.

Figure 21:
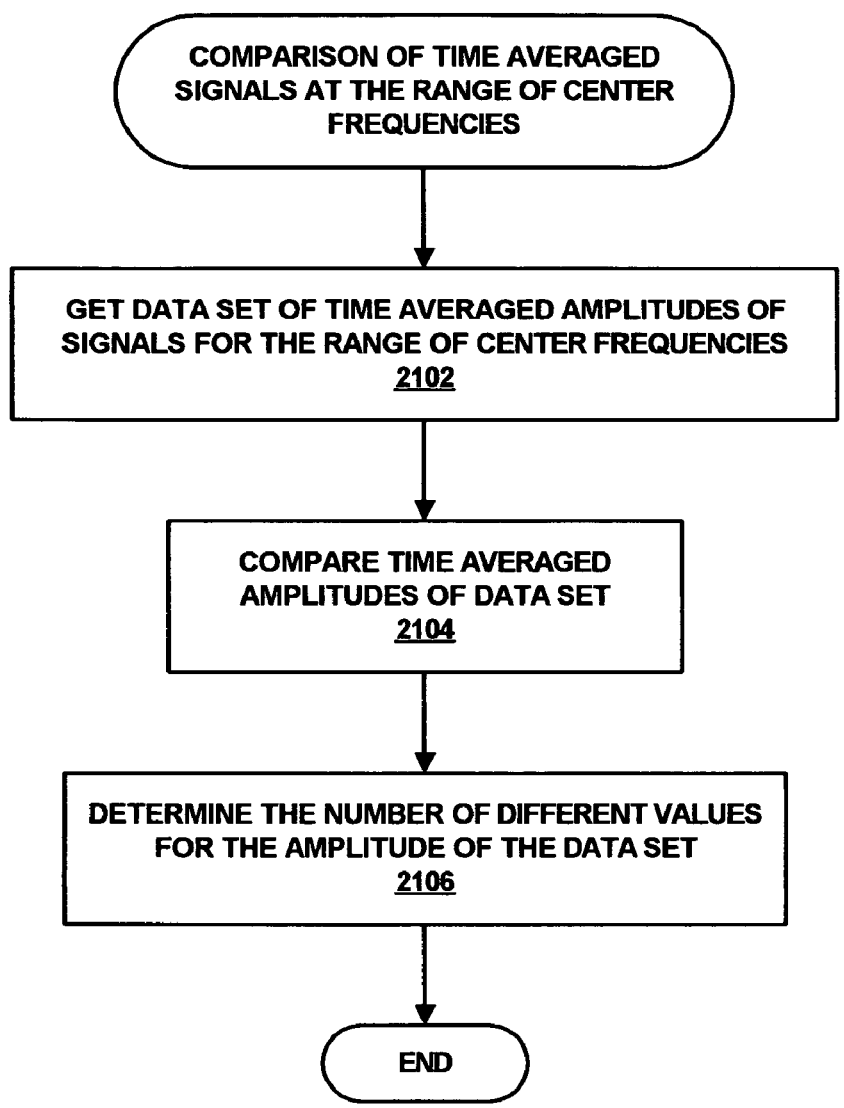
FIG. 21 is a flow chart illustration of an exemplary embodiment of a method of comparing the time averaged amplitudes of the signals filtered by the variable bandpass filter at a plurality of center frequencies.
Figure 22:
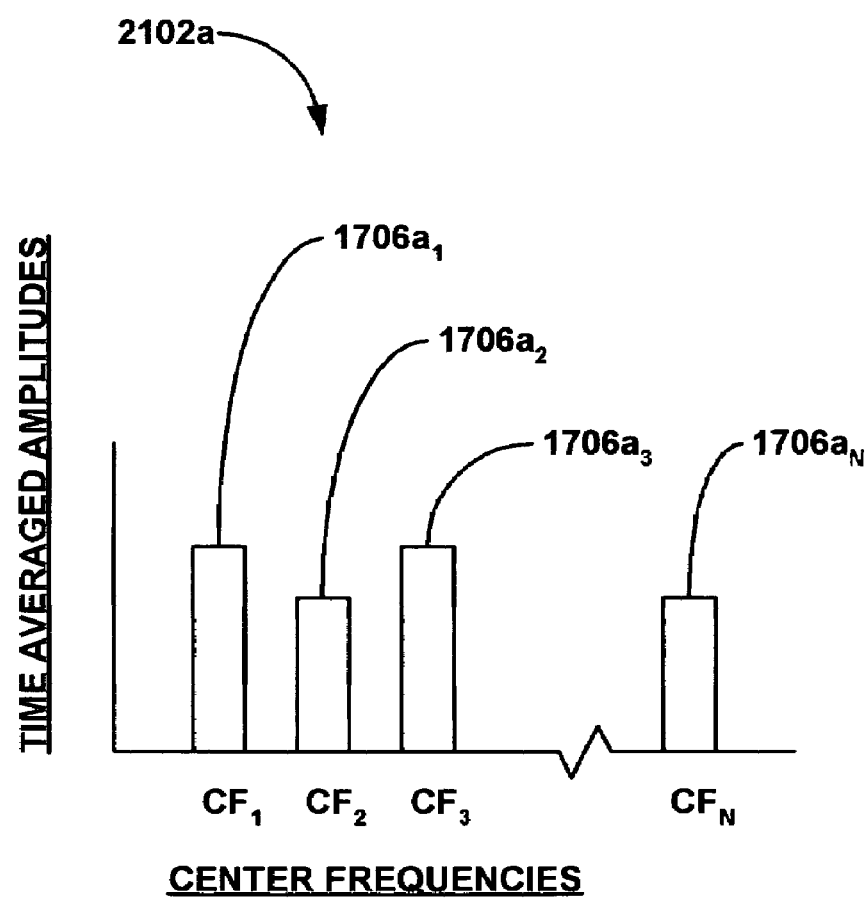
FIG. 22 is a graphical illustration of an exemplary embodiment of the time averaged amplitudes of the output signals of the variable bandpass filter at a plurality of center frequencies.

Referring to FIGS. 21-22, in an exemplary embodiment, during operation of step 1216 of the method 1200, the time average $1706a_i$ of the amplitudes of the signals $1212a_i$ having the center frequency $CF_i$ are compared. In particular, in step 2102, the dataset 2102a of the time averages $1706a_i$ of the amplitudes of the signals $1212a_i$ having center frequency $CF_i$ ranging from 1 to N are retrieved by the controller 110. The amplitudes of the time averages $1706a_i$ of the dataset 2102a are then compared in step 2104. The number of different amplitude values of the time averages $1706a_i$ of the dataset 2102a are then determined in step 2106.

In an exemplary embodiment, steps 2102 to 2106 are implemented by the comparison of time averaged amplitudes at each frequency engine 110cb and differences in time averaged amplitudes at each frequency engine 110cc of the doppler shift engine 110c of the controller 110.

Figure 23:
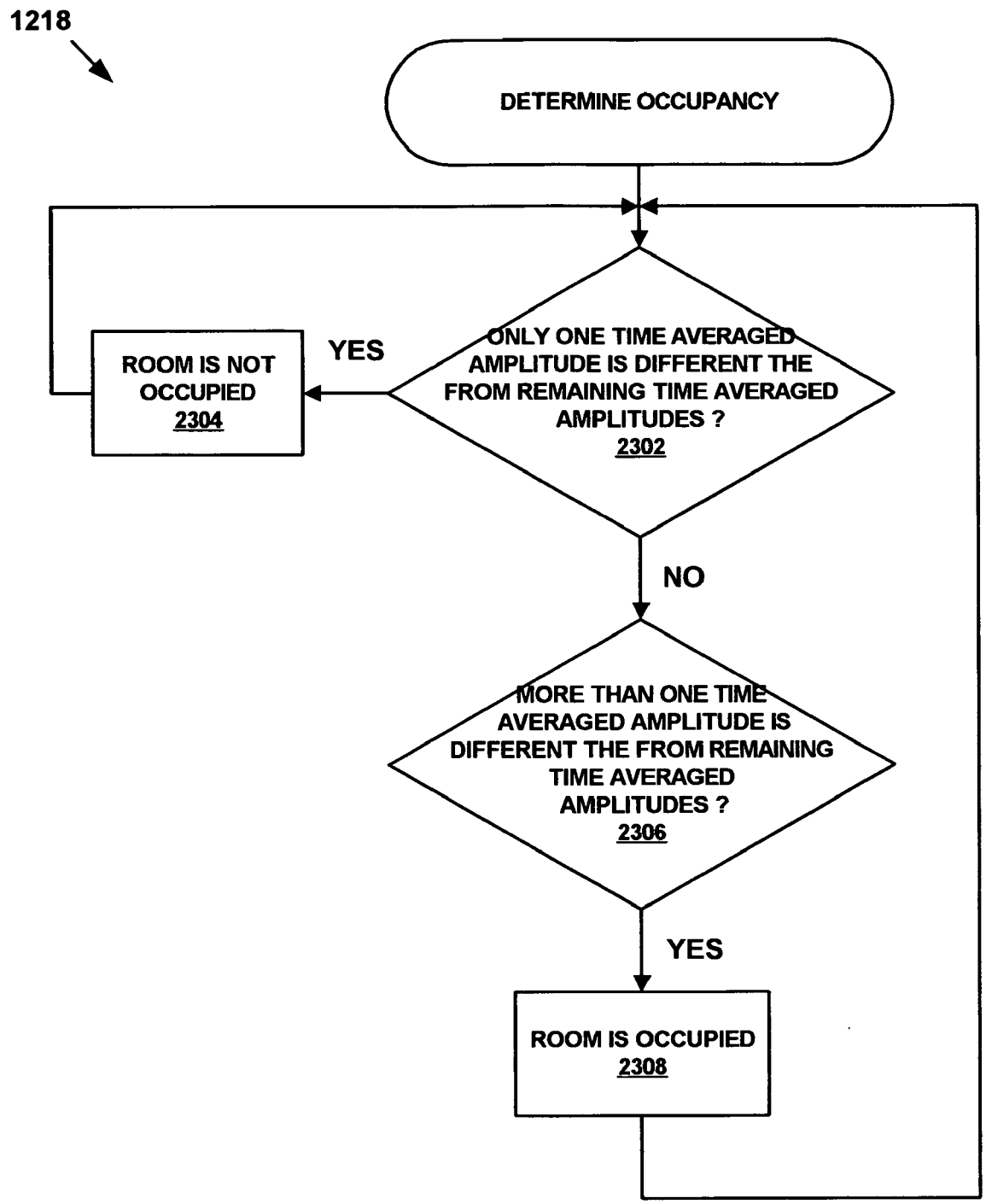
FIG. 23 is a flow chart illustration of an exemplary embodiment of a method of determining occupancy.
Figure 24:
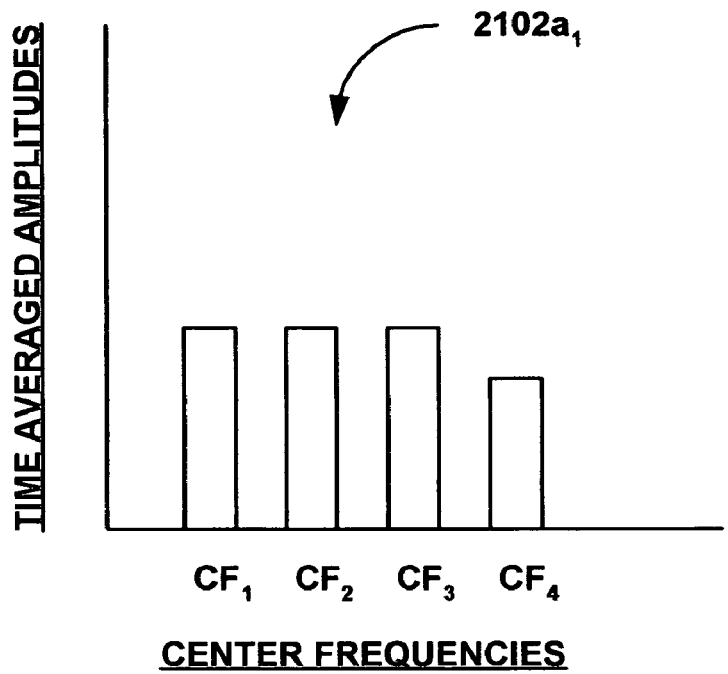
FIG. 24 is a graphical illustration of an exemplary embodiment of the time averaged amplitudes of the output signals of the variable bandpass filter at a plurality of center frequencies.
Figure 25:
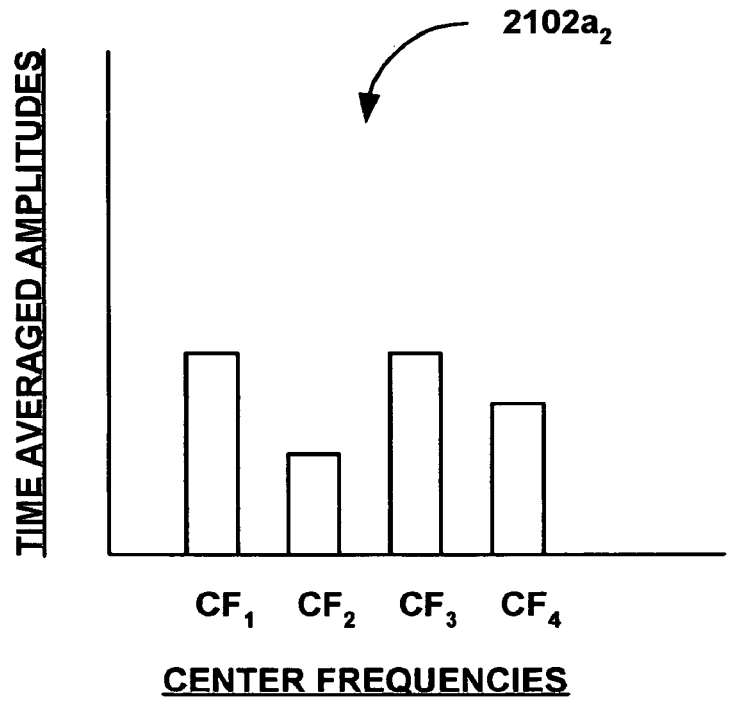
FIG. 25 is a graphical illustration of an exemplary embodiment of the time averaged amplitudes of the output signals of the variable bandpass filter at a plurality of center frequencies.

Referring to FIGS. 23-25, in an exemplary embodiment, during operation of step 1218 of the method 1200, number of different amplitude values of the time averages $1706a_i$ of the dataset 2102a are analyzed to determine whether the defined region 132 includes an occupant 134. In particular, in step 2202, the number of different amplitude values of the time averages $1706a_i$ of the dataset 2102a are analyzed to determine if only one time averaged amplitude has a different value from all of the other time averaged amplitudes. If only one time averaged amplitude $1706a_i$ has a different value from all of the other time averaged amplitudes, then it is determined that the defined region 132 is not occupied by the occupant 134 in step 2304.

For example, as illustrated in FIG. 24, for a first dataset $2102a_1$, the time averaged amplitudes for center frequencies $CF_1$ to $CF_3$ are substantially the same, and the time averaged amplitude for center frequency $CF_4$ is different from that for $CF_1$ to $CF_3$. Consequently, dataset $2102a_1$ indicates that the defined region 132 is not occupied by the occupant 134. In an exemplary embodiment, if it is determined that the defined region 132 is not occupied by the occupant 134 in step 2304, then it may also be determined that the time averaged amplitude for center frequency $CF_4$ is different from that for $CF_1$ to $CF_3$ because of the presence of a source of acoustic noise within the defined region 132 such as, for example, a ventilation system.

Conversely, if it is determined in step 2306 that more than one time averaged amplitude $1706a_i$ has a different value from all of the other time averaged amplitudes, then it is determined that the defined region 132 is occupied by the occupant 134.

For example, as illustrated in FIG. 25, for a first dataset $2102a_2$, the time averaged amplitudes for center frequencies $CF_1$ and $CF_3$ are substantially the same, and the time averaged amplitudes for center frequencies $CF_2$ and $CF_4$ are both different from that for $CF_1$ and $CF_3$. Consequently, dataset $2102a_2$ indicates that the defined region 132 is occupied by the occupant 134.

In an exemplary embodiment, steps 2302 to 2308 are implemented by the determination of noise engine 110da and determination of occupancy engine 110db of the occupancy sensing engine 110d of the controller 110.

Figure 26:
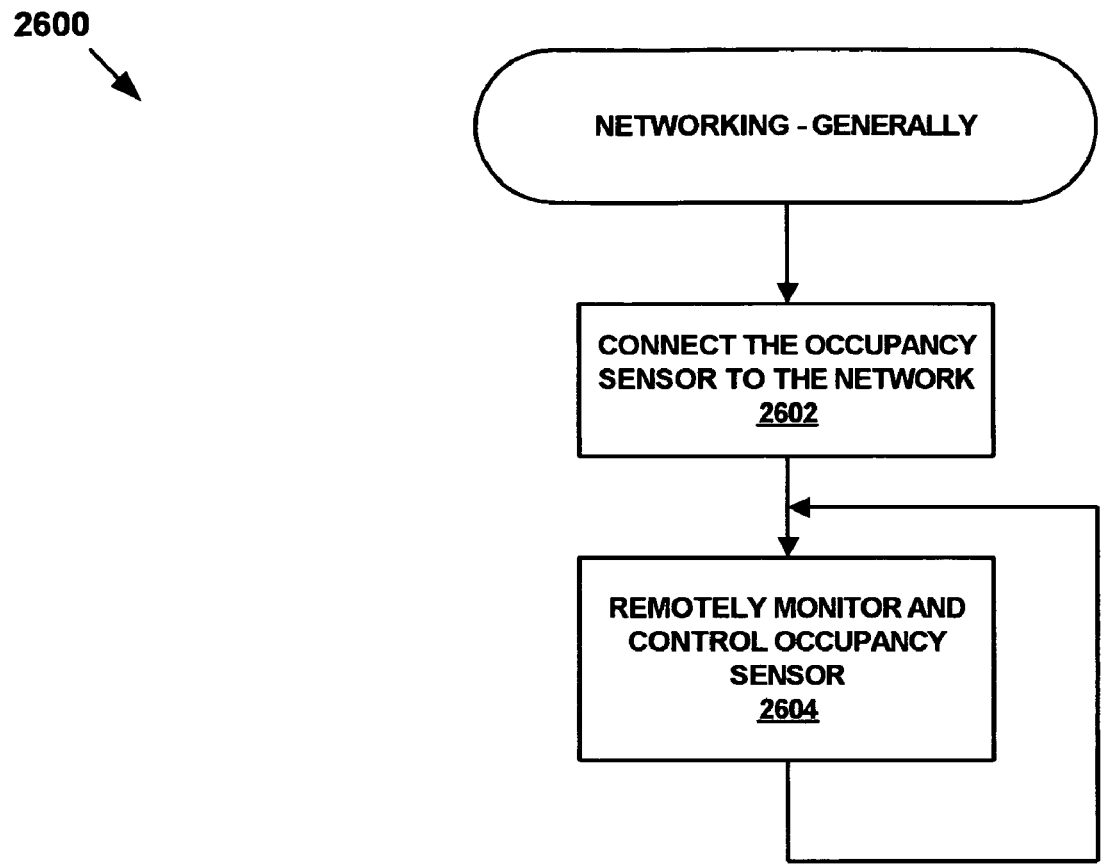
FIG. 26 is a flow chart illustration of an exemplary embodiment of a method of networking occupancy sensors.

In an exemplary embodiment, as illustrated in FIG. 26, during operation of one or more of the occupancy sensors 100 and/or one or more of the other occupancy sensors 120 and one or more of the remote control and monitoring 122, a method 2600 is implemented in which one or more of the occupancy sensors 100 and/or one or more of the other occupancy sensors 120 and one or more of the remote control and monitoring 122 are operably coupled to the network 118 in step 2602. One or more of the remote control and monitoring 122 may then operate to remotely monitor and control one or more of the occupancy sensors 100 and/or one or more of the other occupancy sensors 120 in step 2604. In an exemplary embodiment, in step 2604, the remote control and monitoring 122 may also remotely monitor and control one or more of the BAS system 124 and/or switchpack control 128.

Figure 27A:
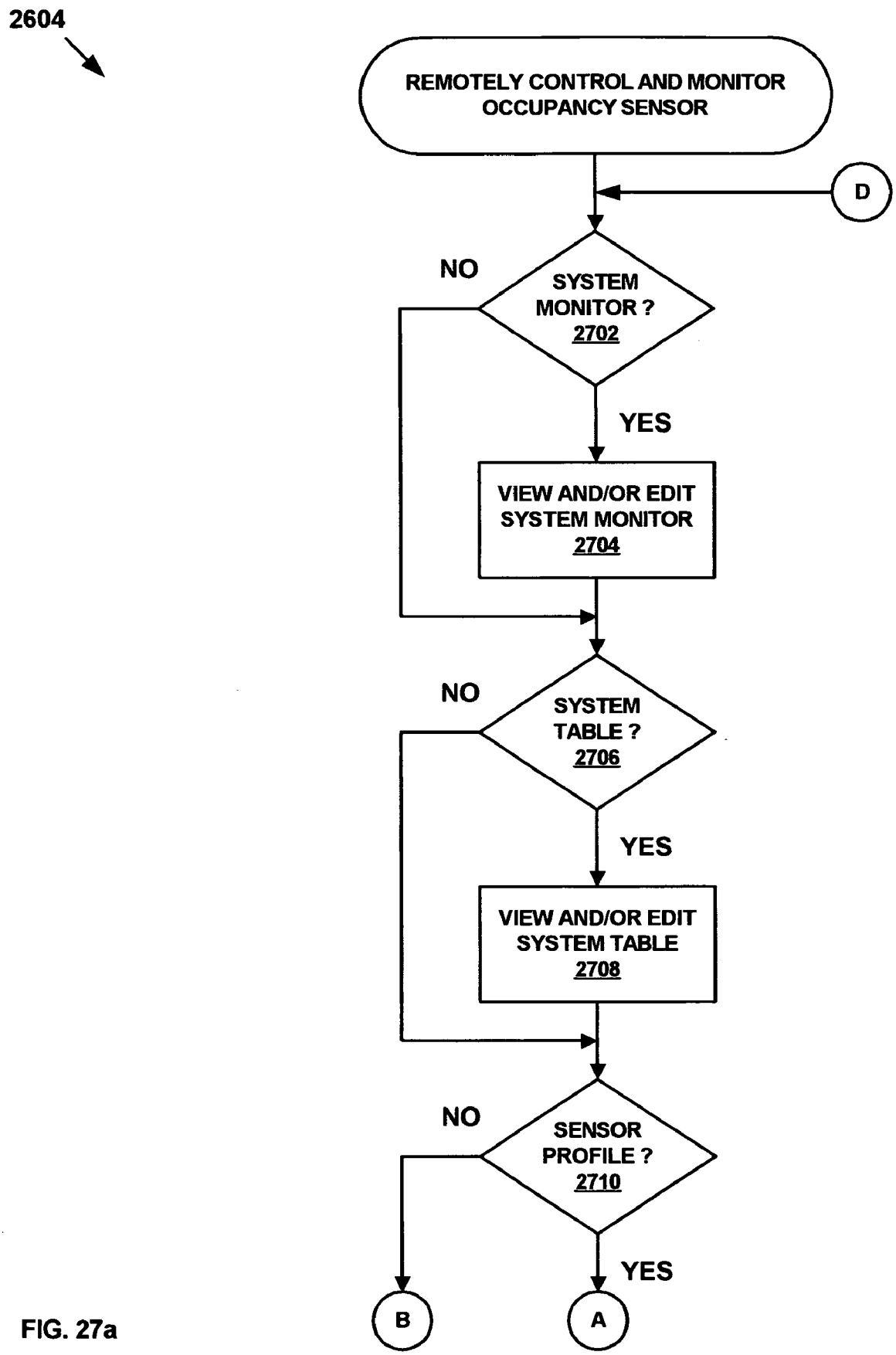
FIGS. 27a-27c is a flow chart illustration of an exemplary embodiment of a method of remotely controlling and monitoring occupancy sensors.
Figure 27B:
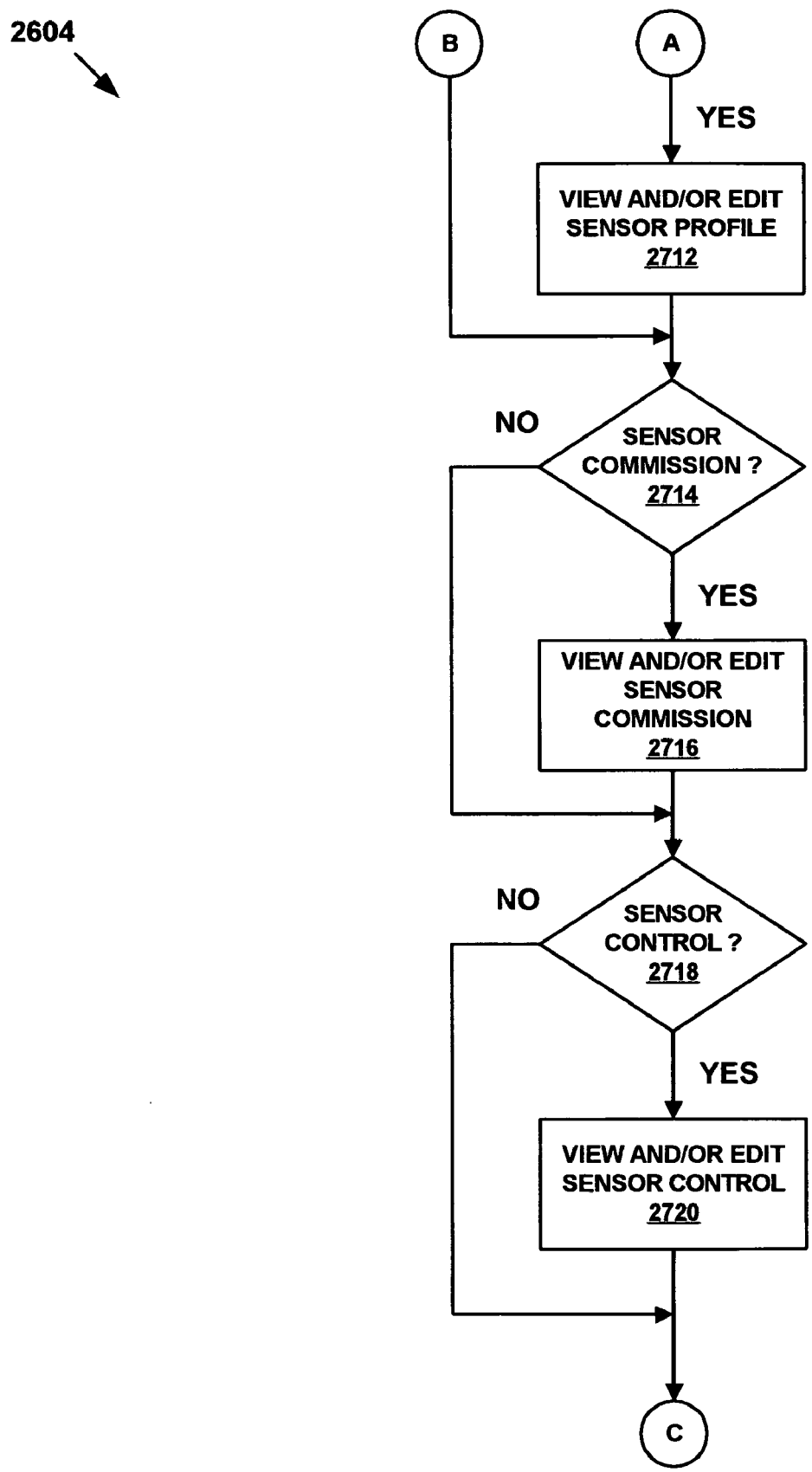
Figure 27C:
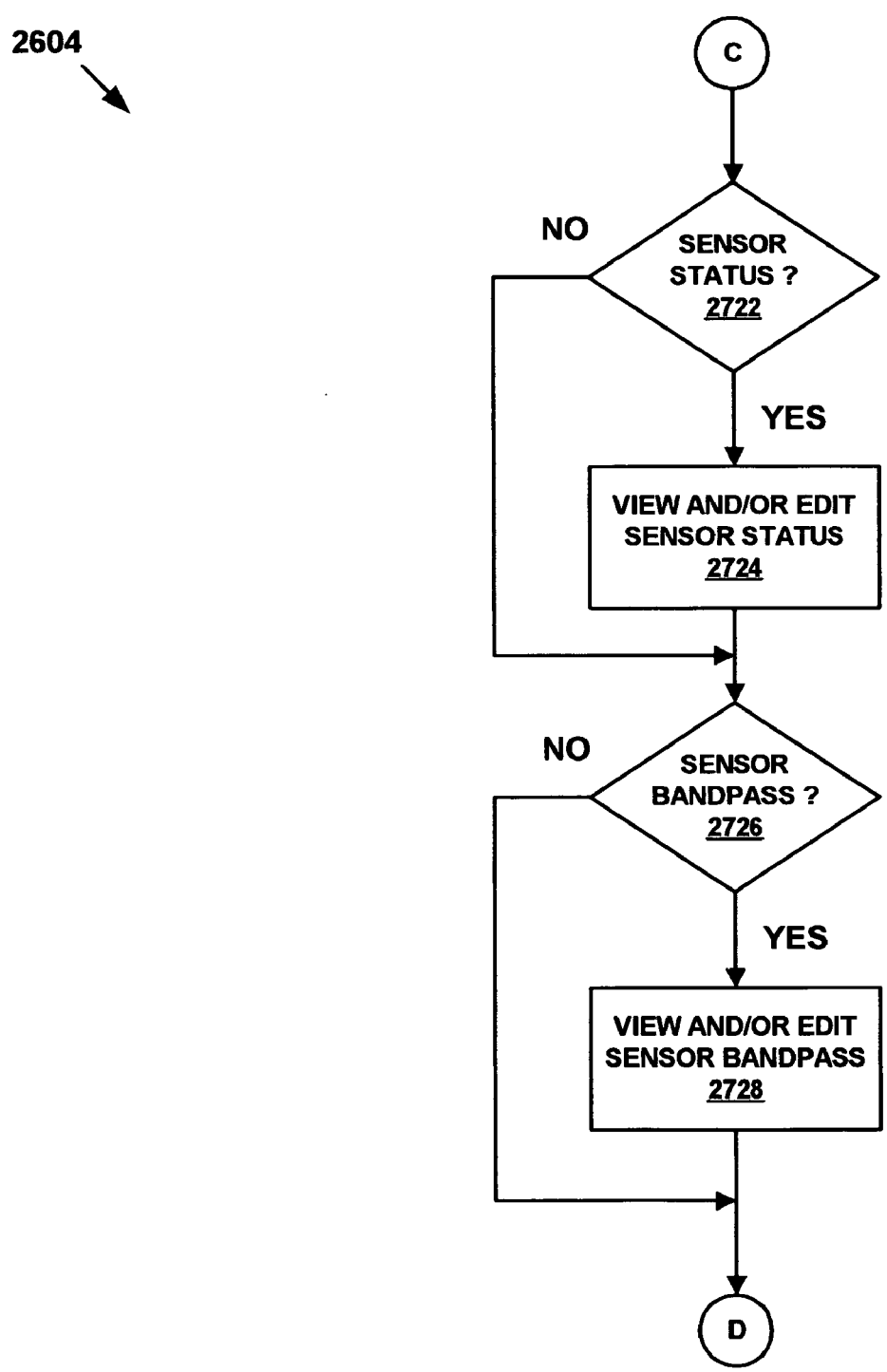

In an exemplary embodiment, as illustrated in FIGS. 27a-27c, during operation of the step 2604, a method 2700 for permitting one or more of the remote control and monitoring 122 to remotely control and monitor one or more of the occupancy sensors 100 and/or 120 is implemented in which, in step 2702, a user of one or more of the remote control and monitoring 122 may select system monitor. If the user of one or more of the remote control and monitoring 122 selects system monitor, then the user may monitor and control the status of one or more of the occupancy sensors 100 and/or 120 in step 2704.

If the user of one or more of the remote control and monitoring 122 does not select system monitor, then the user may select system table in step 2706. If the user of one or more of the remote control and monitoring 122 selects system table, then the user may monitor and control the operational status of one or more of the occupancy sensors 100 and/or 120 in step 2708.

If the user of one or more of the remote control and monitoring 122 does not select system table, then the user may select sensor profile in step 2710. If the user of one or more of the remote control and monitoring 122 selects sensor profile, then the user may monitor and control the profile of one or more of the occupancy sensors 100 and/or 120 in step 2712.

If the user of one or more of the remote control and monitoring 122 does not select sensor profile, then the user may select sensor commission in step 2714. If the user of one or more of the remote control and monitoring 122 selects sensor commission, then the user may monitor and control the commission of one or more of the occupancy sensors 100 and/or 120 in step 2716.

If the user of one or more of the remote control and monitoring 122 does not select sensor commission, then the user may select sensor control in step 2718. If the user of one or more of the remote control and monitoring 122 selects sensor control, then the user may monitor and control one or more of the occupancy sensors 100 and/or 120 in step 2720.

If the user of one or more of the remote control and monitoring 122 does not select sensor control, then the user may select sensor status in step 2722. If the user of one or more of the remote control and monitoring 122 selects sensor status, then the user may monitor and control one or more of the occupancy sensors 100 and/or 120 in step 2724.

If the user of one or more of the remote control and monitoring 122 does not select sensor status, then the user may select sensor bandpass in step 2726. If the user of one or more of the remote control and monitoring 122 selects sensor bandpass, then the user may monitor and control the system table of one or more of the occupancy sensors 100 and/or 120 in step 2728.

Figure 28:
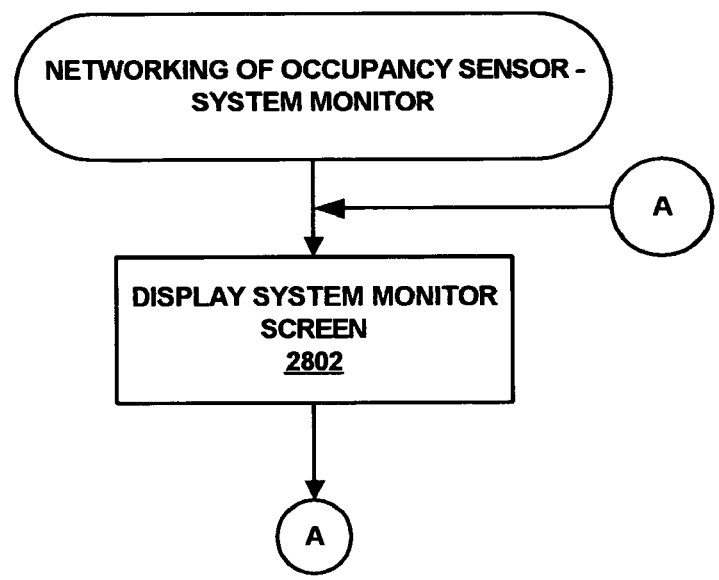
FIG. 28 is a flow chart illustration of an exemplary embodiment of a method of monitoring the system status of one or more occupancy sensors.
Figure 29:
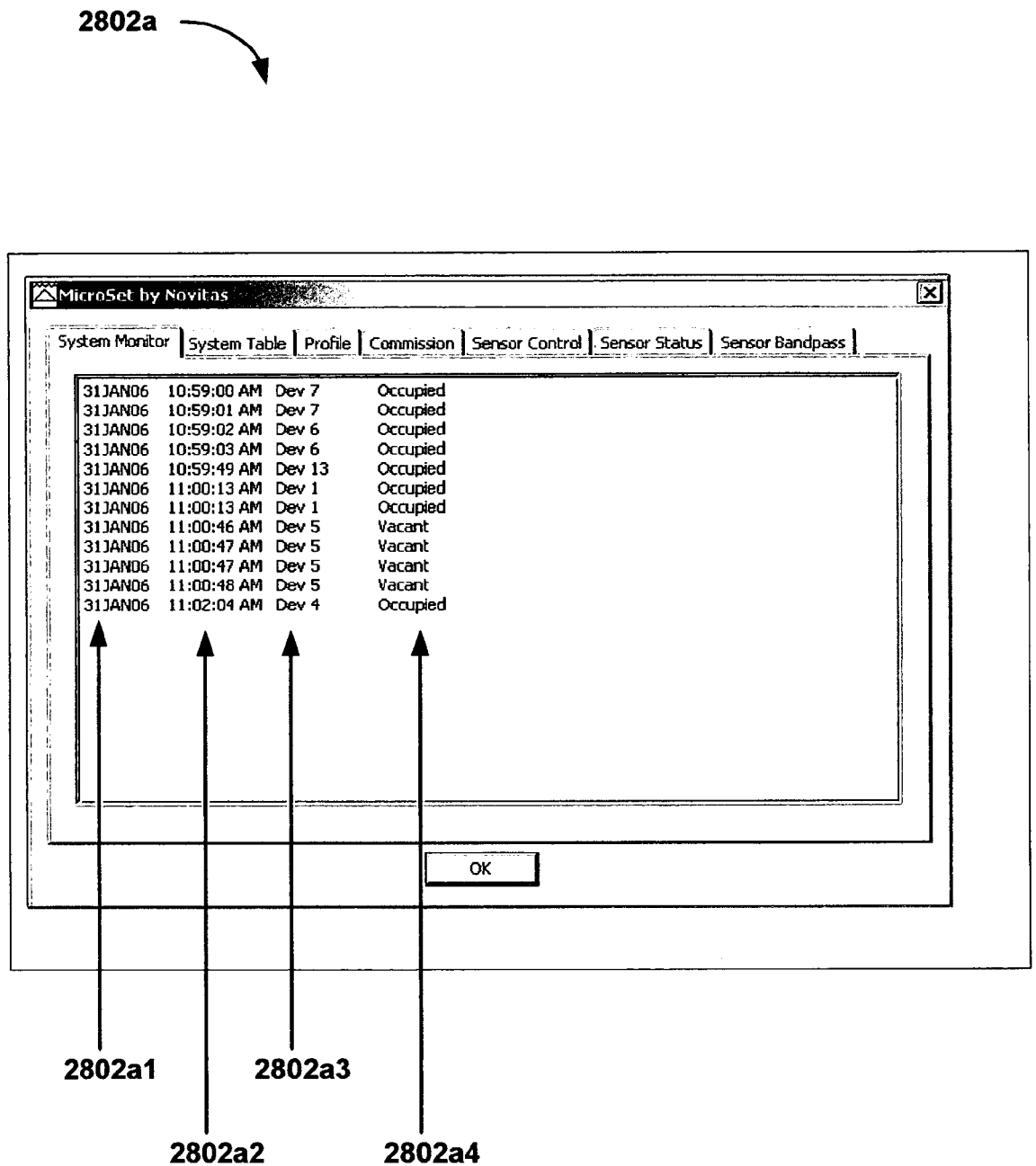
FIG. 29 is an exemplary embodiment of a graphical user interface for remotely controlling and monitoring occupancy sensors in a system.
Figure 30A:
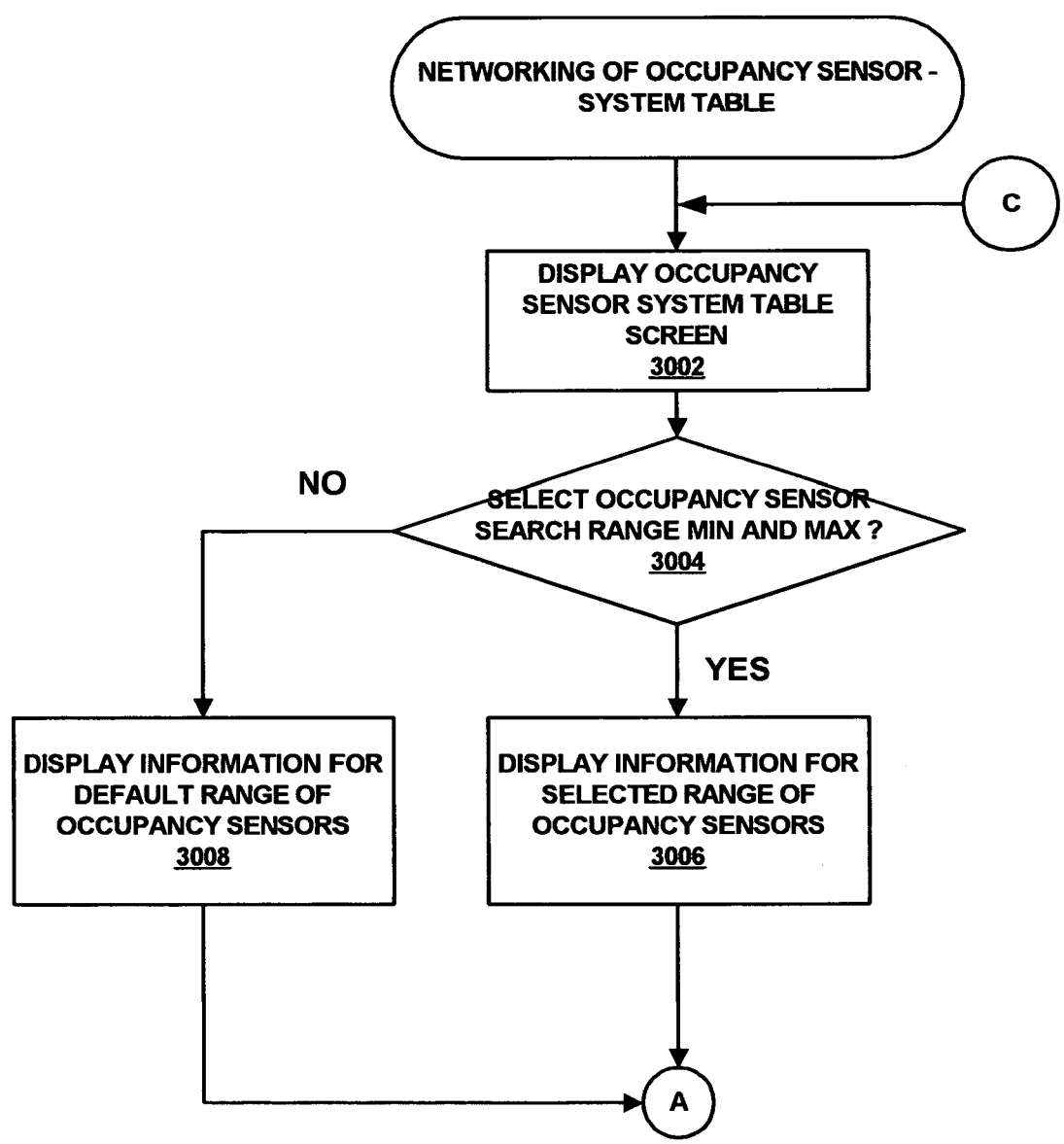
FIGS. 30a-30c is a flow chart illustration of an exemplary embodiment of a method of remotely controlling and monitoring a system of occupancy sensors.
Figure 30B:
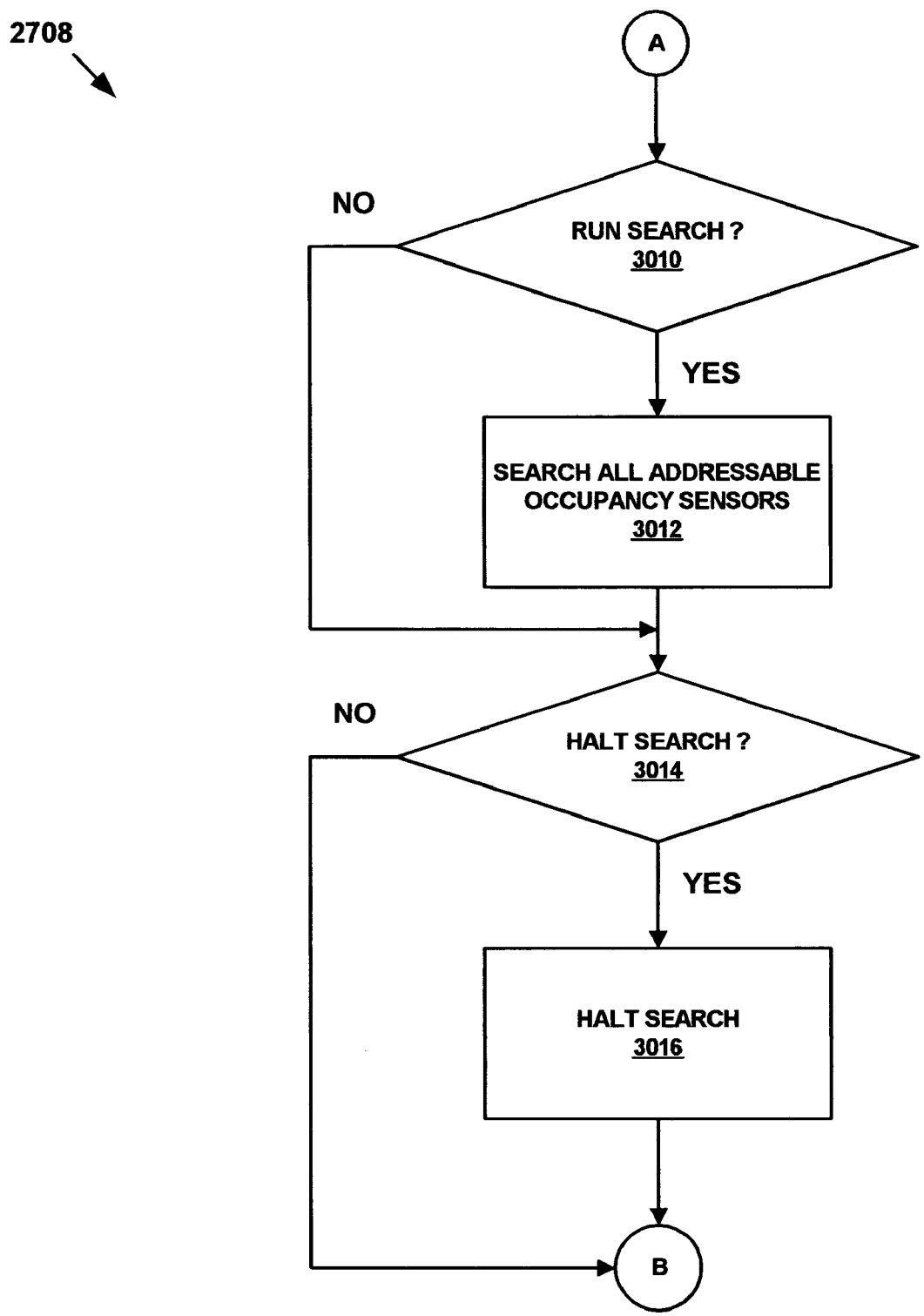
Figure 30C:
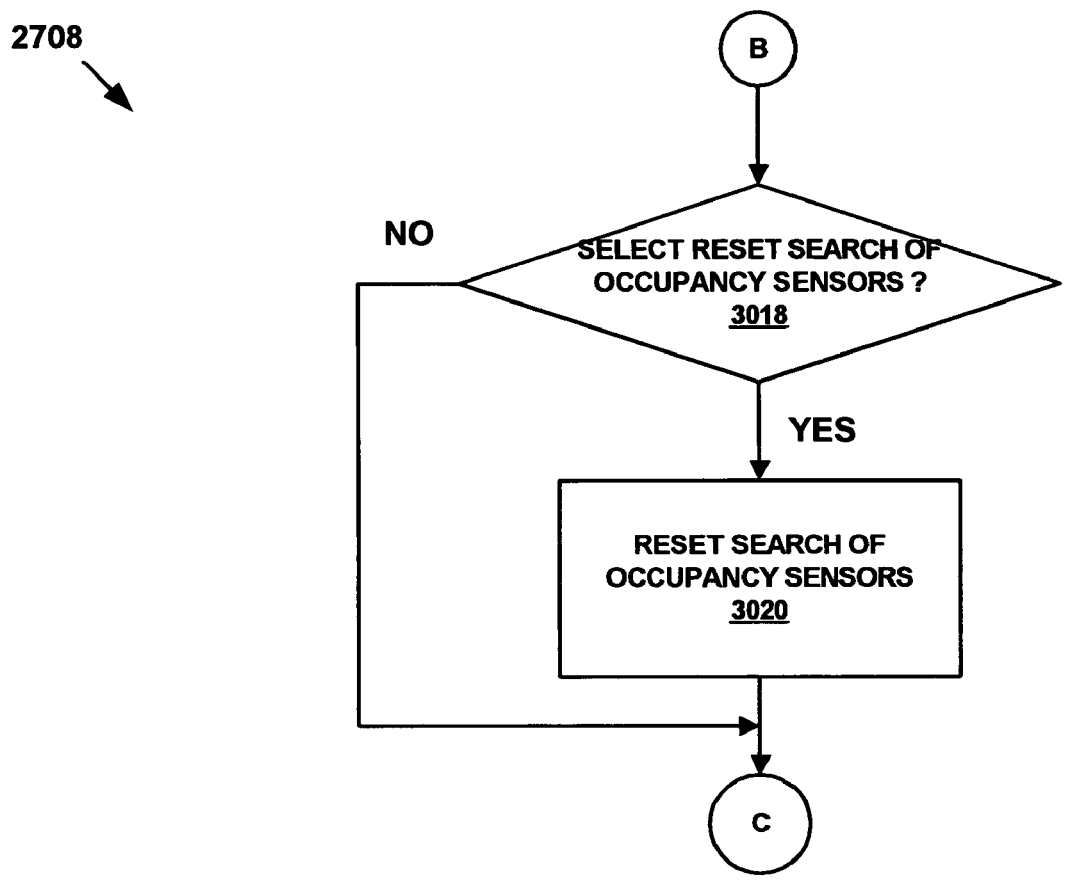
Figure 31A:
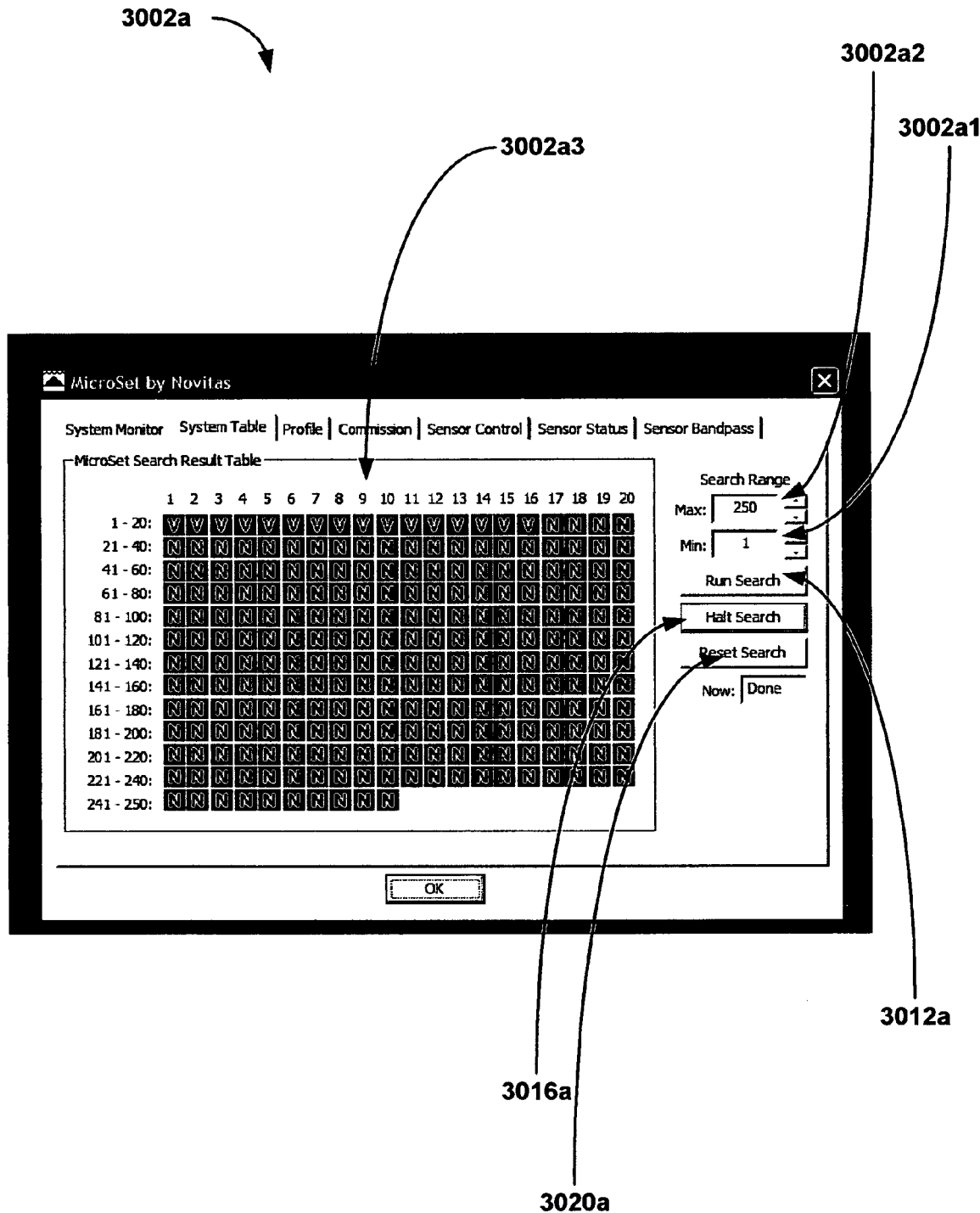
FIG. 31a and 31b are exemplary embodiments of graphical user interfaces for remotely controlling and monitoring a system of occupancy sensors.
Figure 31B:
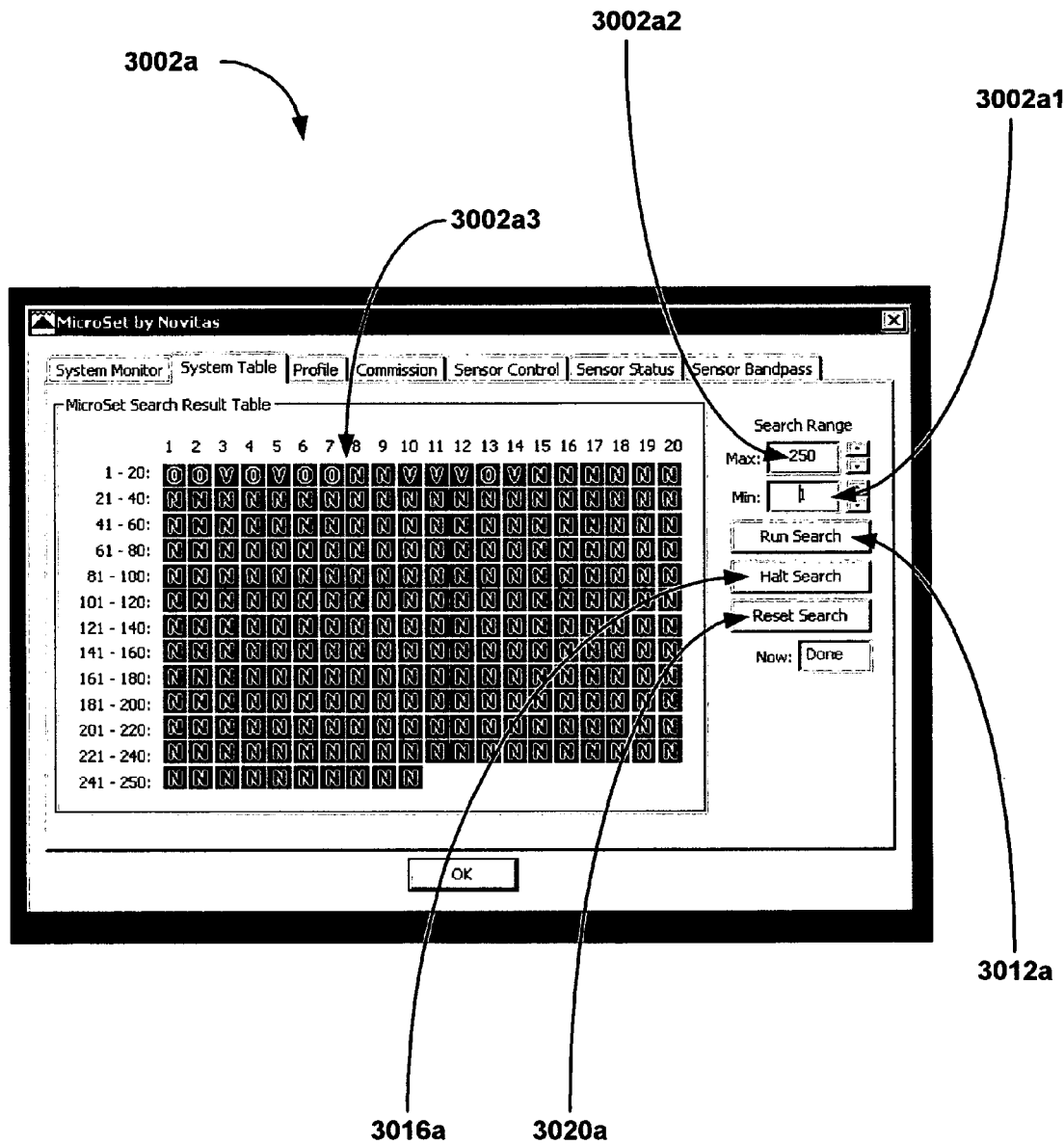

In an exemplary embodiment, as illustrated in FIGS. 28 and 29, during operation of step 2704, an occupancy sensor system monitor graphical user interface (GUI) 2802a is displayed on the remote control and monitoring 122 in step 2802.

In an exemplary embodiment, the sensor system monitor GUI 2802a includes tabular system wide information that includes: a column 2802a1 for the date of a system event, a column 2802a2 for the time of the system event, a network address 2802a3 of the occupancy sensor 100 associated with the system event, and a description 2802a4 of the system event. In an exemplary embodiment, the system wide information includes indications of changes of operational status of the occupancy sensors 100.

In an exemplary embodiment, as illustrated in FIGS. 30a, 30b, 30c, 31a, and 31b, during operation of step 2708, an occupancy sensor system table GUI 3002a is displayed on the remote control and monitoring 122 in step 3002.

In an exemplary embodiment, the sensor system table GUI 3002a includes: a minimum network address 3002a1, a maximum network address 3002a2, and an occupancy sensor search result table 3002a3 for the range of network addresses defined by the minimum and maximum network addresses.

In an exemplary embodiment, the user of the remote control and monitoring 122 may select the minimum and maximum network addresses, 3002a1 and 3002a2, in step 3004. If the user of the remote control and monitoring 122 selects the minimum and maximum network addresses, 3002a1 and 3002a2, then the information corresponding to the range of occupancy sensors having the selected range of network addresses is displayed on the occupancy sensor search result table 3002a3 of the sensor system table GUI 3002a in step 3006. Alternatively, if the user of the remote control and monitoring 122 does not select minimum and maximum network addresses, 3002a1 and 3002a2, then the information corresponding to the occupancy sensors having a predefined default range of network addresses is displayed on occupancy sensor search result table 3002a3 of the sensor system table GUI 3002a in step 3008. In an exemplary embodiment, the information corresponding to the occupancy sensors having a range of network addresses that is displayed on occupancy sensor search result table 3002a3 of the sensor system table GUI 3002a includes an indication of the operating condition of the occupancy sensor. For example, if the displayed indicia for a particular occupancy sensor address is V then that may indicate that the corresponding occupancy sensor 100 is in a vacant room, i.e., one that is not occupied. Alternatively, if the displayed indicia is O then the room is occupied. Alternatively, if the displayed value is N then no information is available or the occupancy sensor 100 is not present.

In an exemplary embodiment, the user of the remote control and monitoring 122 may select running a search of the occupancy sensors within the range of occupancy sensors in step 3010. If the user of the remote control and monitoring 122 selects running a search of all of the occupancy sensors within the range of occupancy sensors off, then the user may initiate the search by pressing the run search button 3012a in step 3012.

Alternatively, if the user of the remote control and monitoring 122 does not select running a search of all of the occupancy sensors within the range of occupancy sensors or if the running of the search of the occupancy sensors within the range of occupancy sensors off has been initiated, then the user of the remote control and monitoring 122 may select halting the search operation on the range of occupancy sensors in step 3014. If the user of the remote control and monitoring 122 selects halting the search operation on the range of occupancy sensors, then the user may halt the search operation by pressing the halt search button 3016a in step 3016.

Alternatively, if the user of the remote control and monitoring 122 does not select halting a search of all of the occupancy sensors within the range of occupancy sensors or if the halting of the search of the occupancy sensors within the range of occupancy sensors off has been initiated, then the user of the remote control and monitoring 122 may select resetting the search operation on the range of occupancy sensors in step 3018. If the user of the remote control and monitoring 122 selects resetting the search operation on the range of occupancy sensors, then the user may reset the search operation by pressing the reset search button 3020a in step 3020.

Figure 32A:
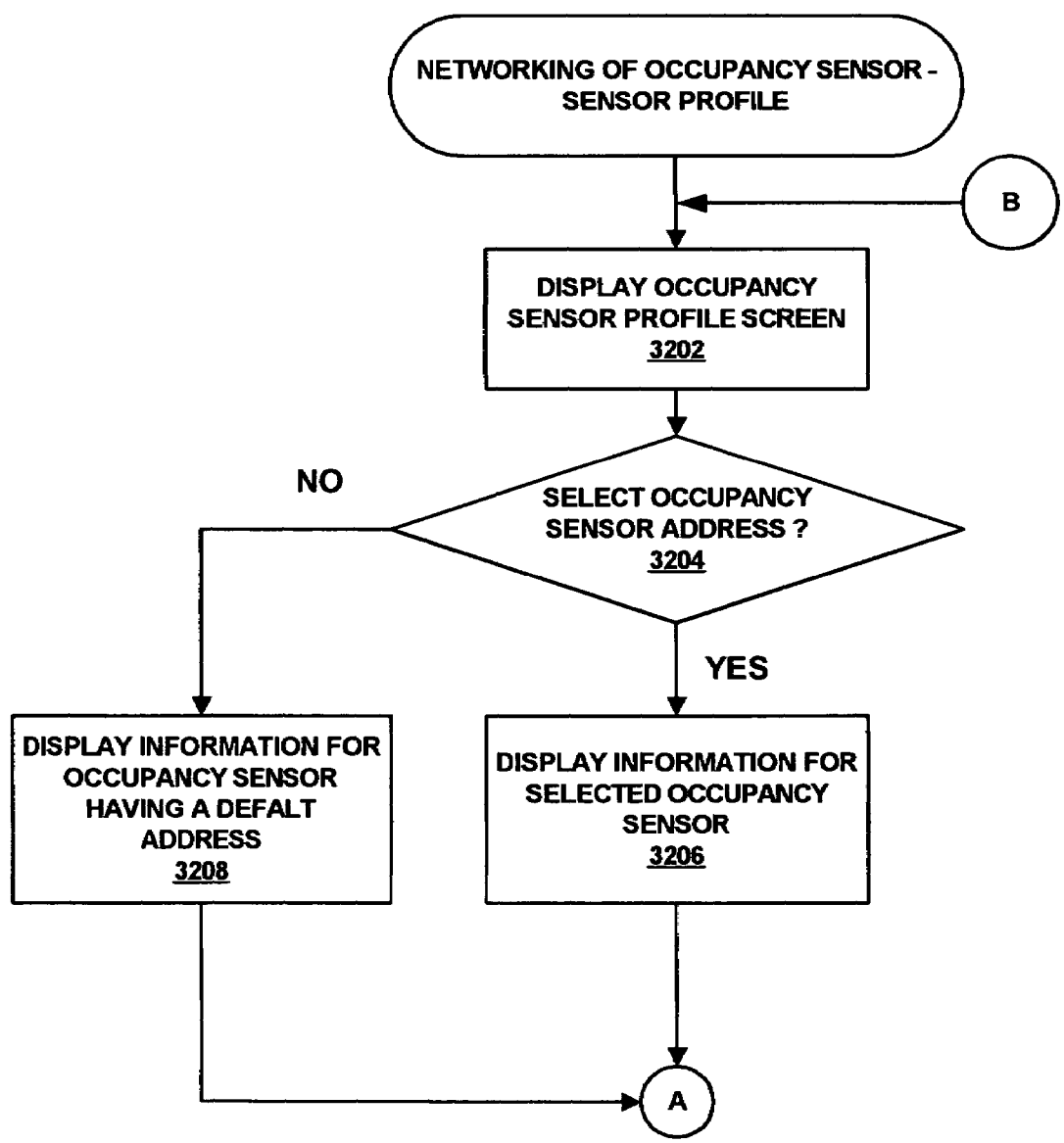
FIGS. 32a-32b is a flow chart illustration of an exemplary embodiment of a method of remotely controlling and monitoring the profile of occupancy sensors.
Figure 32B:
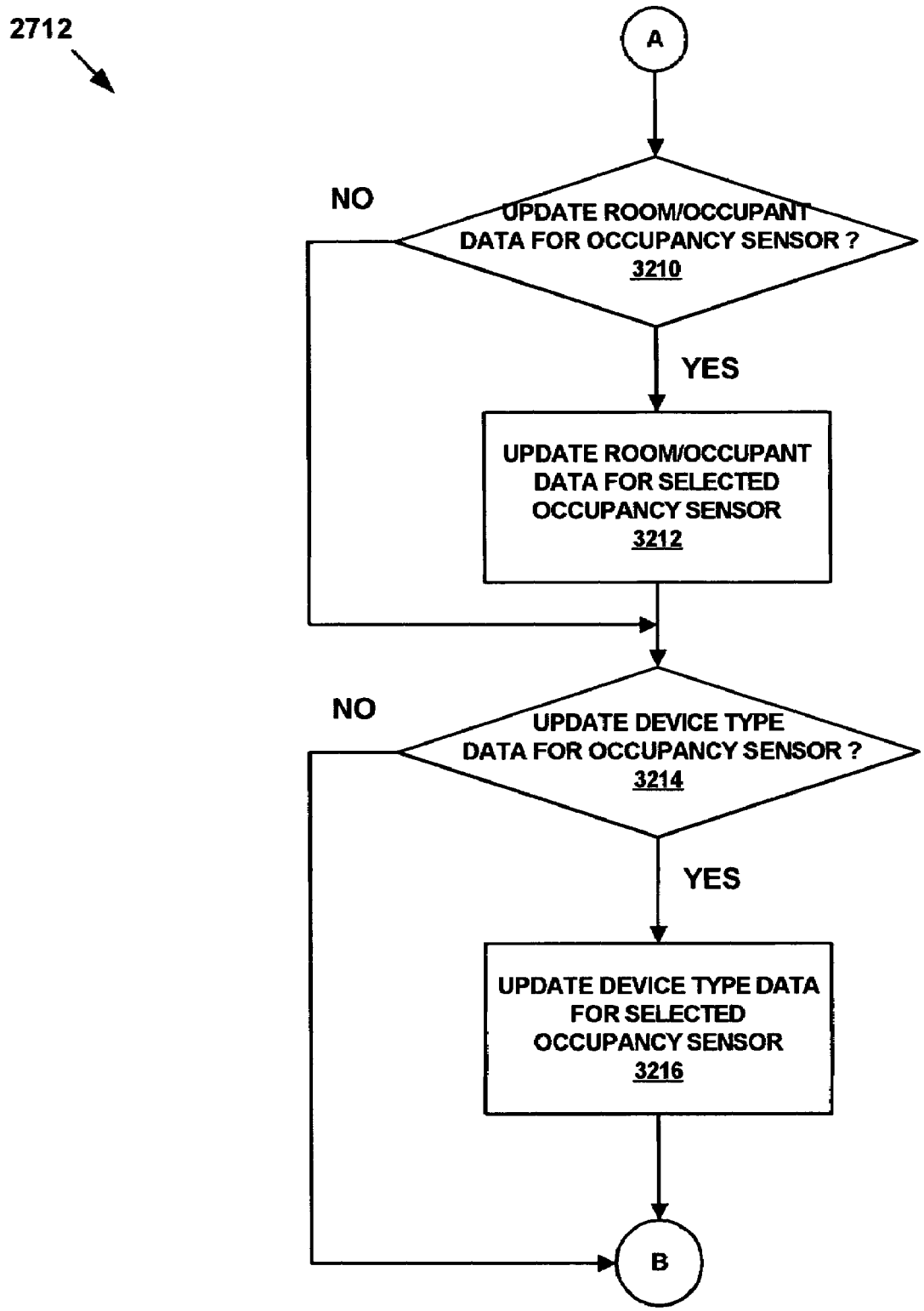
Figure 33:
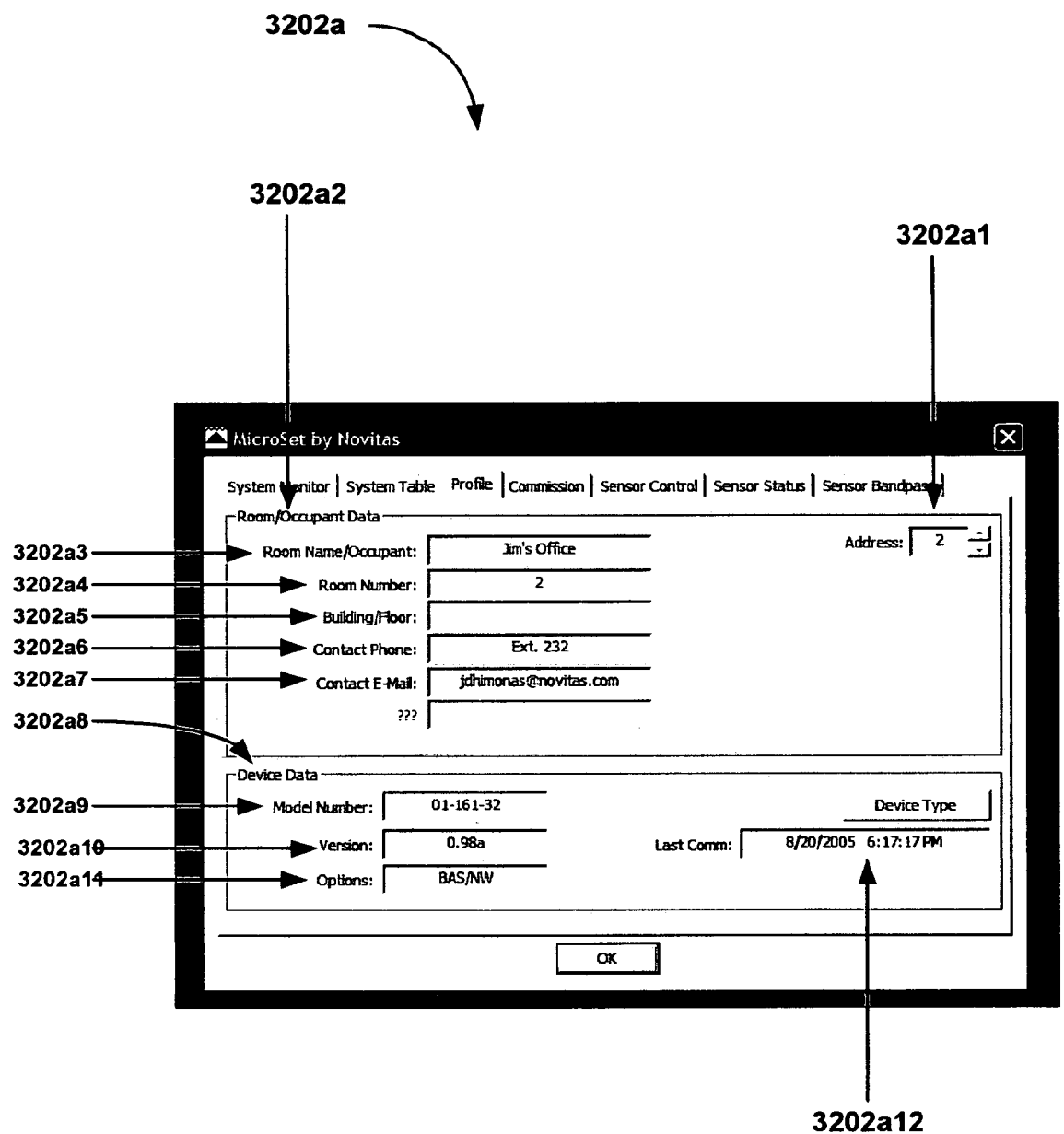
FIG. 33 is an exemplary embodiment of a graphical user interface for remotely controlling and monitoring the profile of occupancy sensors.
Figure 34A:
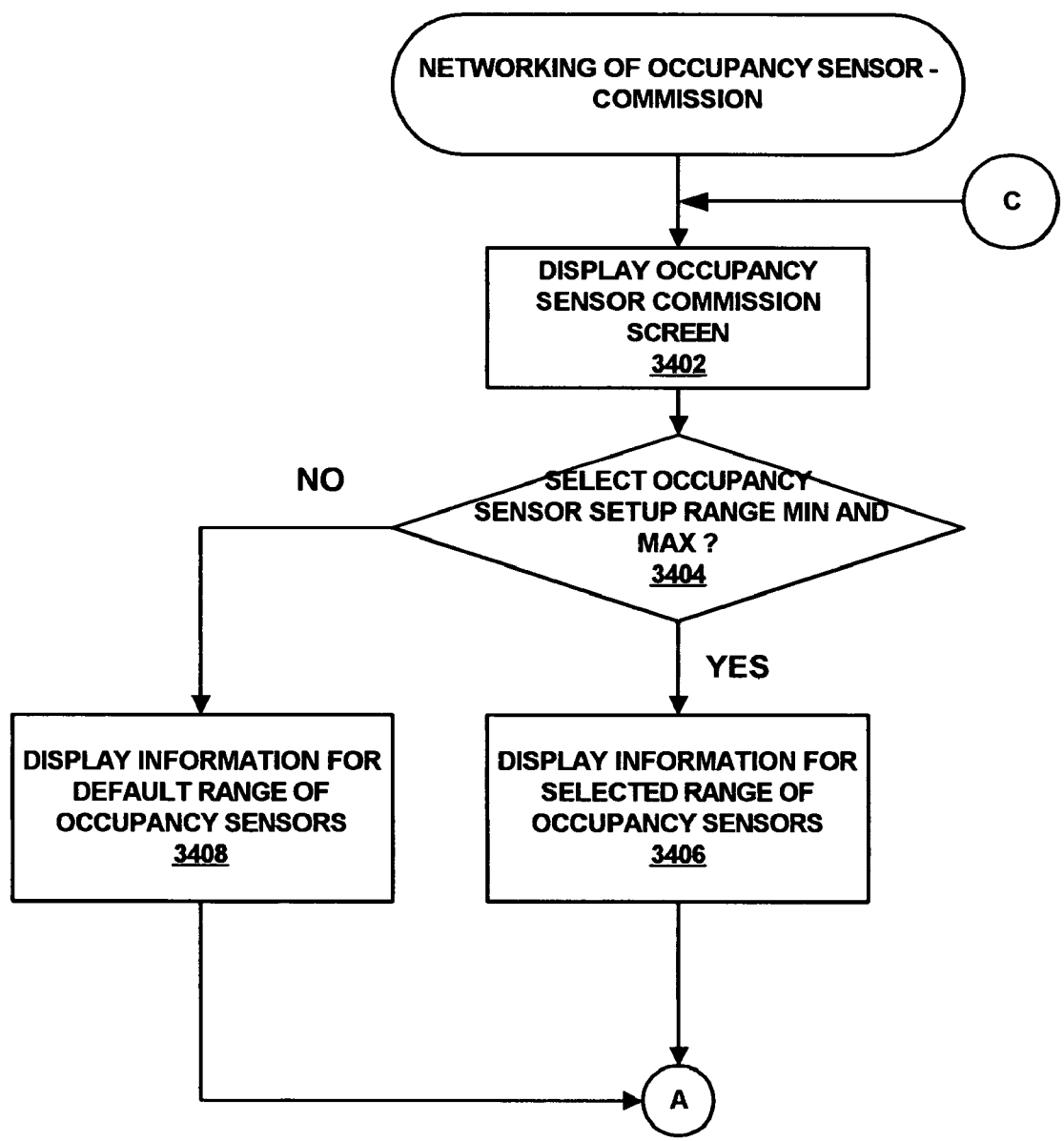
FIGS. 34a-34c is a flow chart illustration of an exemplary embodiment of a method of remotely controlling and monitoring the commissioning of occupancy sensors.
Figure 34B:
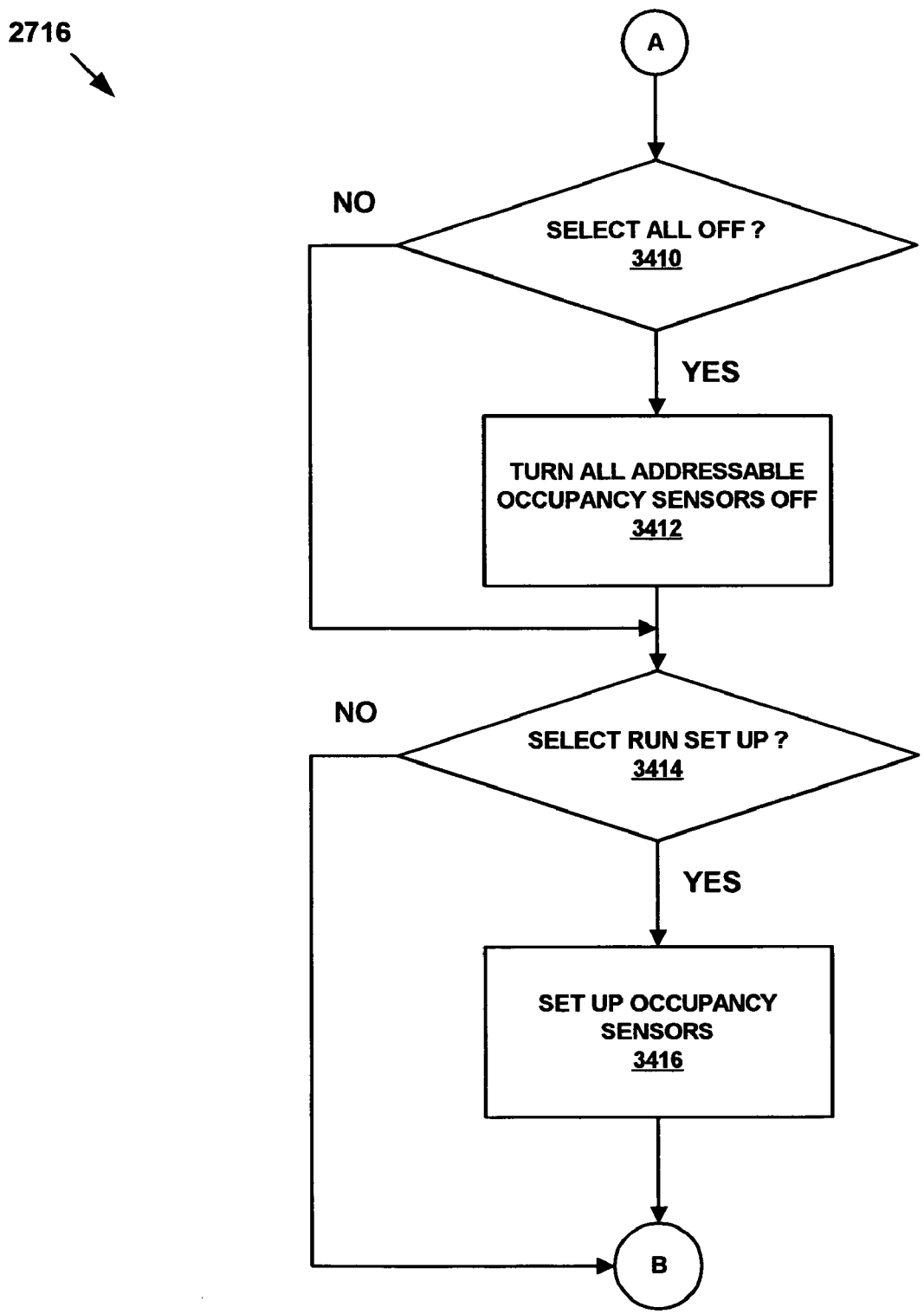
Figure 34C:
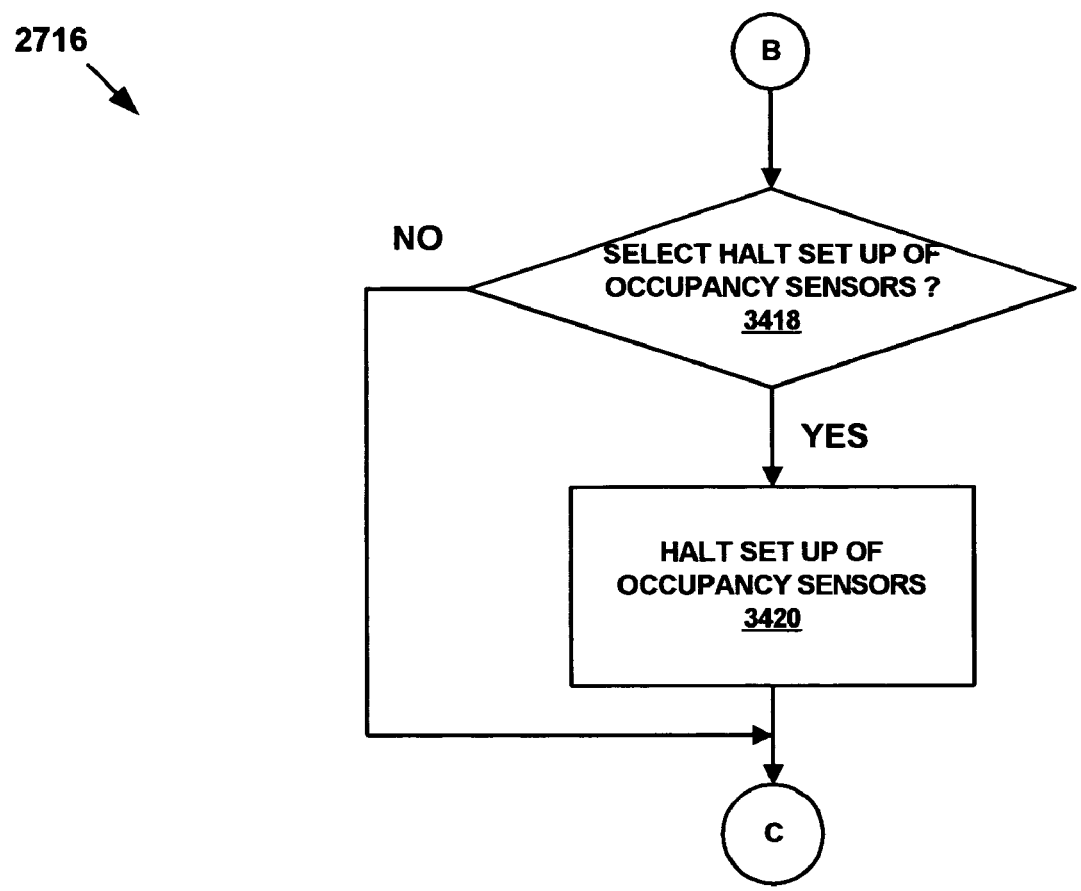
Figure 35:
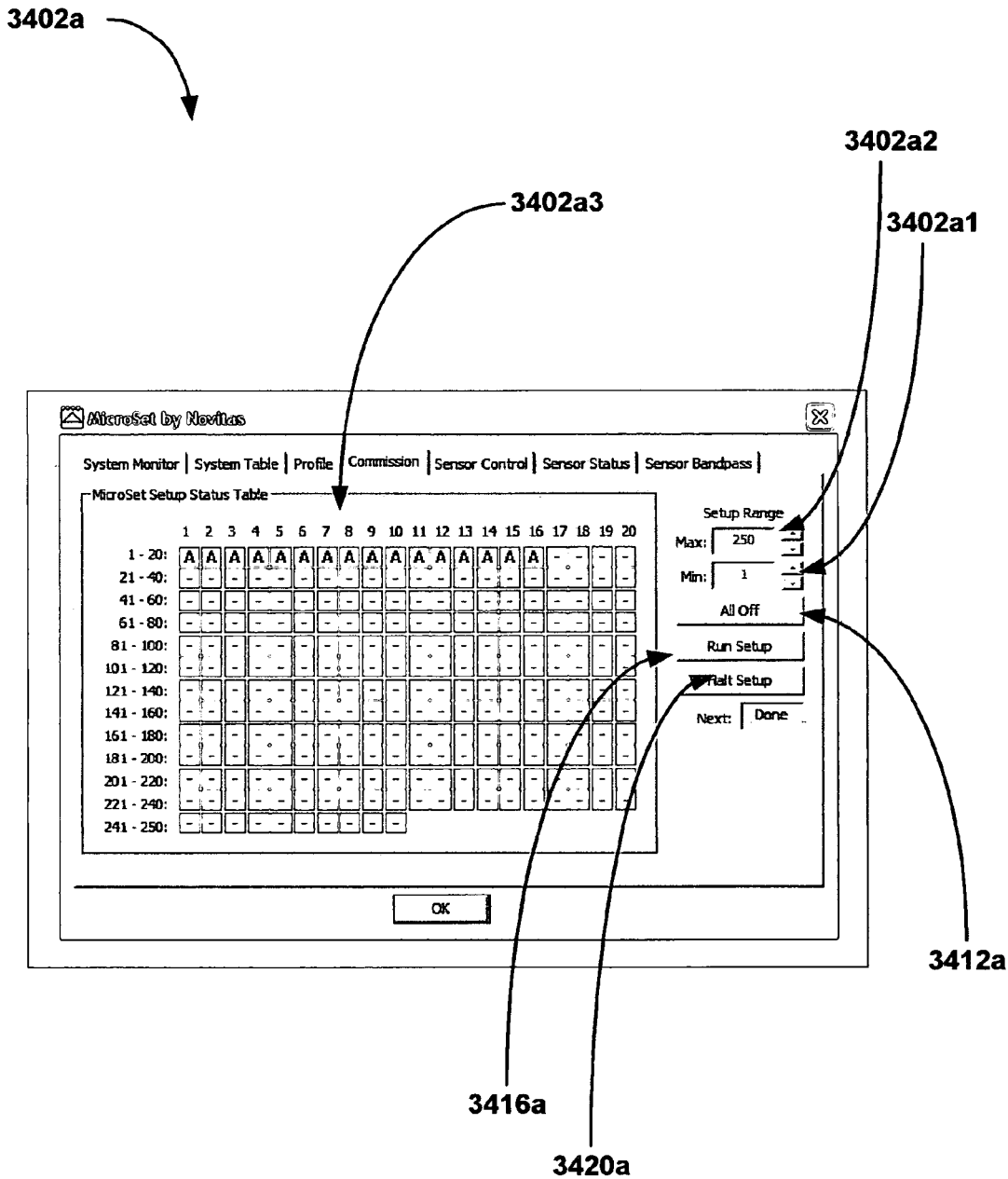
FIG. 35 is an exemplary embodiment of a graphical user interface for remotely controlling and monitoring the commissioning of occupancy sensors.

In an exemplary embodiment, as illustrated in FIGS. 32a, 32b, and 33, during operation of step 2712, an occupancy sensor profile GUI 3202a is displayed on the remote control and monitoring 122 in step 3202.

In an exemplary embodiment, the sensor profile GUI 3202a includes: a network address 3202a1 for the occupancy sensor; room/occupant data 3202a2 including room name/occupant 3202a3, the room number 3202a4, the building/floor 3202a5, contact phone number 3202a6, and contact e-mail 3202a7; device data 3202a8 including the model number 3202a9 of the occupancy sensor, the version 3202a10 of the occupancy sensor, and the options 3202a11 associated within the occupancy sensor; and the date/time 3202a12 of the last communication.

In an exemplary embodiment, the user of the remote control and monitoring 122 may select the network address 3202a1 for the occupancy sensor in step 3204. If the user of the remote control and monitoring 122 selects the network address 3202a1 for the occupancy sensor, the information corresponding to the occupancy sensor having the selected network address is displayed on the sensor profile GUI 3202a in step 3206. Alternatively, if the user of the remote control and monitoring 122 does not select a network address 3202a1 for the occupancy sensor, the information corresponding to the occupancy sensor having a predefined default network address is displayed on the sensor profile GUI 3202a in step 3208.

In an exemplary embodiment, the user of the remote control and monitoring 122 may select updating the room/occupant data 3202a2 for the occupancy sensor in step 3210. If the user of the remote control and monitoring 122 selects updating the room/occupant data 3202a2 for the occupancy sensor, then the user of the remote control and monitoring 122 may update the room/occupant data 3202a2 for the occupancy sensor in step 3212. In an exemplary embodiment, the room/occupant data 3202a2 includes the room name/occupant 3202a3, the room number 3202a4, the building/floor 3202a5, contact phone number 3202a6, and contact e-mail 3202a7.

Alternatively, if the user of the remote control and monitoring 122 does not updating the room/occupant data 3202a2 for the occupancy sensor or if the updating of the room/occupant data for the occupancy sensor has been completed, the user of the remote control and monitoring 122 may select updating the device type data 3202a8 for the occupancy sensor in step 3214.

If the user of the remote control and monitoring 122 selects updating the device type data 3202a8 for the occupancy sensor, then the user of the remote control and monitoring 122 may update the device type data for the occupancy sensor in step 3216. In an exemplary embodiment, device data 3202a8 includes the model number 3202a9 of the occupancy sensor, the version 3202a10 of the occupancy sensor, and the options 3202a11 associated within the occupancy sensor.

In an exemplary embodiment, as illustrated in FIGS. 34a, 34b, 34c and 35, during operation of step 2716, an occupancy sensor commission GUI 3402a is displayed on the remote control and monitoring 122 in step 3402.

In an exemplary embodiment, the sensor commission GUI 3402a includes: a minimum network address 3402a1, a maximum network address 3402a2, and an occupancy sensor status table 3402a3 for the range of network addresses defined by the minimum and maximum network addresses.

In an exemplary embodiment, the user of the remote control and monitoring 122 may select the minimum and maximum network addresses, 3402a1 and 3402a2, in step 3404. If the user of the remote control and monitoring 122 selects the minimum and maximum network addresses, 3402a1 and 3402a2, then the information corresponding to the range of occupancy sensors having the selected range of network addresses is displayed on occupancy sensor status table 3402a3 of the sensor commission GUI 3402a in step 3406. Alternatively, if the user of the remote control and monitoring 122 does not select minimum and maximum network addresses, 3402a1 and 3402a2, then the information corresponding to the occupancy sensors having a predefined default range of network addresses is displayed on occupancy sensor status table 3402a3 of the sensor commission GUI 3402a in step 3408.

In an exemplary embodiment, the information corresponding to the occupancy sensors having a range of network addresses that is displayed on occupancy sensor status table 3402a3 of the sensor commission GUI 3402a includes an indication of the operating condition of the occupancy sensor. For example, if the displayed indicia for a particular occupancy sensor address is A then that may indicate that the corresponding occupancy sensor is active.

In an exemplary embodiment, the user of the remote control and monitoring 122 may select turning all of the occupancy sensors within the range of occupancy sensors off in step 3410. If the user of the remote control and monitoring 122 selects turning all of the occupancy sensors within the range of occupancy sensors off, then the user of the remote control and monitoring 122 may then turn all of the occupancy sensors within the range of occupancy sensors off in step 3412 by depressing an all off button 3412a.

Alternatively, if the user of the remote control and monitoring 122 does not select turning all of the occupancy sensors within the range of occupancy sensors off or if the turning all of the occupancy sensors within the range of occupancy sensors off has been completed, then the user of the remote control and monitoring 122 may select running a setup operation on the range of occupancy sensors in step 3414.

If the user of the remote control and monitoring 122 selects running a setup operation on the range of occupancy sensors in step 3414, then the user of the remote control and monitoring 122 may initiate the setup operation in step 3416 by depressing the set up button 3416a. In an exemplary embodiment, the set up of the occupancy sensors in step 3416 further includes sequentially activating each sensor 100 upon which the next available address within the selected range is assigned.

Alternatively, if the user of the remote control and monitoring 122 does not select running a setup operation on the range of occupancy sensors or if the setting up the occupancy sensors within the range of occupancy sensors off has begun, then the user of the remote control and monitoring 122 may select halting the setup operation on the range of occupancy sensors in step 3418. If the user of the remote control and monitoring 122 selects halting the setup operation on the range of occupancy sensors, then the user may halt the setup operation by pressing the halt setup button 3420a in step 3420.

Figure 36A:
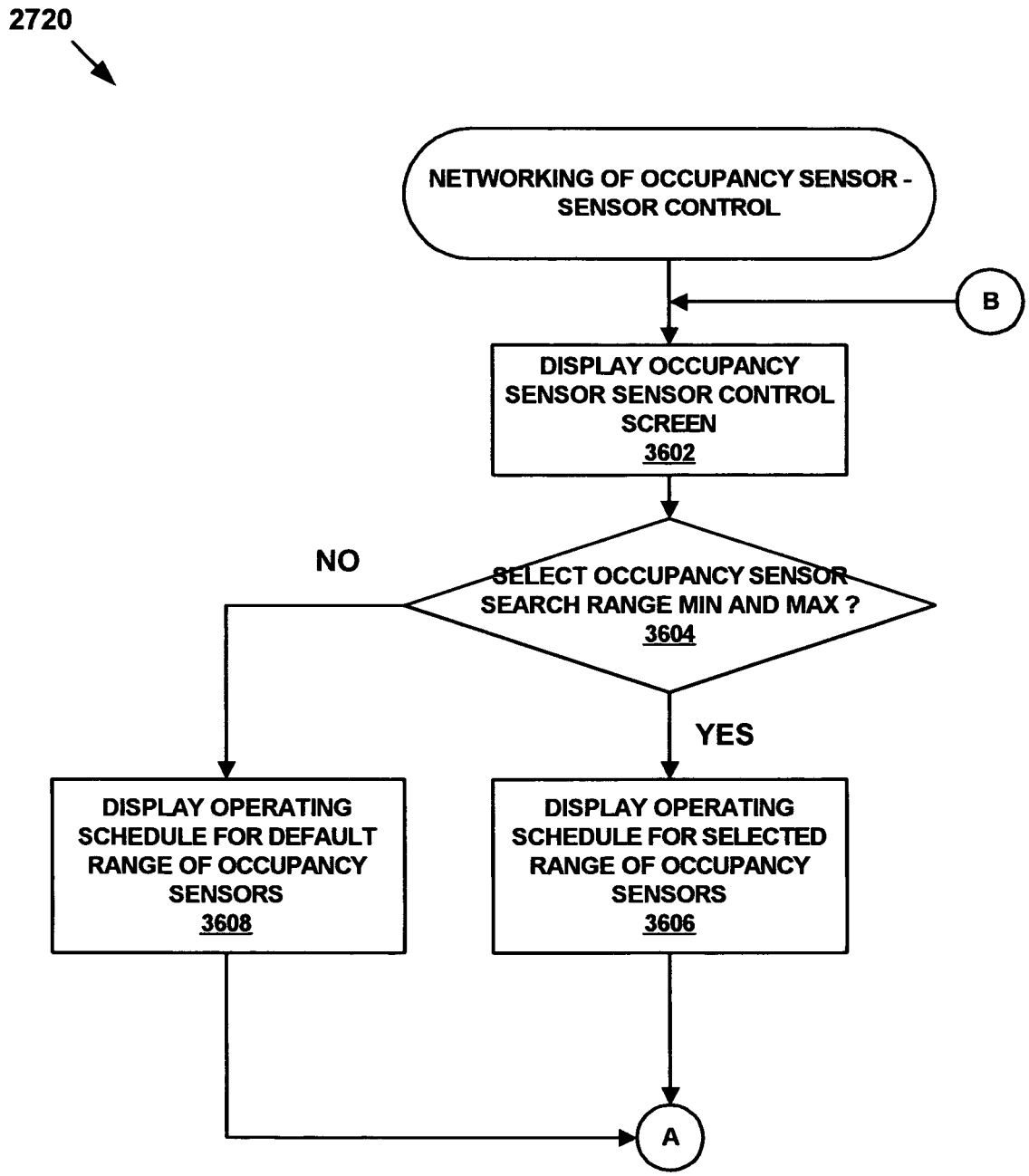
FIGS. 36a-36b is a flow chart illustration of an exemplary embodiment of a method of remotely controlling and monitoring occupancy sensors.
Figure 36B:
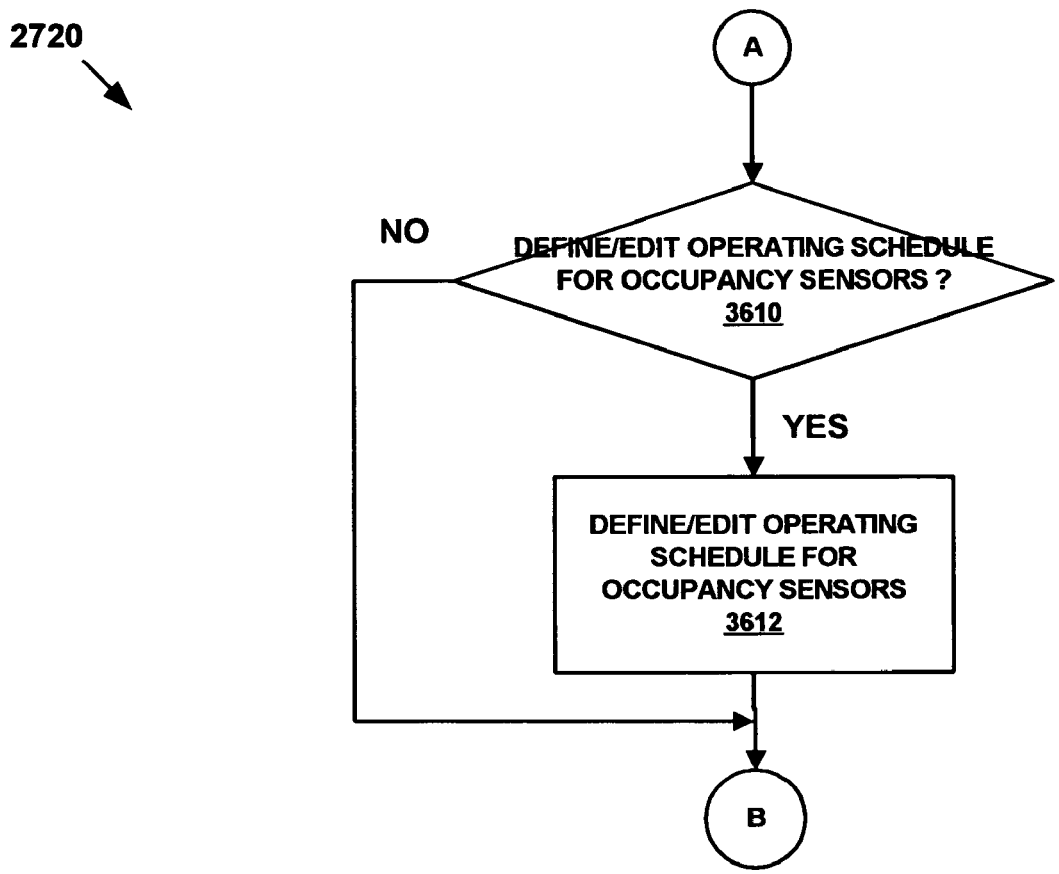
Figure 37:
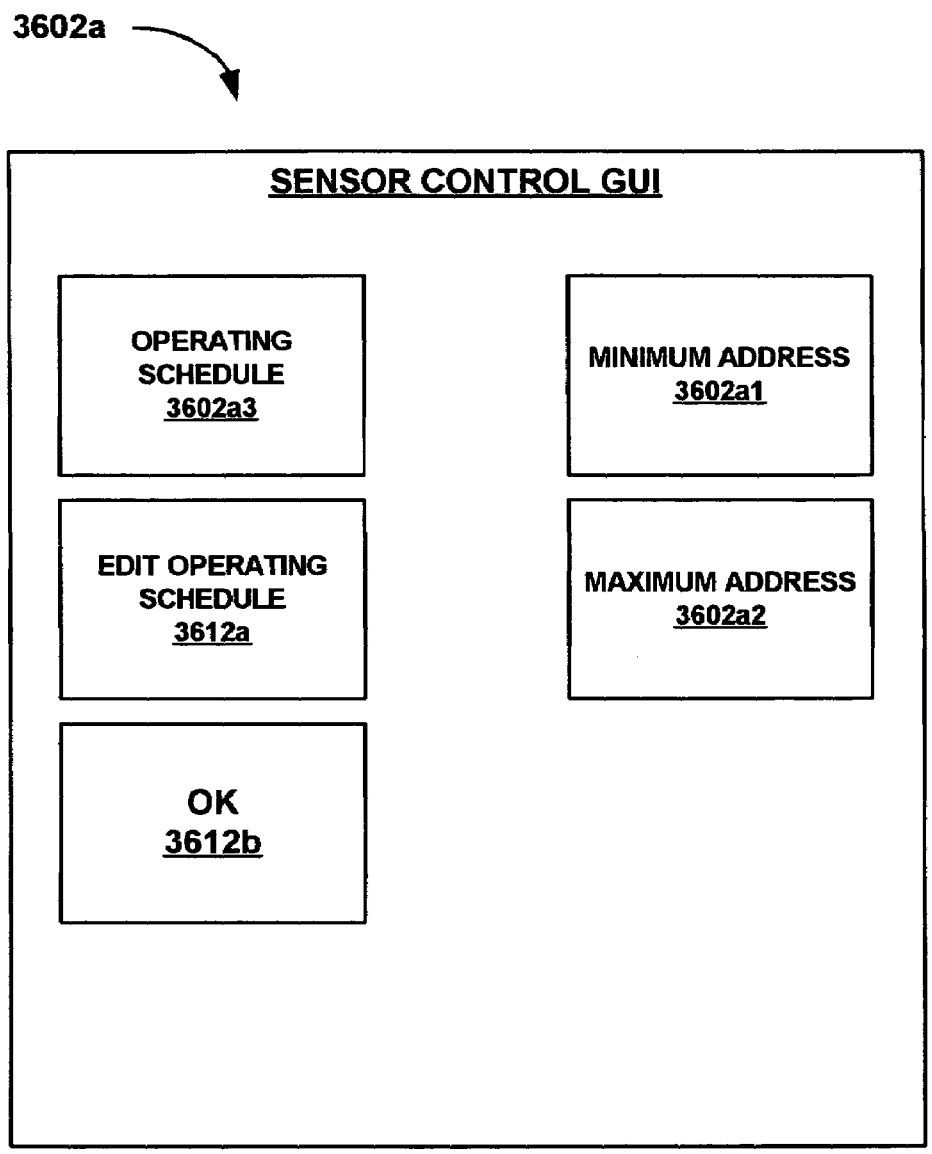
FIG. 37 is an exemplary embodiment of a graphical user interface for remotely controlling and monitoring occupancy sensors.
Figure 38A:
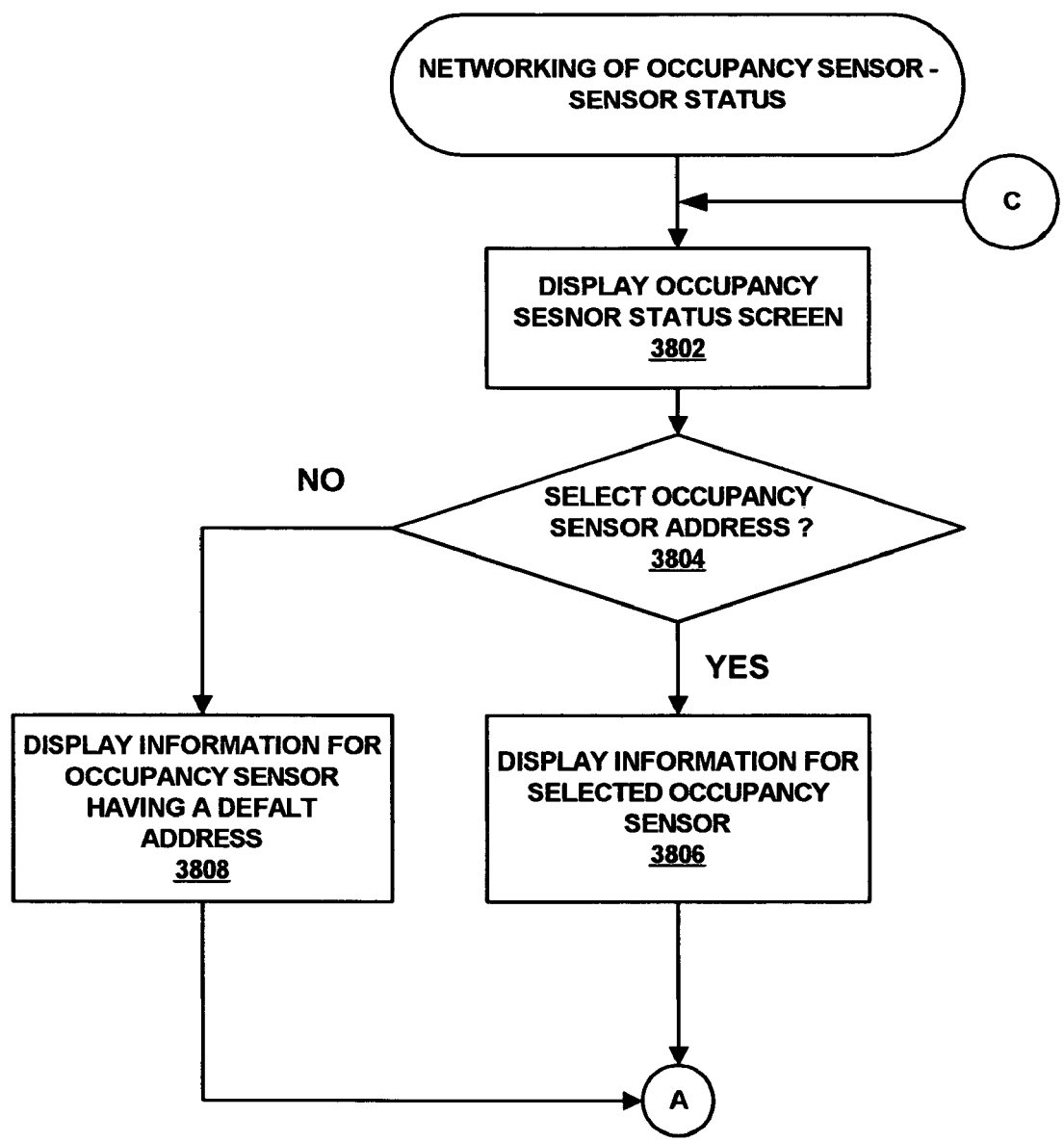
FIGS. 38a-38c is a flow chart illustration of an exemplary embodiment of a method of remotely controlling and monitoring the status of occupancy sensors.
Figure 38B:
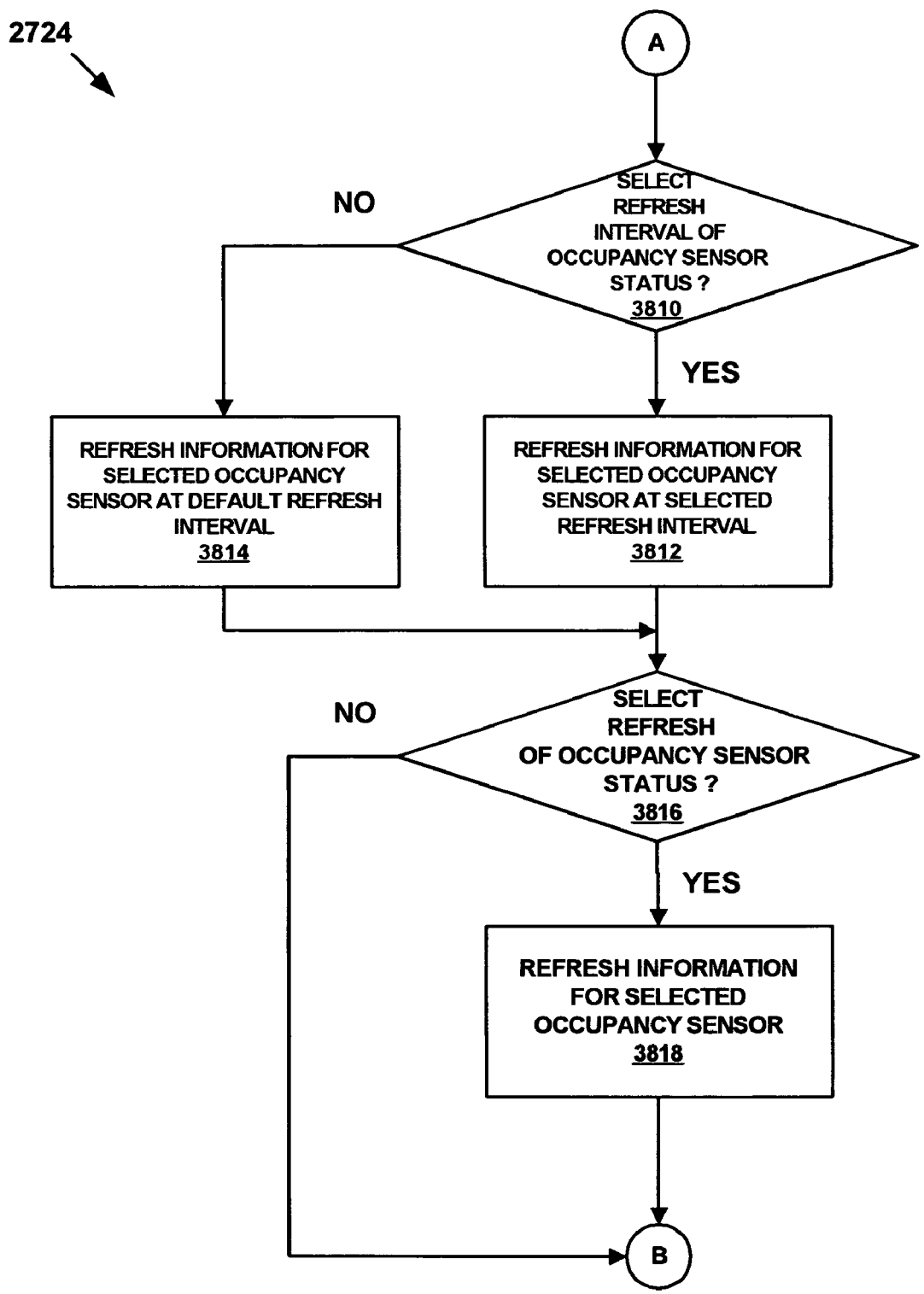
Figure 38C:
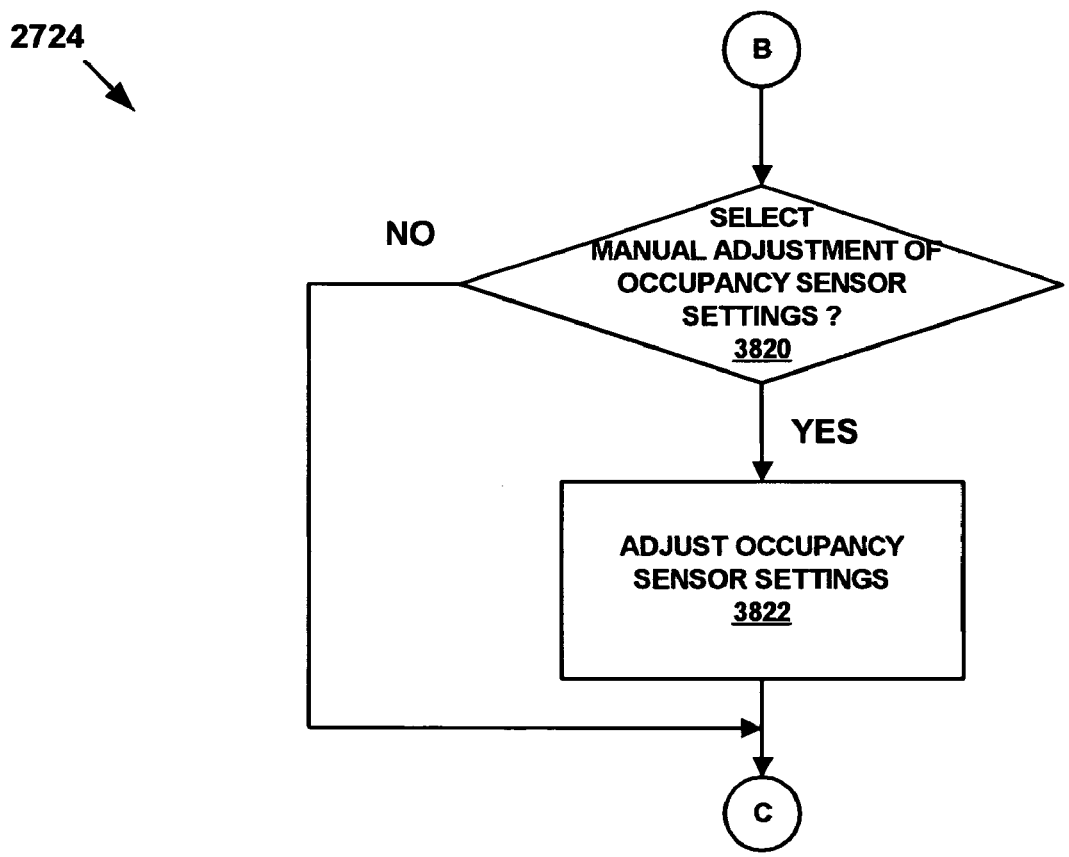
Figure 39:
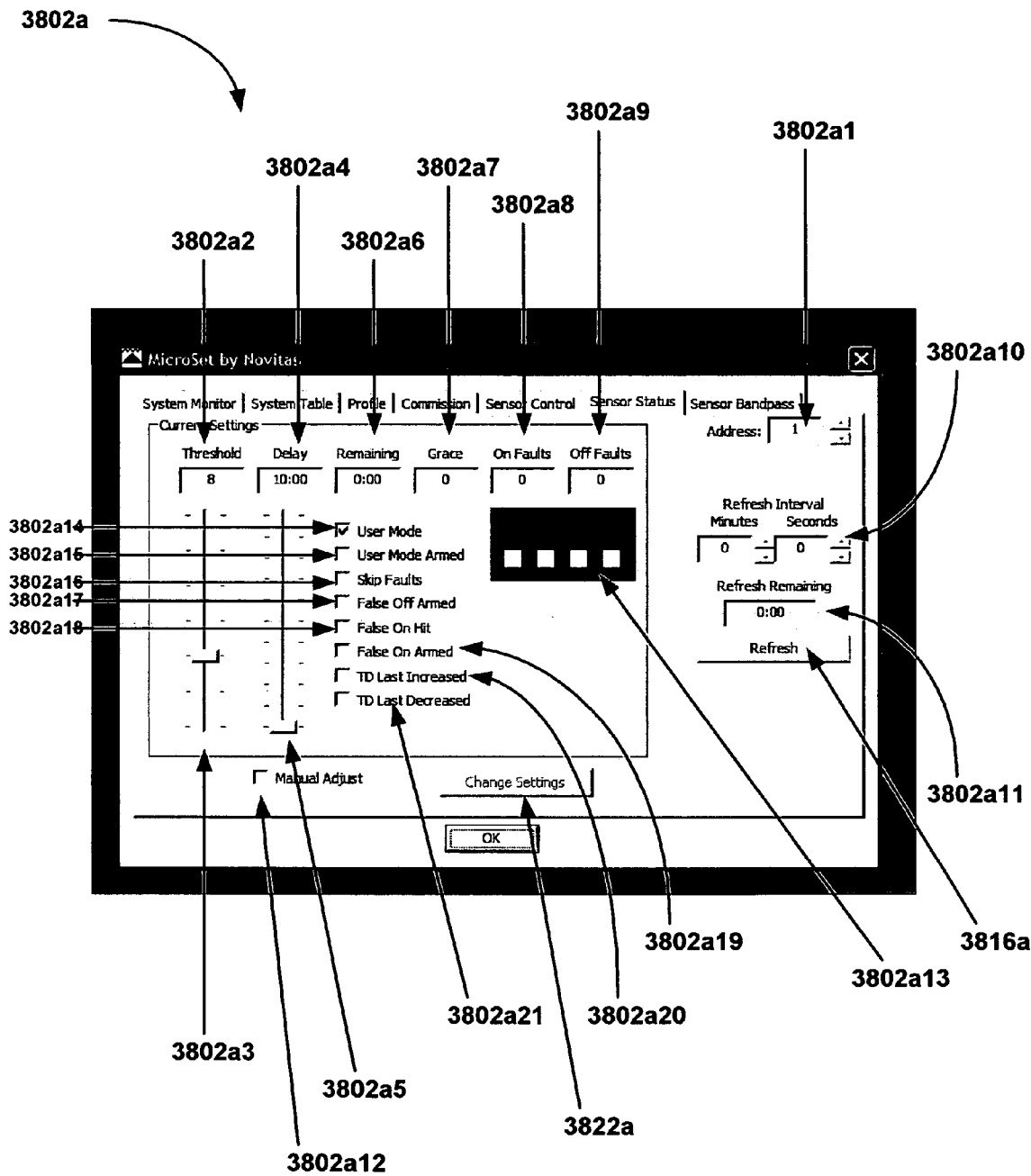
FIG. 39 is an exemplary embodiment of a graphical user interface for remotely controlling and monitoring occupancy sensors.

In an exemplary embodiment, as illustrated in FIGS. 36a, 36b, and 37, during operation of step 2720, an occupancy sensor control GUI 3702a is displayed on the remote control and monitoring 122 in step 3702.

In an exemplary embodiment, the occupancy sensor control GUI 3602a includes: a minimum network address 3602a1, a maximum network address 3602a2, and an occupancy sensor operating schedule 3602a3 for the range of network addresses defined by the minimum and maximum network addresses.

In an exemplary embodiment, the user of the remote control and monitoring 122 may select the minimum and maximum network addresses, 3602a1 and 3602a2, in step 3604. If the user of the remote control and monitoring 122 selects the minimum and maximum network addresses, 3602a1 and 3602a2, then the operating schedule information 3602a3 corresponding to the range of occupancy sensors having the selected range of network addresses is displayed on the occupancy sensor control GUI 3602a in step 3606. Alternatively, if the user of the remote control and monitoring 122 does not select minimum and maximum network addresses, 3602a1 and 3602a2, then the operating schedule information 3602a3 corresponding to the range of occupancy sensors having the selected range of network addresses is displayed on the occupancy sensor control GUI 3602a in step 3608.

In an exemplary embodiment, the operating schedule information 3602a3 corresponding to the occupancy sensors having a range of network addresses that is displayed on the occupancy sensor control GUI 3602a includes the operating schedule, the defined operating sub-components, and operational parameters during each of the above.

In an exemplary embodiment, the user of the remote control and monitoring 122 may select editing the operating schedule information 3602a3 corresponding to the occupancy sensors having a range of network addresses in step 3610. If the user of the remote control and monitoring 122 selects select editing the operating schedule information 3602a3 corresponding to the occupancy sensors having a range of network addresses, then the user may initiate the editing by pressing the edit operating schedule button 3612a in step 3612. In an exemplary embodiment, the user of the remote control and monitoring 122 may complete the editing by pressing the OK button 3612b in step 3612.

In an exemplary embodiment, as illustrated in FIGS. 38a, 38b, 38c, and 39, during operation of step 2724, an occupancy sensor status graphical user interface (GUI) 3802a is displayed on the remote control and monitoring 122 in step 3802.

In an exemplary embodiment, the sensor status GUI 3802a includes a network address 3802a1 for the occupancy sensor, an occupancy threshold value 3802a2 for the occupancy sensor, a slide control 3802a3 for adjusting the occupancy threshold value, a time delay 3802a4 for the occupancy sensor for defining a time delay before turning a load operably coupled to the occupancy sensor on or off in response to the presence or absence of an occupant, a slide control 3802a5 for adjusting the time delay, the time remaining 3802a6 in the time delay during a transition of the load from one operating state to another operating state, a grace period 3802a7 associated with the time delay for the occupancy sensor, the number of on faults 3802a8 for the occupancy sensor, the number of off faults 3802a9 for the occupancy sensor, the refresh interval 3802a10 for updating the sensor status GUI, the time remaining 3802a11 until the information in the sensor status GUI will be refreshed, selection of manual remote control 3802a12 of the occupancy sensor, a display of the status of the DIP switches 3802a13 for the occupancy sensor, selection of user mode 3802a14, selection of user mode armed 3802a15, selection of skip faults 3802a16, selection of false off armed 3802a17, selection of false on hit 3802a18, selection of false on armed 3802a19, selection of time delay (TD) last increased 3802a20, and selection of TD last decreased 3802a21.

In an exemplary embodiment, the user of the remote control and monitoring 122 may select the network address 3802a1 for the occupancy sensor in step 3804. If the user of the remote control and monitoring 122 selects the network address 3802a1 for the occupancy sensor, the information corresponding to the occupancy sensor having the selected network address is displayed on the sensor status GUI 3802a in step 3806. Alternatively, if the user of the remote control and monitoring 122 does not select a network address 3802a1 for the occupancy sensor, the information corresponding to the occupancy sensor having a predefined default network address is displayed on the sensor status GUI 3802a in step 3808.

In an exemplary embodiment, the user of the remote control and monitoring 122 may select the refresh interval 3802a10 for the sensor status GUI 3802a in step 3810. If the user of the remote control and monitoring 122 selects the refresh interval 3802a10 for the sensor status GUI 3802a, then the sensor status GUI 3802a is refreshed in accordance with the selected refresh interval in step 3812. Alternatively, if the user of the remote control and monitoring 122 does not select a refresh interval 3802a10 for the sensor status GUI 3802a, then the sensor status GUI 3802a is refreshed in accordance with a predetermined default refresh interval in step 3814.

In an exemplary embodiment, the user of the remote control and monitoring 122 may immediately refresh the sensor status GUI 3802a in step 3816 by depressing a refresh button 3816a. If the user of the remote control and monitoring 122 selects immediate refresh for the sensor status GUI 3802a, then the sensor status GUI 3802a is immediately refreshed in step 3818.

Alternatively, if the user of the remote control and monitoring 122 does not select immediate refresh for the sensor status GUI 3802a or if immediate refresh has been completed, then the user of the remote control and monitoring 122 may then select manual adjustment of one of more settings of the occupancy sensor in step 3820. If the user of the remote control and monitoring 122 selects manual adjustment of one of more settings of the occupancy sensor, then the user may then manually adjust one or more of the settings of the occupancy sensor in step 3822 by interacting with the sensor status GUI 3802a in step 3822.

In an exemplary embodiment, in step 3822, the user of the remote control and monitoring 122 may manually adjust one or more of the following settings of the occupancy sensor by interacting with the sensor status GUI 3802a: the occupancy threshold value 3802a2, the time delay 3802a4, the number of permissible on faults 3802a8, the number of permissible off faults 3802a9, the refresh interval 3802a10 for updating the sensor status GUI, the DIP switches 3802a13, the user mode 3802a14, the user mode armed 3802a15, the skip faults 3802a16, the false off armed 3802a17, the false on hit 3802a18, the false on armed 3802a19, the TD last increased 3802a20, and the TD last decreased 3802a21. In an exemplary embodiment, the occupancy threshold value 3802a2 refers to the level of response above baseline required to cause a trigger, the time delay 3802a4 refers to the amount to time after sensing motion until one or more of the loads, 126 and 130, are deactivated, the number of on faults 3802a8 refers to number of false activations recorded by the sensor 100, the number of off faults 3802a9 refers to the number of false deactivations of the sensor, the refresh interval 3802a10 refers to interval of time between queries, the DIP switches 3802a13 refer to actual setting of DIP switch on the sensor, the user mode 3802a14 refers to whether or not the sensor is operating in a user or an installer mode, the user mode armed 3802a15 refers to whether or not the sensor installation timer is in an active mode of operation, the skip faults 3802a16 refers to not counting faults while an installation timer is active, the false off armed 3802a17 refers to setting where false deactivations are monitored, the false on hit 3802a18 refers to whether or not a false activation was sensed by the sensor, the false on armed 3802a19 refers to whether or not monitoring for false activations is active, the TD last increased 3802a20 refers to actions taken to resolve a last false activation/deactivation, and the TD last decreased 3802a21 refers to actions taken to resolve a last false activation/deactivation.

In an exemplary embodiment, the user may manually adjust one or more of the settings of the occupancy sensor in step 3822 by interacting with the sensor status GUI 3802a in step 3822 by selecting manual adjust 3802a12 and then, after making all desired adjustments, depressing a change settings button 3822a.

Figure 40:
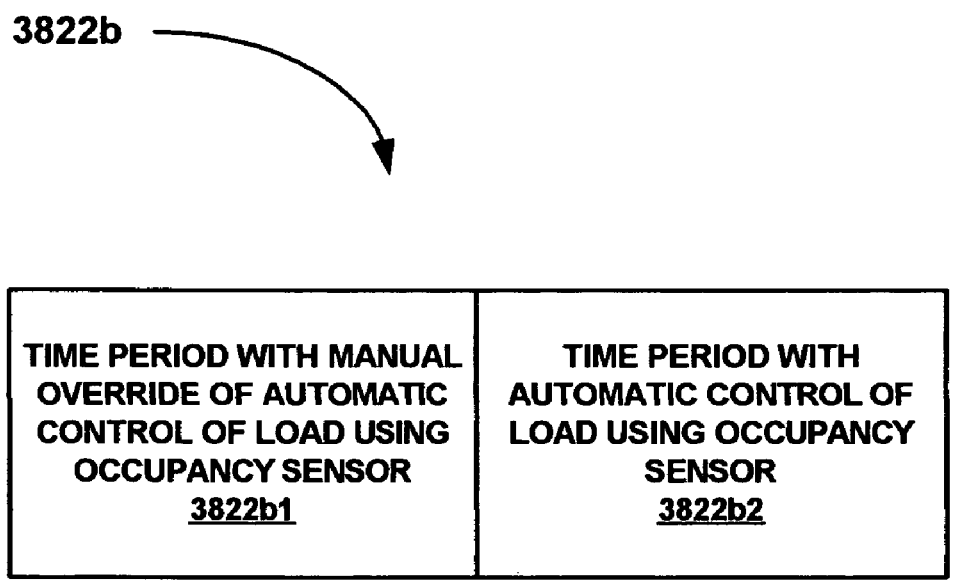
FIG. 40 is a schematic illustration of an exemplary embodiment of a duty cycle for occupancy sensors.

In an exemplary embodiment, as illustrated in FIG. 40, in step 2822, the user of the remote control and monitoring 122 may also select a duty cycle 2822b for the occupancy sensor that includes a first time period 2822b1 during which the operation of the occupancy sensor is manually remotely controller by the user of the remote control and monitoring and a second time period during which the operation of the occupancy sensor is locally controlled by the occupancy sensor.

Figure 41A:
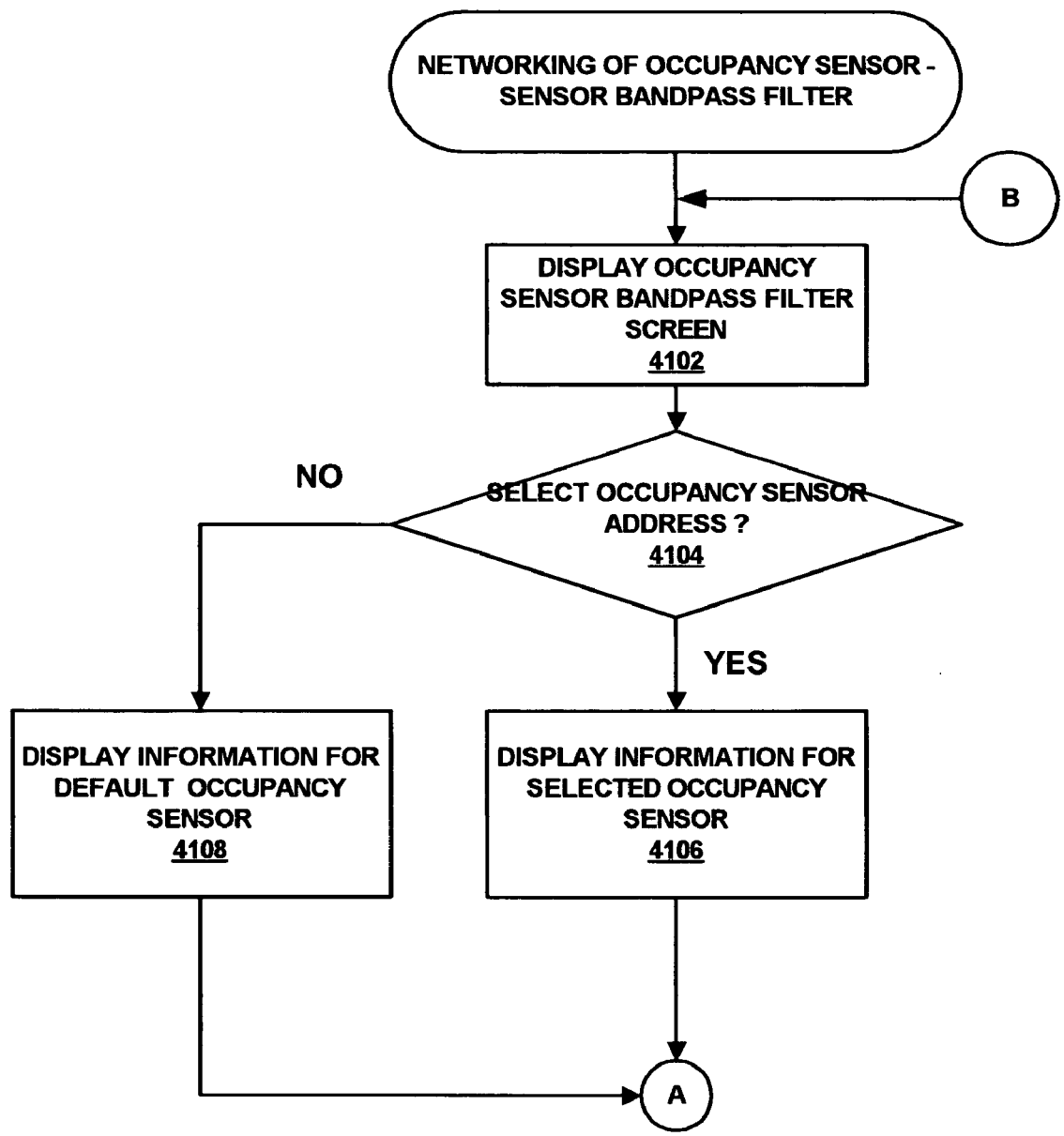
FIGS. 41a-41b is a flow chart illustration of an exemplary embodiment of a method of remotely controlling and monitoring a bandpass filter for an occupancy sensor.
Figure 41B:
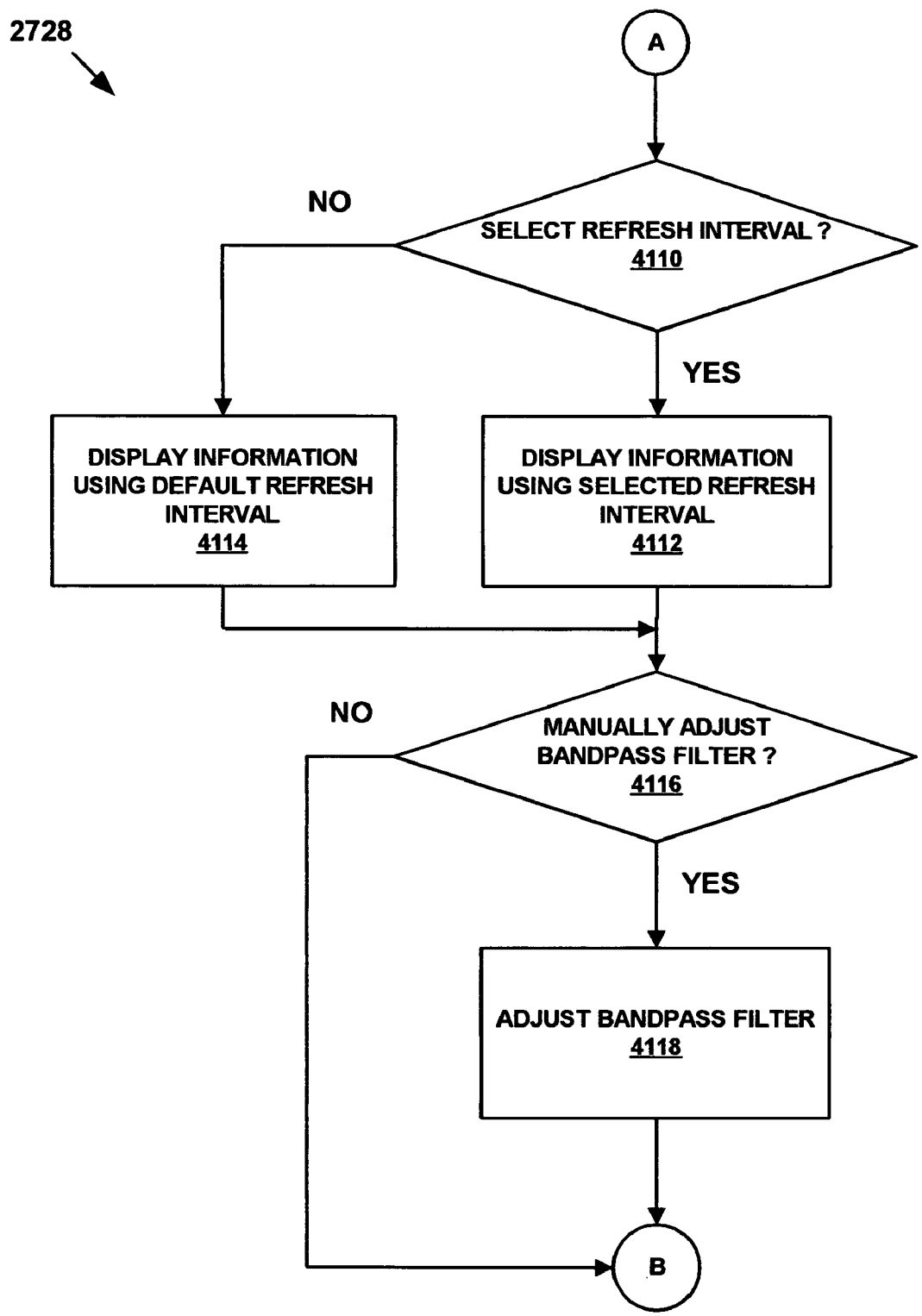
Figure 42:
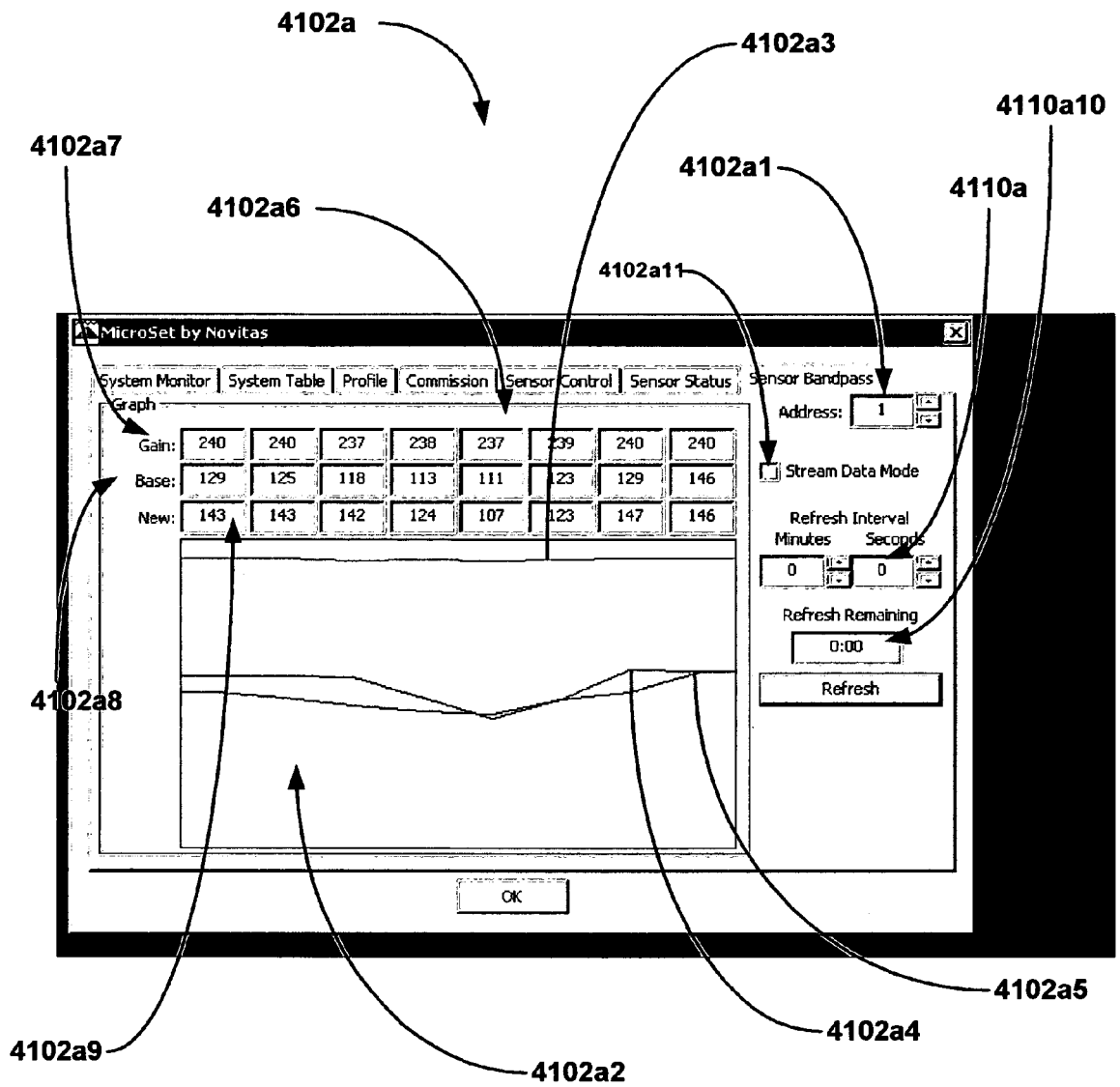
FIG. 42 is an exemplary embodiment of a graphical user interface for remotely controlling and monitoring a bandpass filter for an occupancy filter.

In an exemplary embodiment, as illustrated in FIGS. 41a, 41b, and 42, during operation of step 2728, an occupancy sensor bandpass filter GUI 4102a is displayed on the remote control and monitoring 122 in step 4102.

In an exemplary embodiment, the occupancy sensor bandpass filter GUI 4102a includes: a network address 4102a1 for the occupancy sensor 100, a graphical display 4102a2 of the gain 4102a3, the time averaged baseline 4102a4, and the newest reading 4102a5 for the bandpass filter 108 of the occupancy sensor, tabular data 4102a6 that describes the gain 4102a7, the time averaged baseline 4102a8, and the newest reading 4102a9 for the bandpass filter at a plurality of spaced apart frequencies, and a time period 4102a10 remaining until a refreshment of the occupancy sensor bandpass filter GUI.

In an exemplary embodiment, the gain 4102a7 is directly proportional while the time averaged baseline 4102a8 and the last readings are inversely proportional.

In an exemplary embodiment, the user of the remote control and monitoring 122 may select the network address 4102a1 for the occupancy sensor in step 4104. If the user of the remote control and monitoring 122 selects the network address 4102a1 for the occupancy sensor, the information corresponding to the occupancy sensor having the selected network address is displayed on the sensor status GUI 4102a in step 4106. Alternatively, if the user of the remote control and monitoring 122 does not select a network address 4102a1 for the occupancy sensor, the information corresponding to the occupancy sensor having a predefined default network address is displayed on the sensor status GUI 4102a in step 4108.

In an exemplary embodiment, the user of the remote control and monitoring 122 may select the refresh interval 4110a for the occupancy sensor bandpass filter GUI 4102a in step 4110. If the user of the remote control and monitoring 122 selects the refresh interval 4110a for the occupancy sensor bandpass filter GUI 4102a, the occupancy sensor bandpass filter GUI 4102a is refreshed accordingly in step 4112. Alternatively, if the user of the remote control and monitoring 122 does not select the refresh interval 4110a for the occupancy sensor bandpass filter GUI 4102a, the occupancy sensor bandpass filter GUI 4102a is refreshed using a default refresh value in step 4114.

In an exemplary embodiment, the user of the remote control and monitoring 122 may select manual adjustment of the bandpass filter 108 for the selected occupancy sensor 100 by interacting with the occupancy sensor bandpass filter GUI 4102a in step 4116. If the user of the remote control and monitoring 122 selects manual adjustment of the bandpass filter 108 for the selected occupancy sensor 100, then the user may then manually adjust the bandpass filter 108 for the selected occupancy sensor 100 by interacting with the occupancy sensor bandpass filter GUI 4102a in step 4118.

In an exemplary embodiment, a user of the occupancy sensor bandpass filter GUI 4102a may also select a streaming data option 4102a11, which allows much faster response between the corresponding occupancy sensor 100 and the remote control and monitoring 122. In an exemplary embodiment, using the streaming data option, as soon as the remote control and monitoring 122 receives a data set, it requests another thereby obtaining updates as fast as possible. Streaming data mode ties up the bandwidth of the network 118, so other communications are blocked until this mode of operation is ended.

Figure 43:
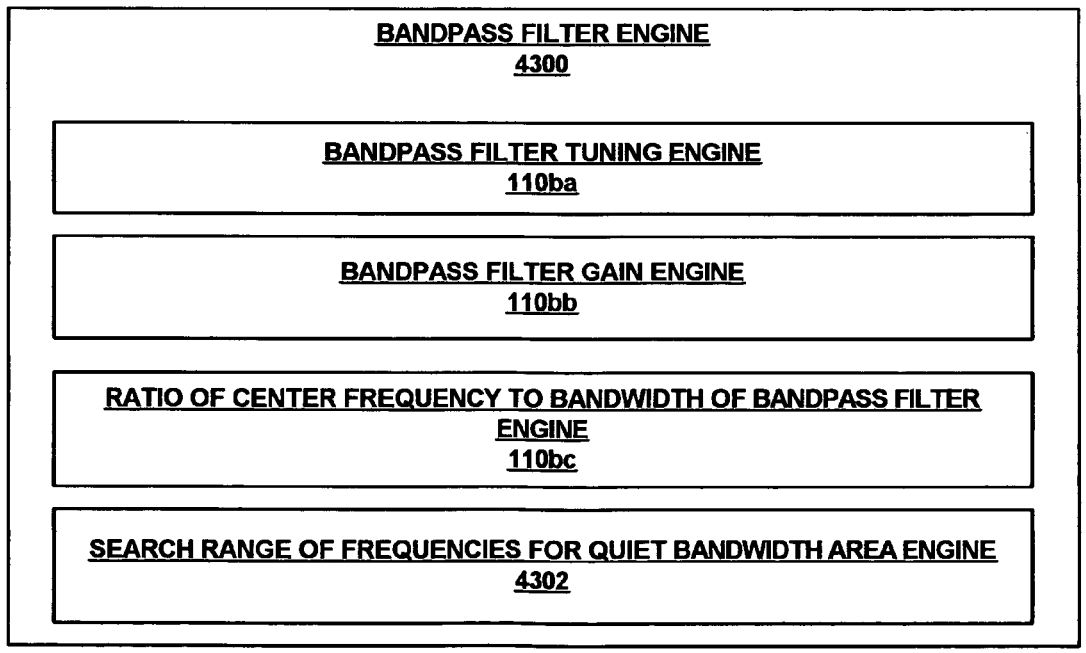
FIG. 43 is a schematic illustration of an exemplary embodiment of a bandpass filter engine.
Figure 44A:
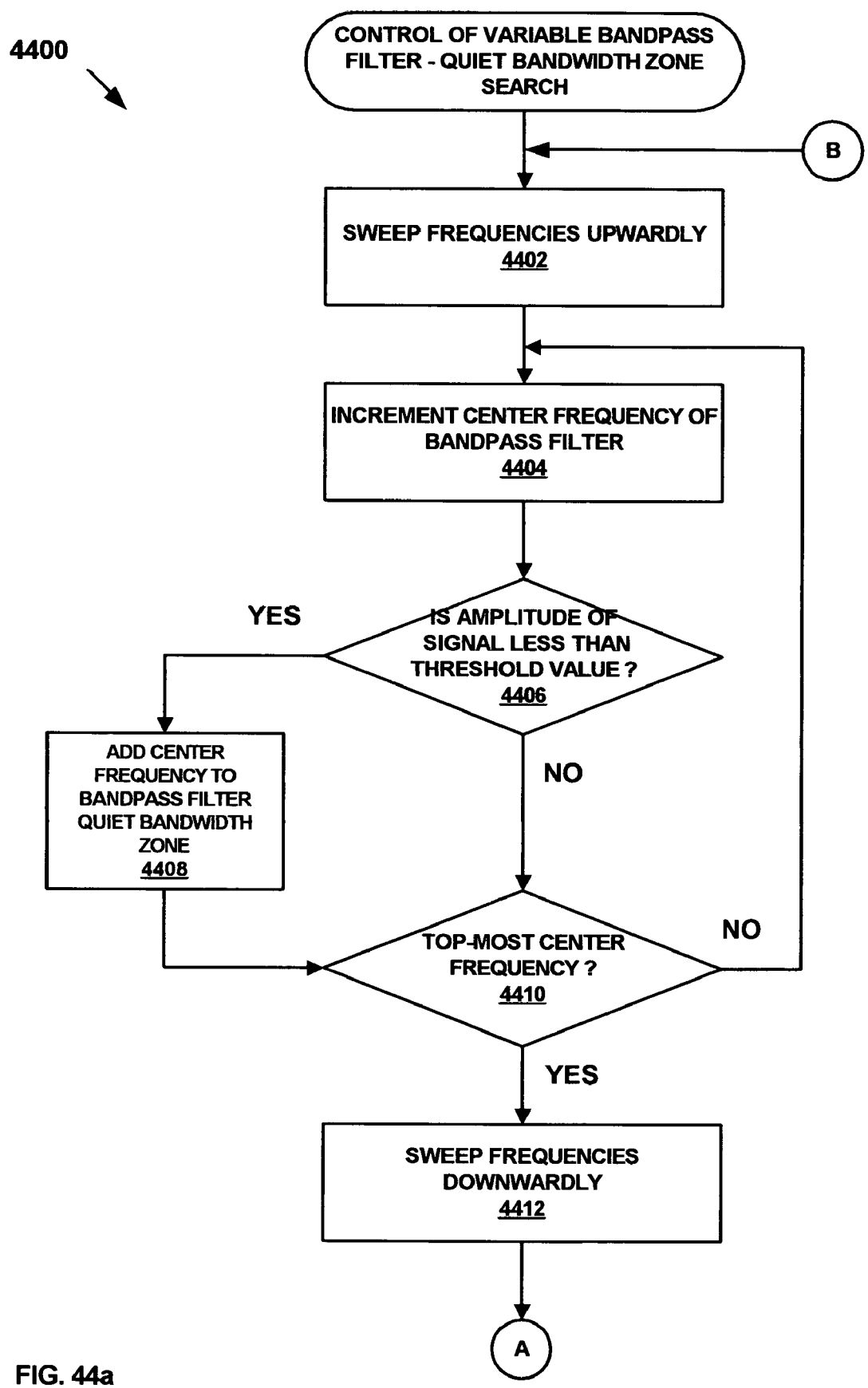
FIGS. 44a-44b is a flow chart illustration of an exemplary embodiment of a method of searching for quiet bandwidth zones.
Figure 44B:
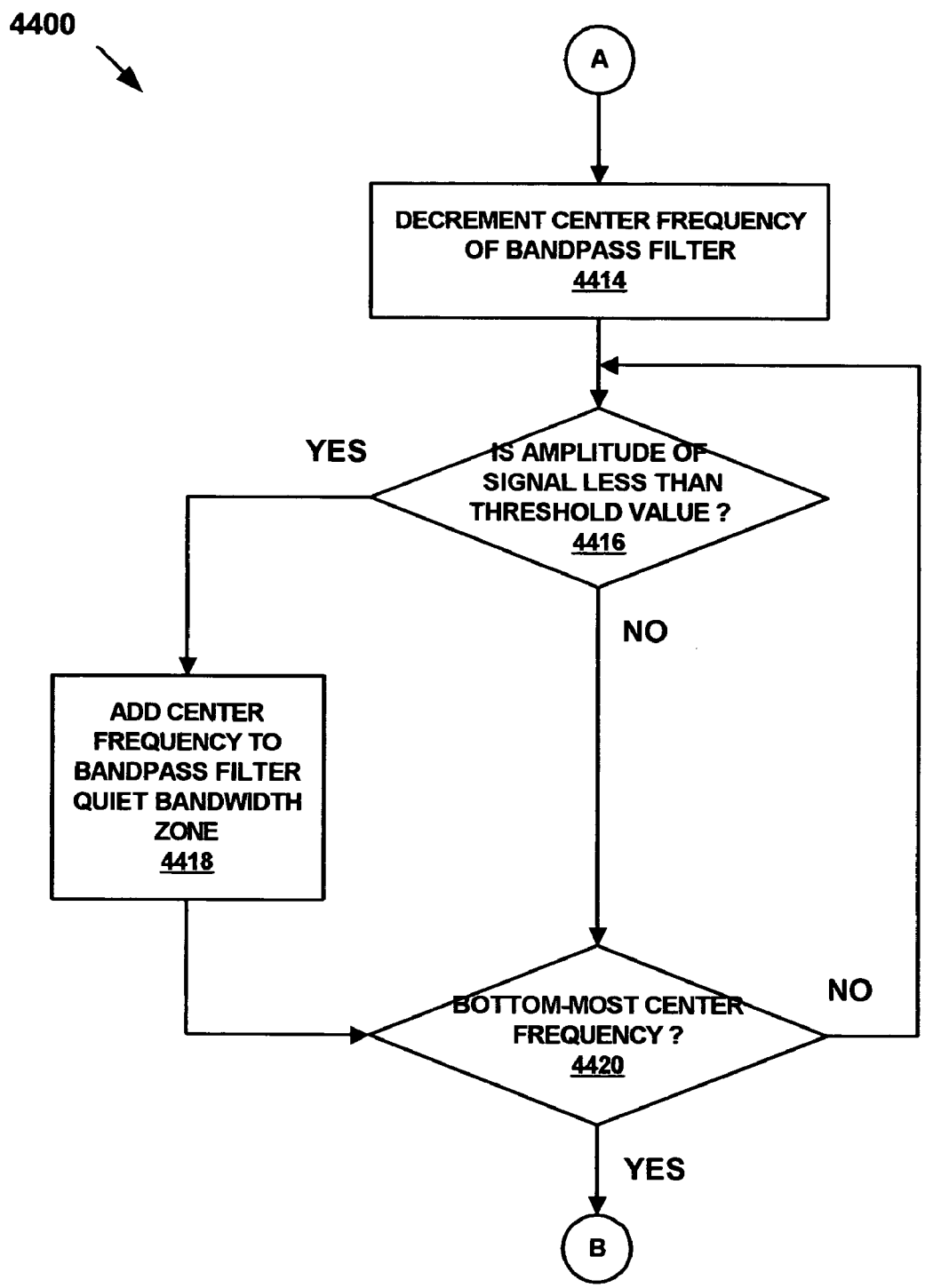
Figure 44C:
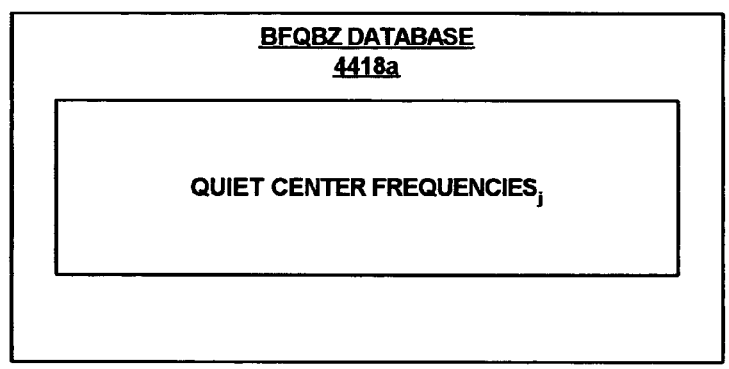
FIG. 44c is a schematic illustration of a quiet bandwidth zone database.

Referring to FIG. 43, in an exemplary embodiment, the controller 110 of the occupancy sensor 100 includes a bandpass filter engine 4300 that includes the bandpass filter tuning engine 110ba, the bandpass filter gain engine 110bb, the ratio of the center frequency to the bandwidth of the bandpass filter engine 110bc, and a search range of frequencies for quiet bandwidth areas engine 4302. In an exemplary embodiment, the search range of frequencies for quiet bandwidth areas engine 4302 is adapted to search the defined region 132 for bandwidth areas that are acoustically quiet.

In an exemplary embodiment, as illustrated in FIGS. 44a-44c and 45, the occupancy sensor 100 implements a method 4400 of searching for quiet bandwidth zones in which the variable bandpass filter 108 is swept upwardly and then downwardly along a range of frequencies to locate quiet bandwidth zones that may then be used to gather signals representative of the presence or absence of the occupant 134 within the defined region 132. In particular, in steps 4402 and 4404, the variable bandpass filter 108 is swept upwardly along a range of frequencies such that the center frequency $CF_i$ of the bandpass filter $1212b_i$ ranges from values 1 to N. If an amplitude of a signal filtered by the bandpass filter $1212b_i$ is less than a predetermined threshold value in step 4406, then the corresponding center frequency $CF_i$ is added to a bandpass filter quiet bandwidth zone ("BFQBZ") database in step 4408.

If a predetermined top most center frequency $CF_N$ has been reached in step 4410, then the bandpass filter $1212b_i$ is then swept downwardly in steps 4412 and 4414 by decrementing the center frequency $CF_i$ of the bandpass filter $1212b_i$ from $CF_N$ to $CF_1$. If an amplitude of a signal filtered by the bandpass filter $1212b_i$ is less than a predetermined threshold value in step 4416, then the corresponding center frequency $CF_i$ is added to a bandpass filter quiet bandwidth zone ("BFQBZ") database 4418a in step 4418.

If a predetermined lowest most center frequency $CF_1$ has been reached in step 4420, then the bandpass filter $1212b_i$ is once again then swept upwardly in steps 4402 and 4404.

Figure 45:
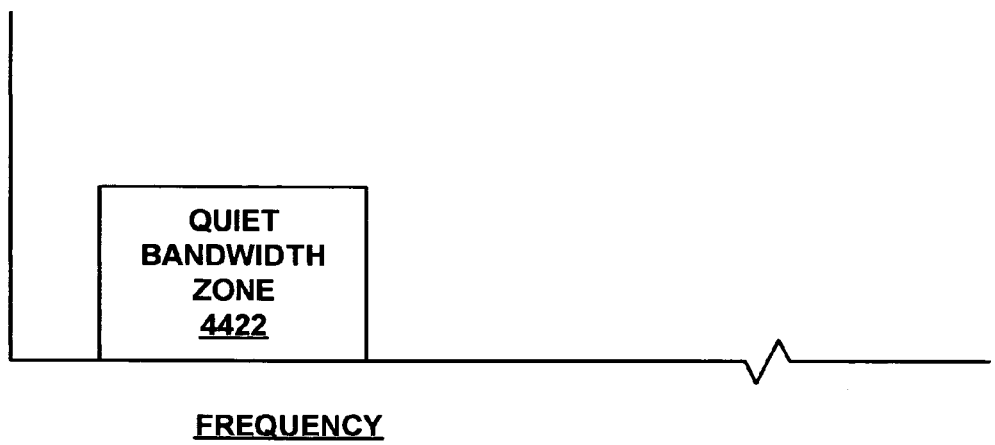
FIG. 45 is a graphical illustration of an exemplary embodiment of quiet bandwidth zones.

In an exemplary embodiment, as illustrated in FIG. 45, the BFQBZ database 4418a is then used to operate the occupancy sensor 100 to filter signals within one or more quiet bandwidth zones 4422 defined by the BFQBZ database in steps 1212 and 1214 of the method 1200. In this manner, sources of background zone that could cause false positive or negative indications of the presence of the occupant 132 within the defined region 134 are minimized.

Figure 46:
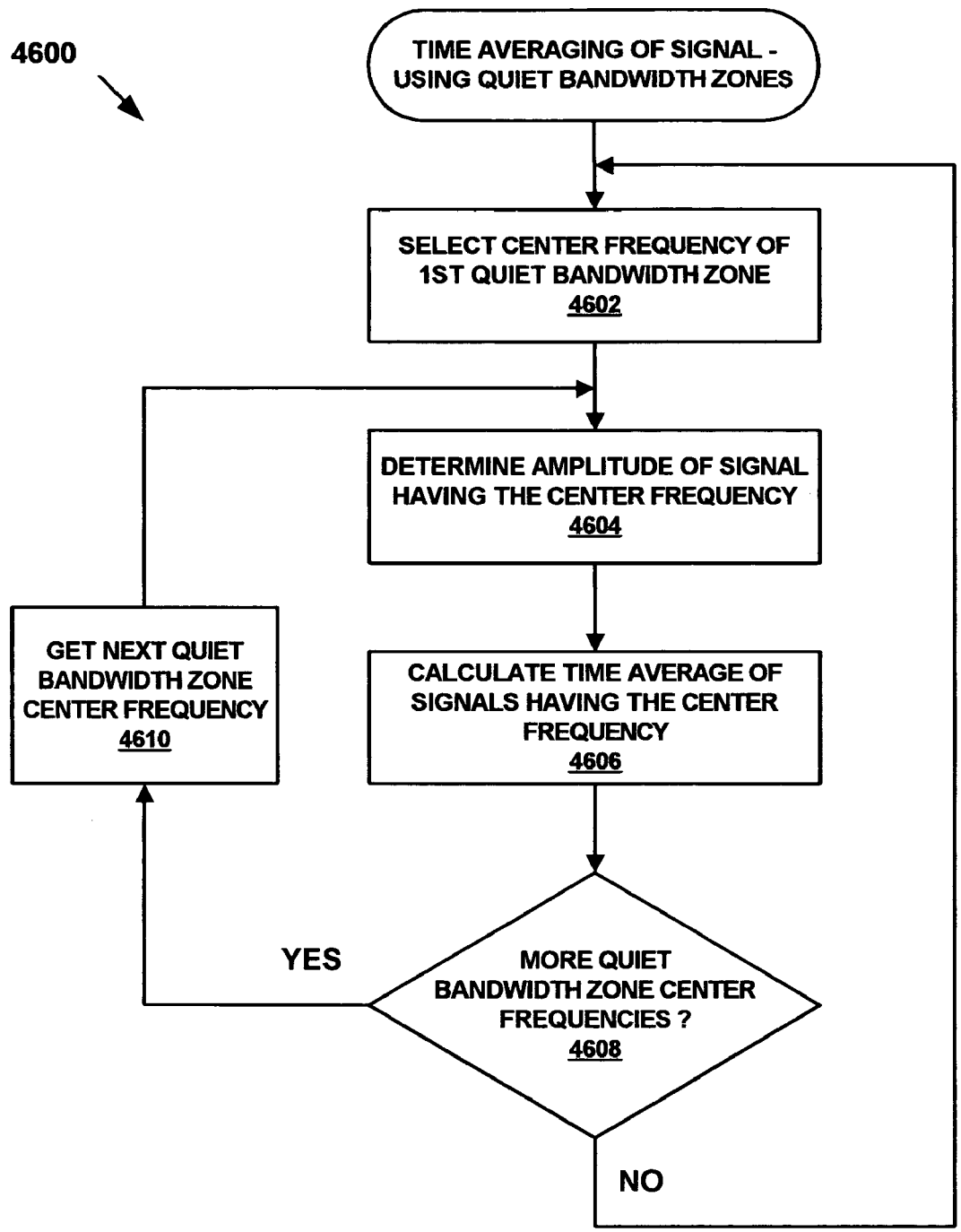
FIG. 46 is a flow chart illustration of an exemplary embodiment of a method of time averaging signals filtered within quiet bandwidth zones.

In particular, in an exemplary embodiment, as illustrated in FIG. 46, in step 1214 of the method 1200, the occupancy sensor 100 implements a method 4600 of time averaging the amplitudes of the signals filtered by the variable bandpass filter 108 that utilizes the BFQBZ database 4418a to define the center frequencies of the signals that are time averaged. In particular, in step 4602, the $1^{st}$ center frequency is obtained from the BFQBZ database 4418a. The amplitude of the filtered signal having the center frequency is then determined in step 4604, and the time average of the amplitude of the filtered signal having the center frequency is then time averaged in step 4606.

If there are more center frequencies within the BFQBZ database 4418a in step 4608, then the next center frequency is obtained from the BFQBZ database in step 4610 and the steps 4604, 4606, 4608, and 4610 are repeated for each center frequency within the BFQBZ database.

In an alternative embodiment, the BFQBZ database 4418a is used to operate the occupancy sensor 100 to monitor and filter signals within one or more quiet bandwidth zones 4422 defined by the BFQBZ database and then determine the presence or absence of the occupant 134 within the defined region 132 using conventional methods of determining occupancy for occupancy sensors.

Figure 47:
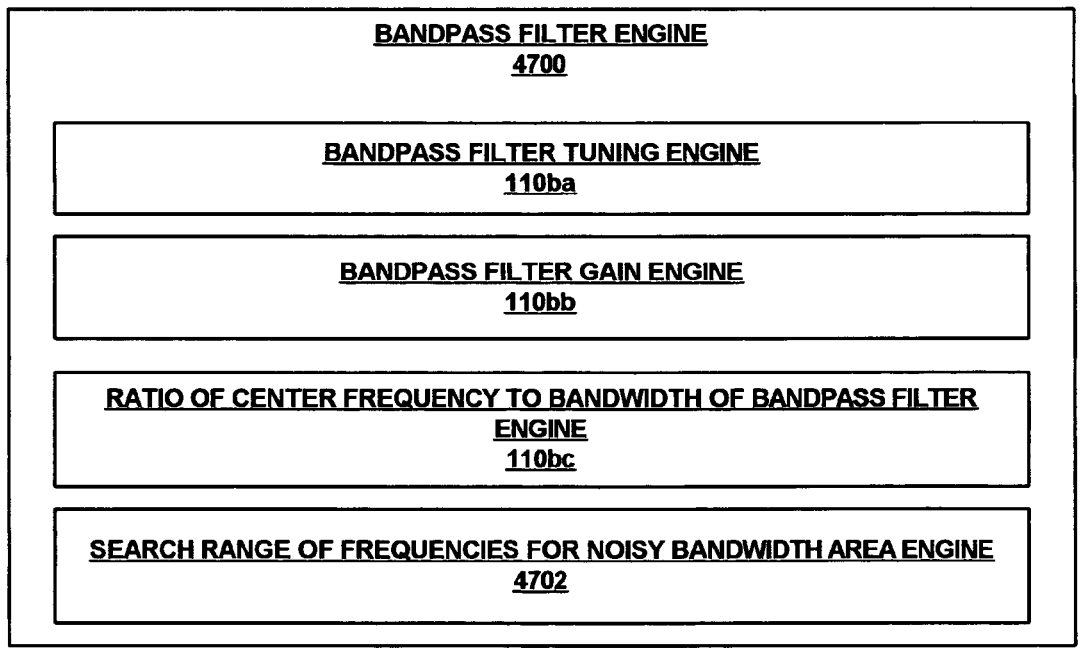
FIG. 47 is a schematic illustration of an exemplary embodiment of a bandpass filter engine.
Figure 48A:
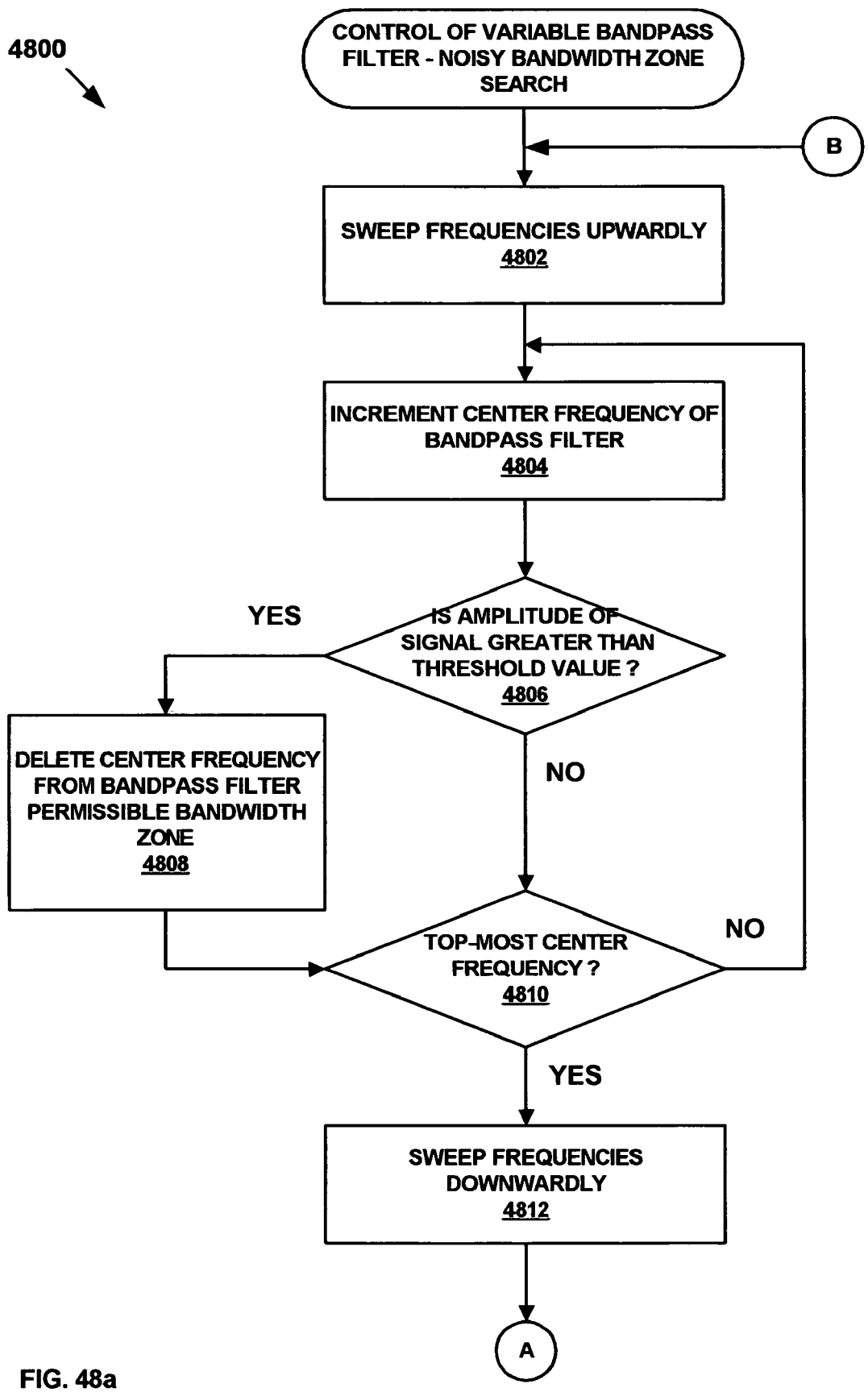
FIGS. 48a-48b is a flow chart illustration of an exemplary embodiment of a method of searching for noisy bandwidth zones.
Figure 48B:
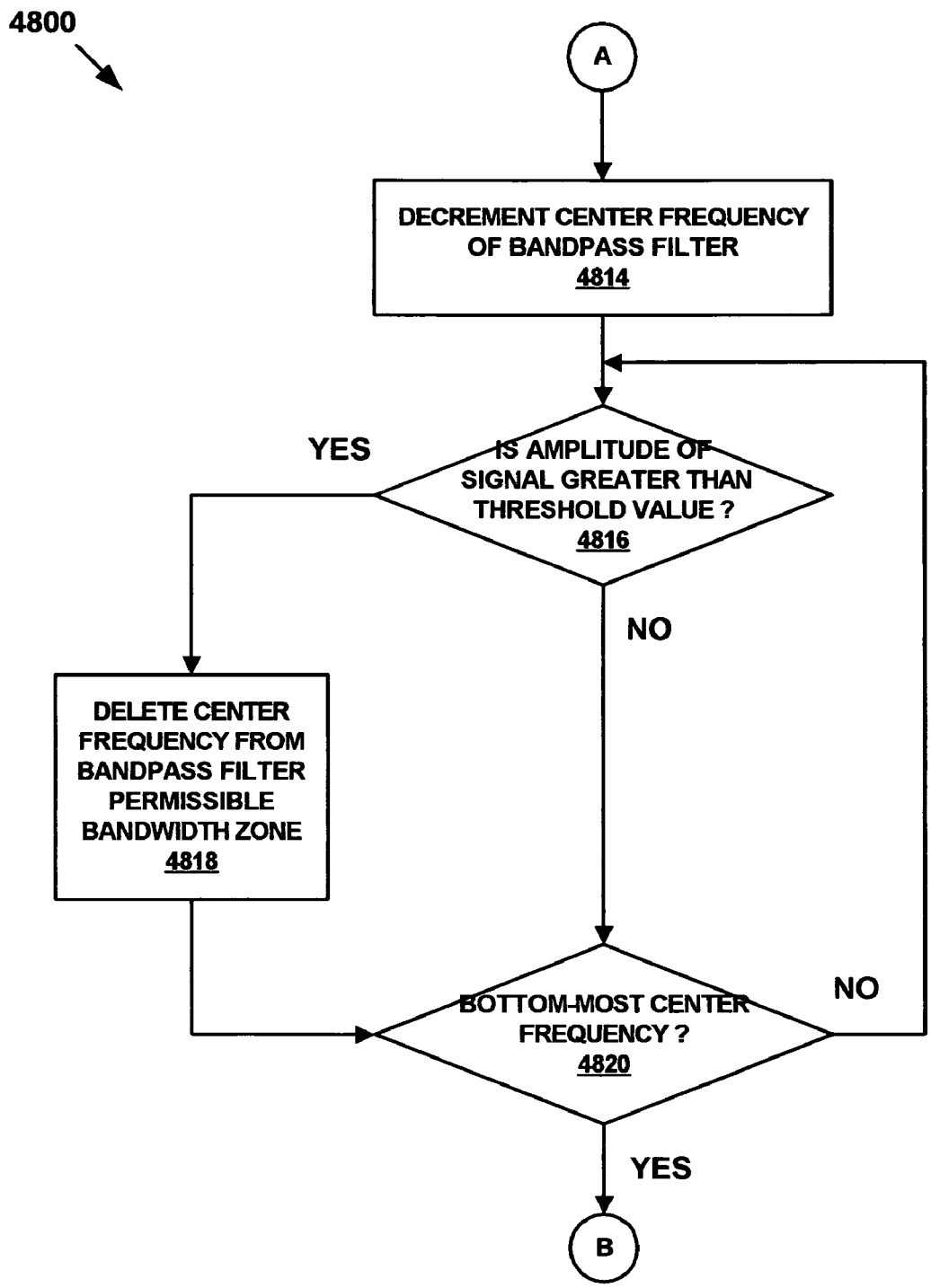
Figure 48C:
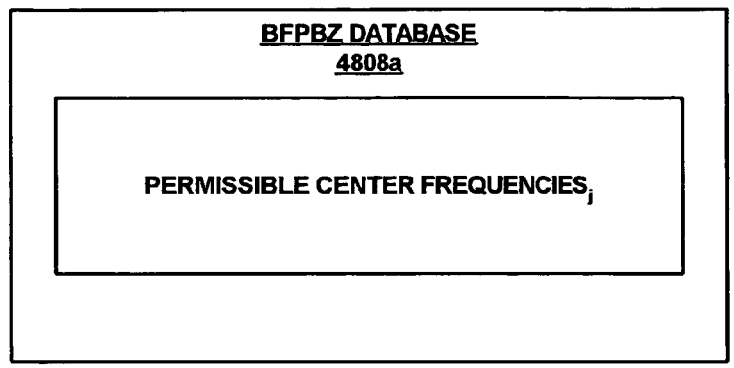
FIG. 48c is a schematic illustration of a permissible bandwidth zone database.

Referring to FIG. 47, in an exemplary embodiment, the controller 110 includes a bandpass filter engine 4700 that includes the bandpass filter tuning engine 110ba, the bandpass filter gain engine 110bb, the ratio of the center frequency to the bandwidth of the bandpass filter engine 110bc, and a search range of frequencies for noisy bandwidth areas engine 4702. In an exemplary embodiment, the search range of frequencies for noisy bandwidth areas engine 4702 is adapted to search the defined region 132 for bandwidth areas that are acoustically noisy.

In an exemplary embodiment, as illustrated in FIGS. 48a-48c and 49, the occupancy sensor 100 implements a method 4800 of searching for noisy bandwidth zones in which the variable bandpass filter 108 is swept upwardly and then downwardly along a range of frequencies to locate noisy bandwidth zones that may not then be used to gather signals representative of the presence or absence of the occupant 134 within the defined region 132. In particular, in steps 4802 and 4804, the variable bandpass filter 108 is swept upwardly along a range of frequencies such that the center frequency $CF_i$ of the bandpass filter $1212b_i$ ranges from values 1 to N. If an amplitude of a signal filtered by the bandpass filter $1212b_i$ is greater than a predetermined threshold value in step 4806, then the corresponding center frequency $CF_i$ is deleted from a bandpass filter permissible bandwidth zone ("BFPBZ") database 4408a in step 4808.

If a predetermined top most center frequency $CF_N$ has been reached in step 4810, then the bandpass filter $1212b_i$ is then swept downwardly in steps 4812 and 4814 by decrementing the center frequency $CF_i$ of the bandpass filter $1212b_i$ from $CF_N$ to $CF_1$. If an amplitude of a signal filtered by the bandpass filter $1212b_i$ is less than a predetermined threshold value in step 4816, then the corresponding center frequency $CF_i$ is deleted from the BFPBZ database 4808a in step 4818.

If a predetermined lowest most center frequency $CF_1$ has been reached in step 4820, then the bandpass filter $1212b_i$ is once again then swept upwardly in steps 4802 and 4804.

Figure 49:
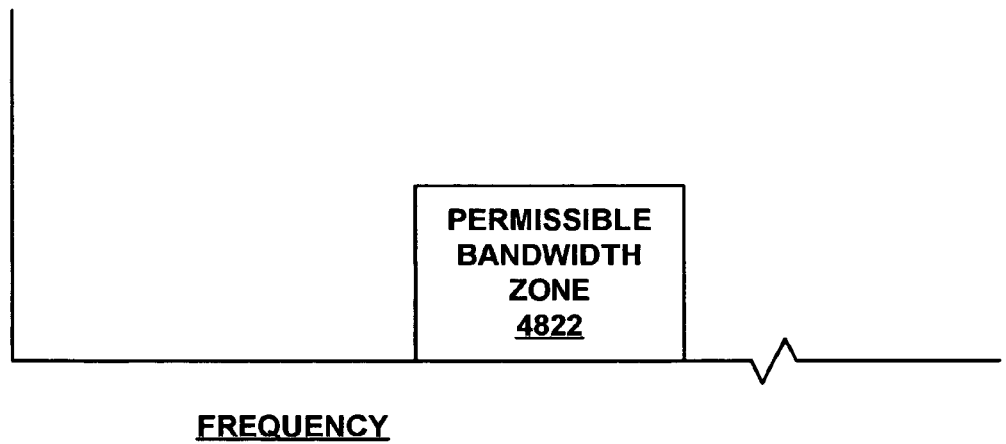
FIG. 49 is a graphical illustration of an exemplary embodiment of permissible bandwidth zones.

In an exemplary embodiment, as illustrated in FIG. 49, the BFPBZ database 4808a is then used to operate the occupancy sensor 100 to filter signals within one or more permissible bandwidth zones 4822 defined by the BFPBZ database in steps 1212 and 1214 of the method 1200. In this manner, sources of background zone that could cause false positive or negative indications of the presence of the occupant 132 within the defined region 134 are minimized.

Figure 50:
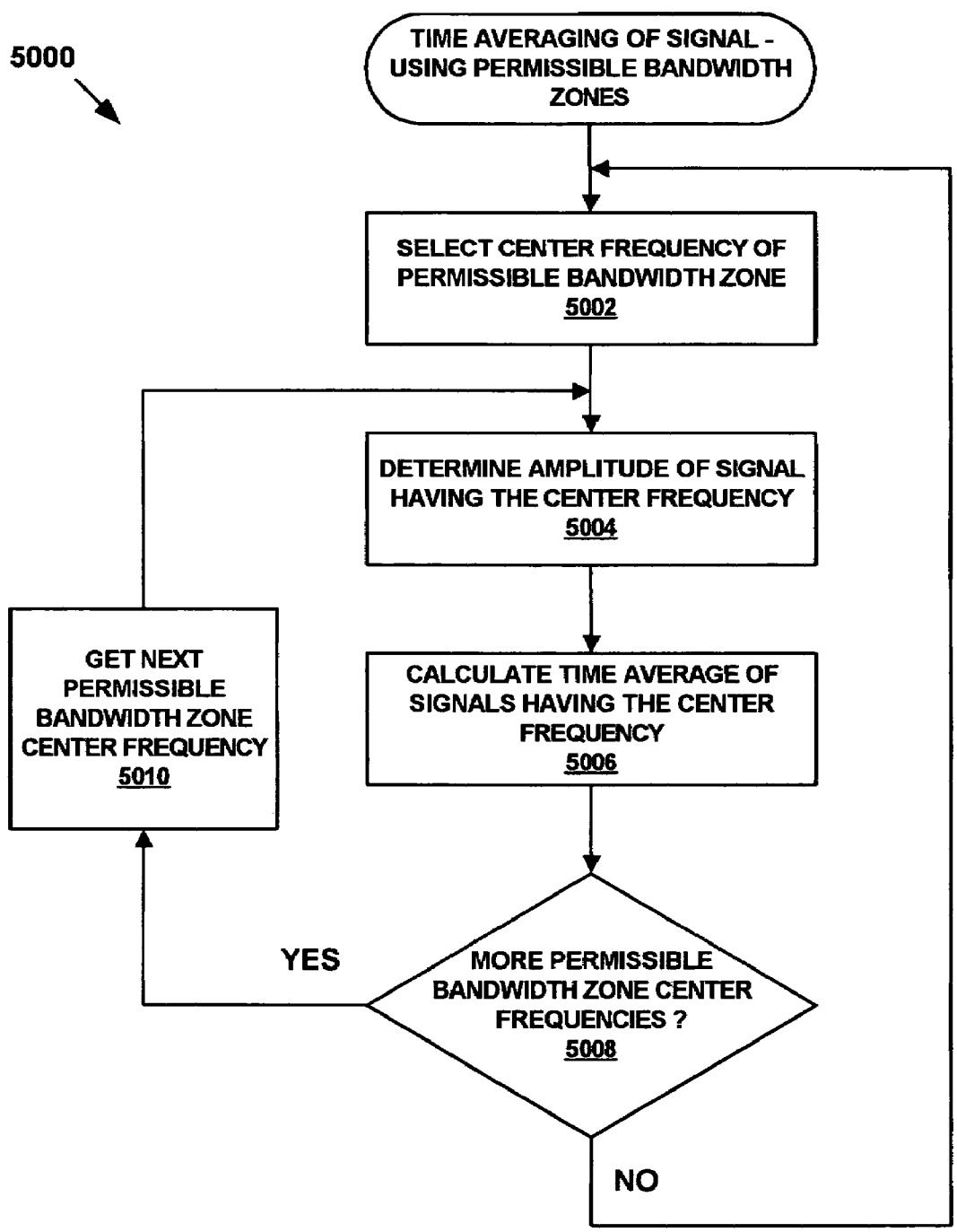
FIG. 50 is a flow chart illustration of an exemplary embodiment of a method of time averaging signals filtered within quiet bandwidth zones.

In particular, in an exemplary embodiment, as illustrated in FIG. 50, in step 1214 of the method 1200, the occupancy sensor 100 implements a method 5000 of time averaging the amplitudes of the signals filtered by the variable bandpass filter 108 that utilizes the BFPBZ database 4808a to define the center frequencies of the signals that are time averaged. In particular, in step 5002, the $1^{st}$ center frequency is obtained from the BFPBZ database 4808a. The amplitude of the filtered signal having the center frequency is then determined in step 5004, and the time average of the amplitude of the filtered signal having the center frequency is then time averaged in step 5006.

If there are more center frequencies within the BFPBZ database 4808a in step 5008, then the next center frequency is obtained from the BFPBZ database in step 5010 and the steps 5004, 5006, 5008, and 5010 are repeated for each center frequency within the BFPBZ database.

In an alternative embodiment, the BFPBZ database 4808a is used to operate the occupancy sensor 100 to monitor and filter signals within one or more permissible bandwidth zones 4822 defined by the BFPBZ database and then determine the presence or absence of the occupant 134 within the defined region 132 using conventional methods of determining occupancy for occupancy sensors.

Figure 51A:
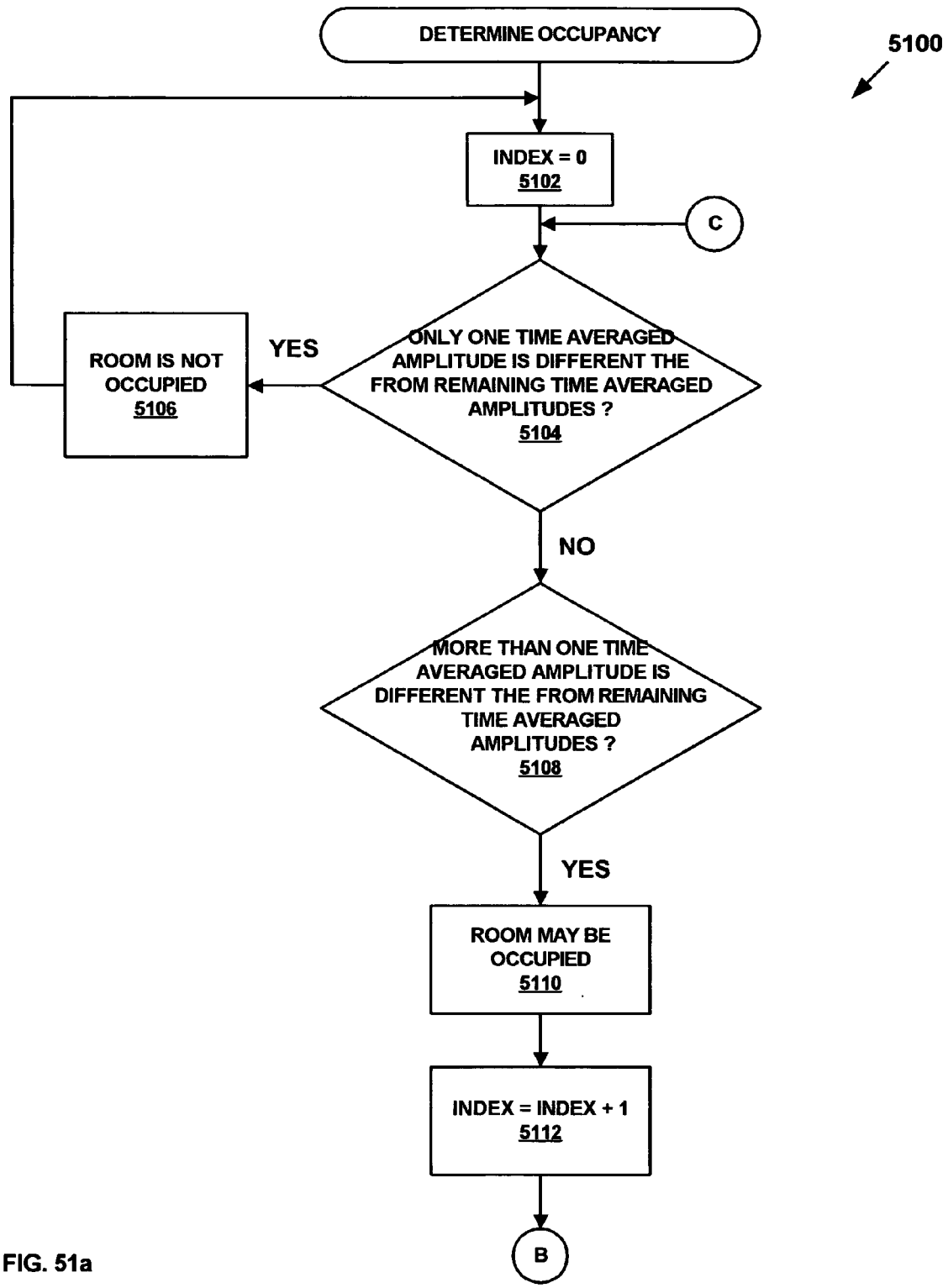
FIGS. 51a-51b is a flow chart illustration of an exemplary embodiment of a method of determining occupancy.
Figure 51B:
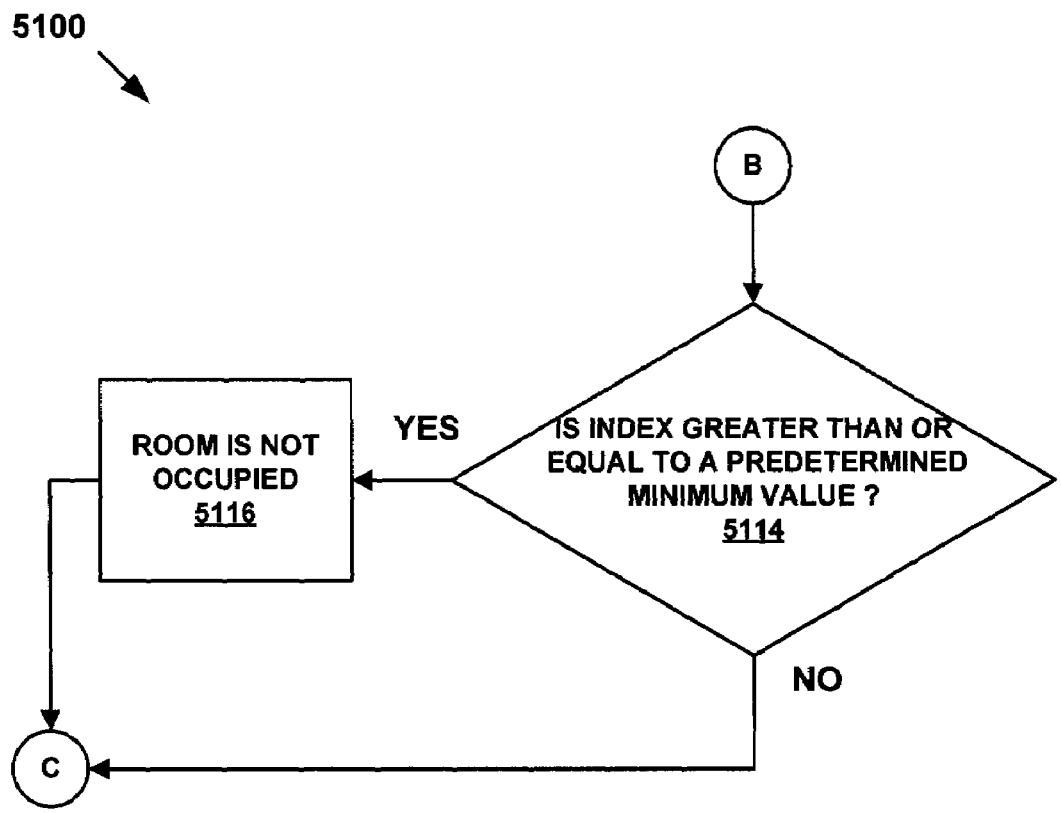

In an exemplary embodiment, as illustrated in FIGS. 51a-51b, during operation of the occupancy sensor 100, the occupancy sensor implements a method of determining occupancy 5100 in which, in step 5102, an INDEX is initialized and set to be equal to zero. In step 5104, it is determined if only one time averaged amplitude, as provided in step 1214 of the method 1200, the method 4600, and/or the method 5000, is different from all of the remaining time averaged amplitudes. If only one time averaged amplitude is different from all of the remaining time averaged amplitudes, then it is determined that the defined region 132 is not occupied by the occupant 134 in step 5106.

Alternatively, if more than one time averaged amplitudes are different from the remaining time averaged amplitudes, then it is determined that the defined region 132 may be occupied by the occupant 134 in steps 5108 and 5110. The index INDEX is then incremented by one in step 5112.

If the INDEX is greater than a predetermined value in step 5114, then it is determined that the defined region 132 is occupied by the occupant 134 in step 5116.

Thus, the method 5100 permits the determination of occupancy of the defined region 132 if the number of different values of the amplitudes of the time averaged filtered signals exceed a predetermined value.

In an exemplary embodiment, the method 5100 is implemented in addition to, or instead of the steps 1216 and/or 1218 in the method 1200.

In an exemplary embodiment, the method 5100 may be implemented in a conventional occupancy sensor in order to provide quality control in the determination of occupancy in a conventional occupancy sensor.

Figure 52A:
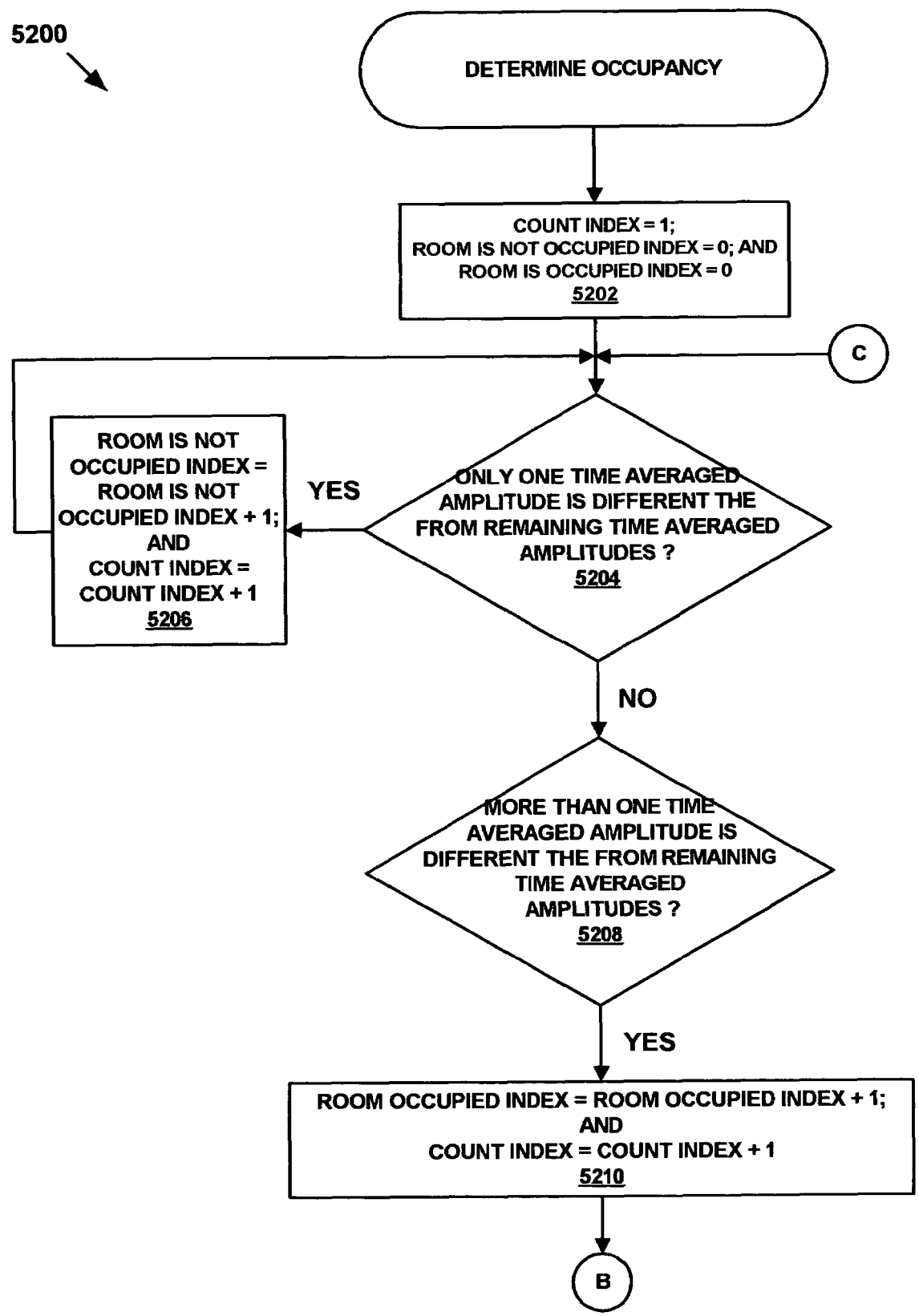
FIGS. 52a-52b is a flow chart illustration of an exemplary embodiment of a method of determining occupancy.
Figure 52B:
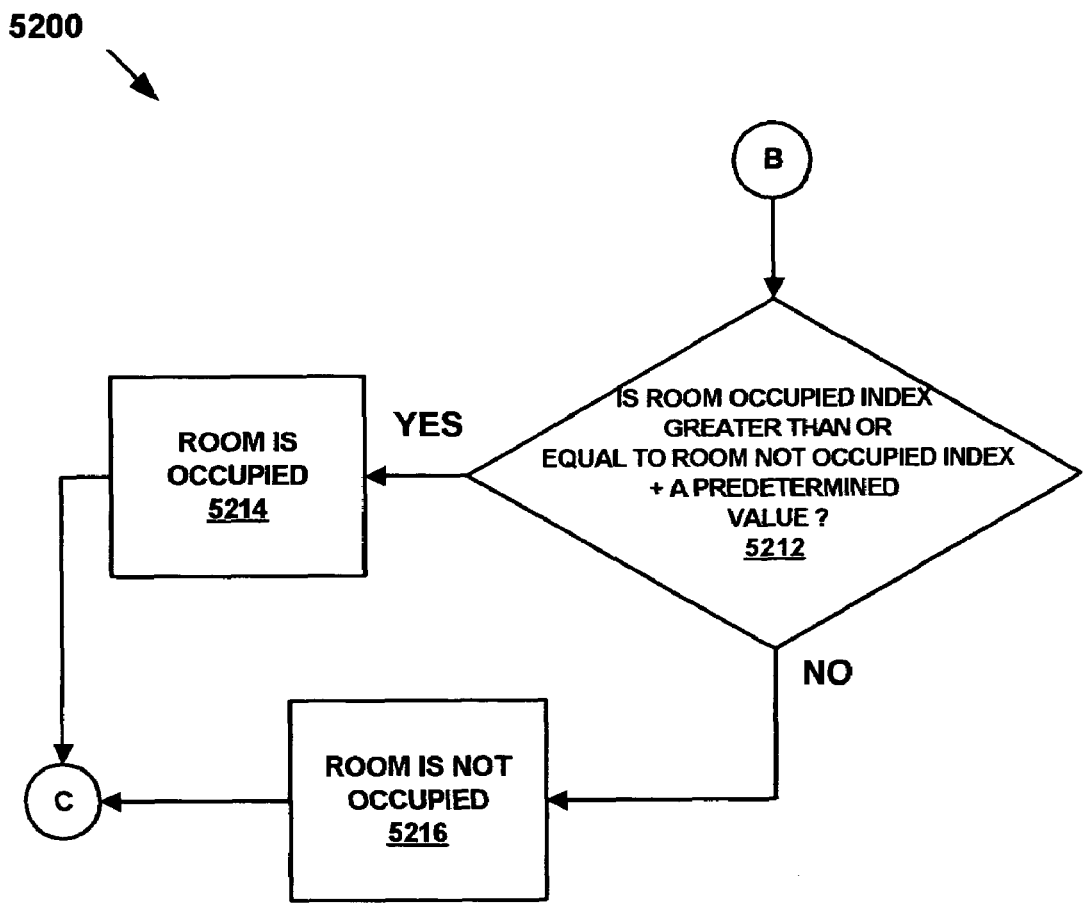

In an exemplary embodiment, as illustrated in FIGS. 52a-52b, during operation of the occupancy sensor 100, the occupancy sensor implements a method of determining occupancy 5200 in which, in step 5202, a COUNT INDEX is initialized and set to be equal to one, a ROOM IS NOT OCCUPIED INDEX is initialized and set equal to zero, and a ROOM IS OCCUPIED INDEX is initialized and set equal to zero. In step 5204, it is determined if only one time averaged amplitude, as provided in step 1214 of the method 1200, the method 4600, and/or the method 5000, is different from all of the remaining time averaged amplitudes. If only one time averaged amplitude is different from all of the remaining time averaged amplitudes, then it is determined that the defined region 132 is not occupied by the occupant 134, the ROOM IS NOT OCCUPIED INDEX is incremented by one, and the COUNT INDEX is incremented by one in step 5206.

Alternatively, if more than one time averaged amplitudes are different from the remaining time averaged amplitudes, then the ROOM IS OCCUPIED INDEX is incremented by one and the COUNT INDEX is incremented by one in steps 5208 and 4810.

If the ROOM IS OCCUPIED INDEX is greater than or equal to the ROOM IS NOT OCCUPIED INDEX plus a predetermined value in step 5212, then it is determined that the defined region 132 is occupied by the occupant 134 in step 5214. Alternatively, If the ROOM IS OCCUPIED INDEX is not greater than or equal to the ROOM IS NOT OCCUPIED INDEX plus a predetermined value in step 5212, then it is determined that the defined region 132 is not occupied by the occupant 134 in step 5216.

Thus, the method 5200 permits the determination of occupancy of the defined region 132 if the statistical frequency of the number of indications of occupancy exceeds the statistical frequency of the number of indications of non-occupancy plus some constant.

In an exemplary embodiment, the method 5200 is implemented in addition to, or instead of the steps 1216 and/or 1218 in the method 1200.

In an exemplary embodiment, the method 5200 may be implemented in a conventional occupancy sensor in order to provide quality control in the determination of occupancy in a conventional occupancy sensor.

Figure 53:
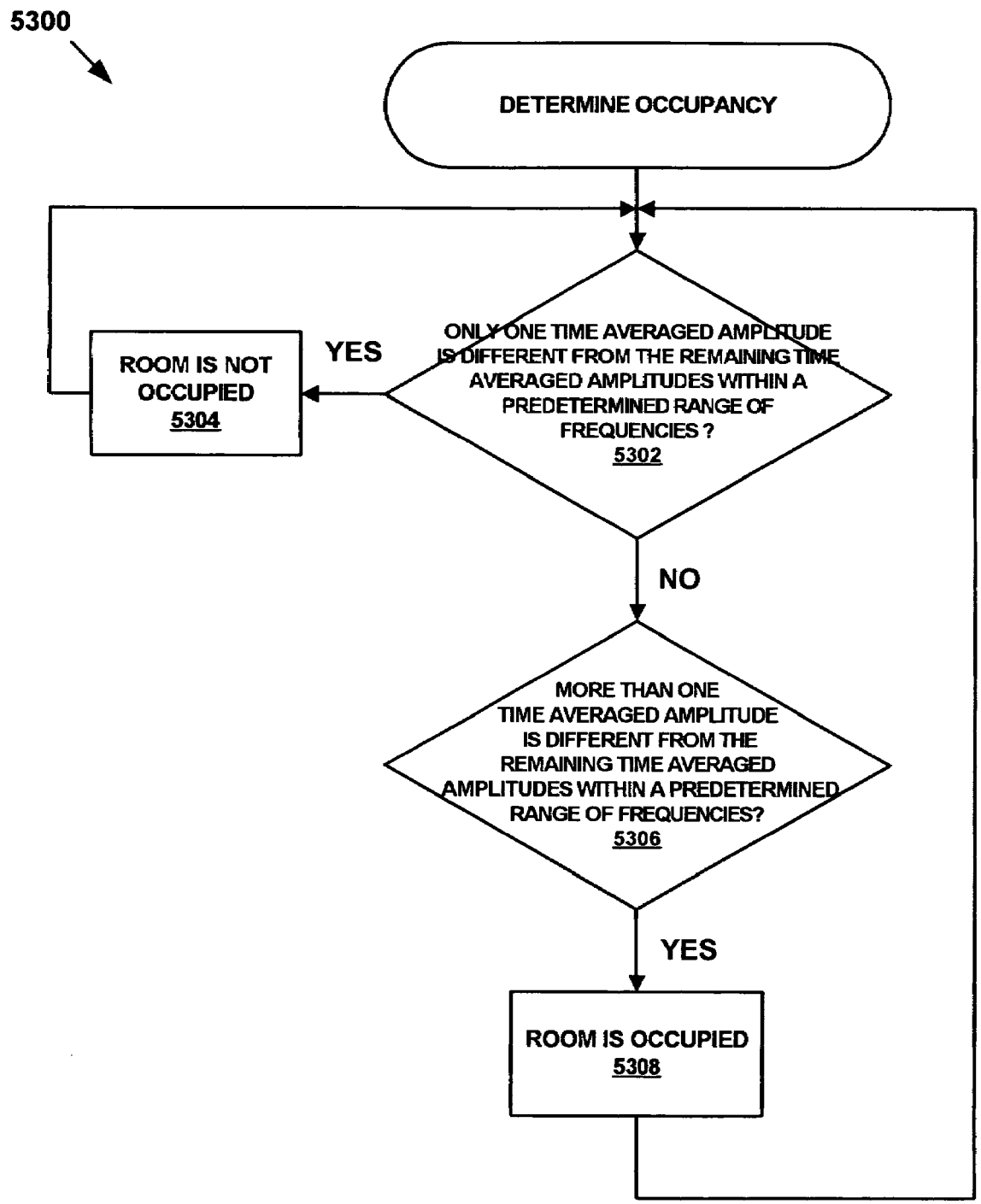
FIG. 53 is a flow chart illustration of an exemplary embodiment of a method of determining occupancy.

In an exemplary embodiment, as illustrated in FIG. 53, during operation of the occupancy sensor 100, the occupancy sensor implements a method of determining occupancy 5300 in which, in step 5302, it is determined if only one time averaged amplitude, as provided in step 1214 of the method 1200, the method 4600, and/or the method 5000, is different from all of the remaining time averaged amplitudes within a predetermined range of frequencies. If only one time averaged amplitude is different from all of the remaining time averaged amplitudes, then it is determined that the defined region 132 is not occupied by the occupant 134 in step 5304.

Alternatively, if more than one time averaged amplitudes are different from the remaining time averaged amplitudes within the predetermined range of frequencies, then it is determined that the defined region 132 is occupied by the occupant 134 in steps 5306 and 5308.

Thus, the method 5300 permits the determination of occupancy of the defined region 132 if the indications of occupancy occur within a predetermined range of frequencies.

In an exemplary embodiment, the method 5300 is implemented in addition to, or instead of the steps 1216 and/or 1218 in the method 1200.

In an exemplary embodiment, the method 5300 may be implemented in a conventional occupancy sensor in order to enhance the determination of occupancy in a conventional occupancy sensor.

Figure 54:
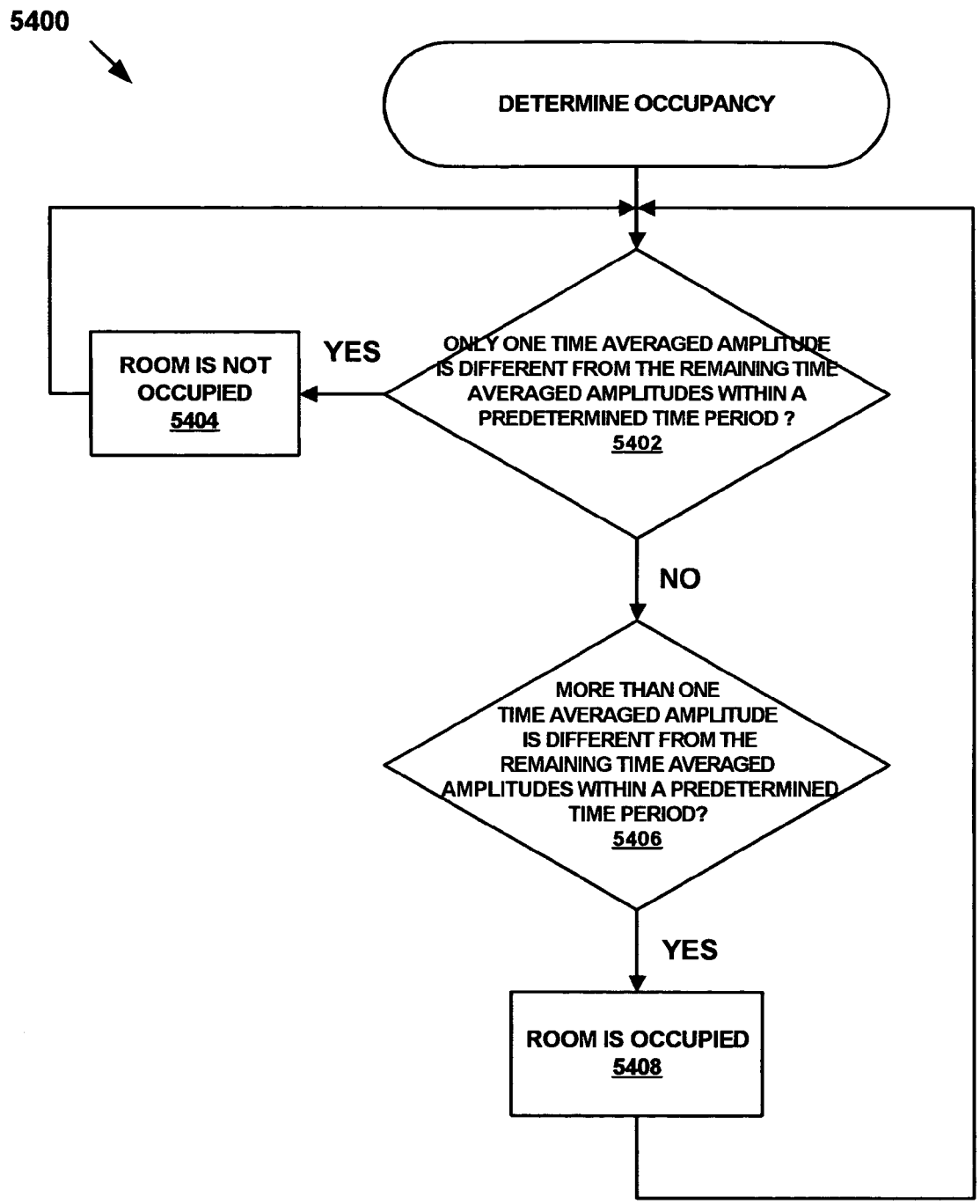
FIG. 54 is a flow chart illustration of an exemplary embodiment of a method of determining occupancy.

In an exemplary embodiment, as illustrated in FIG. 54, during operation of the occupancy sensor 100, the occupancy sensor implements a method of determining occupancy 5400 in which, in step 5402, it is determined if only one time averaged amplitude, as provided in step 1214 of the method 1200, the method 4600, and/or the method 5000, is different from all of the remaining time averaged amplitudes within a time window. If only one time averaged amplitude is different from all of the remaining time averaged amplitudes, then it is determined that the defined region 132 is not occupied by the occupant 134 in step 5404. In an exemplary embodiment, the time window may correspond to a duty cycle associated with the occupancy sensor 100. In this manner, the occupancy sensor may be inactive during hours of known inactivity for the defined region 132 in order to conserve energy.

Alternatively, if more than one time averaged amplitudes are different from the remaining time averaged amplitudes within the predetermined time window, then it is determined that the defined region 132 is occupied by the occupant 134 in steps 5406 and 5408.

Thus, the method 5400 permits the determination of occupancy of the defined region 132 if the indications of occupancy occur within a predetermined time window.

In an exemplary embodiment, the method 5400 is implemented in addition to, or instead of the steps 1216 and/or 1218 in the method 1200.

In an exemplary embodiment, the method 5400 may be implemented in a conventional occupancy sensor in order to enhance the determination of occupancy in a conventional occupancy sensor.

In an exemplary embodiment, one or more of the methods 1200, 5100, 5200, 5300, and/or 5400 are implemented simultaneously by the occupancy sensor 100 in order to provide quality control during the operation of the occupancy sensor.

In an exemplary embodiment, one or more of the methods 5100, 5200, 5300, and/or 5400 are implemented simultaneously in a conventional occupancy sensor in order to provide quality control during the operation of the occupancy sensor.

In an exemplary embodiment, one or more aspects of one or more of the methods 1200, 4400, 4600, 4800, 5000, 5100, 5200, 5300, and/or 5400 may be implemented in a conventional occupancy sensor in order to enhance the operation of the occupancy sensor.

Figure 55A:
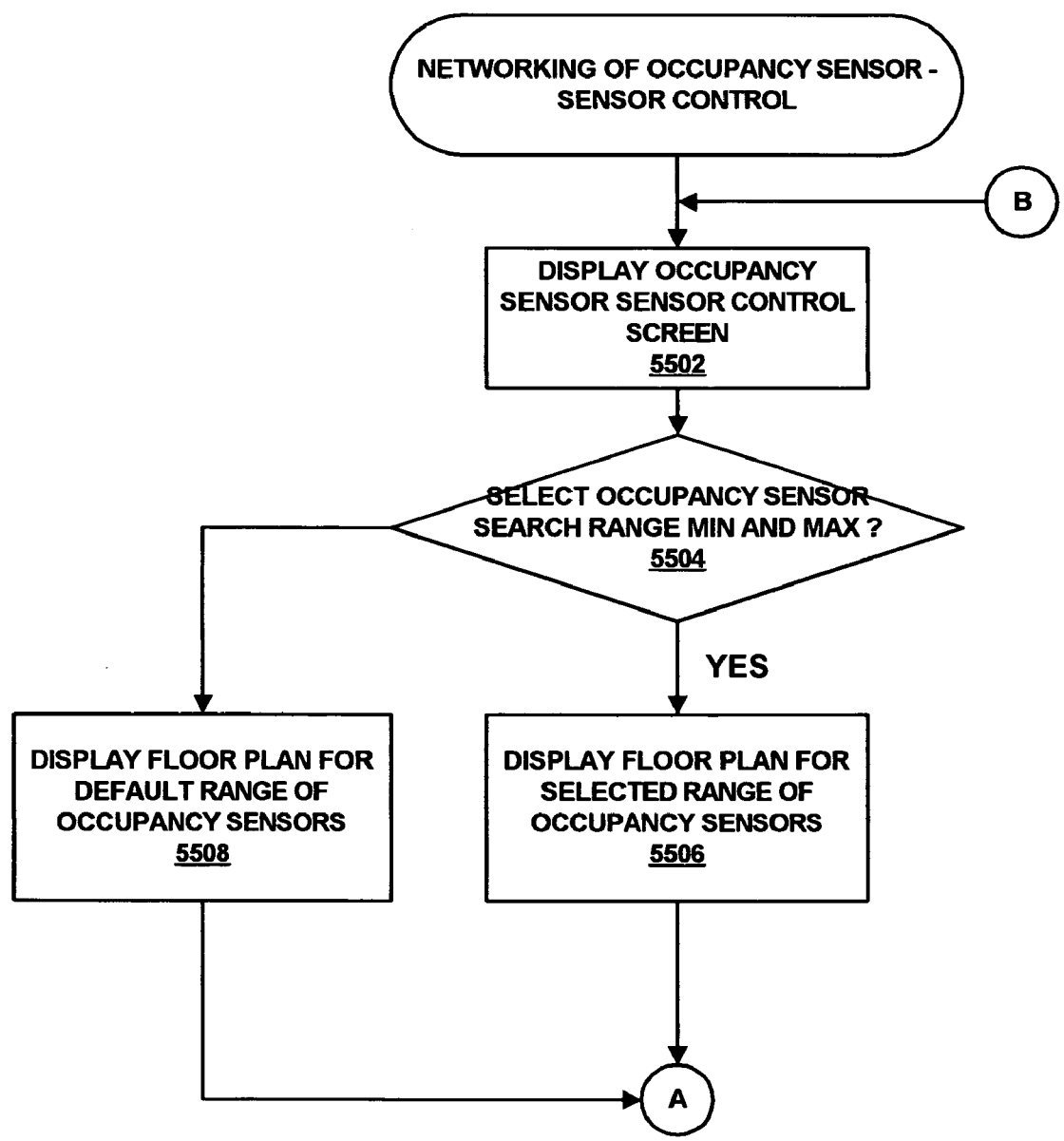
FIGS. 55a-55b is a flow chart illustration of an exemplary embodiment of a method of networking occupancy sensors.
Figure 55B:
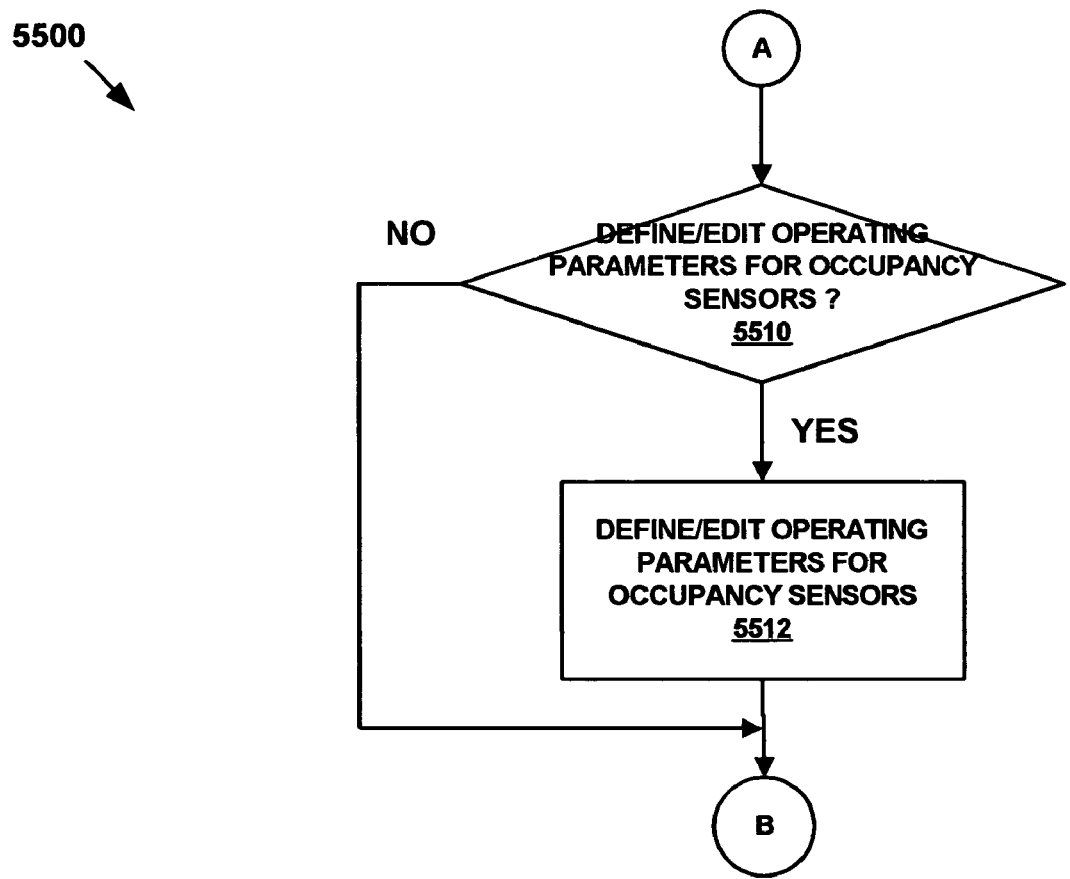
Figure 56:
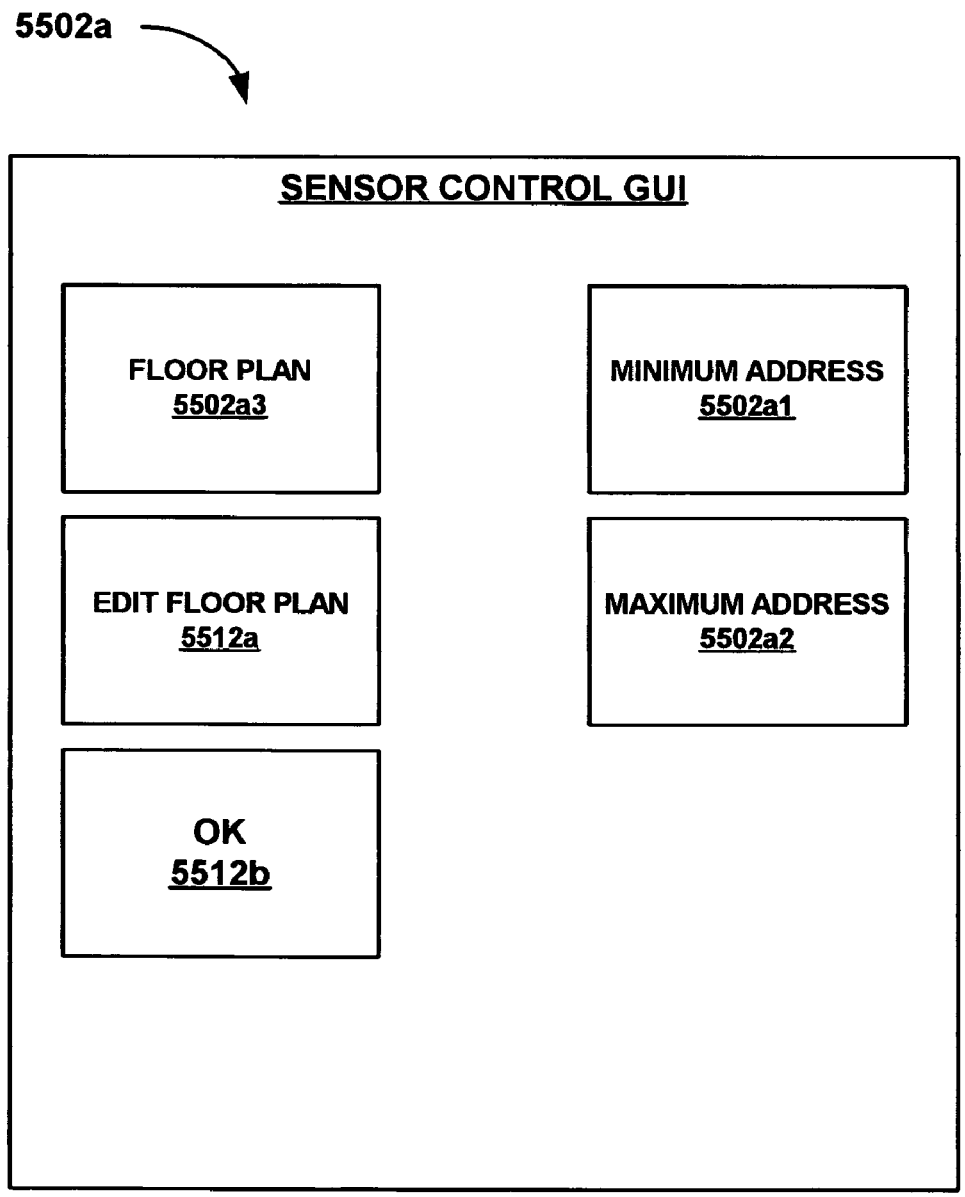
FIG. 56 is a schematic illustration of an exemplary embodiment of a graphical user interface for networking occupancy sensors.

In an exemplary embodiment, as illustrated in FIGS. 55*a*, 55*b*, and 56, during operation of step 2718, an occupancy sensor control GUI 5502*a* is displayed on the remote control and monitoring 122 in step 5502 of a method 5500.

In an exemplary embodiment, the occupancy sensor control GUI 5502*a* includes: a minimum network address 5502*a*1, a maximum network address 5502*a*2, and an occupancy sensor floor plan 5502*a*3 for the range of network addresses defined by the minimum and maximum network addresses.

In an exemplary embodiment, the user of the remote control and monitoring 122 may select the minimum and maximum network addresses, 5502*a*1 and 5502*a*2, in step 5504. If the user of the remote control and monitoring 122 selects the minimum and maximum network addresses, 5502*a*1 and 5502*a*2, then the floor plan information 5502*a*3 corresponding to the range of occupancy sensors having the selected range of network addresses is displayed on the occupancy sensor control GUI 5502*a* in step 5506. Alternatively, if the user of the remote control and monitoring 122 does not select minimum and maximum network addresses, 5502*a*1 and 5502*a*2, then the floor plan information 5502*a*3 corresponding to the range of occupancy sensors having the selected range of network addresses is displayed on the occupancy sensor control GUI 5102*a* in step 5508.

In an exemplary embodiment, the operating schedule information 5502*a*3 corresponding to the occupancy sensors having a range of network addresses that is displayed on the occupancy sensor control GUI 5502a includes the operating schedule and corresponding operational parameters.

In an exemplary embodiment, the user of the remote control and monitoring 122 may select editing the floor plan information 5502a3 corresponding to the occupancy sensors having a range of network addresses in step 5510. If the user of the remote control and monitoring 122 selects select editing the floor plan information 5502a3 corresponding to the occupancy sensors having a range of network addresses, then the user may initiate the editing by pressing the edit floor plan button 5512a in step 5512. In an exemplary embodiment, the user of the remote control and monitoring 122 may complete the editing by pressing the OK button 5512b in step 5512.

Figure 57:
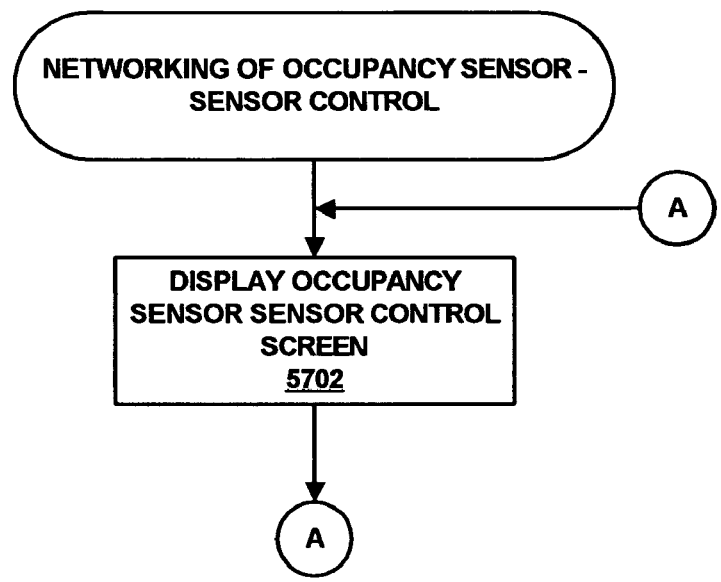
FIG. 57 is a flow chart illustration of an exemplary embodiment of a method of networking occupancy sensors.
Figure 58:
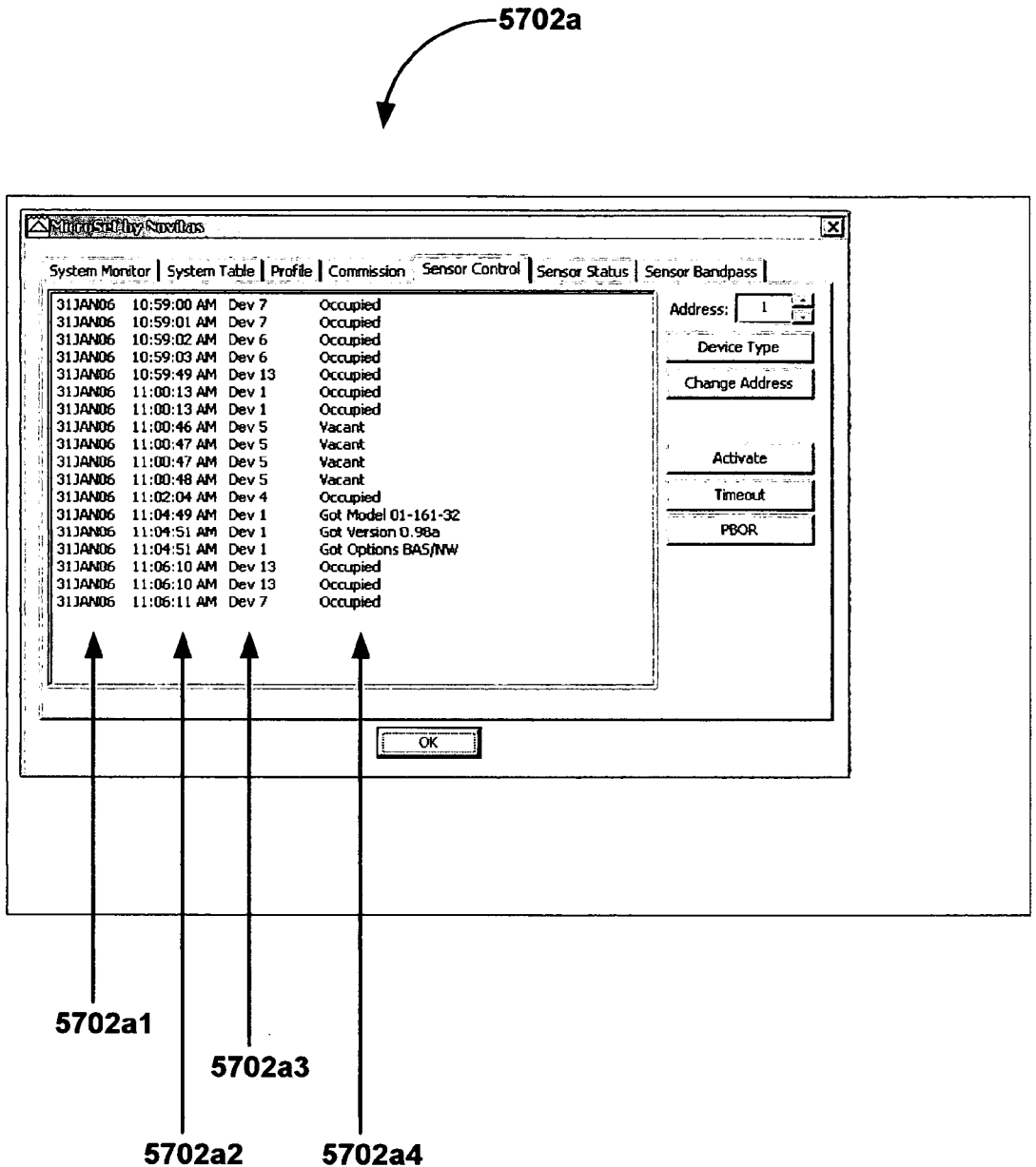
FIG. 58 is a schematic illustration of an exemplary embodiment of a graphical user interface for networking occupancy sensors.

In an exemplary embodiment, as illustrated in FIGS. 57 and 58, during operation of step 2718, an occupancy sensor control GUI 5702a is displayed on the remote control and monitoring 122 in step 5702 of a method 5700.

In an exemplary embodiment, the occupancy sensor control GUI 5702a includes tabular information regarding the operational status of the occupancy sensors that includes: a date 5702a1 associated with an operational status of an occupancy sensor 100, a time 5702a2 associated with an operational status of an occupancy sensor, a network address 5702a3 associated with an operational status of an occupancy sensor, and a description 5702a4 of an operational status of an occupancy sensor.

Figure 59:
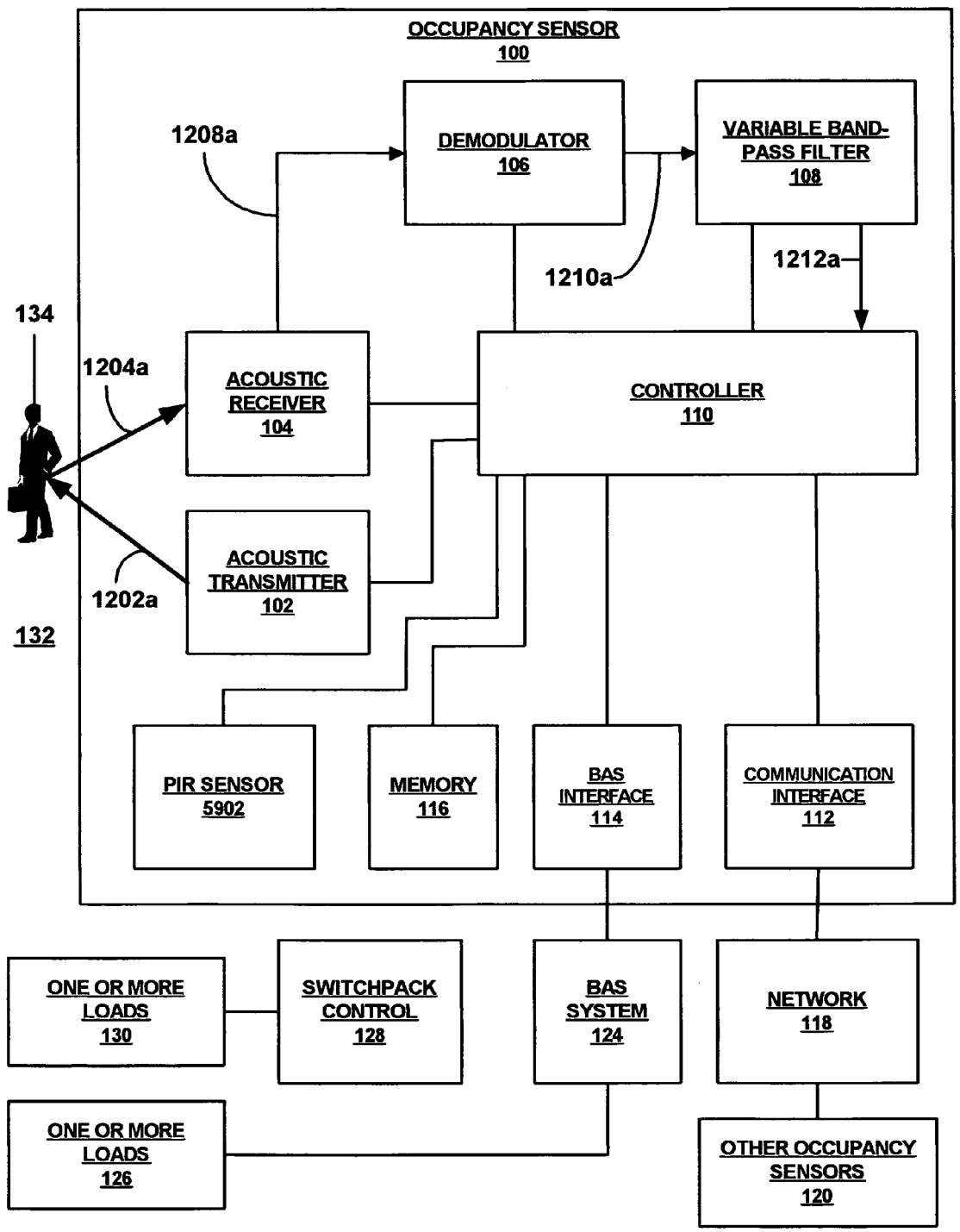
FIG. 59 is a schematic illustration of an exemplary embodiment of an occupancy sensor.

Referring now to FIG. 59, in an exemplary embodiment, one or more of the occupancy sensors 100 may further include a conventional passive infrared ("PIR") sensor 5902 operably coupled to the controller 110. As will be recognized by persons having ordinary skill in the art, generally speaking, PIR sensors sense occupancy by detecting changes in the heat signature of a defined region such as, for example, a room. When a person moves within the room, a PIR sensor detects the body temperature of the person moving which results in a change in the heat signature of the room. In an exemplary embodiment, the PIR sensor 5902 may also incorporate one or more of the teachings of U.S. Pat. No. 5,394,035, the disclosure of which is incorporated herein by reference.

In an exemplary embodiment, the signals generated by the PIR sensor 5902 may be processed using one or more of the teachings of the present disclosure such as the methods 1200, 1208, 1212, 1214, 1216, 1218, 4400, 4600, 4800, 5000, 5100, 5200, 5300, and 5400. In particular, application of the teachings of the methods 1200, 1208, 1212, 1214, 1216, 1218, 4400, 4600, 4800, 5000, 5100, 5200, 5300, and 5400 will enhance the determination of occupancy in a conventional PIR sensor by providing enhanced tolerance of occupancy determination in a thermally noisy environment and/or enhanced statistical quality control of the determination of occupancy.

In an exemplary embodiment, one or more aspects of the methods 2600, 2604, 2704, 2708, 2712, 2716, 2720, 2724, 2728, 5500, and/or 5700 may be applied to the remote control and monitoring of conventional occupancy sensors that may, for example, include acoustic and/or passive infrared and/or other conventional or equivalent forms of occupancy sensors.

In an exemplary embodiment, the teachings of the present disclosure may be used to remotely control and monitor one or more of the other occupancy sensors 120 and/or BAS systems 124 and/or switchpack controls 128.

Figure 60:
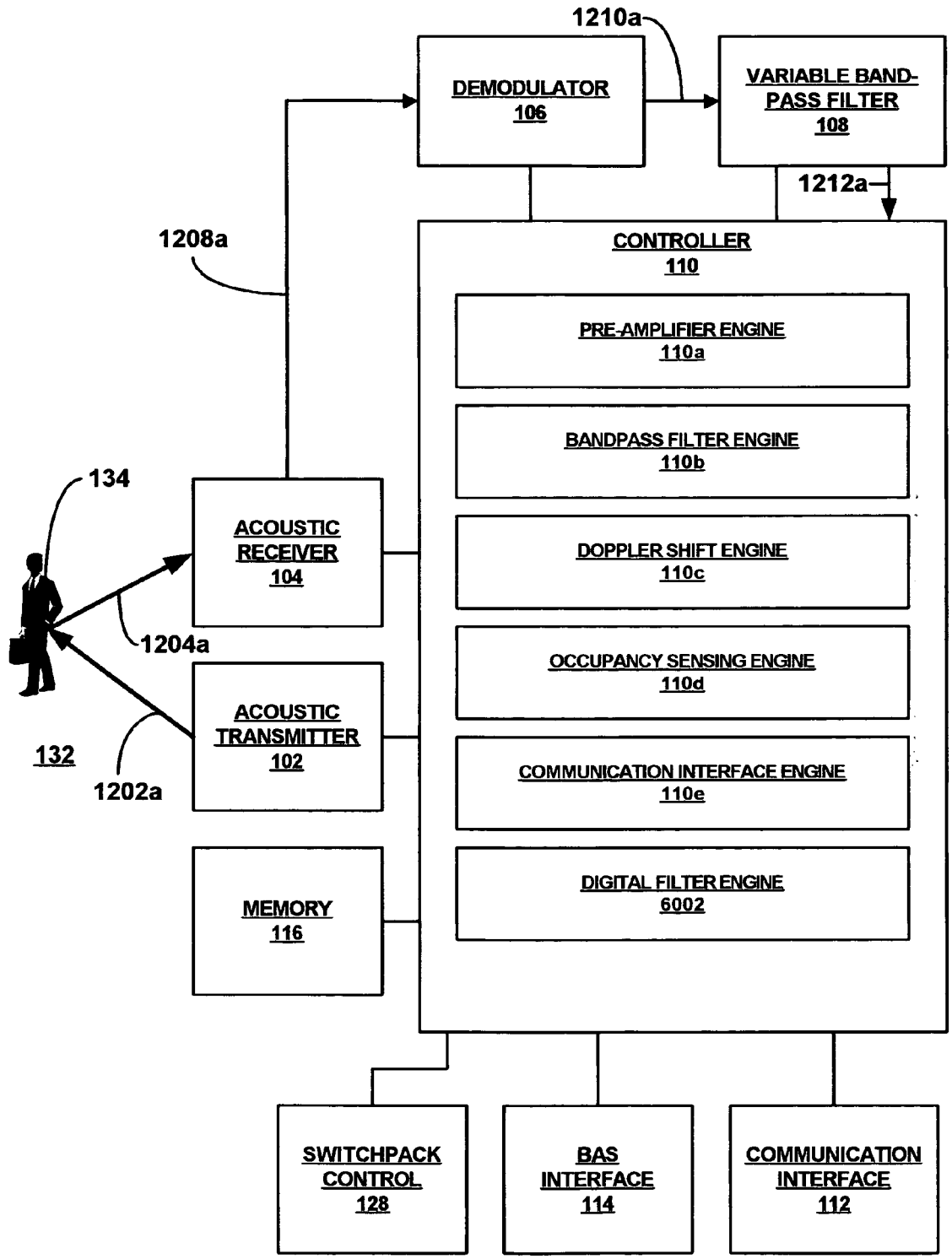
FIG. 60 is a schematic illustration of an exemplary embodiment of an occupancy sensor.

In an exemplary embodiment, as illustrated in FIG. 60, the occupancy sensor 100 includes a digital filter engine 6002 for digitally filtering the signals 1210a output by the demodulator 106. In an exemplary embodiment, the digital filter engine 6002 is adapted to otherwise operate substantially in the same manner as the variable bandpass filter 108. In an exemplary embodiment, the digital filter engine 6002 may be used instead of, or in addition to, the variable bandpass filter 108. In an exemplary embodiment, the resolution of the A/D converter 104c of the acoustic receiver 104 may be increased to match the operational characteristics of the digital filter engine 6002. In an exemplary embodiment, the digital filter engine 6002 may be implemented, for example, using a conventional programmable digital signal processor.

In an exemplary embodiment, one or more aspects of the present exemplary embodiments may be implemented, for example, using a programmable general purpose microprocessor, microcontroller, digital signal processor, application specific integrated circuit, analog circuit, and/or digital circuit using software, firmware and/or other equivalent hardware and/or software.

An occupancy sensor has been described that includes an acoustic transmitter, an acoustic receiver, a variable bandpass filter operably coupled to the acoustic receiver, and a controller operably coupled to the acoustic transmitter, the acoustic receiver, and the variable bandpass filter. In an exemplary embodiment, the controller is adapted to: transmit acoustic signals using the acoustic transmitter, receive acoustic signals using the acoustic receiver, filter the acoustic signals using the variable bandpass filter, and process the filtered acoustic signals to determine the presence or absence of an occupant within a defined region. In an exemplary embodiment, the acoustic receiver includes an acoustic sensor, a pre-amplifier operably coupled to the acoustic sensor comprising a digital potentiometer, and an analog to digital converter operably coupled to the pre-amplifier. In an exemplary embodiment, the digital potentiometer is adapted to control the gain of the pre-amplifier to prevent clipping of signals received by the acoustic receiver. In an exemplary embodiment, the variable bandpass filter includes one or more digital potentiometers adapted to control or more of the following: a gain of the bandpass filter, a tuning of the bandpass filter, and a ratio of a center frequency of the bandpass filter to a bandwidth of the bandpass filter. In an exemplary embodiment, the variable bandpass filter includes a digital potentiometer adapted to control a gain of the bandpass filter, a digital potentiometer adapted to control a tuning of the bandpass filter, and a digital potentiometer adapted to control a ratio of a center frequency of the bandpass filter to a bandwidth of the bandpass filter. In an exemplary embodiment, the controller includes a pre-amplifier engine adapted to control the acoustic receiver, a bandpass filter engine adapted to control the variable bandpass filter, a doppler shift engine adapted to characterize the signals filtered by the variable bandpass filter, and an occupancy sensing engine adapted to characterizations of the Doppler shift engine to determine the presence of absence of the occupant within the defined region. In an exemplary embodiment, the pre-amplifier engine includes a time averaging engine for time averaging a signal received by the acoustic receiver, a maintain signal level below a clipped level engine for maintaining the signal received by the acoustic receiver below a clipping level for the pre-amplifier, and a pre-amplifier gain engine for controlling a gain of the pre-amplifier. In an exemplary embodiment, the bandpass filter engine includes a bandpass filter tuning engine for controlling the bandpass region of the variable bandpass filter, a bandpass filter gain engine for controlling a gain of the variable bandpass filter, a ratio of a center frequency to a bandwidth of the variable bandpass filter engine for controlling the ratio of a center frequency to a bandwidth of the variable bandpass filter, and a sweeping engine for controlling a sweeping of the variable bandpass filter across a range of frequencies. In an exemplary embodiment, the doppler shift engine includes a time averaging engine for time averaging an amplitude of signals filtered by the variable bandpass filter, a comparison engine for comparing the time averaged amplitude of signals, and a difference engine for determining a difference in the amplitudes of the time averaged signals. In an exemplary embodiment, the occupancy sensing engine includes a determination of noise engine for processing the signals filtered by the variable bandpass filter to determine if they indicate a source of noise, and a determination of occupancy engine for processing the signals filtered by the variable bandpass filter to determine the presence or absence of an occupant within the defined region. In an exemplary embodiment, the bandpass filter engine includes a quiet bandwidth search engine for searching a range of frequencies for quiet bandwidth areas that do not include background noise. In an exemplary embodiment, the doppler shift engine includes a time averaging engine for time averaging an amplitude of signals filtered by the variable bandpass filter within the quiet bandwidth areas, a comparison engine for comparing the time averaged amplitude of signals, and a difference engine for determining a difference in the amplitudes of the time averaged signals. In an exemplary embodiment, the bandpass filter engine includes a noisy bandwidth search engine for searching a range of frequencies for noisy bandwidth areas that include background noise. In an exemplary embodiment, the doppler shift engine includes a time averaging engine for time averaging an amplitude of signals filtered by the variable bandpass filter that are not within the noisy bandwidth areas, a comparison engine for comparing the time averaged amplitude of signals, and a difference engine for determining a difference in the amplitudes of the time averaged signals. In an exemplary embodiment, the occupancy sensing engine includes a determination of possible noise engine for processing the signals filtered by the variable bandpass filter to determine if they indicate a possible source of noise, a determination of possible occupancy engine for processing the signals filtered by the variable bandpass filter to determine if they indicate the possible presence of an occupant within the defined region, a statistical processing engine for processing the indications of possible noise and occupants to determine if the defined region is occupied by an occupant. In an exemplary embodiment, the statistical processing engine determines that the defined region is occupied by an occupant based upon the frequency of the indications of occupants within the defined region. In an exemplary embodiment, the statistical processing engine determines that the defined region is occupied by an occupant based upon the frequency of the indications of occupants within the defined region relative to the frequency of the indications of a source of noise within the defined region. In an exemplary embodiment, the occupancy sensing engine includes a determination of noise engine for processing a subset of the signals filtered by the variable bandpass filter to determine if they indicate a source of noise, and a determination of occupancy engine for processing the subset of the signals filtered by the variable bandpass filter to determine the presence or absence of an occupant within the defined region. In an exemplary embodiment, the occupancy sensing engine includes a determination of noise engine for processing the signals filtered by the variable bandpass filter within a predetermined time period to determine if they indicate a source of noise, and a determination of occupancy engine for processing the signals filtered by the variable bandpass filter within a predetermined time period to determine the presence or absence of an occupant within the defined region. In an exemplary embodiment, the occupancy sensor further includes a passive infrared sensor operably coupled to the controller, and wherein the controller is adapted to: process signals generated by the passive infrared sensor to determine the presence or absence of an occupant within the defined region.

An occupancy sensor has been described that includes an acoustic transmitter, an acoustic receiver including: an acoustic sensor, a pre-amplifier operably coupled to the acoustic sensor comprising a digital potentiometer, wherein the digital potentiometer is adapted to control the gain of the pre-amplifier to prevent clipping of signals received by the acoustic receiver, and an analog to digital converter operably coupled to the pre-amplifier, a demodulator operably coupled to the acoustic receiver, a variable bandpass filter operably coupled to the demodulator including: a digital potentiometer adapted to control a gain of the bandpass filter, a digital potentiometer adapted to control a tuning of the bandpass filter, and a digital potentiometer adapted to control a ratio of a center frequency of the bandpass filter to a bandwidth of the bandpass filter, and a controller operably coupled to the acoustic transmitter, the acoustic receiver, the demodulator, and the variable bandpass filter including: a pre-amplifier engine adapted to control the acoustic receiver, a bandpass filter engine adapted to control the variable bandpass filter, a doppler shift engine adapted to characterize the signals filtered by the variable bandpass filter, and an occupancy sensing engine adapted to characterizations of the Doppler shift engine to determine the presence of absence of the occupant within the defined region, wherein the controller is adapted to: transmit acoustic signals using the acoustic transmitter, receive acoustic signals using the acoustic receiver, process the received acoustic signals using the demodulator, filter the processed acoustic signals using the variable bandpass filter, and process the filtered acoustic signals to determine the presence or absence of an occupant within a defined region.

An occupancy sensor has been described that includes an acoustic transmitter, an acoustic receiver including: an acoustic sensor, a pre-amplifier operably coupled to the acoustic sensor comprising a digital potentiometer, wherein the digital potentiometer is adapted to control the gain of the pre-amplifier to prevent clipping of signals received by the acoustic receiver, and an analog to digital converter operably coupled to the pre-amplifier, a demodulator operably coupled to the acoustic receiver, a variable bandpass filter operably coupled to the demodulator including: a digital potentiometer adapted to control a gain of the bandpass filter, a digital potentiometer adapted to control a tuning of the bandpass filter, and a digital potentiometer adapted to control a ratio of a center frequency of the bandpass filter to a bandwidth of the bandpass filter, and a controller operably coupled to the acoustic transmitter, the acoustic receiver, the demodulator, and the variable bandpass filter including: a pre-amplifier engine adapted to control the acoustic receiver, a bandpass filter engine adapted to control the variable bandpass filter including: a quiet bandwidth search engine for searching a range of frequencies for quiet bandwidth areas that do not include background noise, a doppler shift engine adapted to characterize the signals filtered by the variable bandpass filter within the quiet bandwidth areas, and an occupancy sensing engine adapted to characterizations of the Doppler shift engine to determine the presence of absence of the occupant within the defined region, wherein the controller is adapted to: transmit acoustic signals using the acoustic transmitter, receive acoustic signals using the acoustic receiver, process the received acoustic signals using the demodulator, filter the processed acoustic signals using the variable bandpass filter, and process the filtered acoustic signals to determine the presence or absence of an occupant within a defined region.

An occupancy sensor has been described that includes an acoustic transmitter, an acoustic receiver including: an acoustic sensor, a pre-amplifier operably coupled to the acoustic sensor comprising a digital potentiometer, wherein the digital potentiometer is adapted to control the gain of the pre-amplifier to prevent clipping of signals received by the acoustic receiver, and an analog to digital converter operably coupled to the pre-amplifier, a demodulator operably coupled to the acoustic receiver, a variable bandpass filter operably coupled to the demodulator including: a digital potentiometer adapted to control a gain of the bandpass filter, a digital potentiometer adapted to control a tuning of the bandpass filter, and a digital potentiometer adapted to control a ratio of a center frequency of the bandpass filter to a bandwidth of the bandpass filter, and a controller operably coupled to the acoustic transmitter, the acoustic receiver, the demodulator, and the variable bandpass filter including: a pre-amplifier engine adapted to control the acoustic receiver, a bandpass filter engine adapted to control the variable bandpass filter including: a noisy bandwidth search engine for searching a range of frequencies for noisy bandwidth areas that include background noise, a doppler shift engine adapted to characterize the signals filtered by the variable bandpass filter that are not within the noisy bandwidth areas, and an occupancy sensing engine adapted to characterizations of the Doppler shift engine to determine the presence of absence of the occupant within the defined region, wherein the controller is adapted to: transmit acoustic signals using the acoustic transmitter, receive acoustic signals using the acoustic receiver, process the received acoustic signals using the demodulator, filter the processed acoustic signals using the variable bandpass filter, and process the filtered acoustic signals to determine the presence or absence of an occupant within a defined region.

An occupancy sensor has been described that includes an acoustic transmitter, an acoustic receiver including: an acoustic sensor, a pre-amplifier operably coupled to the acoustic sensor comprising a digital potentiometer, wherein the digital potentiometer is adapted to control the gain of the pre-amplifier to prevent clipping of signals received by the acoustic receiver, and an analog to digital converter operably coupled to the pre-amplifier, a demodulator operably coupled to the acoustic receiver, a variable bandpass filter operably coupled to the demodulator including: a digital potentiometer adapted to control a gain of the bandpass filter, a digital potentiometer adapted to control a tuning of the bandpass filter, and a digital potentiometer adapted to control a ratio of a center frequency of the bandpass filter to a bandwidth of the bandpass filter, and a controller operably coupled to the acoustic transmitter, the acoustic receiver, the demodulator, and the variable bandpass filter including: a pre-amplifier engine adapted to control the acoustic receiver, a bandpass filter engine adapted to control the variable bandpass filter, a doppler shift engine adapted to characterize the signals filtered by the variable bandpass filter, and an occupancy sensing engine adapted to characterizations of the Doppler shift engine to determine the presence of absence of the occupant within the defined region including: a determination of possible noise engine for processing signals filtered by the variable bandpass filter to determine if they indicate a possible source of noise, a determination of possible occupancy engine for processing the signals filtered by the variable bandpass filter to determine if they indicate the possible presence of an occupant within the defined region, and a statistical processing engine for processing the indications of possible noise and occupants to determine if the defined region is occupied by an occupant, wherein the statistical processing engine determines that the defined region is occupied by an occupant based upon the frequency of the indications of occupants within the defined region, wherein the controller is adapted to: transmit acoustic signals using the acoustic transmitter, receive acoustic signals using the acoustic receiver, process the received acoustic signals using the demodulator, filter the processed acoustic signals using the variable bandpass filter, and process the filtered acoustic signals to determine the presence or absence of an occupant within a defined region.

An occupancy sensor has been described that includes an acoustic transmitter, an acoustic receiver including: an acoustic sensor, a pre-amplifier operably coupled to the acoustic sensor comprising a digital potentiometer, wherein the digital potentiometer is adapted to control the gain of the pre-amplifier to prevent clipping of signals received by the acoustic receiver, and an analog to digital converter operably coupled to the pre-amplifier, a demodulator operably coupled to the acoustic receiver, a variable bandpass filter operably coupled to the demodulator including: a digital potentiometer adapted to control a gain of the bandpass filter, a digital potentiometer adapted to control a tuning of the bandpass filter, and a digital potentiometer adapted to control a ratio of a center frequency of the bandpass filter to a bandwidth of the bandpass filter, and a controller operably coupled to the acoustic transmitter, the acoustic receiver, the demodulator, and the variable bandpass filter including: a pre-amplifier engine adapted to control the acoustic receiver, a bandpass filter engine adapted to control the variable bandpass filter, a doppler shift engine adapted to characterize the signals filtered by the variable bandpass filter, and an occupancy sensing engine adapted to characterizations of the Doppler shift engine to determine the presence of absence of the occupant within the defined region including: a determination of noise engine for processing a subset of signals filtered by the variable bandpass filter to determine if they indicate a source of noise, and a determination of occupancy engine for processing the subset of the signals filtered by the variable bandpass filter to determine the presence or absence of an occupant within the defined region, wherein the controller is adapted to: transmit acoustic signals using the acoustic transmitter, receive acoustic signals using the acoustic receiver, process the received acoustic signals using the demodulator, filter the processed acoustic signals using the variable bandpass filter, and process the filtered acoustic signals to determine the presence or absence of an occupant within a defined region.

An occupancy sensor has been described that includes an acoustic transmitter, an acoustic receiver including: an acoustic sensor, a pre-amplifier operably coupled to the acoustic sensor comprising a digital potentiometer, wherein the digital potentiometer is adapted to control the gain of the pre-amplifier to prevent clipping of signals received by the acoustic receiver, and an analog to digital converter operably coupled to the pre-amplifier, a demodulator operably coupled to the acoustic receiver, a variable bandpass filter operably coupled to the demodulator including: a digital potentiometer adapted to control a gain of the bandpass filter, a digital potentiometer adapted to control a tuning of the bandpass filter, and a digital potentiometer adapted to control a ratio of a center frequency of the bandpass filter to a bandwidth of the bandpass filter, and a controller operably coupled to the acoustic transmitter, the acoustic receiver, the demodulator, and the variable bandpass filter including: a pre-amplifier engine adapted to control the acoustic receiver, a bandpass filter engine adapted to control the variable bandpass filter, a doppler shift engine adapted to characterize the signals filtered by the variable bandpass filter, and an occupancy sensing engine adapted to characterizations of the Doppler shift engine to determine the presence of absence of the occupant within the defined region including: a determination of noise engine for processing the signals filtered by the variable bandpass filter within a predetermined time period to determine if they indicate a source of noise, and a determination of occupancy engine for processing the signals filtered by the variable bandpass filter within a predetermined time period to determine the presence or absence of an occupant within the defined region, wherein the controller is adapted to: transmit acoustic signals using the acoustic transmitter, receive acoustic signals using the acoustic receiver, process the received acoustic signals using the demodulator, filter the processed acoustic signals using the variable bandpass filter, and process the filtered acoustic signals to determine the presence or absence of an occupant within a defined region.

A method of operating an occupancy sensor has been described that includes transmitting acoustic signals into a defined region, receiving acoustic signals from the defined region, filtering the received acoustic signals using a variable bandpass filter, and processing the filtered acoustic signals to determine a presence or absence of an occupant within a defined region. In an exemplary embodiment, receiving acoustic signals from the defined region includes converting the acoustic signals into electrical signals, and amplifying the electrical signals without clipping the electrical signals. In an exemplary embodiment, filtering the received acoustic signals using a variable bandpass filter includes sweeping the variable bandpass filter across a range of frequencies. In an exemplary embodiment, filtering the received acoustic signals using a variable bandpass filter includes sweeping the variable bandpass filter upwardly along a range of frequencies, then sweeping the variable bandpass filter downwardly along a range of frequencies. In an exemplary embodiment, filtering the received acoustic signals using a variable bandpass filter includes sweeping the variable bandpass filter downwardly along a range of frequencies, and then sweeping the variable bandpass filter upwardly along a range of frequencies. In an exemplary embodiment, filtering the received acoustic signals using a variable bandpass filter includes controlling a ratio of a center frequency to a bandwidth of the variable bandpass filter. In an exemplary embodiment, processing the filtered acoustic signals to determine a presence or absence of an occupant within a defined region includes time averaging an amplitude of the filtered acoustic signals, and comparing the time averaged amplitudes of the filtered acoustic signals. In an exemplary embodiment, processing the filtered acoustic signals to determine a presence or absence of an occupant within a defined region includes determining if a filtered acoustic signal indicated a source of noise within the defined region. In an exemplary embodiment, filtering the received acoustic signals includes searching for quiet bandwidth areas within a range of frequencies that do not include background noise. In an exemplary embodiment, processing the filtered acoustic signals to determine a presence or absence of an occupant within a defined region includes: time averaging an amplitude of the filtered acoustic signals within the quiet bandwidth areas, and comparing the time averaged amplitudes of the filtered acoustic signals. In an exemplary embodiment, filtering the received acoustic signals includes: searching for noisy bandwidth areas within a range of frequencies that include background noise. In an exemplary embodiment, processing the filtered acoustic signals to determine a presence or absence of an occupant within a defined region includes: time averaging an amplitude of the filtered acoustic signals that are not within the noisy bandwidth areas, and comparing the time averaged amplitudes of the filtered acoustic signals. In an exemplary embodiment, processing the filtered acoustic signals to determine a presence or absence of an occupant within a defined region includes: determining the possible presence of a source of noise within the defined region, and determining the possible presence of an occupant within the defined region. In an exemplary embodiment, the method further includes: determining the presence of an occupant within the defined region as a function of a frequency of the determination of the possible presence of an occupant within the defined region. In an exemplary embodiment, the method further includes: determining the presence of an occupant within the defined region as a function of the frequency of the determination of the possible presence of an occupant within the defined region relative to the frequency of the determination of the possible presence of a source of noise within the defined region. In an exemplary embodiment, processing the filtered acoustic signals to determine a presence or absence of an occupant within a defined region includes: time averaging an amplitude of a subset of the filtered acoustic signals, and comparing the time averaged amplitudes of the filtered acoustic signals. In an exemplary embodiment, processing the filtered acoustic signals to determine a presence or absence of an occupant within a defined region includes: time averaging an amplitude of a subset of the filtered acoustic signals for a predetermined finite time period, and comparing the time averaged amplitudes of the filtered acoustic signals. In an exemplary embodiment, the method further includes monitoring infrared energy within the defined region, and based upon the content of the monitored infrared energy determining the presence or absence of the occupant within the defined region.

A method of operating an occupancy sensor has been described that includes transmitting acoustic signals into a defined region, receiving acoustic signals from the defined region, converting the acoustic signals into electrical signals, amplifying the electrical signals without clipping the electrical signals, filtering the received acoustic signals using a variable bandpass filter, controlling a ratio of a center frequency to a bandwidth of the variable bandpass filter, sweeping the variable bandpass filter upwardly along a range of frequencies, then sweeping the variable bandpass filter downwardly along a range of frequencies, time averaging an amplitude of the filtered acoustic signals, comparing the time averaged amplitudes of the filtered acoustic signals, determining if a filtered acoustic signal indicates a source of noise within the defined region, and determining if a filtered acoustic signal indicates a presence of an occupant within the defined region.

A method of operating an occupancy sensor has been described that includes transmitting acoustic signals into a defined region, receiving acoustic signals from the defined region, converting the acoustic signals into electrical signals, amplifying the electrical signals without clipping the electrical signals, filtering the received acoustic signals using a variable bandpass filter, controlling a ratio of a center frequency to a bandwidth of the variable bandpass filter, sweeping the variable bandpass filter upwardly along a range of frequencies, then sweeping the variable bandpass filter downwardly along a range of frequencies, searching for quiet bandwidth areas within a range of frequencies that do not include background noise, time averaging an amplitude of the filtered acoustic signals within the quiet bandwidth areas, comparing the time averaged amplitudes of the filtered acoustic signals, determining if a filtered acoustic signal indicates a source of noise within the defined region, and determining if a filtered acoustic signal indicates a presence of an occupant within the defined region.

A method of operating an occupancy sensor has been described that includes transmitting acoustic signals into a defined region, receiving acoustic signals from the defined region, converting the acoustic signals into electrical signals, amplifying the electrical signals without clipping the electrical signals, filtering the received acoustic signals using a variable bandpass filter, controlling a ratio of a center frequency to a bandwidth of the variable bandpass filter, sweeping the variable bandpass filter upwardly along a range of frequencies, then sweeping the variable bandpass filter downwardly along a range of frequencies, searching for noisy bandwidth areas within a range of frequencies that include background noise, time averaging an amplitude of the filtered acoustic signals not within the noisy bandwidth areas, comparing the time averaged amplitudes of the filtered acoustic signals, determining if a filtered acoustic signal indicates a source of noise within the defined region, and determining if a filtered acoustic signal indicates a presence of an occupant within the defined region.

A method of operating an occupancy sensor has been described that includes transmitting acoustic signals into a defined region, receiving acoustic signals from the defined region, converting the acoustic signals into electrical signals, amplifying the electrical signals without clipping the electrical signals, filtering the received acoustic signals using a variable bandpass filter, controlling a ratio of a center frequency to a bandwidth of the variable bandpass filter, sweeping the variable bandpass filter upwardly along a range of frequencies, then sweeping the variable bandpass filter downwardly along a range of frequencies, time averaging an amplitude of the filtered acoustic signals, comparing the time averaged amplitudes of the filtered acoustic signals, determining a possible presence of a source of noise within the defined region, determining a possible presence of an occupant within the defined region, and determining the presence of an occupant within the defined region as a function of a frequency of the determination of the possible presence of an occupant within the defined region.

A method of operating an occupancy sensor has been described that includes transmitting acoustic signals into a defined region, receiving acoustic signals from the defined region, converting the acoustic signals into electrical signals, amplifying the electrical signals without clipping the electrical signals, filtering the received acoustic signals using a variable bandpass filter, controlling a ratio of a center frequency to a bandwidth of the variable bandpass filter, sweeping the variable bandpass filter upwardly along a range of frequencies, then sweeping the variable bandpass filter downwardly along a range of frequencies, time averaging an amplitude of the filtered acoustic signals, comparing the time averaged amplitudes of the filtered acoustic signals, determining a possible presence of a source of noise within the defined region, determining a possible presence of an occupant within the defined region, and determining the presence of an occupant within the defined region as a function of a frequency of the determination of the possible presence of an occupant within the defined region relative to a frequency of the determination of the possible presence of a source of noise within the defined region.

A method of operating an occupancy sensor has been described that includes transmitting acoustic signals into a defined region, receiving acoustic signals from the defined region, converting the acoustic signals into electrical signals, amplifying the electrical signals without clipping the electrical signals, filtering the received acoustic signals using a variable bandpass filter, controlling a ratio of a center frequency to a bandwidth of the variable bandpass filter, sweeping the variable bandpass filter upwardly along a range of frequencies, then sweeping the variable bandpass filter downwardly along a range of frequencies, time averaging an amplitude of a subset the filtered acoustic signals, comparing the time averaged amplitudes of the filtered acoustic signals, determining if a filtered acoustic signal indicates a source of noise within the defined region, and determining if a filtered acoustic signal indicates a presence of an occupant within the defined region.

A method of operating an occupancy sensor has been described that includes transmitting acoustic signals into a defined region, receiving acoustic signals from the defined region, converting the acoustic signals into electrical signals, amplifying the electrical signals without clipping the electrical signals, filtering the received acoustic signals using a variable bandpass filter, controlling a ratio of a center frequency to a bandwidth of the variable bandpass filter, sweeping the variable bandpass filter upwardly along a range of frequencies, then sweeping the variable bandpass filter downwardly along a range of frequencies, time averaging an amplitude of the filtered acoustic signals for a finite time period, comparing the time averaged amplitudes of the filtered acoustic signals, determining if a filtered acoustic signal indicates a source of noise within the defined region, and determining if a filtered acoustic signal indicates a presence of an occupant within the defined region.

A system for operating an occupancy sensor has been described that includes means for transmitting acoustic signals into a defined region, means for receiving acoustic signals from the defined region, means for filtering the received acoustic signals using a variable bandpass filter, and means for processing the filtered acoustic signals to determine a presence or absence of an occupant within a defined region. In an exemplary embodiment, means for receiving acoustic signals from the defined region includes: means for converting the acoustic signals into electrical signals, and means for amplifying the electrical signals without clipping the electrical signals. In an exemplary embodiment, means for filtering the received acoustic signals using a variable bandpass filter includes: means for sweeping the variable bandpass filter across a range of frequencies. In an exemplary embodiment, means for filtering the received acoustic signals using a variable bandpass filter includes: means for sweeping the variable bandpass filter upwardly along a range of frequencies, and then means for sweeping the variable bandpass filter downwardly along a range of frequencies. In an exemplary embodiment, means for filtering the received acoustic signals using a variable bandpass filter includes: means for sweeping the variable bandpass filter downwardly along a range of frequencies, and then means for sweeping the variable bandpass filter upwardly along a range of frequencies. In an exemplary embodiment, means for filtering the received acoustic signals using a variable bandpass filter includes: means for controlling a ratio of a center frequency to a bandwidth of the variable bandpass filter. In an exemplary embodiment, means for processing the filtered acoustic signals to determine a presence or absence of an occupant within a defined region includes: means for time averaging an amplitude of the filtered acoustic signals, and means for comparing the time averaged amplitudes of the filtered acoustic signals. In an exemplary embodiment, means for processing the filtered acoustic signals to determine a presence or absence of an occupant within a defined region includes: means for determining if a filtered acoustic signal indicated a source of noise within the defined region. In an exemplary embodiment, means for filtering the received acoustic signals includes: means for searching for quiet bandwidth areas within a range of frequencies that do not include background noise. In an exemplary embodiment, means for processing the filtered acoustic signals to determine a presence or absence of an occupant within a defined region includes: means for time averaging an amplitude of the filtered acoustic signals within the quiet bandwidth areas, and means for comparing the time averaged amplitudes of the filtered acoustic signals. In an exemplary embodiment, means for filtering the received acoustic signals includes: means for searching for noisy bandwidth areas within a range of frequencies that include background noise. In an exemplary embodiment, means for processing the filtered acoustic signals to determine a presence or absence of an occupant within a defined region includes: means for time averaging an amplitude of the filtered acoustic signals that are not within the noisy bandwidth areas, and means for comparing the time averaged amplitudes of the filtered acoustic signals. In an exemplary embodiment, means for processing the filtered acoustic signals to determine a presence or absence of an occupant within a defined region includes: means for determining the possible presence of a source of noise within the defined region, and means for determining the possible presence of an occupant within the defined region. In an exemplary embodiment, the system further includes: means for determining the presence of an occupant within the defined region as a function of a frequency of the determination of the possible presence of an occupant within the defined region. In an exemplary embodiment, the system further includes: means for determining the presence of an occupant within the defined region as a function of the frequency of the determination of the possible presence of an occupant within the defined region relative to the frequency of the determination of the possible presence of a source of noise within the defined region. In an exemplary embodiment, wherein means for processing the filtered acoustic signals to determine a presence or absence of an occupant within a defined region includes: means for time averaging an amplitude of a subset of the filtered acoustic signals, and means for comparing the time averaged amplitudes of the filtered acoustic signals. In an exemplary embodiment, means for processing the filtered acoustic signals to determine a presence or absence of an occupant within a defined region includes: means for time averaging an amplitude of a subset of the filtered acoustic signals for a predetermined finite time period, and means for comparing the time averaged amplitudes of the filtered acoustic signals. In an exemplary embodiment, the system further includes: means for monitoring infrared energy within the defined region, and means based upon the content of the monitored infrared energy determining the presence or absence of the occupant within the defined region.

A system for operating an occupancy sensor has been described that includes means for transmitting acoustic signals into a defined region, means for receiving acoustic signals from the defined region, means for converting the acoustic signals into electrical signals, means for amplifying the electrical signals without clipping the electrical signals, means for filtering the received acoustic signals using a variable bandpass filter, means for controlling a ratio of a center frequency to a bandwidth of the variable bandpass filter, means for sweeping the variable bandpass filter upwardly along a range of frequencies, means for then sweeping the variable bandpass filter downwardly along a range of frequencies, means for time averaging an amplitude of the filtered acoustic signals, means for comparing the time averaged amplitudes of the filtered acoustic signals, means for determining if a filtered acoustic signal indicates a source of noise within the defined region, and means for determining if a filtered acoustic signal indicates a presence of an occupant within the defined region.

A system for operating an occupancy sensor has been described that includes means for transmitting acoustic signals into a defined region, means for receiving acoustic signals from the defined region, means for converting the acoustic signals into electrical signals, means for amplifying the electrical signals without clipping the electrical signals, means for filtering the received acoustic signals using a variable bandpass filter, means for controlling a ratio of a center frequency to a bandwidth of the variable bandpass filter, means for sweeping the variable bandpass filter upwardly along a range of frequencies, means for then sweeping the variable bandpass filter downwardly along a range of frequencies, means for searching for quiet bandwidth areas within a range of frequencies that do not include background noise, means for time averaging an amplitude of the filtered acoustic signals within the quiet bandwidth areas, means for comparing the time averaged amplitudes of the filtered acoustic signals, means for determining if a filtered acoustic signal indicates a source of noise within the defined region, and means for determining if a filtered acoustic signal indicates a presence of an occupant within the defined region.

A system for operating an occupancy sensor has been described that includes means for transmitting acoustic signals into a defined region, means for receiving acoustic signals from the defined region, means for converting the acoustic signals into electrical signals, means for amplifying the electrical signals without clipping the electrical signals, means for filtering the received acoustic signals using a variable bandpass filter, means for controlling a ratio of a center frequency to a bandwidth of the variable bandpass filter, means for sweeping the variable bandpass filter upwardly along a range of frequencies, means for then sweeping the variable bandpass filter downwardly along a range of frequencies, means for searching for noisy bandwidth areas within a range of frequencies that include background noise, means for time averaging an amplitude of the filtered acoustic signals not within the noisy bandwidth areas, means for comparing the time averaged amplitudes of the filtered acoustic signals, means for determining if a filtered acoustic signal indicates a source of noise within the defined region, and means for determining if a filtered acoustic signal indicates a presence of an occupant within the defined region.

A system for operating an occupancy sensor has been described that includes means for transmitting acoustic signals into a defined region, means for receiving acoustic signals from the defined region, means for converting the acoustic signals into electrical signals, means for amplifying the electrical signals without clipping the electrical signals, means for filtering the received acoustic signals using a variable bandpass filter, means for controlling a ratio of a center frequency to a bandwidth of the variable bandpass filter, means for sweeping the variable bandpass filter upwardly along a range of frequencies, means for then sweeping the variable bandpass filter downwardly along a range of frequencies, means for time averaging an amplitude of the filtered acoustic signals, means for comparing the time averaged amplitudes of the filtered acoustic signals, means for determining a possible presence of a source of noise within the defined region, means for determining a possible presence of an occupant within the defined region, and means for determining the presence of an occupant within the defined region as a function of a frequency of the determination of the possible presence of an occupant within the defined region.

A system for operating an occupancy sensor has been described that includes means for transmitting acoustic signals into a defined region, means for receiving acoustic signals from the defined region, means for converting the acoustic signals into electrical signals, means for amplifying the electrical signals without clipping the electrical signals, means for filtering the received acoustic signals using a variable bandpass filter, means for controlling a ratio of a center frequency to a bandwidth of the variable bandpass filter, means for sweeping the variable bandpass filter upwardly along a range of frequencies, means for then sweeping the variable bandpass filter downwardly along a range of frequencies, means for time averaging an amplitude of the filtered acoustic signals, means for comparing the time averaged amplitudes of the filtered acoustic signals, means for determining a possible presence of a source of noise within the defined region, means for determining a possible presence of an occupant within the defined region, and means for determining the presence of an occupant within the defined region as a function of a frequency of the determination of the possible presence of an occupant within the defined region relative to a frequency of the determination of the possible presence of a source of noise within the defined region.

A system for operating an occupancy sensor has been described that includes means for transmitting acoustic signals into a defined region, means for receiving acoustic signals from the defined region, means for converting the acoustic signals into electrical signals, means for amplifying the electrical signals without clipping the electrical signals, means for filtering the received acoustic signals using a variable bandpass filter, means for controlling a ratio of a center frequency to a bandwidth of the variable bandpass filter, means for sweeping the variable bandpass filter upwardly along a range of frequencies, means for then sweeping the variable bandpass filter downwardly along a range of frequencies, means for time averaging an amplitude of a subset the filtered acoustic signals, means for comparing the time averaged amplitudes of the filtered acoustic signals, means for determining if a filtered acoustic signal indicates a source of noise within the defined region, and means for determining if a filtered acoustic signal indicates a presence of an occupant within the defined region.

A system for operating an occupancy sensor has been described that includes means for transmitting acoustic signals into a defined region, means for receiving acoustic signals from the defined region, means for converting the acoustic signals into electrical signals, means for amplifying the electrical signals without clipping the electrical signals, means for filtering the received acoustic signals using a variable bandpass filter, means for controlling a ratio of a center frequency to a bandwidth of the variable bandpass filter, means for sweeping the variable bandpass filter upwardly along a range of frequencies, means for then sweeping the variable bandpass filter downwardly along a range of frequencies, means for time averaging an amplitude of the filtered acoustic signals for a finite time period, means for comparing the time averaged amplitudes of the filtered acoustic signals, means for determining if a filtered acoustic signal indicates a source of noise within the defined region, and means for determining if a filtered acoustic signal indicates a presence of an occupant within the defined region.

A computer program for operating an occupancy sensor has been described that includes program instructions for: transmitting acoustic signals into a defined region, receiving acoustic signals from the defined region, filtering the received acoustic signals using a variable bandpass filter, and processing the filtered acoustic signals to determine a presence or absence of an occupant within a defined region. In an exemplary embodiment, receiving acoustic signals from the defined region includes program instructions for: converting the acoustic signals into electrical signals, and amplifying the electrical signals without clipping the electrical signals. In an exemplary embodiment, filtering the received acoustic signals using a variable bandpass filter includes program instructions for: sweeping the variable bandpass filter across a range of frequencies. In an exemplary embodiment, filtering the received acoustic signals using a variable bandpass filter includes program instructions for: sweeping the variable bandpass filter upwardly along a range of frequencies, then sweeping the variable bandpass filter downwardly along a range of frequencies. In an exemplary embodiment, filtering the received acoustic signals using a variable bandpass filter includes program instructions for: sweeping the variable bandpass filter downwardly along a range of frequencies; and then sweeping the variable bandpass filter upwardly along a range of frequencies. In an exemplary embodiment, filtering the received acoustic signals using a variable bandpass filter includes program instructions for: controlling a ratio of a center frequency to a bandwidth of the variable bandpass filter. In an exemplary embodiment, processing the filtered acoustic signals to determine a presence or absence of an occupant within a defined region includes program instructions for: time averaging an amplitude of the filtered acoustic signals, and comparing the time averaged amplitudes of the filtered acoustic signals. In an exemplary embodiment, processing the filtered acoustic signals to determine a presence or absence of an occupant within a defined region includes program instructions for: determining if a filtered acoustic signal indicated a source of noise within the defined region. In an exemplary embodiment, filtering the received acoustic signals includes program instructions for: searching for quiet bandwidth areas within a range of frequencies that do not include background noise. In an exemplary embodiment, processing the filtered acoustic signals to determine a presence or absence of an occupant within a defined region includes program instructions for: time averaging an amplitude of the filtered acoustic signals within the quiet bandwidth areas, and comparing the time averaged amplitudes of the filtered acoustic signals. In an exemplary embodiment, filtering the received acoustic signals includes program instructions for: searching for noisy bandwidth areas within a range of frequencies that include background noise. In an exemplary embodiment, processing the filtered acoustic signals to determine a presence or absence of an occupant within a defined region includes program instructions for: time averaging an amplitude of the filtered acoustic signals that are not within the noisy bandwidth areas, and comparing the time averaged amplitudes of the filtered acoustic signals. In an exemplary embodiment, processing the filtered acoustic signals to determine a presence or absence of an occupant within a defined region includes program instructions for: determining the possible presence of a source of noise within the defined region, and determining the possible presence of an occupant within the defined region. In an exemplary embodiment, the computer program further includes program instructions for: determining the presence of an occupant within the defined region as a function of a frequency of the determination of the possible presence of an occupant within the defined region. In an exemplary embodiment, the computer program further includes program instructions for: determining the presence of an occupant within the defined region as a function of the frequency of the determination of the possible presence of an occupant within the defined region relative to the frequency of the determination of the possible presence of a source of noise within the defined region. In an exemplary embodiment, processing the filtered acoustic signals to determine a presence or absence of an occupant within a defined region includes program instructions for: time averaging an amplitude of a subset of the filtered acoustic signals, and comparing the time averaged amplitudes of the filtered acoustic signals. In an exemplary embodiment, processing the filtered acoustic signals to determine a presence or absence of an occupant within a defined region includes program instructions for: time averaging an amplitude of a subset of the filtered acoustic signals for a predetermined finite time period, and comparing the time averaged amplitudes of the filtered acoustic signals. In an exemplary embodiment, the computer program further includes program instructions for: monitoring infrared energy within the defined region, and based upon the content of the monitored infrared energy determining the presence or absence of the occupant within the defined region.

A computer program for operating an occupancy sensor has been described that includes program instructions for: transmitting acoustic signals into a defined region, receiving acoustic signals from the defined region, converting the acoustic signals into electrical signals, amplifying the electrical signals without clipping the electrical signals, filtering the received acoustic signals using a variable bandpass filter, controlling a ratio of a center frequency to a bandwidth of the variable bandpass filter, sweeping the variable bandpass filter upwardly along a range of frequencies, then sweeping the variable bandpass filter downwardly along a range of frequencies, time averaging an amplitude of the filtered acoustic signals, comparing the time averaged amplitudes of the filtered acoustic signals, determining if a filtered acoustic signal indicates a source of noise within the defined region, and determining if a filtered acoustic signal indicates a presence of an occupant within the defined region.

A computer program for operating an occupancy sensor has been described that includes program instructions for: transmitting acoustic signals into a defined region, receiving acoustic signals from the defined region, converting the acoustic signals into electrical signals, amplifying the electrical signals without clipping the electrical signals, filtering the received acoustic signals using a variable bandpass filter, controlling a ratio of a center frequency to a bandwidth of the variable bandpass filter, sweeping the variable bandpass filter upwardly along a range of frequencies, then sweeping the variable bandpass filter downwardly along a range of frequencies, searching for quiet bandwidth areas within a range of frequencies that do not include background noise, time averaging an amplitude of the filtered acoustic signals within the quiet bandwidth areas, comparing the time averaged amplitudes of the filtered acoustic signals, determining if a filtered acoustic signal indicates a source of noise within the defined region, and determining if a filtered acoustic signal indicates a presence of an occupant within the defined region.

A computer program for operating an occupancy sensor has been described that includes program instructions for: transmitting acoustic signals into a defined region, receiving acoustic signals from the defined region, converting the acoustic signals into electrical signals, amplifying the electrical signals without clipping the electrical signals, filtering the received acoustic signals using a variable bandpass filter, controlling a ratio of a center frequency to a bandwidth of the variable bandpass filter, sweeping the variable bandpass filter upwardly along a range of frequencies, then sweeping the variable bandpass filter downwardly along a range of frequencies, searching for noisy bandwidth areas within a range of frequencies that include background noise, time averaging an amplitude of the filtered acoustic signals not within the noisy bandwidth areas, comparing the time averaged amplitudes of the filtered acoustic signals, determining if a filtered acoustic signal indicates a source of noise within the defined region, and determining if a filtered acoustic signal indicates a presence of an occupant within the defined region.

A computer program for operating an occupancy sensor has been described that includes program instructions for: transmitting acoustic signals into a defined region, receiving acoustic signals from the defined region, converting the acoustic signals into electrical signals, amplifying the electrical signals without clipping the electrical signals, filtering the received acoustic signals using a variable bandpass filter, controlling a ratio of a center frequency to a bandwidth of the variable bandpass filter, sweeping the variable bandpass filter upwardly along a range of frequencies, then sweeping the variable bandpass filter downwardly along a range of frequencies, time averaging an amplitude of the filtered acoustic signals, comparing the time averaged amplitudes of the filtered acoustic signals, determining a possible presence of a source of noise within the defined region, determining a possible presence of an occupant within the defined region, and determining the presence of an occupant within the defined region as a function of a frequency of the determination of the possible presence of an occupant within the defined region.

A computer program for operating an occupancy sensor has been described that includes program instructions for: transmitting acoustic signals into a defined region, receiving acoustic signals from the defined region, converting the acoustic signals into electrical signals, amplifying the electrical signals without clipping the electrical signals, filtering the received acoustic signals using a variable bandpass filter, controlling a ratio of a center frequency to a bandwidth of the variable bandpass filter, sweeping the variable bandpass filter upwardly along a range of frequencies, then sweeping the variable bandpass filter downwardly along a range of frequencies, time averaging an amplitude of the filtered acoustic signals, comparing the time averaged amplitudes of the filtered acoustic signals, determining a possible presence of a source of noise within the defined region, determining a possible presence of an occupant within the defined region, and determining the presence of an occupant within the defined region as a function of a frequency of the determination of the possible presence of an occupant within the defined region relative to a frequency of the determination of the possible presence of a source of noise within the defined region.

A computer program for operating an occupancy sensor has been described that includes program instructions for: transmitting acoustic signals into a defined region, receiving acoustic signals from the defined region, converting the acoustic signals into electrical signals, amplifying the electrical signals without clipping the electrical signals, filtering the received acoustic signals using a variable bandpass filter, controlling a ratio of a center frequency to a bandwidth of the variable bandpass filter, sweeping the variable bandpass filter upwardly along a range of frequencies, then sweeping the variable bandpass filter downwardly along a range of frequencies, time averaging an amplitude of a subset the filtered acoustic signals, comparing the time averaged amplitudes of the filtered acoustic signals, determining if a filtered acoustic signal indicates a source of noise within the defined region, and determining if a filtered acoustic signal indicates a presence of an occupant within the defined region.

A computer program for operating an occupancy sensor has been described that includes program instructions for: transmitting acoustic signals into a defined region, receiving acoustic signals from the defined region, converting the acoustic signals into electrical signals, amplifying the electrical signals without clipping the electrical signals, filtering the received acoustic signals using a variable bandpass filter, controlling a ratio of a center frequency to a bandwidth of the variable bandpass filter, sweeping the variable bandpass filter upwardly along a range of frequencies, then sweeping the variable bandpass filter downwardly along a range of frequencies, time averaging an amplitude of the filtered acoustic signals for a finite time period, comparing the time averaged amplitudes of the filtered acoustic signals, determining if a filtered acoustic signal indicates a source of noise within the defined region, and determining if a filtered acoustic signal indicates a presence of an occupant within the defined region.

An occupancy sensor has been described that includes a sensor, a communication interface for transmitting and receiving communication signals to and from a communication network, and a controller operably coupled to the sensor and the communication interface, wherein the controller is adapted to: process signals generated by the sensor to determine the presence or absence of an occupant within a defined region, and communicate with the communication network using the communication interface. In an exemplary embodiment, the sensor includes: an acoustic transmitter, and an acoustic receiver. In an exemplary embodiment, the sensor includes: an infrared sensor. In an exemplary embodiment, the sensor includes: an acoustic transmitter; an acoustic receiver; and an infrared sensor. In an exemplary embodiment, the sensor further includes a memory operably coupled to the controller comprising information representative of a network address for the sensor. In an exemplary embodiment, the sensor further includes a memory operably coupled to the controller comprising information representative of a data corresponding to the defined region. In an exemplary embodiment, the controller is adapted to permit remote control of the occupancy sensor. In an exemplary embodiment, the controller is adapted to permit remote control of the occupancy sensor during a first time period, and wherein the controller is adapted to permit local control of the occupancy sensor during a second time period. In an exemplary embodiment, the controller is adapted to permit remote updates of the information representative of a data corresponding to the defined region. In an exemplary embodiment, the memory includes information representative of an operating schedule for the occupancy sensor. In an exemplary embodiment, the memory includes information representative of an office plan location assigned to the occupancy sensor.

An occupancy sensor has been described that includes an acoustic transmitter, an acoustic receiver, a communication interface for transmitting and receiving communication signals to and from a communication network, a memory comprising information representative of a network address for the sensor, information representative of data corresponding to the defined region, information representative of an operating schedule for the occupancy sensor, and information representative of an office plan location assigned to the occupancy sensor, and a controller operably coupled to the acoustic transmitter, acoustic receiver, the communication interface, and the memory, wherein the controller is adapted to: transmit acoustic signals using the acoustic transmitter, receive acoustic signals using the acoustic receiver, process the received acoustic signals to determine the presence or absence of an occupant within a defined region, communicate with the communication network using the communication interface, permit remote control of the occupancy sensor during a first time period and permit local control of the occupancy sensor during a second time period, and permit remote updates of the information representative of a network address for the sensor, information representative of data corresponding to the defined region, information representative of an operating schedule for the occupancy sensor, and information representative of an office plan location assigned to the occupancy sensor.

An occupancy sensor has been described that includes an acoustic transmitter, an acoustic receiver, an infrared sensor, a communication interface for transmitting and receiving communication signals to and from a communication network, a memory comprising information representative of a network address for the sensor, information representative of data corresponding to the defined region, information representative of an operating schedule for the occupancy sensor, and information representative of an office plan location assigned to the occupancy sensor, and a controller operably coupled to the acoustic transmitter, acoustic receiver, the infrared sensor, the communication interface, and the memory, wherein the controller is adapted to: transmit acoustic signals using the acoustic transmitter, receive acoustic signals using the acoustic receiver, process the received acoustic signals to determine the presence or absence of an occupant within a defined region, process the signals generated by the infrared second to determine the presence or absence of an occupant within a defined region, communicate with the communication network using the communication interface, permit remote control of the occupancy sensor during a first time period and permit local control of the occupancy sensor during a second time period, and permit remote updates of the information representative of a network address for the sensor, information representative of data corresponding to the defined region, information representative of an operating schedule for the occupancy sensor, and information representative of an office plan location assigned to the occupancy sensor.

A method of operating an occupancy sensor has been described that includes using a sensor to monitor a defined region, processing signals generated by the sensor to determine the presence or absence of an occupant within the defined region, and communicating with the occupancy sensor using a network. In an exemplary embodiment, the method further includes: transmitting acoustic signals into the defined region, receiving acoustic signals from the defined region, and processing the received acoustic signals to determine the presence or absence of an occupant within the defined region. In an exemplary embodiment, the method further includes: monitoring infrared energy within the defined region, and processing the monitored infrared energy to determine the presence or absence of an occupant within the defined region. In an exemplary embodiment, the method further includes: transmitting acoustic signals into the defined region, receiving acoustic signals from the defined region, monitoring infrared energy within the defined region, processing the received acoustic signals to determine the presence or absence of an occupant within the defined region, and processing the monitored infrared energy to determine the presence or absence of an occupant within the defined region. In an exemplary embodiment, the method further includes: assigning a network address to the sensor. In an exemplary embodiment, the method further includes: storing information within the sensor that corresponds to the defined region. In an exemplary embodiment, the method further includes: remotely controlling one or more operational aspects of the occupancy sensor. In an exemplary embodiment, the method further includes: remotely controlling one or more operational aspects of the occupancy sensor during a first time period, and locally controlling the one or more operational aspects during a second time period. In an exemplary embodiment, the method further includes: remotely updating the information representative of a data corresponding to the defined region. In an exemplary embodiment, wherein the information representative of a data corresponding to the defined region includes information representative of an operating schedule for the occupancy sensor. In an exemplary embodiment, the information representative of data corresponding to the defined region includes information representative of an office plan location assigned to the occupancy sensor.

A method of operating an occupancy sensor has been described that includes transmitting acoustic signals into a defined region, receiving acoustic signals from the defined region, processing the received acoustic signals to determine the presence or absence of an occupant within the defined region, communicating with the occupancy sensor using a network, assigning a network address to the sensor, storing information within the sensor that corresponds to the defined region, remotely controlling one or more operational aspects of the occupancy sensor during a first time period, locally controlling the one or more operational aspects during a second time period, and remotely updating the information representative of a data corresponding to the defined region, wherein the information representative of data corresponding to the defined region includes information representative of an operating schedule for the occupancy sensor, and wherein the information representative of data corresponding to the defined region includes information representative of an office plan location assigned to the occupancy sensor.

A method of operating an occupancy sensor has been described that includes: transmitting acoustic signals into a defined region, receiving acoustic signals from the defined region, monitoring infrared energy within the defined region, processing the received acoustic signals to determine the presence or absence of an occupant within the defined region, processing the infrared energy to determine the presence or absence of an occupant within the defined region, communicating with the occupancy sensor using a network, assigning a network address to the sensor, storing information within the sensor that corresponds to the defined region, remotely controlling one or more operational aspects of the occupancy sensor during a first time period, locally controlling the one or more operational aspects during a second time period, and remotely updating the information representative of a data corresponding to the defined region, wherein the information representative of data corresponding to the defined region includes information representative of an operating schedule for the occupancy sensor, and wherein the information representative of data corresponding to the defined region includes information representative of an office plan location assigned to the occupancy sensor.

A system for operating an occupancy sensor has been described that includes means for monitoring a defined region to determine a presence or absence of an occupant within the defined region, and means for communicating with the occupancy sensor using a network. In an exemplary embodiment, the system further includes: means for transmitting acoustic signals into the defined region, means for receiving acoustic signals from the defined region, and means for processing the received acoustic signals to determine the presence or absence of an occupant within the defined region. In an exemplary embodiment, the system further includes means for monitoring infrared energy within the defined region, and means for processing the monitored infrared energy to determine the presence or absence of an occupant within the defined region. In an exemplary embodiment, the system further includes: means for transmitting acoustic signals into the defined region, means for receiving acoustic signals from the defined region, means for processing the received acoustic signals to determine the presence or absence of an occupant within the defined region, means for monitoring infrared energy within the defined region, and means for processing the monitored infrared energy to determine the presence or absence of an occupant within the defined region. In an exemplary embodiment, the system further includes: means for assigning a network address to the sensor. In an exemplary embodiment, the system further includes: means for storing information within the sensor that corresponds to the defined region. In an exemplary embodiment, the system further includes: means for remotely controlling one or more operational aspects of the occupancy sensor. In an exemplary embodiment, the system further includes: means for remotely controlling one or more operational aspects of the occupancy sensor during a first time period, and means for locally controlling the one or more operational aspects during a second time period. In an exemplary embodiment, the system further includes: means for remotely updating the information representative of a data corresponding to the defined region. In an exemplary embodiment, the information representative of a data corresponding to the defined region includes information representative of an operating schedule for the occupancy sensor. In an exemplary embodiment, the information representative of a data corresponding to the defined region includes information representative of an office plan location assigned to the occupancy sensor.

A system for operating an occupancy sensor has been described that includes: means for transmitting acoustic signals into a defined region, means for receiving acoustic signals from the defined region; means for processing the received acoustic signals to determine the presence or absence of an occupant within the defined region; means for communicating with the occupancy sensor using a network; means for assigning a network address to the sensor; means for storing information within the sensor that corresponds to the defined region; means for remotely controlling one or more operational aspects of the occupancy sensor during a first time period; means for locally controlling the one or more operational aspects during a second time period, and means for remotely updating the information representative of a data corresponding to the defined region, wherein the information representative of data corresponding to the defined region includes information representative of an operating schedule for the occupancy sensor, and wherein the information representative of data corresponding to the defined region includes information representative of an office plan location assigned to the occupancy sensor.

A system for operating an occupancy sensor has been described that includes: means for monitoring infrared energy within a defined region, means for transmitting acoustic signals into the defined region, means for receiving acoustic signals from the defined region, means for processing the received acoustic signals to determine the presence or absence of an occupant within the defined region, means for processing the monitored infrared energy to determine the presence or absence of an occupant within the defined region, means for communicating with the occupancy sensor using a network, means for assigning a network address to the sensor, means for storing information within the sensor that corresponds to the defined region, means for remotely controlling one or more operational aspects of the occupancy sensor during a first time period, means for locally controlling the one or more operational aspects during a second time period, and means for remotely updating the information representative of a data corresponding to the defined region, wherein the information representative of data corresponding to the defined region includes information representative of an operating schedule for the occupancy sensor, and wherein the information representative of data corresponding to the defined region includes information representative of an office plan location assigned to the occupancy sensor.

A computer program for operating an occupancy sensor has been described that includes program instructions for: monitoring a defined region to determine a presence or absence of an occupant within the defined region, and communicating with the occupancy sensor using a network. In an exemplary embodiment, the computer program further includes program instructions for: transmitting acoustic signals into the defined region, receiving acoustic signals from the defined region, and processing the received acoustic signals to determine the presence or absence of an occupant within the defined region. In an exemplary embodiment, the computer program further includes program instructions for: monitoring infrared energy within the defined region, and processing the monitored infrared energy to determine the presence or absence of an occupant within the defined region. In an exemplary embodiment, the computer program further includes program instructions for: transmitting acoustic signals into the defined region, receiving acoustic signals from the defined region, processing the received acoustic signals to determine the presence or absence of an occupant within the defined region, monitoring infrared energy within the defined region, and processing the monitored infrared energy to determine the presence or absence of an occupant within the defined region. In an exemplary embodiment, the computer program further includes program instructions for: assigning a network address to the sensor. In an exemplary embodiment, the computer program further includes program instructions for: storing information within the sensor that corresponds to the defined region. In an exemplary embodiment, the computer program further includes program instructions for: remotely controlling one or more operational aspects of the occupancy sensor. In an exemplary embodiment, the computer program further includes program instructions for: remotely controlling one or more operational aspects of the occupancy sensor during a first time period, and locally controlling the one or more operational aspects during a second time period. In an exemplary embodiment, the computer program further includes program instructions for: remotely updating the information representative of a data corresponding to the defined region. In an exemplary embodiment, the information representative of a data corresponding to the defined region includes information representative of an operating schedule for the occupancy sensor. In an exemplary embodiment, the information representative of a data corresponding to the defined region includes information representative of an office plan location assigned to the occupancy sensor.

A computer program for operating an occupancy sensor has been described that includes program instructions for: transmitting acoustic signals into a defined region, receiving acoustic signals from the defined region, processing the received acoustic signals to determine the presence or absence of an occupant within the defined region, communicating with the occupancy sensor using a network, assigning a network address to the sensor, storing information within the sensor that corresponds to the defined region, remotely controlling one or more operational aspects of the occupancy sensor during a first time period, locally controlling the one or more operational aspects during a second time period, and remotely updating the information representative of a data corresponding to the defined region, wherein the information representative of data corresponding to the defined region includes information representative of an operating schedule for the occupancy sensor, and wherein the information representative of data corresponding to the defined region includes information representative of an office plan location assigned to the occupancy sensor.

A computer program for operating an occupancy sensor has been described that includes program instructions for: transmitting acoustic signals into a defined region, receiving acoustic signals from the defined region, monitoring infrared energy in the defined region, processing the received acoustic signals to determine the presence or absence of an occupant within the defined region, processing the monitored infrared energy to determine the presence or absence of an occupant within the defined region, communicating with the occupancy sensor using a network, assigning a network address to the sensor, storing information within the sensor that corresponds to the defined region, remotely controlling one or more operational aspects of the occupancy sensor during a first time period, locally controlling the one or more operational aspects during a second time period, and remotely updating the information representative of a data corresponding to the defined region, wherein the information representative of data corresponding to the defined region includes information representative of an operating schedule for the occupancy sensor, and wherein the information representative of data corresponding to the defined region includes information representative of an office plan location assigned to the occupancy sensor.

A control system has been described that includes: one or more occupancy sensors, a communication network operably coupled to the occupancy sensor, and one or more remote controllers operably coupled to the communication network, wherein one or more of the remote controllers are adapted to permit remote control and monitoring of one or more of the occupancy sensors. In an exemplary embodiment, one or more of the occupancy sensors include network addresses. In an exemplary embodiment, one or more of the remote controllers are adapted to display information corresponding to one or more of the addressable occupancy sensors. In an exemplary embodiment, one or more of the remote controllers are adapted to control one or more operational parameters of one or more of the addressable occupancy sensors. In an exemplary embodiment, one or more of the remote controllers are adapted to control one or more operational parameters of one or more of the addressable occupancy sensors during a first time period, and one or more operational parameters of the one or more addressable occupancy sensors are controlled by the corresponding occupancy sensor during a second time period. In an exemplary embodiment, one or more of the occupancy sensors include a memory comprising one or more operational parameters of the corresponding occupancy sensor. In an exemplary embodiment, one or more of the remote controllers are adapted to update one or more of the operational parameters of the corresponding occupancy sensor. In an exemplary embodiment, the operational parameters include information representative of an operating schedule for the corresponding occupancy sensor. In an exemplary embodiment, one or more of the remote controllers are adapted to display floor plan information corresponding to one or more of the addressable occupancy sensors.

A control system has been described that includes: one or more occupancy sensors including: corresponding network addresses, and a memory comprising one or more operational parameters of the corresponding occupancy sensor, and a communication network operably coupled to the occupancy sensor, one or more remote controllers operably coupled to the communication network, wherein one or more of the remote controllers are adapted to: permit remote control and monitoring of one or more of the occupancy sensors, display information corresponding to the operational parameters for one or more of the addressable occupancy sensors, control one or more operational parameters of one or more of the addressable occupancy sensors during a first time period and permit local control of the one or more addressable occupancy sensors during a second time period, and update one or more of the operational parameters of the corresponding occupancy sensor, and wherein the operational parameters include information representative of an operating schedule and floor plan information for the corresponding occupancy sensor.

A method of operating a control system including one or more occupancy sensors has been described that includes: providing one or more remote controllers, and controlling and monitoring one or more operational aspects of one or more of the occupancy sensors. In an exemplary embodiment, the method further includes: assigning network addresses to one or more of the occupancy sensors. In an exemplary embodiment, the method further includes: remotely displaying information corresponding to one or more of the addressable occupancy sensors. In an exemplary embodiment, the method further includes: remotely controlling one or more operational parameters of one or more of the addressable occupancy sensors. In an exemplary embodiment, the method further includes: remotely controlling one or more operational parameters of one or more of the addressable occupancy sensors during a first time period, and locally controlling the one or more operational parameters of the one or more addressable occupancy sensors during a second time period. In an exemplary embodiment, the method further includes: storing one or more operational parameters of the occupancy sensors within the corresponding occupancy sensors. In an exemplary embodiment, the method further includes: remotely updating one or more of the operational parameters of the corresponding occupancy sensors. In an exemplary embodiment, the operational parameters include information representative of an operating schedule for the corresponding occupancy sensor. In an exemplary embodiment, the method further includes: remotely displaying floor plan information corresponding to one or more of the addressable occupancy sensors.

A method of operating a control system comprising one or more occupancy sensors has been described that includes: providing one or more remote controllers, controlling and monitoring one or more operational aspects of one or more of the occupancy sensors, assigning network addresses to one or more of the occupancy sensors, remotely displaying information corresponding to one or more of the addressable occupancy sensors, remotely controlling one or more operational parameters of one or more of the addressable occupancy sensors during a first time period, locally controlling the one or more operational parameters of the one or more addressable occupancy sensors during a second time period, storing one or more operational parameters of the occupancy sensors within the corresponding occupancy sensors, and remotely updating one or more of the operational parameters of the corresponding occupancy sensors, wherein the operational parameters include information representative of an operating schedule and floor plan information for the corresponding occupancy sensor.

A system for operating a control system comprising one or more occupancy sensors has been described that includes: means for providing one or more remote controllers, and means for remotely controlling and monitoring one or more operational aspects of one or more of the occupancy sensors. In an exemplary embodiment, the system further includes: means for assigning network addresses to one or more of the occupancy sensors. In an exemplary embodiment, the system further includes: means for remotely displaying information corresponding to one or more of the addressable occupancy sensors. In an exemplary embodiment, the system further includes: means for remotely controlling one or more operational parameters of one or more of the addressable occupancy sensors. In an exemplary embodiment, the system further includes: means for remotely controlling one or more operational parameters of one or more of the addressable occupancy sensors during a first time period, and means for locally controlling the one or more operational parameters of the one or more addressable occupancy sensors during a second time period. In an exemplary embodiment, the system further includes: means for storing one or more operational parameters of the occupancy sensors within the corresponding occupancy sensors. In an exemplary embodiment, the system further includes: means for remotely updating one or more of the operational parameters of the corresponding occupancy sensors. In an exemplary embodiment, the operational parameters include information representative of an operating schedule for the corresponding occupancy sensor. In an exemplary embodiment, the system further includes means for remotely displaying floor plan information corresponding to one or more of the addressable occupancy sensors.

A system for operating a control system comprising one or more occupancy sensors has been described that includes: means for providing one or more remote controllers, means for controlling and monitoring one or more operational aspects of one or more of the occupancy sensors, means for assigning network addresses to one or more of the occupancy sensors, means for remotely displaying information corresponding to one or more of the addressable occupancy sensors, means for remotely controlling one or more operational parameters of one or more of the addressable occupancy sensors during a first time period, means for locally controlling the one or more operational parameters of the one or more addressable occupancy sensors during a second time period, means for storing one or more operational parameters of the occupancy sensors within the corresponding occupancy sensors, and means for remotely updating one or more of the operational parameters of the corresponding occupancy sensors, wherein the operational parameters include information representative of an operating schedule and floor plan information for the corresponding occupancy sensor.

A computer program for operating a control system including one or more occupancy sensors has been described that includes program instructions for: remotely controlling and monitoring one or more operational aspects of one or more of the occupancy sensors. In an exemplary embodiment, the computer program further includes program instructions for: assigning network addresses to one or more of the occupancy sensors. In an exemplary embodiment, the computer program further includes program instructions for: remotely displaying information corresponding to one or more of the addressable occupancy sensors. In an exemplary embodiment, the computer program further includes program instructions for: remotely controlling one or more operational parameters of one or more of the addressable occupancy sensors. In an exemplary embodiment, the computer program further includes program instructions for: remotely controlling one or more operational parameters of one or more of the addressable occupancy sensors during a first time period, and locally controlling the one or more operational parameters of the one or more addressable occupancy sensors during a second time period. In an exemplary embodiment, the computer program further includes program instructions for: storing one or more operational parameters of the occupancy sensors within the corresponding occupancy sensors. In an exemplary embodiment, the computer program further includes program instructions for: remotely updating one or more of the operational parameters of the corresponding occupancy sensors. In an exemplary embodiment, the operational parameters include information representative of an operating schedule for the corresponding occupancy sensor. In an exemplary embodiment, the computer program further includes program instructions for: remotely displaying floor plan information corresponding to one or more of the addressable occupancy sensors.

A computer program for operating a control system including one or more occupancy sensors has been described that includes program instructions for: providing one or more remote controllers, controlling and monitoring one or more operational aspects of one or more of the occupancy sensors, assigning network addresses to one or more of the occupancy sensors, remotely displaying information corresponding to one or more of the addressable occupancy sensors, remotely controlling one or more operational parameters of one or more of the addressable occupancy sensors during a first time period, locally controlling the one or more operational parameters of the one or more addressable occupancy sensors during a second time period, storing one or more operational parameters of the occupancy sensors within the corresponding occupancy sensors, and remotely updating one or more of the operational parameters of the corresponding occupancy sensors, wherein the operational parameters include information representative of an operating schedule and floor plan information for the corresponding occupancy sensor.

An occupancy sensor has been described that includes: an infrared sensor, a variable bandpass filter operably coupled to the infrared sensor, and a controller operably coupled to the infrared sensor and the variable bandpass filter, wherein the controller is adapted to: filter the signals generated by the infrared sensor using the variable bandpass filter, and process the filtered signals to determine the presence or absence of an occupant within a defined region. In an exemplary embodiment, the variable bandpass filter includes: one or more digital potentiometers adapted to control or more of the following: a gain of the bandpass filter, a tuning of the bandpass filter, and a ratio of a center frequency of the bandpass filter to a bandwidth of the bandpass filter. In an exemplary embodiment, the variable bandpass filter includes: a digital potentiometer adapted to control a gain of the bandpass filter, a digital potentiometer adapted to control a tuning of the bandpass filter, and a digital potentiometer adapted to control a ratio of a center frequency of the bandpass filter to a bandwidth of the bandpass filter. In an exemplary embodiment, the controller includes: a bandpass filter engine adapted to control the variable bandpass filter, a doppler shift engine adapted to characterize the signals filtered by the variable bandpass filter, and an occupancy sensing engine adapted to characterizations of the doppler shift engine to determine the presence of absence of the occupant within the defined region. In an exemplary embodiment, the bandpass filter engine includes: a bandpass filter tuning engine for controlling the bandpass region of the variable bandpass filter, a bandpass filter gain engine for controlling a gain of the variable bandpass filter, a ratio of a center frequency to a bandwidth of the variable bandpass filter engine for controlling the ratio of a center frequency to a bandwidth of the variable bandpass filter, and a sweeping engine for controlling a sweeping of the variable bandpass filter across a range of frequencies. In an exemplary embodiment, the doppler shift engine includes: a time averaging engine for time averaging an amplitude of signals filtered by the variable bandpass filter, a comparison engine for comparing the time averaged amplitude of signals, and a difference engine for determining a difference in the amplitudes of the time averaged signals. In an exemplary embodiment, the occupancy sensing engine includes: a determination of noise engine for processing the signals filtered by the variable bandpass filter to determine if they indicate a source of noise, and a determination of occupancy engine for processing the signals filtered by the variable bandpass filter to determine the presence or absence of an occupant within the defined region. In an exemplary embodiment, the bandpass filter engine includes: a quiet bandwidth search engine for searching a range of frequencies for quiet bandwidth areas that do not include background noise. In an exemplary embodiment, the doppler shift engine includes: a time averaging engine for time averaging an amplitude of signals filtered by the variable bandpass filter within the quiet bandwidth areas, a comparison engine for comparing the time averaged amplitude of signals, and a difference engine for determining a difference in the amplitudes of the time averaged signals. In an exemplary embodiment, the bandpass filter engine includes: a noisy bandwidth search engine for searching a range of frequencies for noisy bandwidth areas that include background noise. In an exemplary embodiment, the doppler shift engine includes: a time averaging engine for time averaging an amplitude of signals filtered by the variable bandpass filter that are not within the noisy bandwidth areas, a comparison engine for comparing the time averaged amplitude of signals, and a difference engine for determining a difference in the amplitudes of the time averaged signals. In an exemplary embodiment, the occupancy sensing engine includes: a determination of possible noise engine for processing the signals filtered by the variable bandpass filter to determine if they indicate a possible source of noise, a determination of possible occupancy engine for processing the signals filtered by the variable bandpass filter to determine if they indicate the possible presence of an occupant within the defined region, a statistical processing engine for processing the indications of possible noise and occupants to determine if the defined region is occupied by an occupant. In an exemplary embodiment, the statistical processing engine determines that the defined region is occupied by an occupant based upon the frequency of the indications of occupants within the defined region. In an exemplary embodiment, the statistical processing engine determines that the defined region is occupied by an occupant based upon the frequency of the indications of occupants within the defined region relative to the frequency of the indications of a source of noise within the defined region. In an exemplary embodiment, the occupancy sensing engine includes: a determination of noise engine for processing a subset of the signals filtered by the variable bandpass filter to determine if they indicate a source of noise, and a determination of occupancy engine for processing the subset of the signals filtered by the variable bandpass filter to determine the presence or absence of an occupant within the defined region. In an exemplary embodiment, the occupancy sensing engine includes: a determination of noise engine for processing the signals filtered by the variable bandpass filter within a predetermined time period to determine if they indicate a source of noise, and a determination of occupancy engine for processing the signals filtered by the variable bandpass filter within a predetermined time period to determine the presence or absence of an occupant within the defined region.

An occupancy sensor has been described that includes: an infrared sensor, a variable bandpass filter operably coupled to the infrared sensor including: a digital potentiometer adapted to control a gain of the bandpass filter, a digital potentiometer adapted to control a tuning of the bandpass filter, and a digital potentiometer adapted to control a ratio of a center frequency of the bandpass filter to a bandwidth of the bandpass filter, and a controller operably coupled to the infrared sensor and the variable bandpass filter including: a bandpass filter engine adapted to control the variable bandpass filter, a doppler shift engine adapted to characterize the signals filtered by the variable bandpass filter, and an occupancy sensing engine adapted to characterizations of the doppler shift engine to determine the presence of absence of the occupant within the defined region, wherein the controller is adapted to: filter the signals generated by the infrared sensor using the variable bandpass filter, and process the filtered signals to determine the presence or absence of an occupant within a defined region.

An occupancy sensor has been described that includes: an infrared sensor, a variable bandpass filter operably coupled to the infrared sensor including: a digital potentiometer adapted to control a gain of the bandpass filter, a digital potentiometer adapted to control a tuning of the bandpass filter, and a digital potentiometer adapted to control a ratio of a center frequency of the bandpass filter to a bandwidth of the bandpass filter, and a controller operably coupled to the infrared sensor and the variable bandpass filter including: a bandpass filter engine adapted to control the variable bandpass filter including: a quiet bandwidth search engine for searching a range of frequencies for quiet bandwidth areas that do not include background thermal noise, a doppler shift engine adapted to characterize the signals filtered by the variable bandpass filter within the quiet bandwidth areas, and an occupancy sensing engine adapted to characterizations of the Doppler shift engine to determine the presence of absence of the occupant within the defined region, wherein the controller is adapted to: filter the signals generated by the infrared sensor using the variable bandpass filter, and process the filtered signals to determine the presence or absence of an occupant within a defined region.

An occupancy sensor has been described that includes: an infrared sensor, a variable bandpass filter operably coupled to the infrared sensor including: a digital potentiometer adapted to control a gain of the bandpass filter, a digital potentiometer adapted to control a tuning of the bandpass filter, and a digital potentiometer adapted to control a ratio of a center frequency of the bandpass filter to a bandwidth of the bandpass filter, and a controller operably coupled to the infrared sensor and the variable bandpass filter including: a bandpass filter engine adapted to control the variable bandpass filter including: a noisy bandwidth search engine for searching a range of frequencies for noisy bandwidth areas that include background thermal noise, a doppler shift engine adapted to characterize the signals filtered by the variable bandpass filter that are not within the noisy bandwidth areas, and an occupancy sensing engine adapted to characterizations of the Doppler shift engine to determine the presence of absence of the occupant within the defined region, wherein the controller is adapted to: filter the signals generated by the infrared sensor using the variable bandpass filter, and process the filtered signals to determine the presence or absence of an occupant within a defined region.

An occupancy sensor has been described that includes: an infrared sensor, a variable bandpass filter operably coupled to the infrared sensor including: a digital potentiometer adapted to control a gain of the bandpass filter, a digital potentiometer adapted to control a tuning of the bandpass filter, and a digital potentiometer adapted to control a ratio of a center frequency of the bandpass filter to a bandwidth of the bandpass filter, and a controller operably coupled to the infrared sensor and the variable bandpass filter including: a bandpass filter engine adapted to control the variable bandpass filter, a doppler shift engine adapted to characterize the signals filtered by the variable bandpass filter, and an occupancy sensing engine adapted to characterizations of the Doppler shift engine to determine the presence of absence of the occupant within the defined region including: a determination of possible noise engine for processing signals filtered by the variable bandpass filter to determine if they indicate a possible source of thermal noise, a determination of possible occupancy engine for processing the signals filtered by the variable bandpass filter to determine if they indicate the possible presence of an occupant within the defined region, and a statistical processing engine for processing the indications of possible thermal noise and occupants to determine if the defined region is occupied by an occupant, wherein the statistical processing engine determines that the defined region is occupied by an occupant based upon the frequency of the indications of occupants within the defined region, wherein the controller is adapted to: filter the signals generated by the infrared sensor using the variable bandpass filter, and process the filtered signals to determine the presence or absence of an occupant within a defined region.

An occupancy sensor has been described that includes: an infrared sensor, a variable bandpass filter operably coupled to the infrared sensor including: a digital potentiometer adapted to control a gain of the bandpass filter, a digital potentiometer adapted to control a tuning of the bandpass filter, and a digital potentiometer adapted to control a ratio of a center frequency of the bandpass filter to a bandwidth of the bandpass filter, and a controller operably coupled to the infrared sensor and the variable bandpass filter including: a bandpass filter engine adapted to control the variable bandpass filter, a doppler shift engine adapted to characterize the signals filtered by the variable bandpass filter, and an occupancy sensing engine adapted to characterizations of the Doppler shift engine to determine the presence of absence of the occupant within the defined region including: a determination of noise engine for processing a subset of signals filtered by the variable bandpass filter to determine if they indicate a source of thermal noise, and a determination of occupancy engine for processing the subset of the signals filtered by the variable bandpass filter to determine the presence or absence of an occupant within the defined region, wherein the controller is adapted to: filter the signals generated by the infrared sensor using the variable bandpass filter, and process the filtered signals to determine the presence or absence of an occupant within a defined region.

An occupancy sensor has been described that includes: an infrared sensor, a variable bandpass filter operably coupled to the infrared sensor including: a digital potentiometer adapted to control a gain of the bandpass filter, a digital potentiometer adapted to control a tuning of the bandpass filter, a digital potentiometer adapted to control a ratio of a center frequency of the bandpass filter to a bandwidth of the bandpass filter, and a controller operably coupled to the infrared sensor and the variable bandpass filter including: a bandpass filter engine adapted to control the variable bandpass filter, a doppler shift engine adapted to characterize the signals filtered by the variable bandpass filter, and an occupancy sensing engine adapted to characterizations of the doppler shift engine to determine the presence of absence of the occupant within the defined region including: a determination of noise engine for processing the signals filtered by the variable bandpass filter within a predetermined time period to determine if they indicate a source of thermal noise, and a determination of occupancy engine for processing the signals filtered by the variable bandpass filter within a predetermined time period to determine the presence or absence of an occupant within the defined region, wherein the controller is adapted to: filter the signals generated by the infrared sensor using the variable bandpass filter, and process the filtered signals to determine the presence or absence of an occupant within a defined region.

A method of operating an occupancy sensor has been described that includes: monitoring thermal energy within a defined region to generate signals representative of the thermal energy within the defined region, filtering the signals using a variable bandpass filter, and processing the filtered signals to determine a presence or absence of an occupant within a defined region. In an exemplary embodiment, filtering the signals using a variable bandpass filter includes: sweeping the variable bandpass filter across a range of frequencies. In an exemplary embodiment, filtering the signals using a variable bandpass filter includes: sweeping the variable bandpass filter upwardly along a range of frequencies, then sweeping the variable bandpass filter downwardly along a range of frequencies. In an exemplary embodiment, filtering the signals using a variable bandpass filter includes: sweeping the variable bandpass filter downwardly along a range of frequencies; and then sweeping the variable bandpass filter upwardly along a range of frequencies. In an exemplary embodiment, filtering the signals using a variable bandpass filter includes: controlling a ratio of a center frequency to a bandwidth of the variable bandpass filter. In an exemplary embodiment, processing the filtered signals to determine a presence or absence of an occupant within a defined region includes: time averaging an amplitude of the filtered signals, and comparing the time averaged amplitudes of the filtered signals. In an exemplary embodiment, processing the filtered signals to determine a presence or absence of an occupant within a defined region includes: determining if a filtered signal indicated a source of thermal noise within the defined region. In an exemplary embodiment, filtering the signals includes: searching for quiet bandwidth areas within a range of frequencies that do not include background thermal noise. In an exemplary embodiment, processing the filtered signals to determine a presence or absence of an occupant within a defined region includes: time averaging an amplitude of the filtered signals within the quiet bandwidth areas, and comparing the time averaged amplitudes of the filtered signals. In an exemplary embodiment, filtering the signals includes: searching for noisy bandwidth areas within a range of frequencies that include background thermal noise. In an exemplary embodiment, processing the filtered signals to determine a presence or absence of an occupant within a defined region includes: time averaging an amplitude of the filtered signals that are not within the noisy bandwidth areas, and comparing the time averaged amplitudes of the filtered signals. In an exemplary embodiment, processing the filtered signals to determine a presence or absence of an occupant within a defined region includes: determining the possible presence of a source of thermal noise within the defined region, and determining the possible presence of an occupant within the defined region. In an exemplary embodiment, the method further includes determining the presence of an occupant within the defined region as a function of a frequency of the determination of the possible presence of an occupant within the defined region. In an exemplary embodiment, the method further includes: determining the presence of an occupant within the defined region as a function of the frequency of the determination of the possible presence of an occupant within the defined region relative to the frequency of the determination of the possible presence of a source of thermal noise within the defined region. In an exemplary embodiment, processing the filtered signals to determine a presence or absence of an occupant within a defined region includes: time averaging an amplitude of a subset of the filtered signals, and comparing the time averaged amplitudes of the filtered signals. In an exemplary embodiment, processing the filtered signals to determine a presence or absence of an occupant within a defined region includes: time averaging an amplitude of a subset of the filtered signals for a predetermined finite time period, and comparing the time averaged amplitudes of the filtered signals.

A method of operating an occupancy sensor has been described that includes: monitoring thermal energy within a defined region and generating signals representative of the thermal energy, filtering the signals using a variable bandpass filter, controlling a ratio of a center frequency to a bandwidth of the variable bandpass filter, sweeping the variable bandpass filter upwardly along a range of frequencies, then sweeping the variable bandpass filter downwardly along a range of frequencies, time averaging an amplitude of the filtered signals, comparing the time averaged amplitudes of the filtered signals, determining if a filtered signal indicates a source of thermal noise within the defined region, and determining if a filtered signal indicates a presence of an occupant within the defined region.

A method of operating an occupancy sensor has been described that includes: monitoring thermal energy within a defined region and generating signals representative of the thermal energy, filtering the signals using a variable bandpass filter, controlling a ratio of a center frequency to a bandwidth of the variable bandpass filter, sweeping the variable bandpass filter upwardly along a range of frequencies, then sweeping the variable bandpass filter downwardly along a range of frequencies, searching for quiet bandwidth areas within a range of frequencies that do not include background thermal noise, time averaging an amplitude of the filtered signals within the quiet bandwidth areas, comparing the time averaged amplitudes of the filtered signals, determining if a filtered signal indicates a source of thermal noise within the defined region, and determining if a filtered signal indicates a presence of an occupant within the defined region.

A method of operating an occupancy sensor has been described that includes monitoring thermal energy within a defined region and generating signals representative of the thermal energy, filtering the signals using a variable bandpass filter, controlling a ratio of a center frequency to a bandwidth of the variable bandpass filter, sweeping the variable bandpass filter upwardly along a range of frequencies, then sweeping the variable bandpass filter downwardly along a range of frequencies, searching for noisy bandwidth areas within a range of frequencies that include background thermal noise, time averaging an amplitude of the filtered signals not within the noisy bandwidth areas, comparing the time averaged amplitudes of the filtered signals, determining if a filtered signal indicates a source of thermal noise within the defined region, and determining if a filtered signal indicates a presence of an occupant within the defined region.

A method of operating an occupancy sensor has been described that includes: monitoring thermal energy within a defined region and generating signals representative of the thermal energy, filtering the signals using a variable bandpass filter, controlling a ratio of a center frequency to a bandwidth of the variable bandpass filter, sweeping the variable bandpass filter upwardly along a range of frequencies, then sweeping the variable bandpass filter downwardly along a range of frequencies, time averaging an amplitude of the filtered signals, comparing the time averaged amplitudes of the filtered signals, determining a possible presence of a source of thermal noise within the defined region, determining a possible presence of an occupant within the defined region, and determining the presence of an occupant within the defined region as a function of a frequency of the determination of the possible presence of an occupant within the defined region.

A method of operating an occupancy sensor has been described that includes: monitoring thermal energy within a defined region and generating signals representative of the thermal energy, filtering the signals using a variable bandpass filter, controlling a ratio of a center frequency to a bandwidth of the variable bandpass filter, sweeping the variable bandpass filter upwardly along a range of frequencies, then sweeping the variable bandpass filter downwardly along a range of frequencies, time averaging an amplitude of the filtered signals, comparing the time averaged amplitudes of the filtered signals, determining a possible presence of a source of thermal noise within the defined region, determining a possible presence of an occupant within the defined region, and determining the presence of an occupant within the defined region as a function of a frequency of the determination of the possible presence of an occupant within the defined region relative to a frequency of the determination of the possible presence of a source of thermal noise within the defined region.

A method of operating an occupancy sensor has been described that includes: monitoring thermal energy within a defined region and generating signals representative of the thermal energy, filtering the signals using a variable bandpass filter, controlling a ratio of a center frequency to a bandwidth of the variable bandpass filter, sweeping the variable bandpass filter upwardly along a range of frequencies, then sweeping the variable bandpass filter downwardly along a range of frequencies, time averaging an amplitude of a subset the filtered signals, comparing the time averaged amplitudes of the filtered signals, determining if a filtered signal indicates a source of thermal noise within the defined region, and determining if a filtered signal indicates a presence of an occupant within the defined region.

A method of operating an occupancy sensor, including: monitoring thermal energy within a defined region and generating signals representative of the thermal energy, filtering the signals using a variable bandpass filter, controlling a ratio of a center frequency to a bandwidth of the variable bandpass filter, sweeping the variable bandpass filter upwardly along a range of frequencies, then sweeping the variable bandpass filter downwardly along a range of frequencies, time averaging an amplitude of the filtered signals for a finite time period, comparing the time averaged amplitudes of the filtered signals, determining if a filtered signal indicates a source of noise within the defined region, and determining if a filtered signal indicates a presence of an occupant within the defined region.

A system for operating an occupancy sensor has been described that includes: means for monitoring thermal energy within a defined region and generating signals representative of the thermal energy, means for filtering the signals using a variable bandpass filter, and means for processing the filtered signals to determine a presence or absence of an occupant within a defined region. In an exemplary embodiment, means for filtering the signals using a variable bandpass filter includes: means for sweeping the variable bandpass filter across a range of frequencies. In an exemplary embodiment, means for filtering the signals using a variable bandpass filter includes: means for sweeping the variable bandpass filter upwardly along a range of frequencies, and then means for sweeping the variable bandpass filter downwardly along a range of frequencies. In an exemplary embodiment, means for filtering the signals using a variable bandpass filter includes: means for sweeping the variable bandpass filter downwardly along a range of frequencies, and then means for sweeping the variable bandpass filter upwardly along a range of frequencies. In an exemplary embodiment, means for filtering the signals using a variable bandpass filter includes: means for controlling a ratio of a center frequency to a bandwidth of the variable bandpass filter. In an exemplary embodiment, means for processing the filtered signals to determine a presence or absence of an occupant within a defined region includes: means for time averaging an amplitude of the filtered signals, and means for comparing the time averaged amplitudes of the filtered signals. In an exemplary embodiment, means for processing the filtered signals to determine a presence or absence of an occupant within a defined region includes: means for determining if a filtered signal indicated a source of thermal noise within the defined region. In an exemplary embodiment, means for filtering the signals includes: means for searching for quiet bandwidth areas within a range of frequencies that do not include background thermal noise. In an exemplary embodiment, means for processing the filtered signals to determine a presence or absence of an occupant within a defined region includes: means for time averaging an amplitude of the filtered signals within the quiet bandwidth areas, and means for comparing the time averaged amplitudes of the filtered signals. In an exemplary embodiment, means for filtering the signals includes: means for searching for noisy bandwidth areas within a range of frequencies that include background thermal noise. In an exemplary embodiment, means for processing the filtered signals to determine a presence or absence of an occupant within a defined region includes: means for time averaging an amplitude of the filtered signals that are not within the noisy bandwidth areas, and means for comparing the time averaged amplitudes of the filtered signals. In an exemplary embodiment, means for processing the filtered signals to determine a presence or absence of an occupant within a defined region includes: means for determining the possible presence of a source of thermal noise within the defined region, and means for determining the possible presence of an occupant within the defined region. In an exemplary embodiment, the system further includes: means for determining the presence of an occupant within the defined region as a function of a frequency of the determination of the possible presence of an occupant within the defined region. In an exemplary embodiment, the system further includes: means for determining the presence of an occupant within the defined region as a function of the frequency of the determination of the possible presence of an occupant within the defined region relative to the frequency of the determination of the possible presence of a source of thermal noise within the defined region. In an exemplary embodiment, means for processing the filtered signals to determine a presence or absence of an occupant within a defined region includes: means for time averaging an amplitude of a subset of the filtered signals, and means for comparing the time averaged amplitudes of the filtered signals. In an exemplary embodiment, means for processing the filtered signals to determine a presence or absence of an occupant within a defined region includes: means for time averaging an amplitude of a subset of the filtered signals for a predetermined finite time period, and means for comparing the time averaged amplitudes of the filtered signals.

A system for operating an occupancy sensor has been described that includes: means for monitoring thermal energy within a defined region and generating signals representative of the thermal energy, means for filtering the signals using a variable bandpass filter, means for controlling a ratio of a center frequency to a bandwidth of the variable bandpass filter, means for sweeping the variable bandpass filter upwardly along a range of frequencies, means for then sweeping the variable bandpass filter downwardly along a range of frequencies, means for time averaging an amplitude of the filtered signals, means for comparing the time averaged amplitudes of the filtered signals, means for determining if a filtered signal indicates a source of thermal noise within the defined region, and means for determining if a filtered signal indicates a presence of an occupant within the defined region.

A system for operating an occupancy sensor has been described that includes: means for monitoring thermal energy within a defined region and generating signals representative of the thermal energy, means for filtering the signals using a variable bandpass filter, means for controlling a ratio of a center frequency to a bandwidth of the variable bandpass filter, means for sweeping the variable bandpass filter upwardly along a range of frequencies, means for then sweeping the variable bandpass filter downwardly along a range of frequencies, means for searching for quiet bandwidth areas within a range of frequencies that do not include background thermal noise, means for time averaging an amplitude of the filtered signals within the quiet bandwidth areas, means for comparing the time averaged amplitudes of the filtered signals, means for determining if a filtered signal indicates a source of thermal noise within the defined region, and means for determining if a filtered signal indicates a presence of an occupant within the defined region.

A system for operating an occupancy sensor has been described that includes: means for monitoring thermal energy within a defined region and generating signals representative of the thermal energy, means for filtering the signals using a variable bandpass filter, means for controlling a ratio of a center frequency to a bandwidth of the variable bandpass filter, means for sweeping the variable bandpass filter upwardly along a range of frequencies, means for then sweeping the variable bandpass filter downwardly along a range of frequencies, means for searching for noisy bandwidth areas within a range of frequencies that include background thermal noise, means for time averaging an amplitude of the filtered signals not within the noisy bandwidth areas, means for comparing the time averaged amplitudes of the filtered signals, means for determining if a filtered signal indicates a source of thermal noise within the defined region, and means for determining if a filtered signal indicates a presence of an occupant within the defined region.

A system for operating an occupancy sensor has been described that includes: means for monitoring thermal energy within a defined region and generating signals representative of the thermal energy, means for filtering the signals using a variable bandpass filter, means for controlling a ratio of a center frequency to a bandwidth of the variable bandpass filter, means for sweeping the variable bandpass filter upwardly along a range of frequencies, means for then sweeping the variable bandpass filter downwardly along a range of frequencies, means for time averaging an amplitude of the filtered acoustic signals, means for comparing the time averaged amplitudes of the filtered signals, means for determining a possible presence of a source of thermal noise within the defined region, means for determining a possible presence of an occupant within the defined region, and means for determining the presence of an occupant within the defined region as a function of a frequency of the determination of the possible presence of an occupant within the defined region.

A system for operating an occupancy sensor has been described that includes: means for monitoring thermal energy within a defined region and generating signals representative of the thermal energy, means for filtering the signals using a variable bandpass filter, means for controlling a ratio of a center frequency to a bandwidth of the variable bandpass filter, means for sweeping the variable bandpass filter upwardly along a range of frequencies, means for then sweeping the variable bandpass filter downwardly along a range of frequencies, means for time averaging an amplitude of the filtered signals, means for comparing the time averaged amplitudes of the filtered signals, means for determining a possible presence of a source of thermal noise within the defined region, means for determining a possible presence of an occupant within the defined region, and means for determining the presence of an occupant within the defined region as a function of a frequency of the determination of the possible presence of an occupant within the defined region relative to a frequency of the determination of the possible presence of a source of thermal noise within the defined region.

A system for operating an occupancy sensor has been described that includes: means for monitoring thermal energy within a defined region and generating signals representative of the thermal energy, means for filtering the signals using a variable bandpass filter, means for controlling a ratio of a center frequency to a bandwidth of the variable bandpass filter, means for sweeping the variable bandpass filter upwardly along a range of frequencies, means for then sweeping the variable bandpass filter downwardly along a range of frequencies, means for time averaging an amplitude of a subset the filtered signals, means for comparing the time averaged amplitudes of the filtered signals, means for determining if a filtered signal indicates a source of thermal noise within the defined region, and means for determining if a filtered signal indicates a presence of an occupant within the defined region.

A system for operating an occupancy sensor has been described that includes: means for monitoring thermal energy within a defined region and generating signals representative of the thermal energy, means for filtering the signals using a variable bandpass filter, means for controlling a ratio of a center frequency to a bandwidth of the variable bandpass filter, means for sweeping the variable bandpass filter upwardly along a range of frequencies, means for then sweeping the variable bandpass filter downwardly along a range of frequencies, means for time averaging an amplitude of the filtered signals for a finite time period, means for comparing the time averaged amplitudes of the filtered signals, means for determining if a filtered signal indicates a source of thermal noise within the defined region, and means for determining if a filtered signal indicates a presence of an occupant within the defined region.

A computer program for operating an occupancy sensor has been described that includes program instructions for: monitoring thermal energy within a defined region to generate signals representative of the thermal energy within the defined region, filtering the signals using a variable bandpass filter, and processing the filtered signals to determine a presence or absence of an occupant within a defined region. In an exemplary embodiment, filtering the signals using a variable bandpass filter includes program instructions for: sweeping the variable bandpass filter across a range of frequencies. In an exemplary embodiment, filtering the signals using a variable bandpass filter includes program instructions for: sweeping the variable bandpass filter upwardly along a range of frequencies; and then sweeping the variable bandpass filter downwardly along a range of frequencies. In an exemplary embodiment, filtering the signals using a variable bandpass filter includes program instructions for: sweeping the variable bandpass filter downwardly along a range of frequencies, and then sweeping the variable bandpass filter upwardly along a range of frequencies. In an exemplary embodiment, filtering the signals using a variable bandpass filter includes program instructions for: controlling a ratio of a center frequency to a bandwidth of the variable bandpass filter. In an exemplary embodiment, processing the filtered signals to determine a presence or absence of an occupant within a defined region includes program instructions for: time averaging an amplitude of the filtered signals, and comparing the time averaged amplitudes of the filtered signals. In an exemplary embodiment, processing the filtered signals to determine a presence or absence of an occupant within a defined region includes program instructions for: determining if a filtered signal indicated a source of noise within the defined region. In an exemplary embodiment, filtering the received signals includes program instructions for: searching for quiet bandwidth areas within a range of frequencies that do not include background thermal noise. In an exemplary embodiment, processing the filtered signals to determine a presence or absence of an occupant within a defined region includes program instructions for: time averaging an amplitude of the filtered signals within the quiet bandwidth areas, and comparing the time averaged amplitudes of the filtered signals. In an exemplary embodiment, filtering the signals includes program instructions for: searching for noisy bandwidth areas within a range of frequencies that include background thermal noise. In an exemplary embodiment, processing the filtered signals to determine a presence or absence of an occupant within a defined region includes program instructions for: time averaging an amplitude of the filtered signals that are not within the noisy bandwidth areas, and comparing the time averaged amplitudes of the filtered signals. In an exemplary embodiment, processing the filtered signals to determine a presence or absence of an occupant within a defined region includes program instructions for: determining the possible presence of a source of thermal noise within the defined region, and determining the possible presence of an occupant within the defined region. In an exemplary embodiment, the computer program further includes program instructions for: determining the presence of an occupant within the defined region as a function of a frequency of the determination of the possible presence of an occupant within the defined region. In an exemplary embodiment, the computer program further includes program instructions for: determining the presence of an occupant within the defined region as a function of the frequency of the determination of the possible presence of an occupant within the defined region relative to the frequency of the determination of the possible presence of a source of thermal noise within the defined region. In an exemplary embodiment, processing the filtered signals to determine a presence or absence of an occupant within a defined region includes program instructions for: time averaging an amplitude of a subset of the filtered signals, and comparing the time averaged amplitudes of the filtered signals. In an exemplary embodiment, processing the filtered signals to determine a presence or absence of an occupant within a defined region includes program instructions for: time averaging an amplitude of a subset of the filtered signals for a predetermined finite time period, and comparing the time averaged amplitudes of the filtered signals.

A computer program for operating an occupancy sensor has been described that includes program instructions for: monitoring thermal energy within a defined region to generate signals representative of the thermal energy within the defined region, filtering the signals using a variable bandpass filter, controlling a ratio of a center frequency to a bandwidth of the variable bandpass filter, sweeping the variable bandpass filter upwardly along a range of frequencies, then sweeping the variable bandpass filter downwardly along a range of frequencies, time averaging an amplitude of the filtered signals, comparing the time averaged amplitudes of the filtered signals, determining if a filtered signal indicates a source of thermal noise within the defined region, and determining if a filtered signal indicates a presence of an occupant within the defined region.

A computer program for operating an occupancy sensor has been described that includes program instructions for: monitoring thermal energy within a defined region to generate signals representative of the thermal energy within the defined region, filtering the signals using a variable bandpass filter, controlling a ratio of a center frequency to a bandwidth of the variable bandpass filter, sweeping the variable bandpass filter upwardly along a range of frequencies, then sweeping the variable bandpass filter downwardly along a range of frequencies, searching for quiet bandwidth areas within a range of frequencies that do not include background thermal noise, time averaging an amplitude of the filtered signals within the quiet bandwidth areas, comparing the time averaged amplitudes of the filtered signals, determining if a filtered signal indicates a source of thermal noise within the defined region, and determining if a filtered signal indicates a presence of an occupant within the defined region.

A computer program for operating an occupancy sensor has been described that includes program instructions for: monitoring thermal energy within a defined region to generate signals representative of the thermal energy within the defined region, filtering the signals using a variable bandpass filter, controlling a ratio of a center frequency to a bandwidth of the variable bandpass filter, sweeping the variable bandpass filter upwardly along a range of frequencies, then sweeping the variable bandpass filter downwardly along a range of frequencies, searching for noisy bandwidth areas within a range of frequencies that include background thermal noise, time averaging an amplitude of the filtered signals not within the noisy bandwidth areas, comparing the time averaged amplitudes of the filtered signals, determining if a filtered signal indicates a source of thermal noise within the defined region and determining if a filtered signal indicates a presence of an occupant within the defined region.

A computer program for operating an occupancy sensor has been described that includes program instructions for: monitoring thermal energy within a defined region to generate signals representative of the thermal energy within the defined region, filtering the signals using a variable bandpass filter, controlling a ratio of a center frequency to a bandwidth of the variable bandpass filter, sweeping the variable bandpass filter upwardly along a range of frequencies, then sweeping the variable bandpass filter downwardly along a range of frequencies, time averaging an amplitude of the filtered signals, comparing the time averaged amplitudes of the filtered signals, determining a possible presence of a source of thermal noise within the defined region, determining a possible presence of an occupant within the defined region, and determining the presence of an occupant within the defined region as a function of a frequency of the determination of the possible presence of an occupant within the defined region.

A computer program for operating an occupancy sensor has been described that includes program instructions for: monitoring thermal energy within a defined region to generate signals representative of the thermal energy within the defined region, filtering the signals using a variable bandpass filter, controlling a ratio of a center frequency to a bandwidth of the variable bandpass filter, sweeping the variable bandpass filter upwardly along a range of frequencies, then sweeping the variable bandpass filter downwardly along a range of frequencies, time averaging an amplitude of the filtered signals, comparing the time averaged amplitudes of the filtered signals, determining a possible presence of a source of thermal noise within the defined region, determining a possible presence of an occupant within the defined region, and determining the presence of an occupant within the defined region as a function of a frequency of the determination of the possible presence of an occupant within the defined region relative to a frequency of the determination of the possible presence of a source of thermal noise within the defined region.

A computer program for operating an occupancy sensor has been described that includes program instructions for: monitoring thermal energy within a defined region to generate signals representative of the thermal energy within the defined region, filtering the signals using a variable bandpass filter, controlling a ratio of a center frequency to a bandwidth of the variable bandpass filter, sweeping the variable bandpass filter upwardly along a range of frequencies, then sweeping the variable bandpass filter downwardly along a range of frequencies, time averaging an amplitude of a subset the filtered signals, comparing the time averaged amplitudes of the filtered signals, determining if a filtered signal indicates a source of thermal noise within the defined region, and determining if a filtered acoustic signal indicates a presence of an occupant within the defined region.

A computer program for operating an occupancy sensor has been described that includes program instructions for: monitoring thermal energy within a defined region to generate signals representative of the thermal energy within the defined region, filtering the signals using a variable bandpass filter, controlling a ratio of a center frequency to a bandwidth of the variable bandpass filter, sweeping the variable bandpass filter upwardly along a range of frequencies, then sweeping the variable bandpass filter downwardly along a range of frequencies, time averaging an amplitude of the filtered signals for a finite time period, comparing the time averaged amplitudes of the filtered signals, determining if a filtered signal indicates a source of thermal noise within the defined region, and determining if a filtered signal indicates a presence of an occupant within the defined region.

A switchpack for controlling an operational state of one or more loads has been described that includes: a communication interface for transmitting and receiving communication signals to and from a communication network, and a controller operably coupled to the communication interface and adapted to be operably coupled to the one or more loads, wherein the controller is adapted to: control an operational state of the one or more of the loads, and communicate with the communication network using the communication interface. In an exemplary embodiment, the switchpack further includes: a memory operably coupled to the controller comprising a network address assigned to the switchpack. In an exemplary embodiment, the controller is adapted to permit remote control of the switchpack using the communication network. In an exemplary embodiment, the controller is adapted to permit remote control of the switchpack using the communication network during a first time period; and wherein the controller is adapted to permit local control of the switchpack during a second time period. In an exemplary embodiment, the switchpack further includes: a memory operably coupled to the controller comprising information assigned to the switchpack. In an exemplary embodiment, the controller is adapted to permit remote control of the information assigned to the switchpack using the communication network. In an exemplary embodiment, the switchpack information comprises information representative of an operating schedule for the switchpack. In an exemplary embodiment, the switchpack information includes information representative of an office plan location assigned to the switchpack. In an exemplary embodiment, the switchpack further includes a current monitor operably coupled to the controller for monitoring an operational state of one or more of the loads. In an exemplary embodiment, the switchpack further includes a user interface operably coupled to the controller for monitoring and controlling an operational state of the switchpack.

A switchpack for controlling an operational state of one or more loads has been described that includes a communication interface for transmitting and receiving communication signals to and from a communication network, a controller operably coupled to the communication interface and adapted to be operably coupled to one or more loads, a memory operably coupled to the controller including: a network address assigned to the switchpack, and information assigned to the switchpack, a current monitor operably coupled to the controller for monitoring an operational state of one or more of the loads, and a user interface operably coupled to the controller for permitting a local user of the switchpack to monitor and control an operational state of the switchpack, wherein the controller is adapted to: control an operational state of one or more of the loads, communicate with the communication network using the communication interface, permit remote control of the switchpack using the communication network during a first time period, and permit local control of the switchpack during a second time period, and permit remote control of the information assigned to the switchpack using the communication network, wherein the switchpack information includes information representative of an operating schedule for the switchpack, and wherein the switchpack information includes information representative of an office plan location assigned to the switchpack.

A method of operating a switchpack operably coupled to one or more loads has been described that includes: controlling an operational state of one or more of the loads, and communicating with the switchpack using a network. In an exemplary embodiment, the method further includes: assigning a network address to the switchpack. In an exemplary embodiment, the method further includes: remotely controlling one or more operational aspects of the switchpack. In an exemplary embodiment, the method further includes: remotely controlling one or more operational aspects of the switchpack during a first time period, and locally controlling the one or more operational aspects of the switchpack during a second time period. In an exemplary embodiment, the method further includes: remotely controlling switchpack information. In an exemplary embodiment, the switchpack information includes information representative of an operating schedule for the switchpack. In an exemplary embodiment, the switchpack information includes information representative of an office plan location assigned to the switchpack. In an exemplary embodiment, the method further includes: monitoring a current level within one or more of the loads.

A method of operating a switchpack operably coupled to one or more loads has been described that includes: controlling an operational state of one or more of the loads, communicating with the switchpack using a network, assigning a network address to the switchpack, assigning information to the switchpack, remotely controlling one or more operational aspects of the switchpack during a first time period, locally controlling the one or more operational aspects of the switchpack during a second time period, remotely controlling the switchpack information, and monitoring a current level within one or more of the loads, wherein the switchpack information includes information representative of an operating schedule for the switchpack, and wherein the switchpack information comprises information representative of an office plan location assigned to the switchpack.

A system for operating a switchpack operably coupled to one or more loads has been described that includes: means for controlling an operational state of one or more of the loads, and means for communicating with the switchpack using a network. In an exemplary embodiment, the system further includes means for assigning a network address to the switchpack. In an exemplary embodiment, the system further includes: means for remotely controlling one or more operational aspects of the switchpack. In an exemplary embodiment, the system further includes: means for remotely controlling one or more operational aspects of the switchpack during a first time period, and means for locally controlling the one or more operational aspects of the switchpack during a second time period. In an exemplary embodiment, the system further includes: means for remotely controlling switchpack information. In an exemplary embodiment, the switchpack information includes information representative of an operating schedule for the switchpack. In an exemplary embodiment, the switchpack information includes information representative of an office plan location assigned to the switchpack. In an exemplary embodiment, the system further includes means for monitoring a current level within one or more of the loads.

A system for operating a switchpack operably coupled to one or more loads has been described that includes: means for controlling an operational state of one or more of the loads, means for communicating with the switchpack using a network, means for assigning a network address to the switchpack, means for assigning information to the switchpack, means for remotely controlling one or more operational aspects of the switchpack during a first time period, means for locally controlling the one or more operational aspects of the switchpack during a second time period, means for remotely controlling the switchpack information, and means for monitoring a current level within one or more of the loads, wherein the switchpack information comprises information representative of an operating schedule for the switchpack, and wherein the switchpack information comprises information representative of an office plan location assigned to the switchpack.

A computer program for operating a switchpack operably coupled to one or more loads has been described that includes program instructions for: controlling an operational state of one or more of the loads, and communicating with the switchpack using a network. In an exemplary embodiment, the computer program further includes program instructions for: assigning a network address to the switchpack. In an exemplary embodiment, the computer program further includes program instructions for: remotely controlling one or more operational aspects of the switchpack. In an exemplary embodiment, the computer program further includes program instructions for: remotely controlling one or more operational aspects of the switchpack during a first time period, and locally controlling the one or more operational aspects of the switchpack during a second time period. In an exemplary embodiment, the computer program further includes program instructions for: remotely controlling switchpack information. In an exemplary embodiment, the switchpack information includes information representative of an operating schedule for the switchpack. In an exemplary embodiment, the switchpack information includes information representative of an office plan location assigned to the switchpack. In an exemplary embodiment, the computer program further includes program instructions for monitoring a current level within one or more of the loads.

A computer program for operating a switchpack operably coupled to one or more loads has been described that includes program instructions for: controlling an operational state of one or more of the loads, communicating with the switchpack using a network, assigning a network address to the switchpack, assigning information to the switchpack, remotely controlling one or more operational aspects of the switchpack during a first time period, locally controlling the one or more operational aspects of the switchpack during a second time period, remotely controlling the switchpack information, and monitoring a current level within one or more of the loads, wherein the switchpack information includes information representative of an operating schedule for the switchpack, and wherein the switchpack information comprises information representative of an office plan location assigned to the switchpack.

A control system has been described that includes: one or more switchpack controllers operably coupled to one or more loads, a communication network operably coupled to the switchpack controllers, one or more remote controllers operably coupled to the communication network, wherein one or more of the remote controllers are adapted to permit remote control and monitoring of one or more of the switchpack controllers. In an exemplary embodiment, one or more of the switchpack controllers include network addresses. In an exemplary embodiment, one or more of the remote controllers are adapted to display information corresponding to one or more of the addressable switchpack controllers. In an exemplary embodiment, one or more of the remote controllers are adapted to control one or more operational parameters of one or more of the addressable switchpack controllers. In an exemplary embodiment, one or more of the remote controllers are adapted to control one or more operational parameters of one or more of the addressable switchpack controllers during a first time period, and the one or more operational parameters of the one or more addressable switchpack controllers are controlled by the corresponding switchpack controller during a second time period. In an exemplary embodiment, one or more of the switchpack controllers include a memory comprising one or more operational parameters of the corresponding switchpack controllers. In an exemplary embodiment, one or more of the remote controllers are adapted to update one or more of the operational parameters of the corresponding switchpack controllers. In an exemplary embodiment, the operational parameters include information representative of an operating schedule for the corresponding switchpack controllers. In an exemplary embodiment, one or more of the remote controllers are adapted to display floor plan information corresponding to one or more of the addressable switchpack controllers. In an exemplary embodiment, one or more of the switchpack controllers are adapted to monitor a current level within one or more of the loads.

A control system has been described that includes: one or more switchpack controllers including: corresponding network addresses, and a memory comprising one or more operational parameters of the corresponding switchpack controller, and a communication network operably coupled to the switchpack controllers, one or more remote controllers operably coupled to the communication network, wherein one or more of the remote controllers are adapted to: permit remote control and monitoring of one or more of the switchpack controllers, display information corresponding to the operational parameters for one or more of the addressable switchpack controllers, control one or more operational parameters of one or more of the addressable switchpack controllers during a first time period and permit local control of the one or more addressable switchpack controllers during a second time period, and update one or more of the operational parameters of the corresponding switchpack controllers, and monitor a current level within one or more of the loads, wherein the operational parameters include information representative of an operating schedule and floor plan information for the corresponding switchpack controllers.

A method of operating a control system comprising one or more switchpack controllers has been described that includes: providing one or more remote controllers, and controlling and monitoring one or more operational aspects of one or more of the switchpack controllers using one or more of the remote controllers. In an exemplary embodiment, the method further includes: assigning network addresses to one or more of the switchpack controllers. In an exemplary embodiment, the method further includes: remotely displaying information corresponding to one or more of the addressable switchpack controllers. In an exemplary embodiment, the method further includes: remotely controlling one or more operational parameters of one or more of the addressable switchpack controllers. In an exemplary embodiment, the method further includes: remotely controlling one or more operational parameters of one or more of the addressable switchpack controllers during a first time period, and locally controlling the one or more operational parameters of the one or more addressable switchpack controllers during a second time period. In an exemplary embodiment, the method further includes: storing one or more operational parameters of the switchpack controllers within the corresponding switchpack controllers. In an exemplary embodiment, the method further includes: remotely updating one or more of the operational parameters of the corresponding switchpack controllers. In an exemplary embodiment, the operational parameters include information representative of an operating schedule for the corresponding switchpack controllers. In an exemplary embodiment, the method further includes: remotely displaying floor plan information corresponding to one or more of the addressable switchpack controllers. In an exemplary embodiment, the method further includes: monitor a current level within one or more of the loads using one or more of the remote controllers.

A method of operating a control system comprising one or more switchpack controllers has been described that includes: providing one or more remote controllers, controlling and monitoring one or more operational aspects of one or more of the switchpack controllers using one or more of the remote controllers, assigning network addresses to one or more of the switchpack controllers, remotely displaying information corresponding to one or more of the addressable switchpack controllers, remotely controlling one or more operational parameters of one or more of the addressable switchpack controllers during a first time period, locally controlling the one or more operational parameters of the one or more addressable switchpack controllers during a second time period, storing one or more operational parameters of the switchpack controllers within the corresponding switchpack controllers, remotely updating one or more of the operational parameters of the corresponding switchpack controllers, and remotely monitoring a current level within one or more of the loads using one or more of the remote controllers, wherein the operational parameters include information representative of an operating schedule and floor plan information for the corresponding switchpack controllers.

A system for operating a control system comprising one or more switchpack controllers has been described that includes: means for providing one or more remote controllers, and means for remotely controlling and monitoring one or more operational aspects of one or more of the switchpack controllers using one or more of the remote controllers. In an exemplary embodiment, the system further includes: means for assigning network addresses to one or more of the switchpack controllers. In an exemplary embodiment, the system further includes: means for remotely displaying information corresponding to one or more of the addressable switchpack controllers. In an exemplary embodiment, the system further includes: means for remotely controlling one or more operational parameters of one or more of the addressable switchpack controllers. In an exemplary embodiment, the system further includes: means for remotely controlling one or more operational parameters of one or more of the addressable switchpack controllers during a first time period, and means for locally controlling the one or more operational parameters of the one or more addressable switchpack controllers during a second time period. In an exemplary embodiment, the system further includes: means for storing one or more operational parameters of the switchpack controllers within the corresponding switchpack controllers. In an exemplary embodiment, the system further includes: means for remotely updating one or more of the operational parameters of the corresponding switchpack controllers. In an exemplary embodiment, the operational parameters include information representative of an operating schedule for the corresponding switchpack controllers. In an exemplary embodiment, the system further includes: means for remotely displaying floor plan information corresponding to one or more of the addressable switchpack controllers. In an exemplary embodiment, the system further includes: means for monitoring a current level within one or more of the loads using one or more of the remote controllers.

A system for operating a control system comprising one or more switchpack controllers has been described that includes: means for providing one or more remote controllers, means for controlling and monitoring one or more operational aspects of one or more of the switchpack controllers using one or more of the remote controllers, means for assigning network addresses to one or more of the switchpack controllers, means for remotely displaying information corresponding to one or more of the addressable switchpack controllers, means for remotely controlling one or more operational parameters of one or more of the addressable switchpack controllers during a first time period, means for locally controlling the one or more operational parameters of the one or more addressable switchpack controllers during a second time period, means for storing one or more operational parameters of the switchpack controllers within the corresponding switchpack controllers, means for remotely updating one or more of the operational parameters of the corresponding switchpack controllers, and means for monitoring a current level within one or more of the loads using one or more of the remote controllers, wherein the operational parameters include information representative of an operating schedule and floor plan information for the corresponding switchpack controllers.

A computer program for operating a control system including one or more switchpack controllers has been described that includes program instructions for: remotely controlling and monitoring one or more operational aspects of one or more of the switchpack controllers. In an exemplary embodiment, the computer program further includes program instructions for: assigning network addresses to one or more of the switchpack controllers. In an exemplary embodiment, the computer program further includes program instructions for: remotely displaying information corresponding to one or more of the addressable switchpack controllers. In an exemplary embodiment, the computer program further includes program instructions for: remotely controlling one or more operational parameters of one or more of the addressable switchpack controllers. In an exemplary embodiment, the computer program further includes program instructions for: remotely controlling one or more operational parameters of one or more of the addressable switchpack controllers during a first time period, and locally controlling the one or more operational parameters of the one or more addressable switchpack controllers during a second time period. In an exemplary embodiment, the computer program further includes program instructions for: storing one or more operational parameters of the switchpack controllers within the corresponding switchpack controllers. In an exemplary embodiment, the computer program further includes program instructions for: remotely updating one or more of the operational parameters of the corresponding switchpack controllers. In an exemplary embodiment, the operational parameters include information representative of an operating schedule for the corresponding switchpack controllers. In an exemplary embodiment, the computer program further includes program instructions for: remotely displaying floor plan information corresponding to one or more of the addressable switchpack controllers. In an exemplary embodiment, the computer program further includes program instructions for: monitoring a current level within one or more of the loads using one or more of the remote controllers.

A computer program for operating a control system comprising one or more switchpack controllers has been described that includes program instructions for: providing one or more remote controllers, controlling and monitoring one or more operational aspects of one or more of the switchpack controllers using one or more of the remote controllers, assigning network addresses to one or more of the switchpack controllers, remotely displaying information corresponding to one or more of the addressable switchpack controllers, remotely controlling one or more operational parameters of one or more of the addressable switchpack controllers during a first time period, locally controlling the one or more operational parameters of the one or more addressable switchpack controllers during a second time period, storing one or more operational parameters of the switchpack controllers within the corresponding switchpack controllers, remotely updating one or more of the operational parameters of the corresponding switchpack controllers, and monitoring a current level within one or more of the loads using one or more of the remote controllers, wherein the operational parameters include information representative of an operating schedule and floor plan information for the corresponding switchpack controllers.

It is understood that variations may be made in the foregoing without departing from the scope of the disclosure. For example, one or more aspects of the present exemplary embodiments may be implemented using hardware, software, firmware, analog, digital, radio frequency, optical or other equivalent or interchangeable technologies.

Any foregoing spatial references such as, for example, "upper," "lower," "above," "below," "rear," "between," "vertical," "angular," etc., are for the purpose of illustration only and do not limit the specific orientation or location of the structure described above.

In several exemplary embodiments, it is understood that one or more of the operational steps in each embodiment may be omitted. Moreover, in some instances, some features of the present disclosure may be employed without a corresponding use of the other features. Moreover, it is understood that one or more of the above-described embodiments and/or variations may be combined in whole or in part with any one or more of the other above-described embodiments and/or variations.

Although exemplary embodiments of this disclosure have been described in detail above, those skilled in the art will readily appreciate that many other modifications, changes and/or substitutions are possible in the exemplary embodiments without materially departing from the novel teachings and advantages of this disclosure. Accordingly, all such modifications, changes and/or substitutions are intended to be included within the scope of this disclosure as defined in the following claims. In the claims, means-plus-function clauses are intended to cover the structures described herein as performing the recited function and not only structural equivalents, but also equivalent structures.

What is claimed is:

1. An occupancy sensor, comprising:
   an acoustic transmitter;
   an acoustic receiver;
   a communication interface for transmitting and receiving communication signals to and from a communication network;
   a memory comprising information representative of a network address for the sensor, information representative of data corresponding to the defined region, information representative of an operating schedule for the occupancy sensor, and information representative of an office plan location assigned to the occupancy sensor; and
   a controller operably coupled to the acoustic transmitter, acoustic receiver, the communication interface, and the memory;
   wherein the controller is adapted to:
      transmit acoustic signals using the acoustic transmitter;
      receive acoustic signals using the acoustic receiver;
      process the received acoustic signals to determine the presence or absence of an occupant within a defined region;
      communicate with the communication network using the communication interface;
      permit remote control of the occupancy sensor during a first time period and permit local control of the occupancy sensor during a second time period; and
      permit remote updates of the information representative of a network address for the sensor, information representative of data corresponding to the defined region, information representative of an operating schedule for the occupancy sensor, and information representative of an office plan location assigned to the occupancy sensor.

2. The occupancy sensor of claim 1, further comprising:
   an infrared sensor; and
   wherein the controller is adapted to:
      process the signals generated by the infrared sensor to determine the presence or absence of an occupant within a defined region.

3. A method of operating an occupancy sensor, comprising:
   transmitting acoustic signals into a defined region;
   receiving acoustic signals from the defined region;
   processing the received acoustic signals to determine the presence or absence of an occupant within the defined region;

communicating with the occupancy sensor using a network;
assigning a network address to the sensor;
storing information within the sensor that corresponds to the defined region;
remotely controlling one or more operational aspects of the occupancy sensor during a first time period;
locally controlling the one or more operational aspects during a second time period; and
remotely updating the information representative of a data corresponding to the defined region;
wherein the information representative of data corresponding to the defined region comprises information representative of an operating schedule for the occupancy sensor; and
wherein the information representative of data corresponding to the defined region comprises information representative of an office plan location assigned to the occupancy sensor.

4. The method of claim 3, further comprising:
monitoring infrared energy within the defined region; and
processing the infrared energy to determine the presence or absence of an occupant within the defined region.

5. A system for operating an occupancy sensor, comprising:
means for transmitting acoustic signals into a defined region;
means for receiving acoustic signals from the defined region;
means for processing the received acoustic signals to determine the presence or absence of an occupant within the defined region;
means for communicating with the occupancy sensor using a network;
means for assigning a network address to the sensor;
means for storing information within the sensor that corresponds to the defined region;
means for remotely controlling one or more operational aspects of the occupancy sensor during a first time period;
means for locally controlling the one or more operational aspects during a second time period; and
means for remotely updating the information representative of a data corresponding to the defined region;
wherein the information representative of data corresponding to the defined region comprises information representative of an operating schedule for the occupancy sensor; and
wherein the information representative of data corresponding to the defined region comprises information representative of an office plan location assigned to the occupancy sensor.

6. The system of claim 5, further comprising:
means for monitoring infrared energy within a defined region; and
means for processing the infrared energy to determine the presence or absence of an occupant within the defined region.

7. A computer-readable medium having computer-executable instructions for operating an occupancy sensor, comprising the steps of:
transmitting acoustic signals into a defined region;
receiving acoustic signals from the defined region;
processing the received acoustic signals to determine the presence or absence of an occupant within the defined region;
communicating with the occupancy sensor using a network;
assigning a network address to the sensor;
storing information within the sensor that corresponds to the defined region;
remotely controlling one or more operational aspects of the occupancy sensor during a first time period;
locally controlling the one or more operational aspects during a second time period; and
remotely updating the information representative of a data corresponding to the defined region;
wherein the information representative of data corresponding to the defined region comprises information representative of an operating schedule for the occupancy sensor; and
wherein the information representative of data corresponding to the defined region comprises information representative of an office plan location assigned to the occupancy sensor.

8. The computer-readable medium of claim 7 further comprising computer-executable instructions for:
monitoring infrared energy in the defined region; and
processing the monitored infrared energy to determine the presence or absence of an occupant within the defined region.

9. A control system, comprising:
one or more occupancy sensors comprising:
corresponding network addresses; and
a memory comprising one or more operational parameters of the corresponding occupancy sensor; and
a communication network operably coupled to the occupancy sensor;
one or more remote controllers operably coupled to the communication network;
wherein one or more of the remote controllers are adapted to:
permit remote control and monitoring of one or more of the occupancy sensors;
display information corresponding to the operational parameters for one or more of the addressable occupancy sensors;
control one or more operational parameters of one or more of the addressable occupancy sensors during a first time period and permit local control of the one or more addressable occupancy sensors during a second time period; and
update one or more of the operational parameters of the corresponding occupancy sensor; and
wherein the operational parameters comprise information representative of an operating schedule and floor plan information for the corresponding occupancy sensor.

10. A method of operating a control system comprising one or more occupancy sensors, comprising:
providing one or more remote controllers;
controlling and monitoring one or more operational aspects of one or more of the occupancy sensors;
assigning network addresses to one or more of the occupancy sensors;
remotely displaying information corresponding to one or more of the addressable occupancy sensors;
remotely controlling one or more operational parameters of one or more of the addressable occupancy sensors during a first time period;
locally controlling the one or more operational parameters of the one or more addressable occupancy sensors during a second time period;

storing one or more operational parameters of the occupancy sensors within the corresponding occupancy sensors; and remotely updating one or more of the operational parameters of the corresponding occupancy sensors;

wherein the operational parameters comprise information representative of an operating schedule and floor plan information for the corresponding occupancy sensor.

11. A system for operating a control system comprising one or more occupancy sensors, comprising:

means for providing one or more remote controllers;

means for controlling and monitoring one or more operational aspects of one or more of the occupancy sensors;

means for assigning network addresses to one or more of the occupancy sensors;

means for remotely displaying information corresponding to one or more of the addressable occupancy sensors;

means for remotely controlling one or more operational parameters of one or more of the addressable occupancy sensors during a first time period;

means for locally controlling the one or more operational parameters of the one or more addressable occupancy sensors during a second time period;

means for storing one or more operational parameters of the occupancy sensors within the corresponding occupancy sensors; and means for remotely updating one or more of the operational parameters of the corresponding occupancy sensors;

wherein the operational parameters comprise information representative of an operating schedule and floor plan information for the corresponding occupancy sensor.

12. A computer-readable medium having computer-executable instructions for operating a control system comprising one or more occupancy sensors, comprising the steps of:

providing one or more remote controllers;

controlling and monitoring one or more operational aspects of one or more of the occupancy sensors;

assigning network addresses to one or more of the occupancy sensors;

remotely displaying information corresponding to one or more of the addressable occupancy sensors;

remotely controlling one or more operational parameters of one or more of the addressable occupancy sensors during a first time period;

locally controlling the one or more operational parameters of the one or more addressable occupancy sensors during a second time period;

storing one or more operational parameters of the occupancy sensors within the corresponding occupancy sensors; and remotely updating one or more of the operational parameters of the corresponding occupancy sensors;

wherein the operational parameters comprise information representative of an operating schedule and floor plan information for the corresponding occupancy sensor.

\* \* \* \* \*